(12) United States Patent
Mueck

(10) Patent No.: US 12,101,634 B2
(45) Date of Patent: Sep. 24, 2024

(54) TECHNOLOGIES FOR RADIO EQUIPMENT CYBERSECURITY AND MULTIRADIO INTERFACE TESTING

(71) Applicant: Intel Corporation, Santa Clara, CA (US)

(72) Inventor: Markus Dominik Mueck, Unterhaching (DE)

(73) Assignee: Intel Corporation, Santa Clara, CA (US)

( * ) Notice: Subject to any disclaimer, the term of this patent is extended or adjusted under 35 U.S.C. 154(b) by 251 days.

(21) Appl. No.: 17/485,111

(22) Filed: Sep. 24, 2021

(65) Prior Publication Data
US 2022/0038902 A1    Feb. 3, 2022

Related U.S. Application Data

(60) Provisional application No. 63/130,016, filed on Dec. 23, 2020, provisional application No. 63/113,759, filed on Nov. 13, 2020, provisional application No. 63/113,764, filed on Nov. 13, 2020.

(51) Int. Cl.
H04W 12/12 (2021.01)
H04B 17/24 (2015.01)

(52) U.S. Cl.
CPC ............ *H04W 12/12* (2013.01); *H04B 17/24* (2015.01)

(58) Field of Classification Search
CPC .. H04B 17/24; H04B 17/345; H04B 17/3913; G06F 21/57; H04W 12/06; H04W 52/42; H04W 24/08; H04W 12/12; H04W 12/108; H04W 52/367; H04W 12/121; H04W 8/265; H04W 12/08; H04W 24/02; H04W 24/04; H04K 1/00; H04L 63/1433; H04L 63/162
See application file for complete search history.

(56) References Cited

U.S. PATENT DOCUMENTS

2015/0178112 A1*  6/2015  Ivanov ................... G06F 21/64
                                                     718/1

OTHER PUBLICATIONS

"Reconfigurable Radio Systems (RRS); Mobile Device (MD) information models and protocols; Part 1: Multiradio Interface (MURI)", Jun. 2018, 34 pages, ETSI EN 303 146-1 V1.3.1, France.
"Reconfigurable Radio Systems (RRS); Mobile Device (MD) information models and protocols; Part 2: Reconfigurable Radio Frequency Interface (RRFI)", Jun. 2016, 35 pages, ETSI EN 303 146-2 V1.2.1, France.
"Reconfigurable Radio Systems (RRS); Mobile Device (MD) information models and protocols; Part 3: Unified Radio Application Interface (URAI)", Jun. 2018, 33 pages, ETSI EN 303 146-3 V1.3.1, France.

(Continued)

*Primary Examiner* — Fred A Casca
(74) *Attorney, Agent, or Firm* — Hanley, Flight & Zimmerman, LLC

(57) ABSTRACT

The present disclosure is related to reconfigurable radio equipment and edge computing, and in particular, to technologies for cyber security and radio equipment supporting certain features ensuring protection from fraud, and testing interfaces related to reconfigurable radio equipment. Other embodiments may be described and/or claimed.

20 Claims, 32 Drawing Sheets

(56) References Cited

OTHER PUBLICATIONS

"Reconfigurable Radio Systems (RRS); Mobile Device (MD) information models and protocols; Part 4: Radio Programming Interface (RPI)", Apr. 2017, 39 pages, ETSI EN 303 146-4 V1.1.2, France.
"Reconfigurable Radio Systems (RRS); Radio Equipment (RE) reconfiguration requirements", Jun. 2020, 23 pages, ETSI EN 303 641 V1.1.2, France.
"Reconfigurable Radio Systems (RRS); Radio Equipment (RE) reconfiguration architecture", Jun. 2020, 89 pages, ETSI EN 303 648 V1.1.2, France.
"Reconfigurable Radio Systems (RRS); Radio Equipment (RE) information models and protocols for generalized software reconfiguration architecture; Part 1: generalized Multiradio Interface (gMURI)", Jun. 2020, 34 pages, ETSI EN 303 681-1 V1.1.2, France.
"Reconfigurable Radio Systems (RRS); Radio Equipment (RE) information models and protocols for generalized software reconfiguration architecture; Part 2: generalized Reconfigurable Radio Frequency Interface (gRRFI)", Jun. 2020, 36 pages, ETSI EN 303 681-2 V1.1.2, France.
"Reconfigurable Radio Systems (RRS); Radio Equipment (RE) information models and protocols for generalized software reconfiguration architecture; Part 3: generalized Unified Radio Application Interface (gURAI)", Jun. 2020, 32 pages, ETSI EN 303 681-3 V1.1.2, France.
"Reconfigurable Radio Systems (RRS); Radio Equipment (RE) information models and protocols for generalized software reconfiguration architecture; Part 4: generalized Radio Programming Interface (gRPI)", Jun. 2020, 42 pages, ETSI EN 303 681-4 V1.1.2, France.
"Reconfigurable Radio Systems (RRS); Radio Equipment (RE) reconfiguration architecture", Jan. 2020, 82 pages, ETSI TS 103 648 V1.1.1, France.
Thoralf Czichy, "5G RAN optimization using the O-RAN software community's RIC (RAN Intelligent Controller)" Sep. 23, 2019, 23 pages.
"Member States publish a report on EU coordinated risk assessment of 5G networks security", Oct. 9, 2019, 2 pages, Brussels.
NIS Cooperation Group, "Cybersecurity of 5G networks EU Toolbox of risk mitigating measures", Jan. 2020, 45 pages.
NIS Cooperation Group, "EU coordinated risk assessment of the cybersecurity of 5G networks", Oct. 9, 2019, 33 pages.
National Institute of Standards and Technology, "Framework for Improving Critical Infrastructure Cybersecurity", Apr. 16, 2018, 55 pages, Version 1.1.
NIST Cyber, "The Cybersecurity Framework", Oct. 2019, 12 pages, Version 1.1.
O-RAN Alliance, "O-RAN Working Group 3 Near-Real-time RAN Intelligent Controller Near-RT RIC Architecture", 2020, 19 pages, ORAN-WG3.RICARCH-v01.00.00.
"Reconfigurable Radio Systems (RRS); Radio Interface Engine (RIE); Part 2: Architecture", Nov. 2020, 17 pages, Draft ETSI TS 103 655-2 V0.0.7. France.
Extended European Search Report mailed Mar. 3, 2022 for European Patent Application No. 21199611.1, 12 pages.
"Reconfigurable Radio Systems (RRS); Mobile Device Information Models and Protocols; Part 1: Multiradio Interface (MURI)", ETSI EN 303 146-1 v1.1.2 (Jul. 2015), 34 pages.
"Reconfigurable Radio Systems (RRS); Radio Equipment (RE) information models and protocols for generalized software reconfiguration architecture; Part 3: generalized Unified Radio Application Interface (gURAI)", ETSI EN 303 681-3 v1.1.2 (Jun. 2020), 32 pages.

* cited by examiner

TECHNOLOGIES FOR RADIO EQUIPMENT CYBERSECURITY AND MULTIRADIO INTERFACE TESTING

RELATED APPLICATIONS

The present application claims priority to U.S. Provisional App. No. 63/113,759 filed Nov. 13, 2020 ("[AC8304-Z]"), U.S. Provisional App. No. 63/113,764 filed Nov. 13, 2020 ("[AD3395-Z]"), and U.S. Provisional App. No. 63/130,016 filed Dec. 23, 2020 ("[AD4381-Z]"), the contents of each of which are hereby incorporated by reference in their entireties.

TECHNICAL FIELD

Embodiments described herein generally relate to cybersecurity, edge computing, network communication, and communication system implementations, and in particular, to technologies for radio equipment cyber security and radio equipment supporting certain features ensuring protection from fraud.

BACKGROUND

The DIRECTIVE 2014/53/EU OF THE EUROPEAN PARLIAMENT AND OF THE COUNCIL of 16 Apr. 2014 ON THE HARMONIZATION OF THE LAWS OF THE MEMBER STATES RELATING TO THE MAKING AVAILABLE ON THE MARKET OF RADIO EQUIPMENT AND REPEALING DIRECTIVE 1999/5/EC (hereinafter the "Radio Equipment Directive" or "[RED]") establishes a European Union (EU) regulatory framework for placing radio equipment (RE) on the market. The [RED] ensures a single market for RE by setting essential requirements for safety and health, electromagnetic compatibility, and the efficient use of the radio spectrum. The RED also provides the basis for further regulation governing some additional aspects. These include technical features for the protection of privacy, and protection of personal data and against fraud. Furthermore, additional aspects cover interoperability, access to emergency services, and compliance regarding the combination of RE and software.

The [RED] fully replaced the existing Radio & Telecommunications Terminal Equipment (R&TTE) Directive in June 2017. Compared to the R&TTE Directive, there are new provisions in the RED which are not yet "activated", but which will be implemented through so-called "Delegated Acts" and/or "Implementing Acts" by the European Commission in the future. Recently, Expert Groups have been set up by the European Commission for various sub-articles of [RED] Article 3 in order to prepare new "Delegated Acts" and "Implementing Acts" regulating equipment using a combination of hardware (HW) and software (SW).

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
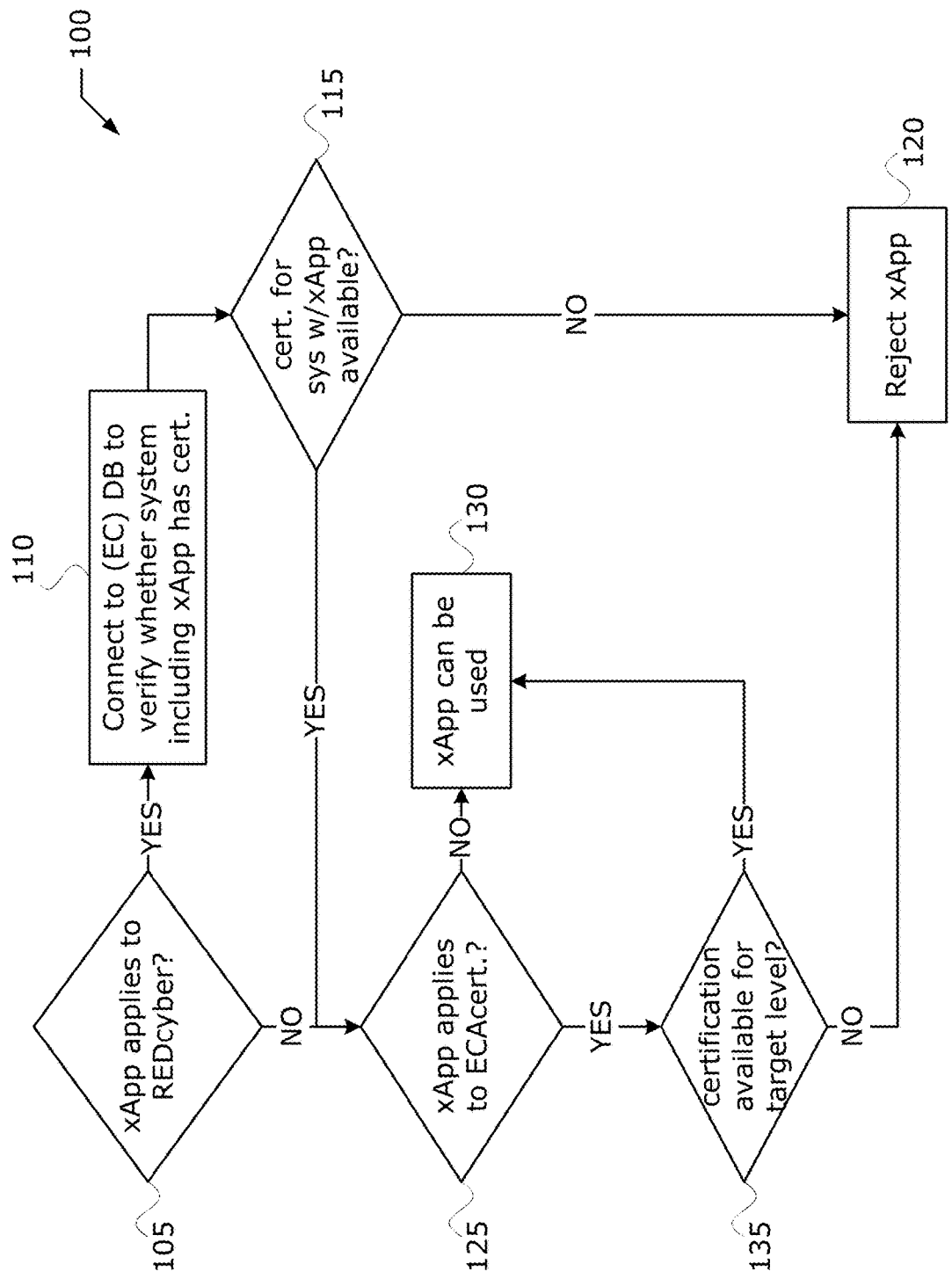
FIG. 1 depicts an example process for identifying a security framework applicable to an application such as an O-RAN xApp.

1. Reconfigurable Radio Equipment and Radio Equipment Directive Aspects

The embodiments herein are related to various aspects of the [RED]. The various embodiments discussed herein are applicable to any kind of wireless/radio equipment and/or components thereof, including, for example, processors/CPUs with (or capable of accessing) connectivity features, mobile devices (e.g., smartphones, feature phones, tablets, wearables (e.g., smart watches or the like), IoT devices, laptops, wireless equipment in vehicles, industrial automation equipment, etc.), network or infrastructure equipment (e.g., Macro/Micro/Femto/Pico Base Stations, repeaters, relay stations, WiFI access points, RSUs, RAN nodes, backbone equipment, routing equipment, any type of Information and Communications Technology (ICT) equipment, any type of Information Technology (IT) equipment, etc.), and systems/applications that are not classically part of a communications network (e.g., medical systems/applications (e.g., remote surgery, robotics, etc.), tactile internet systems/applications, satellite systems/applications, aviation systems/applications, vehicular communications systems/applications, autonomous driving systems/applications, industrial automation systems/applications, robotics systems/applications, etc.). The embodiments introduce hierarchy levels for various types of equipment, for example, network equipment may have a higher hierarchy level as compared to UEs, or vice versa. Depending on the hierarchy level, some equipment may be treated preferably (less delay) or may have access to more information/data than other equipment.

[RED] Article 3 Requirements are not yet "activated". This "activation" requires a Delegated Act and possibly an Implementing Act by the European Commission. The European Commission has created an Expert Group which is working towards the implementation of the sub-articles of [RED] Article 3.

1.1. Radio Equipment Cybersecurity

The present disclosure is related to [RED] Article 3(3)(f), which is about protection of radio equipment against fraud and thus related to Cybersecurity requirements. [RED] Article 3(3)(f) states that radio equipment within certain categories or classes shall be so constructed that it complies with the following essential requirements: "(f) radio equipment supports certain features ensuring protection from fraud." Furthermore, the present disclosure is also relevant to the cybersecurity frameworks that are currently being developed in the U.S. and the European Commission/ENISA such as the National Institute of Standards and Technology (NIST), "Framework for Improving Critical Infrastructure Cybersecurity," v1.1 (16 Apr. 2018) available at: https://nvlpubsnist.gov/nistpubs/CSWP/NIST.CSWP.04162018.pdf ("[NIST]"); the European Commission, "EU coordinated risk assessment of the cybersecurity of 5G networks," Network and Information Systems (NIS) Cooperation Group Report (9 Oct. 2019) available at: https://ec.europa.eu/newsroom/dae/document.cfm?docid=62132 ("[EC1]"); and the European Commission, "Cybersecurity of 5G networks EU Toolbox of risk mitigating measures," NIS Cooperation Group CG Publication (31 Jan. 2020) available at: https://ec.europa.eu/newsroom/dae/document.cfm?docid=64468 ("[EC2]"). Furthermore, the present disclosure is applicable to aspects of the O-RAN alliance, which develops concepts of so called "xApps", which are applications that can be added by 3rd parties to a (e.g., flexible) base station, radio access network (RAN), and/or other access network or network access node (NAN). The O-RAN architecture and aspects of xApps are discussed in more detail infra with respect to FIGS. 26-30.

The present disclosure considers whether xApps (e.g., xApps 2911 of FIG. 29) relate to cybersecurity features, for example, the specific functions introduced by the NIST framework [NIST] and/or [RED] Article 3(3)(f) on cybersecurity (hereinafter referred to as "REDcyber"). The present disclosure solves problems/issues of how to treat the installation of cybersecurity xApps 2911 from 3rd parties depending on whether such xApps 2911 fall under REDcyber or not. Embodiments herein provide mechanisms to differentiate related xApps 2911 and provide corresponding installation procedures.

Currently, the O-RAN alliance introduces the generic principle of adding functionalities to a network access node (NAN) (e.g., NANs 1731-1733 of FIG. 17) using "xApps" 2911 which may be added to a given platform. The concept does implicitly assume that the xApps 2911 do not relate to REDcyber. Existing O-RAN implementations simply leave the responsibility to the final integrator of the product who puts HW and xApps 2911 together and does the final product certification.

The present disclosure complements O-RAN xApp framework 2900 (see e.g., FIG. 2911) and allows for xApps 2911 related to REDcyber and/or other sub-Articles of [RED] Article 3(3), and/or other cybersecurity frameworks. This improves the protection of computer systems and networks from the theft of or damage to hardware, software, or electronic data, as well as from the disruption or misdirection of the services they provide.

According to various embodiments, a "tag" or indicator is introduced in the xApps 2911, which indicates whether the xApp 2911 affects the compliance of the radio product to [RED] (and in particular REDcyber). If such a tag is not available, a security-related entity such as a certificate authority or a European Commission (EC) database (DB) (e.g., a database as defined in [RED] Article 4), is contacted, which provides information on the validity of the corresponding xApp 2911. The xApp 2911 is installed if the xApp 2911 does not relate to [RED] Article 3(3)(f). Otherwise, the DB is contacted as defined by [RED] Article 4 in order to verify whether a full product certification is available including the concerned xApp 2911. If the product certification is available, then the xApp 2911 is accepted and installed.

Furthermore, [NIST] as well as Europe's ENISA (see e.g., [EC1], [EC2]) has currently prepared a cybersecurity framework, and ENISA is expected to reuse many of the NIST findings such as the NIST proposed a mapping of specific security risks to available risk mitigation solutions [NIST]. Table 1 shows aspects of the Identity Management, Authentication and Access Control (PR.AC) components of the [NIST] Framework Core (see e.g., [NIST], pages 29-31).

TABLE 1

An Excerpt from the [NIST] Framework Core

| Function | Category | Subcategory | Informative References |
|---|---|---|---|
| Protect (PR) | Identity Management, Authentication and Access Control (PR.AC): Access to physical and logical assets and associated facilities is limited to authorized users, processes, and devices, and is managed consistent with the assessed risk of unauthorized access to authorized activities and transactions. | PR.AC-6: Identities are proofed and bound to credentials and asserted in interactions | CIS Critical Security Controls for Effective Cyber Defense (CIS CSC), 16 Control Objectives for Information and Related Technology (COBIT 5) DSS05.04, DSS05.05, DSS05.07, DSS06.03 ISA 62443-2-1: 2009 4.3.3.2.2, 4.3.3.5.2, 4.3.3.7.2, 4.3.3.7.4 ISA 62443-3-3: 2013 SR 1.1, SR 1.2, SR 1.4, SR 1.5, SR 1.9, SR 2.1 ISO/IEC 27001: 2013, A.7.1.1, A.9.2.1 NIST SP 800-53 Rev. 4 AC-1, AC-2, AC-3, AC-16, AC-19, AC-24, IA-1, IA-2, IA-4, IA-5, IA-8, PE-2, PS-3 |
| | | PR.AC-7: Users, devices, and other assets are authenticated (e.g., single-factor, multi-factor) commensurate with the risk of the transaction (e.g., individuals' security and privacy risks and other organizational risks) | CIS CSC 1, 12, 15, 16 COBIT 5 DSS05.04, DSS05.10, DSS06.10 ISA 62443-2-1: 2009 4.3.3.6.1, 4.3.3.6.2, 4.3.3.6.3, 4.3.3.6.4, 4.3.3.6.5, 4.3.3.6.6, 4.3.3.6.7, 4.3.3.6.8, 4.3.3.6.9 ISA 62443-3-3: 2013 SR 1.1, SR 1.2, SR 1.5, SR 1.7, SR 1.8, SR 1.9, SR 1.10 ISO/IEC 27001: 2013 A.9.2.1, A.9.2.4, A.9.3.1, A.9.4.2, A.9.4.3, A.18.1.4 NIST SP 800-53 Rev. 4 AC-7, AC-8, AC-9, AC-11, AC-12, AC-14, IA-1, IA-2, IA-3, IA-4, IA-5, IA-8, IA-9, IA-10, IA-11 |

It is expected that xApps 2911 will be created addressing the risk mitigation solutions as identified by [NIST]. However, the usage approach needs to be different in case that the related features falls under REDcyber or not.

According to various embodiments, an xApp stack (e.g., xApp stack 2910 of FIG. 29) is split into two parts, including a first part and a second part. The first part of the xApp stack 2910 comprises xApps 2911 falling under REDcyber, and the second part of the xApp stack 2910 comprise xApps 2911 that do not fall under REDcyber.

Additionally, it is anticipated that Europe's Cybersecurity Act will include a certification for Cybersecurity (hereinafter referred to as an "ECA certification", "ECAcert", etc.). Therefore, xApps 2911 may be differentiated based on whether they do, or do not, fall under the ECAcert. This leads to an additional splitting/dividing of the xApp stack 2910 as shown by Table 2.

TABLE 2 example xApp stack split

| xApp stack part | Applicable to REDcyber | Applicable to ECAcert |
|---|---|---|
| 1 | Yes | Yes |
| 2 | No | Yes |
| 3 | Yes | No |
| 4 | No | No |

In Table 2, the first part (1) of the xApp stack 2910 include xApps 2911 that do fall under REDcyber and under ECAcert; a second part (2) of the xApp stack 2910 include xApps 2911 that do not fall under REDcyber but do fall under ECAcert; a third part (3) of the xApp stack 2910 include xApps 2911 that do fall under REDcyber, but do fall under ECAcert; and a fourth part (4) of the xApp stack 2910 include xApps 2911 that do not fall under REDcyber and do not fall under ECAcert.

Depending on the xApp type (e.g., following the aforementioned categories), the corresponding access to SW changes/updates and parameterization is adapted. For example, the fourth part does not require specific protection, or would only utilize a minimum amount of protection, but the first, second, and third parts would require mechanisms such that no unverified xApps 2911 can be included.

In various embodiments, a corresponding application to REDcyber and/or ECAcert can be indicated using a tag in each xApp 2911. For example, a first tag is used to indicate whether an xApp 2911 falls under REDcyber, and a second tag is used to indicate whether an xApp 2911 falls under ECAcert. The tag may indicate which certificates are available, for example, cybersecurity assessment level basic, substantial, or high as defined in ENISA Cybersecurity Act. The Cybersecurity Act introduces three levels of cybersecurity assessment including basic, substantial, and high. If the xApp 2911 matches the certification for the target cybersecurity level, the xApp 2911 can be accepted and installed. If an xApp 2911 does not fall under either of the security frameworks (e.g., ECAcert and/or REDcyber), then the xApp 2911 can be installed and used without further checking. The checking on ECAcert and REDcyber can be done independently, for example, only if all applicable requirements are fulfilled, the xApp 2911 can be installed, otherwise the xApp 2911 is rejected.

FIG. 1 shows an example process 100 for checking whether an xApp 2911 does or does not fall under a security framework. Process 100 begins at operation 105 where a computing device determines whether an xApp 2911 applies to REDcyber.

If the xApp 2911 does apply to REDcyber, the computing device proceeds to operation 110 connect to a verification entity (e.g., a certificate authority, EC DB, or the like) to verify whether system including the xApp 2911 has a certification, and then proceeds to operation 115 to determine whether a certification for the system including the xApp 2911 is available. If a certification for the system including the xApp 2911 is available, then the computing device proceeds to operation 125 to determine whether the xApp 2911 applies to ECAcert. If a certification for the system including the xApp 2911 is not available, the computing device rejects the xApp 2911 at operation 120.

If at operation 115 the xApp 2911 does not apply to REDcyber, the computing device proceeds to operation 125 to determine whether the xApp 2911 applies to ECAcert. If the xApp 2911 does not apply to ECAcert, the computing device accepts and installs the xApp 2911 at operation 130. If the xApp 2911 does apply to ECAcert, the computing device proceeds to operation 135 to determine whether a certification is available for a target certification level. If no certification is available for the system including the xApp 2911, the computing device rejects the xApp 2911 at operation 120. If a certification is available for the system including the xApp 2911, the computing device accepts and installs the xApp 2911 at operation 130. Process 100 can end or repeat as necessary after operation 120 or 130.

Note that the verification of the tags is sufficient in order to identify whether an xApp 2911 falls under REDcyber or under the ECAcert. Also note that the ECAcert introduces three levels of Cybersecurity assessment: basic, substantial and high. If the xApp 2911 matches the certification for the target cybersecurity level, the xApp 2911 can be accepted and installed.

1.2. Reconfigurable Radio Equipment

Figure 2:
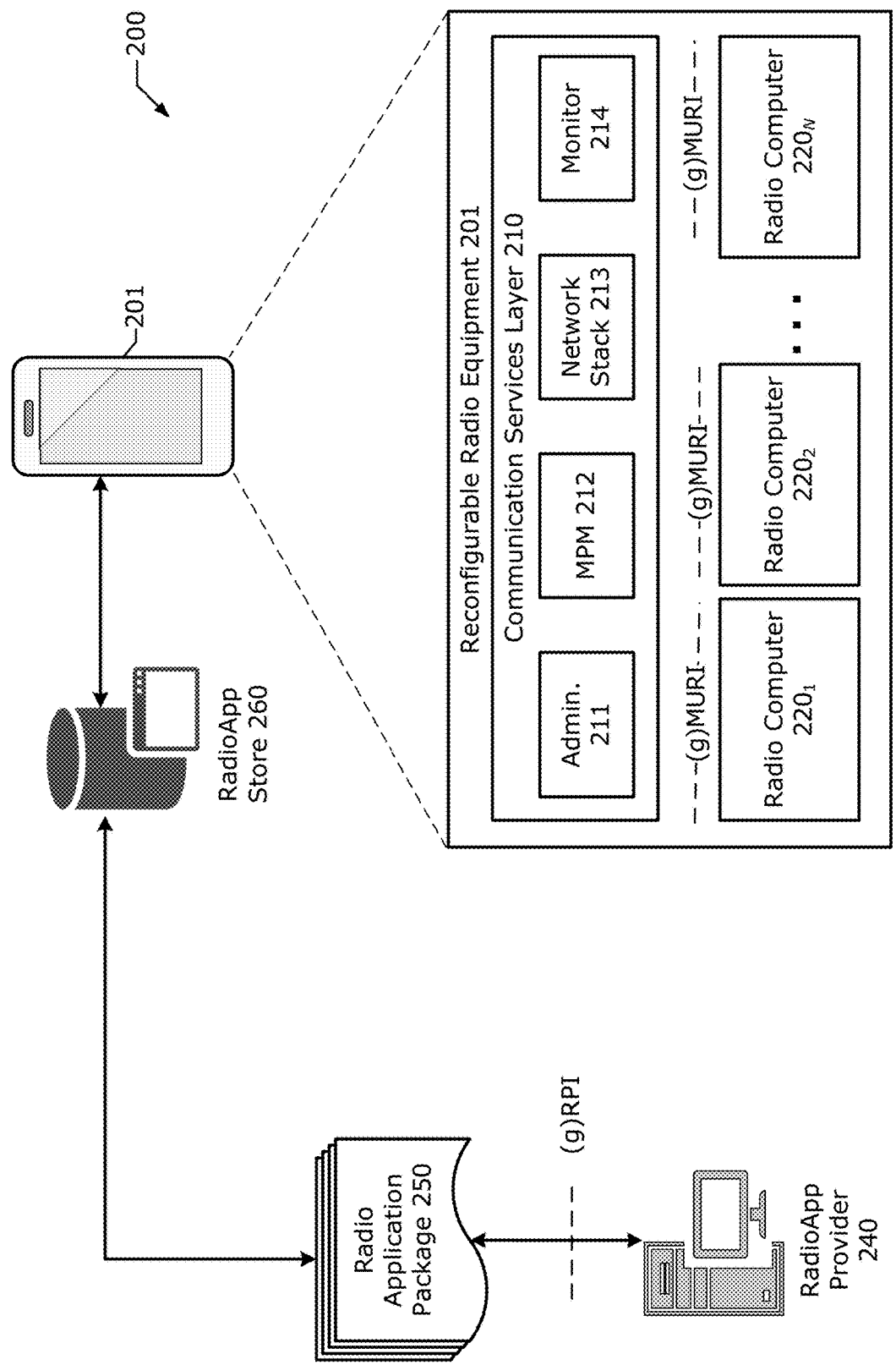
FIG. 2 illustrates an example reconfigurable radio equipment (RRE) architecture.
Figure 3:
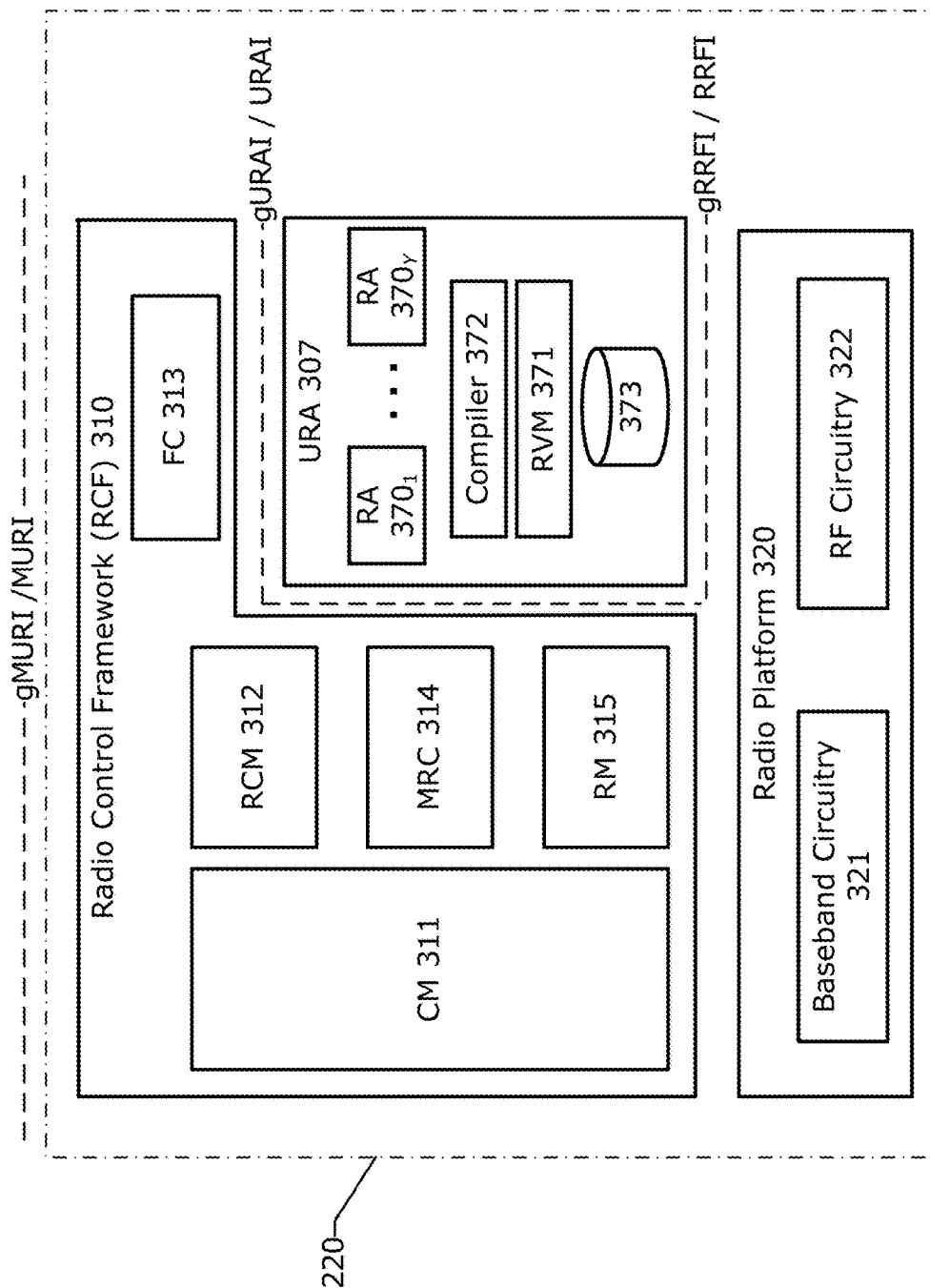
FIG. 3 illustrates an example radio computer architecture.

FIG. 2 shows an example reconfigurable RE (RRE) architecture 200, which includes a the RRE 201 includes a Communication Services Layer (CSL) 210 and one or more radio computers 2201 to 220N (where N is a number) for supporting distributed computations (see e.g., [EN303648]). Components of the radio computers 2201 to 220N (collectively referred to as "radio computers 220" or "radio computer 220") is shown by FIG. 3. The RRE 201 is capable of running multiple radios simultaneously (e.g., radio computers 220), changing the set of radios by loading new Radio Application Packages (RAPs) 250 and setting their parameters. For the specific case of Mobile Device Reconfiguration as given in [EN303095], [EN303146-1] to [EN303146-4], [TR103087], and [TS103436], only a single Radio Computer is used in the target platform.

Each radio computer 220 can execute radio application (RA) code (e.g., code of RA 370 of FIG. 3) including various functional blocks (FBs) of which the granularities might be all different depending upon hardware platform vendors. Depending on the features provided by radio equipment manufacturers, the (3rd party) software manufacturer develops the entire or partial radio application code using the standard programming interfaces shown by FIGS. 2 and 3. A modular software approach is applied in order to maximize the reusability of software components. The evolution of RATs can be supported by adding and/or replacing the FBs on a given hardware platform.

A RAP 250 is a delivery unit of an RA (e.g., RA 370 of FIG. 3), which may, upon execution of the RA 370, reconfigure the radio communications technologies of the RE 201. Additionally or alternatively, an installed RAP 250 can be instantiated, to create one or more RAs to be later executed. The same RAP 250 may potentially be instantiated more than once, and the RA 370 instances may be deleted if not needed. An RA 370 is software that enforces the generation of the transmit radiofrequency (RF) signals or the decoding of the receive RF signals The software is executed on a particular radio platform (e.g., radio platform 320 of FIG. 3) or a radio virtual machine (RVM) (e.g., RVM 371 of FIG. 3) as part of the radio platform 320.

Each RA 370 may have a number of associations which represent logical links to PeerDevices. The creation of an association may be originated by the mobile device or the PeerDevice. Capabilities and other information of the PeerDevice are available through the RadioApplicationMeasurements, but the Association itself may for instance only use part of the possible Capabilities; for this reason there is an associated Profile for each Association. DataFlows are established to carry user data to and from the PeerDevice. For this reason, DataFlows are always attached to an Association, and may also be initiated by the mobile device or the PeerDevice. There is also a Profile for the DataFlows. The Profiles for Associations and DataFlows may for instance inform the multiradio computer about the requirements for the communication link. With a simple "service type" parameter it is possible to distinguish several traffic patterns, like streaming delay tolerant data (e.g. web video streaming), streaming delay sensitive data (e.g. phone call, video call), priority best effort traffic (e.g., mobile gaming, foreground web browsing), and background traffic (e.g., email sync). With identifiers for each flow it is possible to distinguish between different types of traffic, to better support quality of service. All this information can then be used when optimizing the performance of the RATs.

RAs 370 are applications (apps) that may access low-level parameters of REs 201 in order to update or otherwise alter how the RE 201 uses its radio technology or individual radio computer(s) 300. In this example, RE 201 reconfiguration through RAs 370 is implemented via the RadioApp Store 260, which is an extension of the app store concept used for most mobile device platforms, such as smartphones and tablet computers, wherein a user may access an RA 370 from the RadioApp Store 260 through a RPI/gRPI to download and install RAs 370.

RAs 370 may have different forms of representation including, for example, source code including Radio Library 373 calls of Radio Library 373 native implementation and Radio HAL calls; as Intermediate Representations (IRs)

including Radio Library 373 calls of Radio Library 373 native implementation and radio HAL calls; and/or as executable codes for a particular radio platform. All RAs 370 are called Unified Radio Applications (URAs) 307 when they exhibit a common behavior from the RRE's 201 point of view in [EN303648]. A URA 307 is an RA 370 that complies with the RRE framework defined in the present disclosure and/or a suitable standard/specification such as ETSI EN 303 681-3 V1.1.2 (2020 March) ("[EN303681-3]") and/or the like. In order to run multiple URAs 307, the RRE 201 includes CSL 210 and one or more radio computers 300, each of which includes a Radio Control Framework (RCF) (see e.g., radio platform 310 of FIG. 3) and Radio Platform (see e.g., radio platform 320 of FIG. 3).

The CSL 210 is a layer related to communication services supporting generic applications. The CSL 210 supports generic applications like Internet access, enterprise network access, and/or the like. The CSL 210 introduces functionalities for the (de-)installation, selection and configuration of software components and the management of the data flows (see e.g., [EN303648]). The CSL 210 includes Administrator entity (admin) 211, Mobility Policy Manager entity (MPM) 212, a networking stack entity (NetStack) 213, and a monitor entity 214.

The admin 211 may request installation or uninstallation of URAs 307, and create or delete instances of URAs 307. This includes provisioning information about the URAs 307, URA 307 statuses, and/or other like URA-related information. Additionally, the admin 211 includes two sub-entities: an Administrator Security Function (ASF) and an RRS Configuration Manager (RRS-CM). The ASF is sub-entity of the admin 211 on the device end-point responsible for ensuring confidentiality, integrity, and authenticity of assets such as the RE Configuration Policy, and RAP(s), and supporting the non-repudiation, remote attestation, and configuration enforcement strategies. This may include direct and indirect interactions related to security with the Radio-App Store 260 and other security related entities associated with the RadioApp Store 260. In addition to supporting operations related to asset protection, the ASF acts as a proxy to other security functions on the platform, as detailed in [TR103087]. The RRS-CM is sub-entity of the admin 211 in charge of long-term management as discussed in clause 11 of [TR103087]. In case that a snapshot function is required, the admin 211 may store relevant RAPs, their configuration parameters and information on the URA 307 installation and execution history. When required, the same steps can be executed by the admin 211 to fall back to a previous snapshot.

The MPM 212 includes functions for monitoring of the radio environments and RE capabilities, functions for requesting activation or deactivation of URA 307, and functions for providing information about URA 307 lists. The MPM 212 also makes selections among different RATs and discover peer communication equipment and arrangement of associations. Here, the "association" is a logical communication link to a RAN or a peer equipment. Some control signaling may be necessary to maintain the association, and no user data transfer may occur with only an association present, but a data flow may be established into an association for this purpose. Additionally, "peer equipment" refers to any communication counterpart of a RRE 201, which can be reached by establishing a logical communication link (e.g., an association) between the RRE 201 and peer equipment. In addition, the MPM 212 may request a computational/spectral load balancing among baseband processors (e.g., baseband circuitry 321 of FIG. 3) and RF transceivers (e.g., RF circuitry 322 of FIG. 3) in one or more radio platforms (e.g., radio platform 320 of FIG. 3) when the number of baseband processors and RF transceivers in radio platform exceeds one. The requirement for computational and/or spectral resources varies depending on the situation of each base station in the case of network application. For example, the required traffic of each base station can rapidly and unexpectedly vary due to natural disasters, sports games, accidents, etc. When the RRE 201 is shared with multiple stakeholders (e.g., multiple network operators share a single network infrastructure), the policy of using both computational and spectral resources may have to be controlled for a desired performance requirement at each operation.

The NetStack 213 includes functions for sending and receiving user data. The NetStack 213 translates radio computer identifiers (IDs) to corresponding target network addresses, and vice versa. The NetStack 213 also manages data flows for basic TX/RX operation. The requirement is described in clause 6.2.4 of [EN303641]. The monitor 214 includes functions to transfer information from URAs 307 to user or proper destination entities in the RE 201. In addition, in case that distributed computation is applied, the monitor 214 receives the computational/spectral resource usage status. In some implementations, a non-real time OS is used for execution of the admin 211, MPM 212, NetStack 213, and monitor 214 which are part of the CSL 210 as described previously.

A Radio Controller (RC) is a functional component of an RA 370 for transferring context information from corresponding RAs to monitor. The RC in an RA 370 ensures the availability of context information (see e.g., clause 6.2.5 of [EN303641]). An RC, which may operate in computational resources in non-real-time, accesses RAs which operates in radio computer in real time. The monitor 214, to which the context information is transferred using an RC, provides context information to the admin 211 and/or MPM 212 for application(s) to be performed using the context information, for example, terminal-centric configuration.

Figure 4:
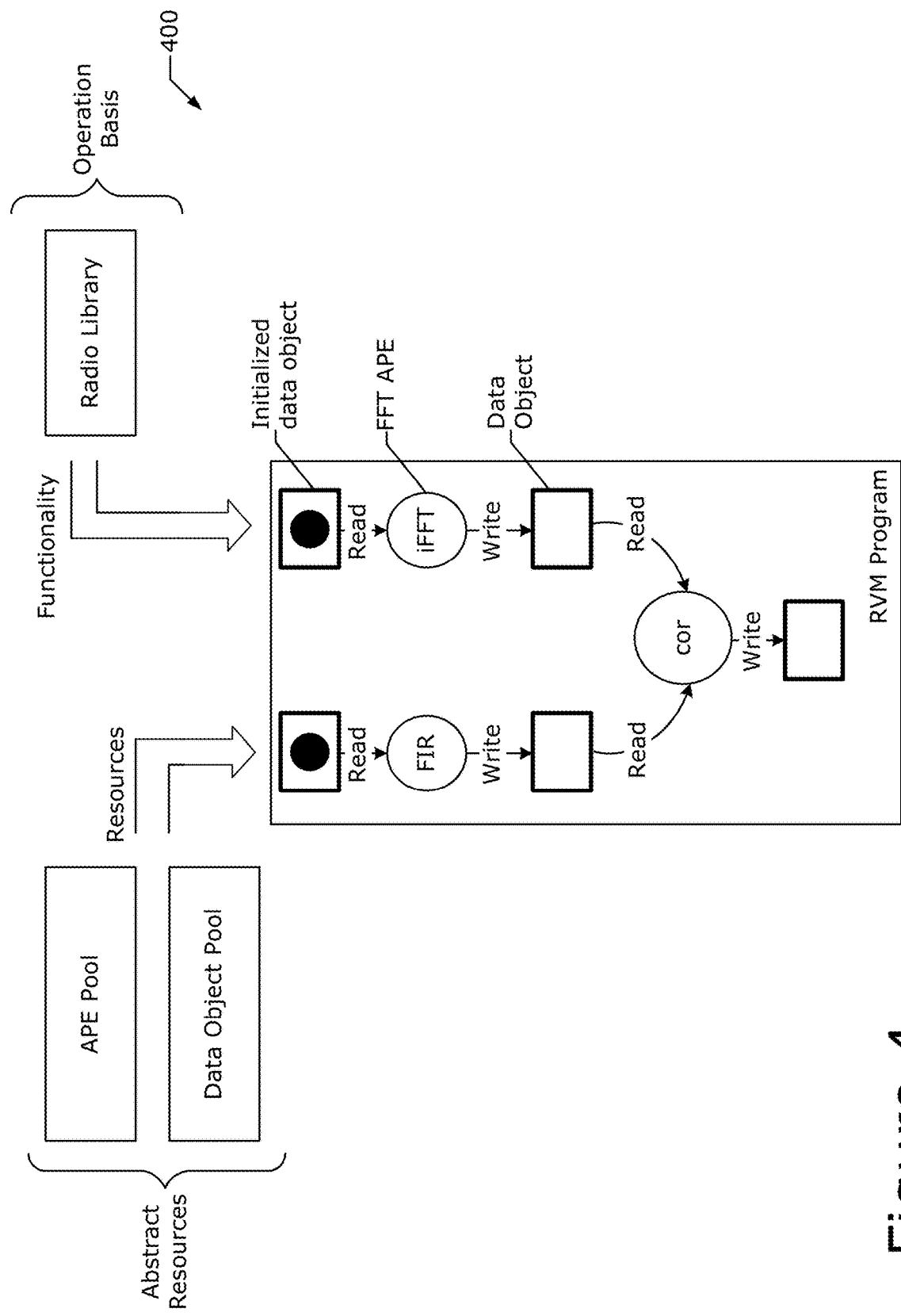
FIG. 4 illustrates a conceptual view of a radio virtual machine (RVM) processing.

A radio computer 220 is the part of the RE 201 hardware working under operating system (OS) control and on which RAs are executed. The part of RE 201 hardware working under OS control and on which applications, among others, are executed are referred to as "computational resources". The operation of Computational Resources is performed by a given OS, which is performed on non-real-time basis, whereas radio computer(s)'s 220 operation is performed by another OS, which should support real-time operations of URA 307. The OS of radio computer(s) 220 is referred to as a Radio OS (ROS) and/or Real-time OS (RTOS) in the present disclosure and can belong to its own radio computer 220. An ROS or RTOS as used herein may refer to any appropriate OS empowered by RCF 310 and may provide RCF capabilities as well as traditional management capabilities related to management of RP such as resource management, file system support, unified access to hardware resources, etc. The radio computer(s) 300 include the following components: an ROS and/or RTOS and the five entities of the RCF 310, specified in clause 4.2.3 of [EN303648] and discussed infra with respect to FIG. 3, are classified into two groups. One group relates to real-time execution and the other group to non-real-time execution as shown by FIG. 4.3.1-1 of [EN303648]. The particular entities of the RCF interface related to real-time and non-real-time execution, can be determined by each vendor. The ROS/RTOS enables management of timing constraints and provides interface between URA 307 and the radio platform 320. The requirements are described in clauses 6.4.9 and 6.2.6 of [EN303641]. Other aspects of the radio computer(s) 220 are discussed in [EN303648].

The RRE 201 also includes four sets of interfaces or reference points that interconnect the various elements/components of the RRE 201. These interfaces include the Multiradio Interface (MURI) (see e.g., [EN303146-1]) and/or generalized MURI (gMURI) (see e.g., [EN303681-1]) (collectively referred to herein as the "(g)MURI") between the CSL 210 and an RCF 310 (see e.g., FIG. 3); the Unified Radio Application Interface (URAI) (see e.g., [EN303146-3]) and/or generalized URAI (gURAI) (see e.g., [EN303681-3]) (collectively referred to herein as the "(g)URAI") between the RCF 310 and URA 307 (see e.g., FIG. 3); and the Reconfigurable Radio Frequency Interface (RRFI) (see e.g., [EN303146-2]) and/or generalized RRFI (gRRFI) (see e.g., [EN303681-2]) (collectively referred to herein as the "(g)RRFI") between a URA 307 and RF transceiver(s) 322 (see e.g., FIG. 3). These interfaces are discussed in more detail infra.

The architecture 200 also includes a radio programming interface (RPI) (see e.g., [EN303146-4])/generalized RPI (gRPI) (see e.g., [EN303681-4]) (collectively referred to herein as the "(g)RPI"). The (g)RPI is an interface/reference point allowing an independent and uniform production of RAs 370 (see e.g., [EN303681-4]). For example, a Radio-App provider 240 (e.g., an RA developer, etc.) may produce one or more RAs 370 and/or RAPs 250, which may be provided to the RadioApp store 260. One or more RAPs 250 may be provided to the RadioApp Store 260 via the (g)RPI, and the RE 201 may request and download RAPs 250 generated by the RadioApp provider 240 from the RadioApp Store 260 via a predetermined link or resource. A RAP 250 may contain a URA 307, which is controlled by the RCF 310 and executed on any type of hardware components (e.g., FPGAs, DSPs, ASICs, CPUs, etc.) of a radio platform 320. The RRE 201 is capable of running multiple radios simultaneously and of changing the set of radios by loading new RAPs 250. While a RAP 250 may provide an entire novel RAT to a target radio equipment, it is also possible that a RAP 250 replaces one or several components of an existing (hardwired) RAT implementation. For such a selected replacement of existing (hardwired) RAT components, a Radio Library 373 will provide an SFB which provides interfaces to (3rd party) software developers for accessing the (hardwired) RAT internal interfaces.

1.2.1. Radio Computer Architecture

FIG. 3 shows an example radio computer architecture 300 or an individual radio computer(s) 220 of FIG. 2 (note that a radio computer 220 in FIG. 2 may also be referred to as radio computer 300 in the present disclosure). The radio computer 300 may correspond to the communication subsystem 3212 of FIG. 32, the communication circuitry 3366 of FIG. 33, or the communication circuitry of any other device discussed herein. The radio computer architecture 300 includes an RCF 310, a URA 307, and a radio platform 320.

The RCF 310 is control framework which, as a part of the OS (e.g., ROS, RTOS, and/or platform/application OS), extends OS capabilities in terms of radio resource management. The RCF 310 provides a generic environment for the execution of URA 307, and a uniform way of accessing the functionality of the radio computer 300 and individual RAs 370. The RCF 310 is communicatively coupled with the CSL 210 via the (g)MURI. The RCF 310 manages the actual software execution through a number of functionalities discussed in [EN303648].

The CSL 210 and RCF 310 interact with each other using the (g)MURI, where each radio computer 300 may include or be connected with a respective (g)MURI. These interactions may also be applicable to the (g)MURI. The (g)MURI supports three kinds of services: administrative services, access control services, and data flow services (see e.g., FIG. 7 discussed infra).

The RCF 310 is a control framework that includes Configuration Manager entity (CM) 311, Radio Connection Manager entity (RCM) 312, Flow Controller entity (FC) 313, and Multiradio Controller entity (MRC) 314. The RCF 310 may also include a Resource Manager entity (RM) 315, however in some implementations the RM 315 is part of an OS (e.g., ROS, RTOS, and/or platform/application OS). The CM 311 includes functions for installing/uninstalling and creating/deleting instances of URA 307 as well as management of and access to the radio parameters of the URA 307. The RCM 312 includes functions for activating/deactivating URA 307 according to user requests, and to management of user data flows, which can also be switched from one RA 370 to another RA 370. A "data flow" refers to a logical channel between the FC 313 and the URA 307 created by the FC 313 to send to or receive data elements (octets, packets or other granularity) from the URA 307. The FC 313 includes functions for sending and receiving user data packets and controlling the flow of signaling packets (e.g., data flows and the like). The MRC 314 include at least functions to schedule the requests for radio resources issued by concurrently executing URA 307, and to detect and manage the interoperability problems among the concurrently executed URA 307. In addition, for distributed computation cases, the MRC 314 includes a function to report spectral resource usage status. The RM 315 includes functions to manage the computational resources, to share them among simultaneously active URA 307, and to guarantee their real-time execution. In addition, for distributed computation cases, RM 315 includes a function to report computational resource usage status. A distributed computation case is a computational model in which components located on networked computers communicate and coordinate their actions by passing messages interacting with each other in order to achieve a common goal.

The RCF 310 may represent functionalities provided by the radio computer 300, and may require all RAs 370 to be subject to a common reconfiguration, multiradio execution and resource sharing strategy framework depending on the concerned Radio Equipment Reconfiguration Class (RERC). Since all RAs 370 exhibit a common behavior from the RRE perspective, those RAs 370 are called URAs 307. The services relate to activation and deactivation, peer equipment discovery and maintenance of communication over user data flows are provided at the (g)URAI, which is an interface between the URA 307 and the RCF 310. The URA 307 represents the software downloaded and installed onto the target platform as in discussed in [EN303648]. A URA 307 includes one or more RAs, and a plurality of RAs 370 370 may be referred to as URA 307 when the RAs 370 exhibit common attributes, characteristics, or requirements related to the reconfiguration of the MD. As used herein, "URA" may be used interchangeably with "RA". An "RA" may also be referred to as "RA component(s)", "RRS component(s)", and the like.

The services provided by the URA 307 may be related to activation and deactivation, peer equipment discovery, and/or maintenance of communication over user data flows, which may be provided at the URAI/gURAI interface between the URA 307 and the RCF 310. In some cases, these services may be provided to the CSL 210 via the (g)MURI between the RCF 310 and the CSL 210.

Figure 32:
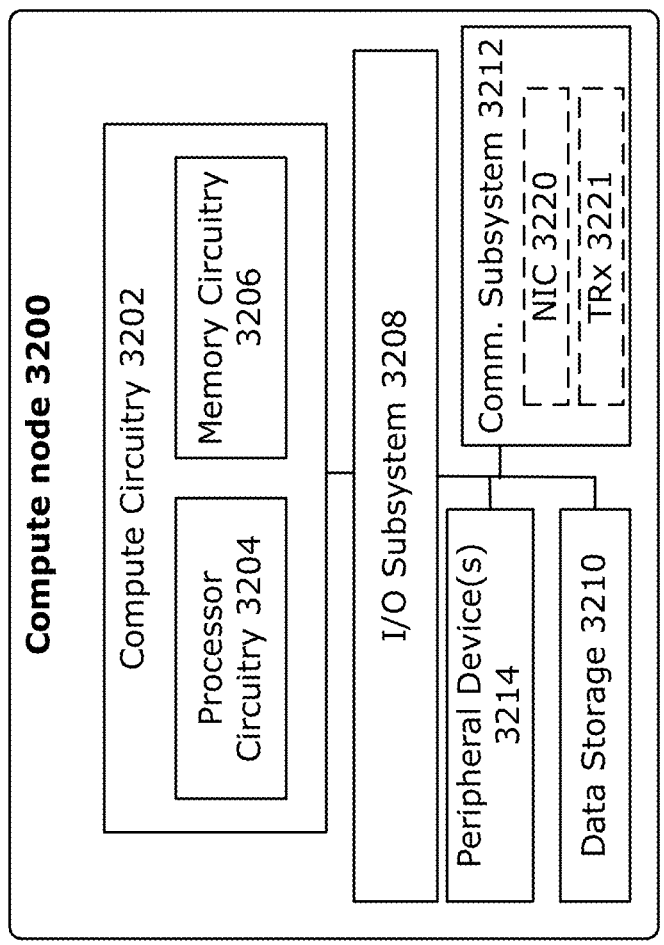
FIGS. 32 and 33 depict example components of various compute nodes in edge computing system(s).

The RAs 370 (including RA 3701 to RA 370y, where Y is a number) are applications that, when executed by one or more processors (e.g., baseband circuitry 321 or the processor circuitry discussed infra with respect to FIGS. 32 and/or 33) may control generation and transmission of transmit (Tx) RF signals, control receipt of receive (Rx) RF signals, and the decode the Rx RF signals. The RAs 370 may be executed/operated in an RVM 371 that is part of the radio platform 320.

The RVM 371 is a controlled execution environment that allows RAs 370 to access low-level radio parameters. The RVM 371 may be an abstract machine independent of the hardware, which is capable of executing configcodes. In some implementations, the RVM 371 may be an abstract machine that can be configured by configcodes into an RA 370. The implementation of the RVM 371 is radio computer-specific and may include a compiler 372 (e.g., a front-end compiler or back-end compiler), which may provide Just-in-Time (JIT) or Ahead-of-Time (AOT) compilation of configcodes into executable codes.

The RAs 370 may have different forms of representation including, for example, source codes (also referred to as "RA codes"), intermediate representations (IRs), and executable codes for a particular radio platform. The RAs 370 may comprise RA codes including of User Defined Functional Blocks (UDFBs), Standard Functional Blocks (SFBs), radio controller (RC) codes, and/or executable codes depending on RA design choice and/or executable codes for a particular radio platform. The RAs 370 may comprise RA codes including Functional Blocks (FBs), radio controller (RC) codes, and/or executable codes depending on the RA design choice.

An FB is a function needed for real-time implementation of RA(s) 370. An FB includes not only the modem functions in L1, L2, and L3 but also all the control functions that should be processed in real-time for implementing given RA(s) 370. FBs are categorized into SFBs and UDFBs. SFBs can be shared by many RAs 370. Examples of SFBs include Forward Error Correction (FEC), Fast Fourier Transform (FFT)/Inverse Fast Fourier Transform (IFFT), (de)interleaver, Turbo coding, Viterbi coding, Multiple Input Multiple Output (MIMO), Beamforming, and other like category of SFBs. UDFBs include FBs that are dependent upon a specific RA 370. UDFBs are used to support special function(s) required in a specific RA 370 and/or to support a special algorithm used for performance improvement. In addition, a UDFB can be used as a baseband controller functional block, which controls the functional blocks operating in baseband processor in real-time and to control some context information processed in real-time.

In some implementations, an RA 370 may be expressed as a set of interconnecting SFBs together with one or more UDFBs. In some implementations, a radio library 373 may include some or all of the SFBs, and the SFBs to be provided from the radio library 373 may be represented in a platform-independent normative language. The native implementation of the Radio Library 373 may be provided as platform-specific codes of the SFBs for the radio platform 320. The Radio Library 373 may be located in the radio computer circuitry 300, and in some implementations, the Radio Library 373 may be a part of the RVM 371. The RC codes may be used to send context information to the monitor 214 and send/receive data to/from the net stack 213. The RC codes may be executed in a non-real-time environment (e.g., application/host circuitry of the UE/RE 201), and the remaining portion of the RAs 370 may be executed in the real-time environment (e.g., the radio platform 320).

SFBs are implemented through a Radio Hardware Abstraction Layer (RHAL) when the SFB is implemented on dedicated HW accelerators. SFBs are classified into two groups, those requiring dedicated hardware accelerators and those not requiring dedicated hardware accelerators. In case that a hardware accelerator is used, it is accessed through the RHAL. In the other case, platform specific code is provided for the concerned SFB by the Radio Library 373. When executable code is provided, the SFBs and UDFBs needed to perform a given URA 307 are already bound in the executable configcodes of URA 307. When source code(s) or IR is/are provided, the UDFBs needed to perform a given URA 307 are included in the configcodes of the URA 307 and are compiled for Source Code (by the Compiler) or IR (by the Back End Compiler), respectively (see e.g., [EN303648]).

The RHAL is part of the ROS. The RHAL abstracts the radio platform 320 and supports SFBs to be implemented using one or more hardware accelerators (e.g., FPGAs, CPLDs, programmable ASICs, programmable SoCs, etc.) in order for each of those SFBs to be implemented directly on corresponding hardware accelerator(s). In some implementations, the RHAL is platform specific and is not standardized.

Compiling the source codes of an RA 370 may yield configcodes. When an RA provider develops high level code based on a target platform (e.g., radio platform 320), a result of compiling the RA source codes or URA 307 codes is configcodes that is executable on the target platform (e.g., radio platform 320). In addition, the RE 201 may support different types of RA source codes or URA 307 codes wherein some RAs 370 and/or URA 307 may run directly on the ROS as executable codes while others may run as an RVM 371 configured by configcodes. When the RA provider develops high level code without considering a target platform, a result of front-end compiling of RA source codes is an IR, which may be back-end compiled for operating on a specific target platform. In this case, the configcodes may be configuration codes of an RVM 371 instance. Back-end compilation may occur within the radio computer circuitry 300 or by a cloud computing service.

In some implementations, the RE 201 may include a shadow radio platform, or may interact with a cloud based shadow radio platform. The shadow radio platform is a platform where configcodes can be directly executed when it corresponds to the target radio platform or, when it corresponds to an RVM 371, compiled and executed. If the shadow radio platform corresponds to the target radio platform, then a front-end compiler will generate the executable code for the target radio platform and configcodes are equivalent to the executable code for that radio platform.

An RA provider may generate an RAP 250, which may be a delivery unit of an RA 370 from the RadioApp Store 260 to the RE 201. As used herein, the term "RAP" may be used interchangeably with RA 370 and may be referred to as RAP 250. A RAP 250 may include RA codes of an RA 370 and configuration metadata for the RE 201. The metadata may include RPI/gRPI information, which is a descriptive interface detailing how the RA 370 is structured and how its sub-components are synchronized together; bindings to the hardware abstraction layer (HAL), when applicable; bindings to linkable libraries, when applicable; and a pipeline configuration. RAPs 250 may be provided to the RadioApp Store 260 via the RPI/gRPI, and the RE 201 may request and download RAPs 250 generated by an RA provider from the RadioApp Store 260 via a predetermined link. The configuration metadata may include a DoC that is associated with the RE 201 and also indicates installation parameters of the RA 370 component included in the RAP 250. In other embodiments, the DoC may be separate from the RAP 250, but provided to the RE 201 in a same digital signature as the RAP 250. In other embodiments, the DoC may be access from a remote resource.

In some implementations, the RE 201 may compile a RAP 250 to generate executable code for the radio platform 320. In such implementations, URA 307 configcodes may be downloaded to the radio computer circuitry 300 in the form of source code or IR, and may be transformed into corresponding executable code through the compiler 372. Where URA 307 configcodes are source codes or IR, the source codes or IR may be compiled at a RE 201 or compiled by a cloud computing service. When the compilation process is performed by a cloud computing service (not within the radio computer), the URA 307 configcodes may be downloaded into the radio computer circuitry 300 in the form of executable code as a result of the compilation at the cloud (not shown). In this case, the compiler 372 and radio library 373 may not be included in the RE 201, and instead, the vendor of the radio platform 320 may provide the compiler 372 and the radio library 373 at the cloud in accordance with the radio platform 320.

The radio platform 320 is the part of RE 201 hardware that relates to radio processing capability, including programmable hardware components, hardware accelerators, RF transceiver, and antenna(s). The radio platform 320 comprises hardware capable of generating RF signals or receiving RF signals, including baseband and RF processing. By nature, it is heterogeneous hardware including different processing elements such as fixed accelerators (e.g., ASICs, or reconfigurable accelerators such as FPGAs, programmable SoCs, etc.). In case of multiple radio computers 300, there is an independent radio platform 320 for each of the radio computers 300.

The radio platform 320 comprises baseband circuitry 321 and radiofrequency (RF) circuitry 322 (also referred to as "RF transceiver 322" or "TRx 322"). The baseband circuitry 321 comprises processor circuitry that may implement one or more layer operations that are "below" layer operations of a network protocol stack 213. These operations may include, for example, PHY operations, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The TRx 322 is the part of radio platform 320 that converts baseband signals from the baseband circuitry 322 into radio signals for transmission, and converts received radio signals into baseband signals for processing by the baseband circuitry 322. The TRx 322 manages input/output signals from/to one or several RAs 370. Several RAs 370 that are simultaneously in active state may be served by one or multiple TRx(s) 322. The (g)RRFI is an interface between the URA 307 and the TRx(s) 322. This interface enables the exchange of control and data information between the RAs 370 and the TRx 322.

Figure 33:
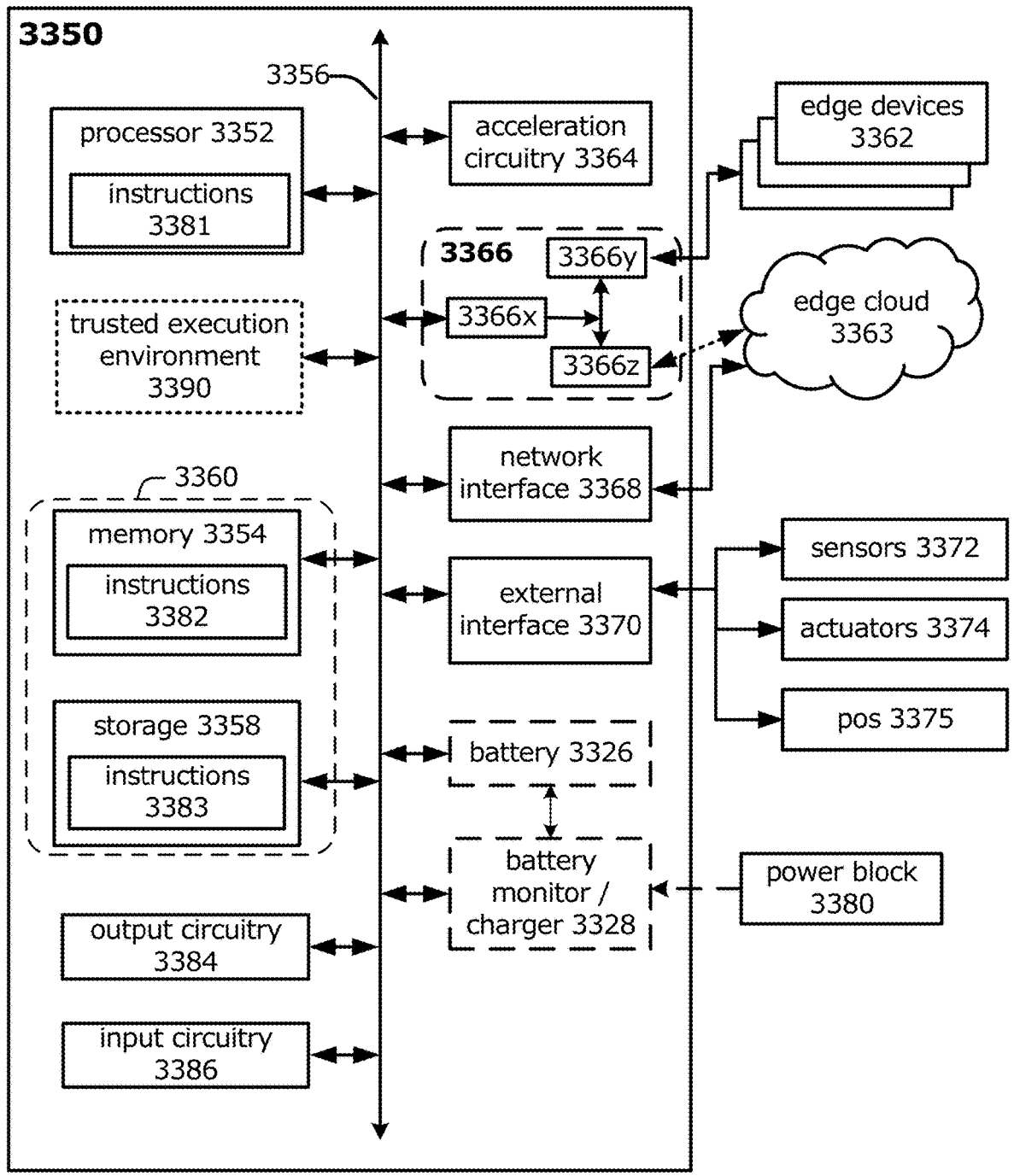

The baseband processor(s) 321 may be the same or similar to the baseband processing circuitry and/or communication circuitry 3366 of FIG. 33 and TRx(s) 322 may be the same or similar to radio front-end module (FEM) circuitry and/or radio IC circuitry and/or comm subsystem 3212 of FIG. 32. In some implementations, the baseband circuitry 321 and/or RF circuitry 322 may include hardware elements such as digital signal processors (DSPs), Application Specific Integrated Circuit (ASICs), a field-programmable gate array (FPGAs), radio-frequency integrated circuits (RFICs), and/or other hardware element.

Referring back to both FIGS. 2 and 3, the CSL 210 communicates with one or multiple Radio Computers through the MURI/gMURI interface(s) as defined in [EN303146-1] and [EN303681-1]. There are a number of MURI/gMURI services and service primitives defined which are feed to/from the RCF 310 within the target Radio Computer 300. The RAP 250 is containing a URA 307, which is controlled by the RCF 310 and executed on any type of hardware components (e.g., FPGAs, DSPs, ASICs, CPUs, etc.).

1.2.2. Radio Virtual Machine

As introduced in [EN303095], the RVM 371 is an Abstract Machine which is capable of executing configcodes. The RVM 371 executes a particular algorithm presented as a data flow chart. In other words, the RVM 371 is the result of replacing all operators and tokens in a particular data flow chart with Abstract Processing Elements (APEs) and Data Objects (DOs), respectively. Each APE executes computations marked by the replaced operator identifier. These computations are taken from a Radio Library 373, which is also included in an RVM 371.

FIG. 4 illustrates a conceptual view of RVM processing. The implementation of a RVM 371 is target Radio Computer 300 specific. The RVM 371 has access to a Back-end Compiler (e.g., on the platform itself or externally as described in [EN303095], clause 4.4.1) for JIT or AOT compilation of configcodes. The RVM process includes one or more APEs in an APE Pool, one or more DOs in a DO Pool, and a Radio Library 373. The RVM 371 is independent of the underlying hardware.

Each APE abstracts a computational resource corresponding to an operation in a particular data flow chart. Each APE abstracts computational resource(s) that executes any computations downloaded from the Radio Library 373. A "computational resource" may refer to part of RE hardware working under OS control and on which applications (e.g., RA(s) 370), among others, are executed. Each APE is connected with one or more input DOs and one or more output DOs. APEs are reactive. Any computations are started if all input DOs are filled with real data.

In this context, a "data flow chart" is a reactive data flow computational model including data and operators where data are connected with operators. A "data flow" may be a logical channel between a Flow Controller (FC) 313 and one or more URAs 307 created by the FC 313 to send to or receive data elements (e.g., octets, packets, PDUs, and/or other granularity) from URA 307. The operators in a data flow chart are abstract computations that are triggered by full data (e.g., when a DO is in a "full state"). Results of operator computations are written in connected output data if they are empty.

DOs are typeless tokens that abstract any type of data. Each DO abstracts a memory resource. In other words, a DO is an abstracted memory for storing data used during the procedure of Radio processing. Each DO provides a container for storing data. A DO can be empty if there is no data in the container or it can be full if there is data in the container. Each DO acknowledges connected APEs about its status whether it empty or full. One or more APEs from the RVM 371 can be connected with a DO. In the applied model, memory is considered be flat and infinite, and each DO is allocated in the infinite and flat memory. Any RVM 371 has access to this memory.

The Radio Library 373 includes normative definitions/ native implementation of all SFBs [EN303095] for front-end/back-end compilation. The Radio Library 373 may be a native radio library and/or a reference radio library. The native radio library provides platform-specific description of each SFB that represents the target platform hardware. The reference radio library provides normative definition of each SFB. There may be multiple such Reference Radio Libraries. For a given RA 370, a unique Reference Radio Library 373 is used. The computations included in the Radio Library 373 are represented in terms of normative definitions or native implementations of SFBs depending upon whether the Radio Library is used for front-end or back-end compilation, respectively.

In some implementations, UDFBs may be created through a combination of SFBs and represented as a data flow chart to be executed in the RVM 371. Alternatively, a UDFB is implemented as a stand-alone module/function that can be mapped into one APE (e.g., the UDFB can be considered atomic); or into an eRVM 571 and/or RVM 371 (e.g., not atomic). In general, UDFBs are not included into the Radio Library 373, but they are part of a RAP.

The RVM 371 begins to work immediately after some DOs initialization. Usually, all APEs execute computations asynchronously and concurrently. One or more APEs execute computations synchronously according to a clock signal provided by a sync source as discussed above. An individual APE executes the allocated operator if all the corresponding input DOs are full. APEs access DOs with operations "read", "read-erase", or "write". After reading input data from the DOs, the APE executes the allocated operator and, if output DOs are empty, then the APE writes processed data. Any full output DO blocks the corresponding write operation. An output DO can become an input DO for a subsequent operator, this input DO can activate a subsequent operator.

The RVM 371 executes computations until reaching the state when all APEs become inactive. In this state, there are not enough full DOs, which can activate the inactive operators. The result of computations are full DOs, which cannot activate the inactive operators. The state or operation of a given APE is independent on the state of other APEs (e.g., each APE is atomic).

Additionally, the RVM 371 enables an RA 370 to choose one among multiple available RVM protection classes for code to be executed on the RVM 371 as well as a protection class for the RF front-end. RVM protection classes are introduced in order to find a trade-off between (re-) certification effort and baseband code development flexibility. A high-level RVM class corresponds to full reconfigurability of the low-level parameters of an RVM 371, and accordingly necessitates a relatively more extensive certification testing process after the RVM 371 has been reconfigured. A low-level RVM class corresponds to a limited reconfigurability of the low-level parameters of an RVM 371. One or more medium- or intermediate-level RVM classes may also be established between the two extreme RVM classes that correspond to intermediate levels of reconfigurability of the low-level parameters of an RVM 371. An intermediate-level RVM class, for example, would allow more flexibility for reconfiguring low-level parameters of an RVM 371 than the lowest-level RVM 371 class, but would not permit the degree of reconfigurability that would be associated with the highest-level RVM class. Details about RVM protection classes are discussed in ETSI TS 103 641 V1.1.1 (2019 March) ("[TS103641]"). Depending on the combination of chosen RF & RVM protection classes, the required re-certification process of the software reconfigurable radio platform will be more or less complex. An RE architecture may include an RF transceiver chain, Analog-to-Digital converters, Digital-to-Analog converters, Baseband Processor(s), and the like (see e.g., FIG. 3). The RVM 373 controls RF transceiver chain, in particular for selection of an RF protection class. In some embodiments, the RVM 371 may be, or may include, and elementary RVM (eRVM) 571.

Figure 5:
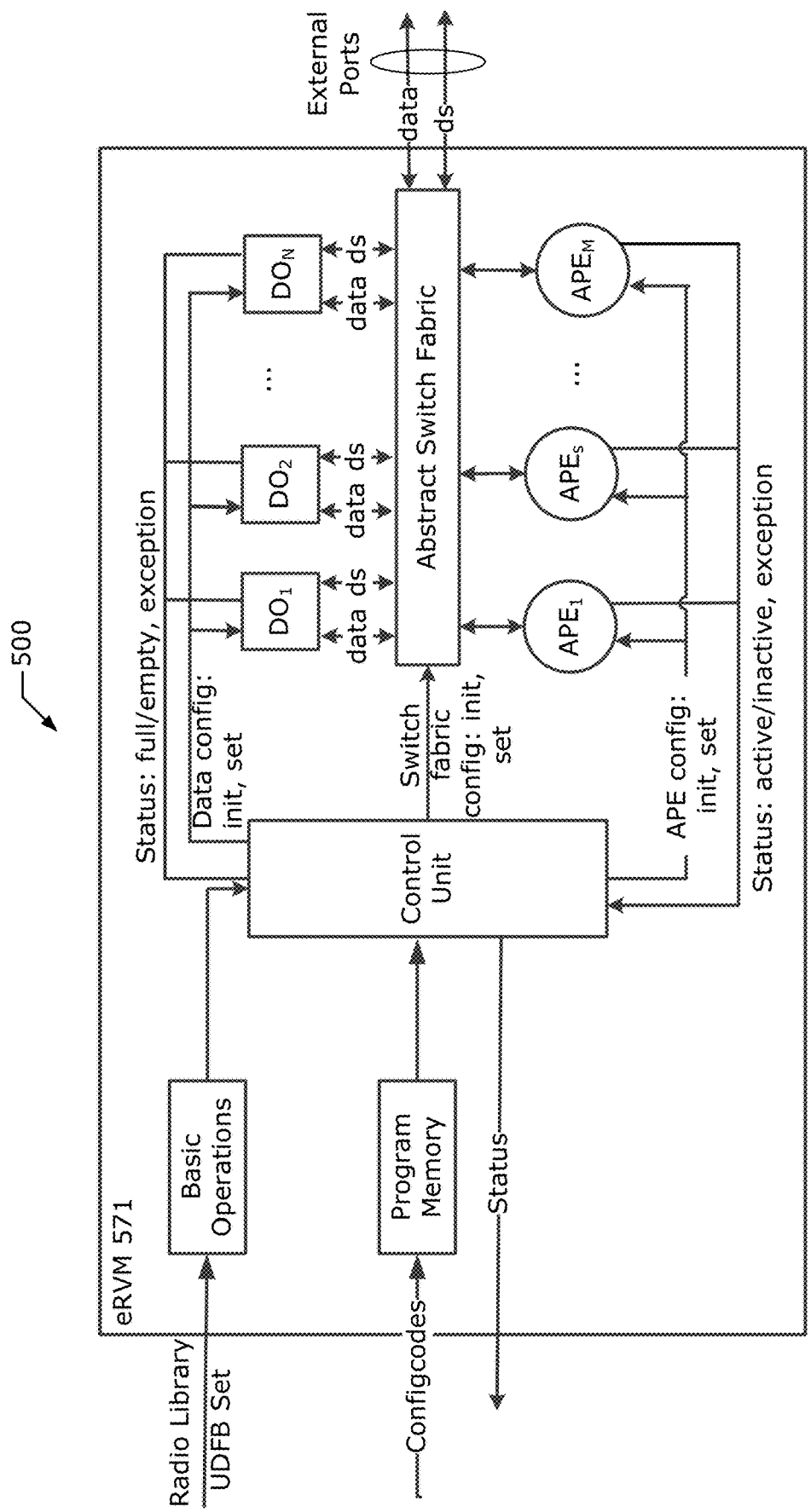
FIG. 5 shows an example architecture of an elementary RVM.

FIG. 5 shows an example architecture 500 of an eRVM 571. The eRVM 571 includes Basic Operations, Program memory, Control Unit (CU), Abstract Switch Fabric (ASF) as well as APEs and DOs.

The Basic Operations in eRVM 571 include operations provided by the Radio Library 373 and/or a UDFB Set. Three cases can be considered: i) where a RAP includes only SFBs; ii) where a RAP includes only UDFBs; iii) where a RAP includes SFBs and UDFBs. Additionally or alternatively, the Basic Operations may include: i) SFBs only; ii) UDFBs only; or iii) SFBs and UDFBs.

The Basic Operations include operators either provided from the Radio Library 373 as SFBs and/or from a UDFB set as UDFBs, each of which is mapped onto one single APE. Since UDFBs might be implemented as a stand-alone module/function which can be mapped into one APE. In this case, the Basic Operations include operators provided by the UDFB Set as well as by the Radio Library 373 as SFBs. Note that those UDFBs are atomic. For an RVM 371, the SFB or UDFB can be mapped onto an APE, RVM 371, or eRVM 571. In the eRVM 571 case, the mapping to RVM 371 or eRVM 571 is not possible since it is the lowest level of hierarchy (see e.g., clause 6.3 of [EN303146-4] and/or clause 6.3 of [EN303681-4]). Note that from an execution perspective, there is no difference between SFBs and UDFBs. The target platform may or may not provide accelerators for some/all SFBs and/or UDFBs.

The program memory is provided with Configcodes which determine the eRVM 571 configuration. The CU generates Initialization and Set-up instructions for APEs, DOs, and the ASF based on decoding Configcodes stored in the Program memory. The ASF connects APEs and DOs in accordance with CU signals. One DO can be connected with multiple APEs, and/or one APE can be connected with multiple DOs. Additionally, one or more DOs from other eRVMs 571 can be connected with the ASF through external data ports.

Each DO is represented by a unique number including DO1, DO2, . . . , DON, where N is a number. Each DO is configured by a config instruction that includes an init field that initializes DO according to the specific initialization procedure (depending on implementation); and a set field with an instruction which sets up the DO attributes such as DO_ID, access time, size, etc. (as shown in clause 6.2 of [EN303146-4] and/or clause 6.2 of [EN303681-4]). The DOs communicate with APEs through an ASF interface that includes a data status (ds) signal to indicate whether the DO is full or empty; and data lines directed to or from DO to read or write data to or from APEs. The status interface provides the status information of DO to CU and includes a full/empty describes whether DO is full of data or empty; and exception describes the reason of fail when an APE operates with the DO.

Each APE is represented by a unique number including APE1, APE2, . . . , APEM, where M is a number. APEs are configured by a config instruction which includes an init field that brings the op code operation from Basic Operations; and a set field that sets up APE attributes such as the number of ports, port types, the execution cost and time. An APE's ports connect the APE to the ASF and includes a data interface including a ds signal to indicate whether the DO is full or empty; and one or more data lines to read or write data through the ASF. A status interface provides status information of the APE to the CU and includes an active/inactive interface that describes state of the APE, such as active and inactive; and an exception interface that describes the reason of fail when an APE's operation has an error. An APE is active when it has consumed input DOs and processes them. The APE transitions to the inactive state with a corresponding indication to the CU immediately after processing all the data associated to/with the APE.

Figure 6:
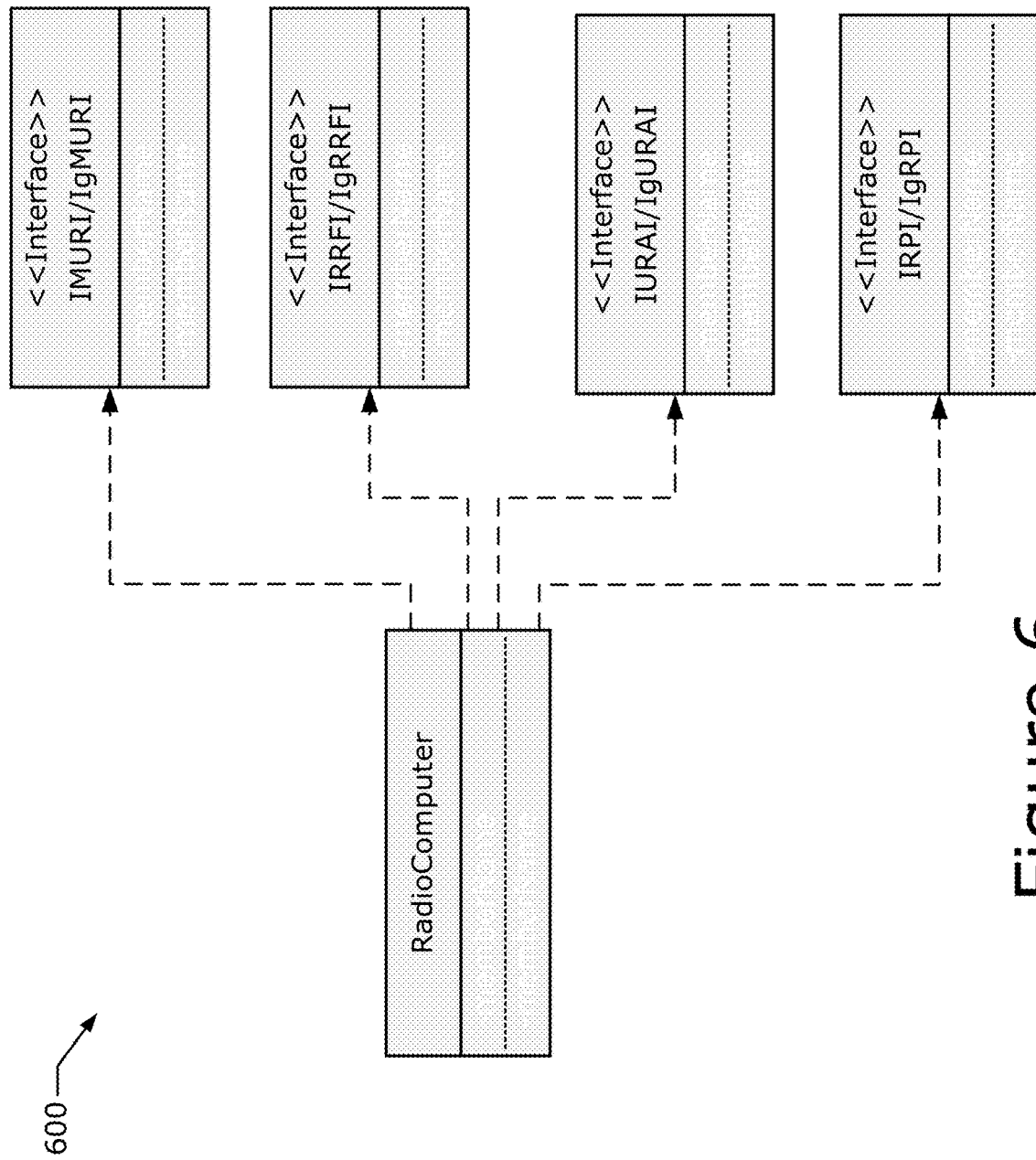
FIG. 6 illustrates an example UML class diagram for Radio Computer interfaces.

The ASF connects APEs and DOs (e.g., as shown by FIG. 6.5 in [EN303146-4] and/or [EN303681-4]). One DO can be connected to multiple APEs, and/or one APE can be connected to multiple DOs. The ASF connects DOs and APEs through ports which include one or more data ports (internal) connect the ASF to DOs via interface lines; data ports (external) that connect the ASF to DOs from other eRVM 571 and/or RVMs 371; and processing ports connect the ASF to APEs via one or more respective interface lines. Each connector of the ASF connects ports bounded to a DO with ports bounded to an APE. Each connector has the same interface lines as ports do (e.g., ds, data, etc.). Connectors convey interface values between ports when they appear in corresponding ports. The CU configures the ASF using the following commands: init, which associates data ports with DOs and processing ports with APEs; and set, which creates connections between data ports and processing ports. Other aspects of the RVM 371 and eRVM 571 are discussed in more detail in [EN303146-4] and/or [EN303681-4].

The RVM 371 as illustrated in FIGS. 4 and 5 is/are used to represent an algorithm in a concurrent manner. The description of an algorithm is typically independent on implementation choices, including a synchronous or asynchronous implementation approach. In some implementations, a compiler processes the algorithm description such that the desired implementation approach is applied. In practice, however, it can be preferred by a designer to facilitate the tasks of a compiler and describe the algorithm closer to an hardware implementation level, including provisions for a synchronous or asynchronous implementation approach. This is a common approach in hardware design programming languages such as Very High Speed Integrated Circuit Hardware Description Language (VHDL). Other hardware description languages and/or other programming languages may be used to develop the RVM 371. Also, some critical applications that require deterministic behavior(s) may need to be implemented using a synchronous approach 1.2.3. Multiradio Interface Testing FIG. 6 shows an example UML class diagram 600 for radio computer 220 interfaces. The RRE 201 may be seen as a set of multiple radio computers 220 where individual URAs 307 are engineered as software entities in [EN303648]. While UML is used for defining the information model and protocol related to (g)MURI, other modeling languages could be used as well.

Figure 7:
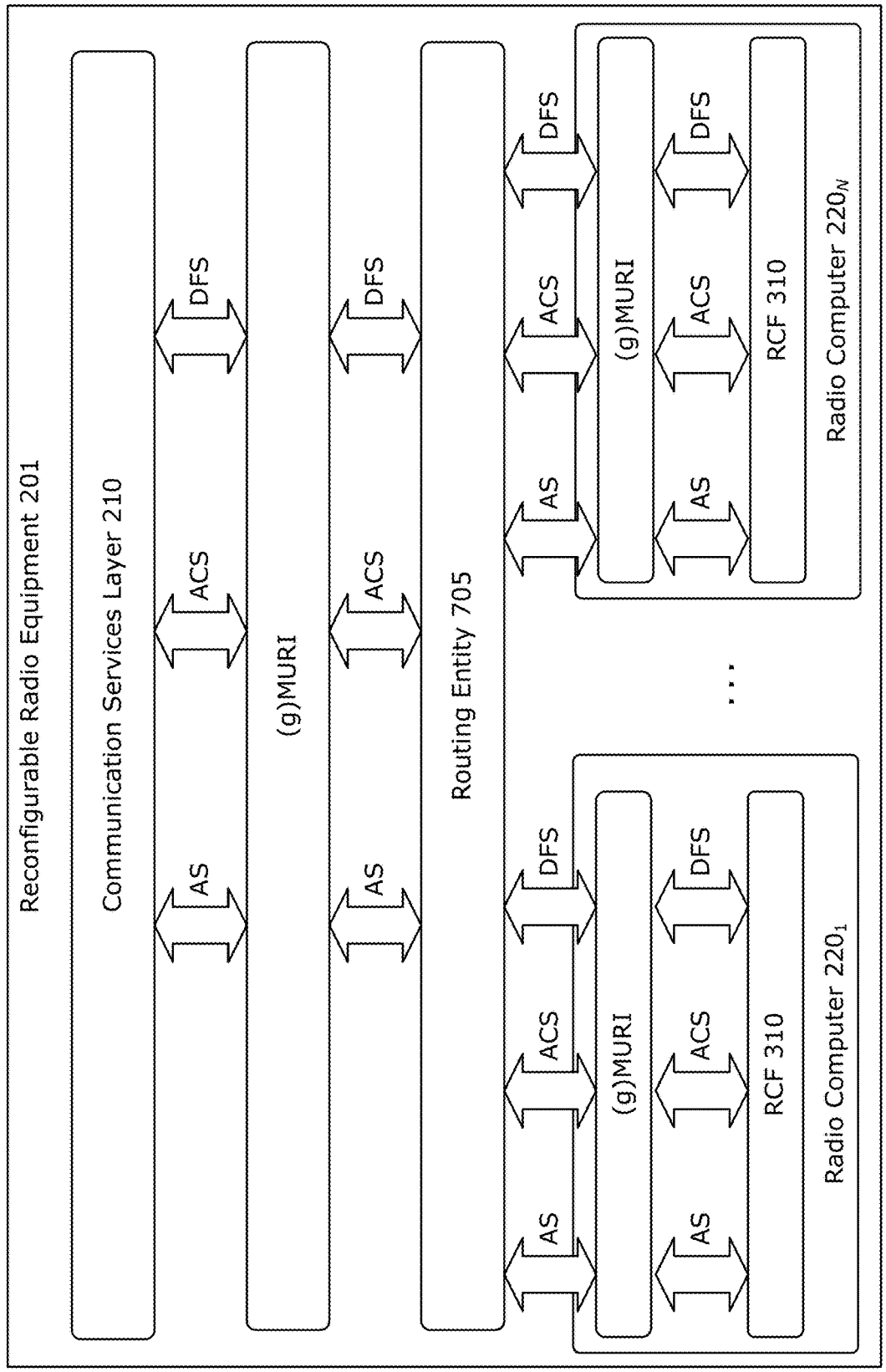
FIG. 7 illustrates the interconnection between a Communication Service Layer (CSL) and a Radio Control Framework (RCF) using Multiradio Interface (MURI) and generalized MURI (gMURI) for an RRE.

FIG. 7 illustrates an architecture 700 showing how CSL 210 and RCFs 310 interact with each other using the (g)MURI. As shown in FIG. 7, the (g)MURI supports three kinds of services: administrative services (AS), access control services (ACS), and data flow services (DFS).

The administrative services are used by some device configuration application (e.g., administrator 211 of FIG. 2), which is included in the CSL 210 to (un)install a new URA 307 into the RRE 201 and create/delete an instance of the URA 307. Installation and loading may take place both at device start-up time to set up the network connection as well as during run-time, whenever reconfiguration of available URAs is needed. (g)MURI does not make any assumption on how and when the RE 201 will detect the need of the reconfiguration.

The access control services are used by the MPM 212 to maintain the user policies and preferences related to the usage of different RATs and to make a selection between them. Modelling of such preferences and selection algorithms is not in the scope of the present document; however, the (g)MURI specification covers the information exchange of RAT selection decisions between CSL 210 and RCF 310. The preferences themselves may originate either locally from applications or end user settings as well as in a distributed manner from network operator or from a cognitive radio management framework.

The data flow services are used by the networking stack of the RRE 201, such as the TCP/IP stack or the like. Therefore data flow services represent the set of (logical) link layer services, which are provided in a uniform manner regardless of which URAs 307 are active.

With references to FIGS. 2, 3, and 7, the CSL 210 communicates with one or multiple radio computers 300 through the (g)MURI as defined in [EN303146-1] and [EN303681-1]. There are a number of (g)MURI services and service primitives defined which are feed to/from the RCF 310 within the target radio computer 300. The RAP 250 is containing one or more RAs 370 and/or URAs 307, which is/are controlled by the RCF 310 and executed on any type of hardware components (e.g., FPGAs, DSPs, ASICs, CPUs, etc.) of the radio platform 320.

The present disclosure addresses how to verify, in a non-intrusive way, that the (g)MURI interface is correctly implemented on a target radio equipment. According to various embodiments, the verifying the correct implementation of the (g)MURI interface includes the following aspects: (1) creation of a Reference RAP (RRAP) 250; (2) introduction of a test mode for the RCF 310; and (3) verification of output vectors.

1.2.3.1. Creation of a Reference Radio Application Package (RRAP)

In various embodiments, a first RRAP (RRAP1) is introduced. When the RCF 310 test mode is activated (as further described infra), then the (g)MURI service primitives calls to RCF 310 are forwarded to the RRAP. In some embodiments, the (g)MURI service primitives calls to the RCF 310 are directly forwarded to the RRAP. Embodiments also include a second RRAP (RRAP2), which contains a relatively simple feature, for example, the creation of an output signal such as one of those shown by FIG. 8.

Figure 8:
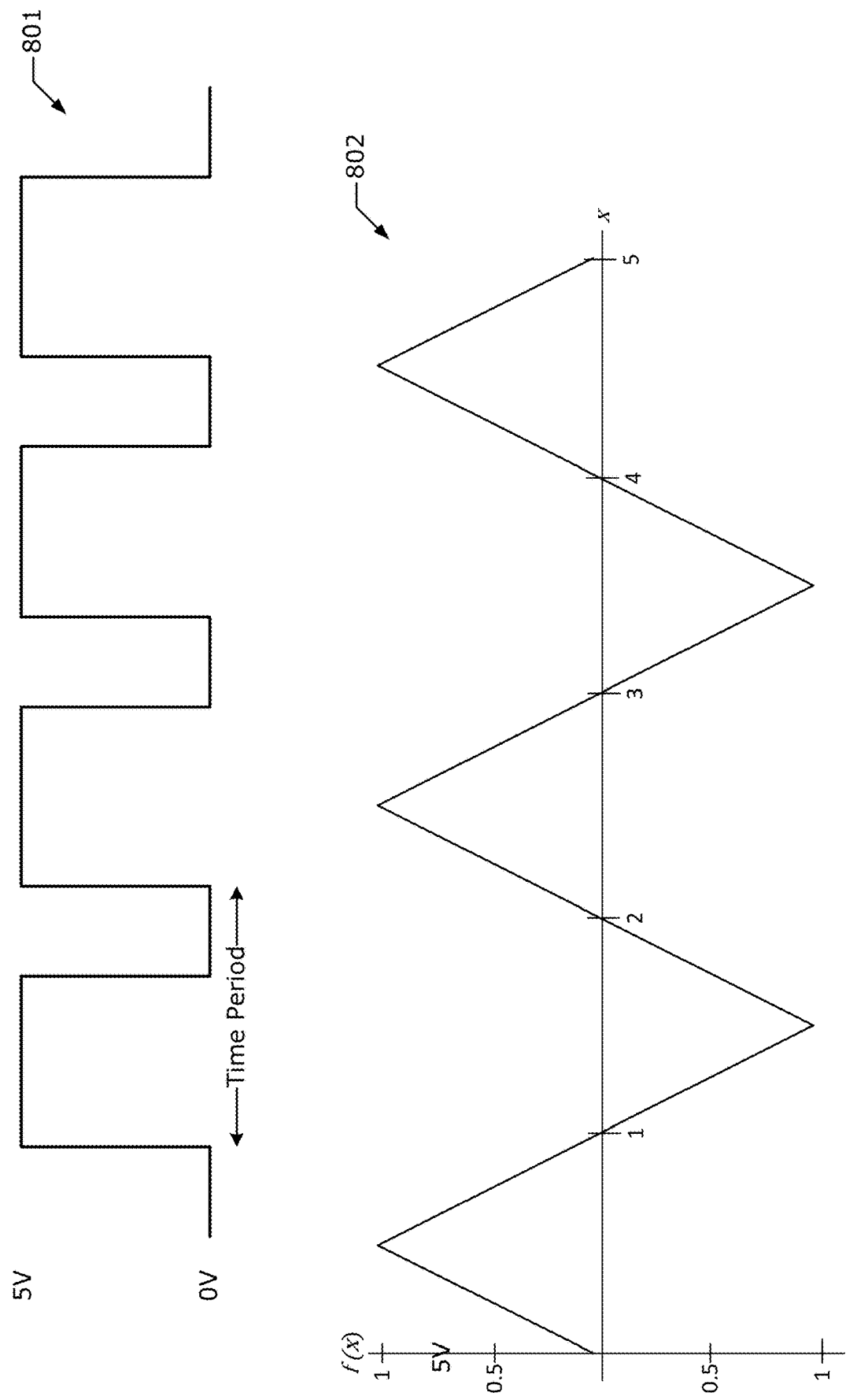
FIG. 8 depicts an example rectangular clock signal and an example symmetric triangle wave.

FIG. 8 shows an example rectangular clock signal 801. The clock signal 801 is represented as a train of pulses, where ON times and OFF times are not same. The train of pulses is considered as a clock signal. This signal stays at logic High (5V) for some time and stays at logic Low (0V) for some other time. This pattern repeats with some time period. In this case, the time period will be equal to sum of ON time and OFF time. The reciprocal of the time period of clock signal is known as the frequency of the clock signal. All sequential circuits are operated with at least one clock signal. The clock signal frequency is chosen according to a frequency at which a sequential circuit can be operated. FIG.

8 also shows an analytic representation of a symmetric triangle wave 802 with period 2 and varying between −1 and 1 according to various embodiments As mentioned previously, the (g)MURI supports three basic services (e.g., administrative services, access control services, and data flow services), which are further detailed infra. Table 3a describes an overview the administrative services that are associated with admin. 211, and the interfaces for the administrative services are used to transmit the messages outlined by Table 3b. The class definition and related operations of the administrative services are described in clause 8.5 of [EN303681-1].

TABLE 3a

Administrative Services

| Administrative Services | Description |
|---|---|
| installation/ uninstallation of URA | RRE sets up its configuration through software download and installation. For the support of RE reconfiguration, administrator requests installation/uninstallation of URA to CM. |
| creating instance of URA | For activating the installed URA(s), instance(s) of the corresponding URA(s) has (have) to be created. Administrator requests CM to create instance(s) of the corresponding URA(s). CM creates the instance(s) and returns the confirmation of the instance creation to Administrator, when CM judges the instance(s) creation is valid. |
| deleting instance of URA | Since the instance(s) of instantiated URA(s) occupies (occupy) the memory resources of the RRE, it might be desired to delete URA(s) instance(s) that is (are) not needed. Administrator requests CM to delete instance(s) of such URA(s). |
| getting/ configuring URA Parameters | Administrator requests CM to provide parameter(s) of URA(s) such as required computational/spectral resources, antenna ports, etc. in order to manage the created URA(s) instance(s). |
| updating instance of URA | Instance(s) of (an) installed URA(s) is/are replaced, typically by a SW Update. During the replacement process, the configuration is maintained. |
| URA List | In RRE, the status of URA(s) might be installed, instantiated, or activated. In order to manage each URA properly, Administrator requests CM to provide URA list which includes ID and name as well as the status of each URA. |

TABLE 3b

| Involved Entities | Messages |
|---|---|
| From CSL 210 to RCF 310 | Request of installation/uninstallation of an URA. Request of creating/deleting an instance of an URA. Request of updating an instance of an URA. Request of getting/configuring parameters of an URA. Request of installed/instantiated/activated URA(s) list. |
| From RCF 310 to CSL 210 | Confirmation of installation/uninstallation of URA. Confirmation of the creation/deletion of a URA instance. Confirmation of the updating of a URA instance. Failure of URA installation/uninstallation. Failure of the creation/deletion of an URA instance. Failure of the updating of a URA instance. Information of URA parameters. URA(s) list retrieving. |

Table 4a describes an overview of the access control services which are associated with MPM 212, and the interfaces for the access control services are used to transmit the messages outlined by Table 4b. The class definition and related operations of the access control services are described in clause 8.5 of [EN303681-1].

TABLE 4a

Access Control Services

| Access Control Services | Description |
|---|---|
| URA List | When the MPM of reconfigurable RE activates URA(s) and/or creates association of URA(s), MPM needs to know the URA list. For this purpose, MPM requests CM to provide the URA list. Upon receiving the URA list request from MPM, CM returns the URA list which includes ID and name as well as the status of each URA. |
| Activation/ deactivation of URAs | MPM requests RCM to activate/deactivate URA(s) depending upon the contents of the URA list provided from CM. RCM performs the activation/deactivation of the URA(s) and acknowledges the confirmation of the request. |
| Radio environments measurement | URA may perform a certain level of measurements autonomously or upon a trigger. In the second case, MPM requests RCM to start radio environment measurements. RCM request URA to start the radio environment measurements and acknowledges the success of start radio environment measurements. In the case of stopping radio environment measurements, MPM requests RCM to stop radio environment measurements. Then, RCM requests URA to stop radio environment measurements and sends the measurement information. |
| Creation/termination of associations | MPM requests RCM to create/terminate association of URA(s) because activated URA(s) set(s) up the association. |
| Creation/termination of data flows into/ from associations | MPM requests RCM to create/terminate data flow(s) into/from association(s). When the created data flow is terminated, RCM acknowledges the termination of the data flow to MPM. |
| Flexible Data flow | In some communication environments such as Vertical Handover, the data flow of one association may have to be moved to another association or partitioned into many associations. In some other cases, the data flow of many associations may have to be combined into a single association. In those instances, MPM requests RCM to move/partition/combine of the data flow. |
| Errors reporting | During the procedure of handling multi-RAT in reconfigurable RE, various kinds of errors may take place in RCF. When the error occurs, CM has to report it to MPM. Example: In the case of spectral resource collision, MRC informs of this error to CM, which reports the error to MPM. |

TABLE 4b

| Involved Entities | Messages |
|---|---|
| From CSL 210 to RCF 310 | Request of activation/deactivation of an URA 307. Request of update of an URA 307. Request of installed/instantiated/activated URA(s) 307 list. Request of start/stop measurements for radio environment. Request of measurements for RE capabilities. Request for the creation of a data flow. Request for the termination of a data flow. Request for the creation of a network and logical radio link association. Request for changing a data flow. |

TABLE 4b-continued

| Involved Entities | Messages |
| --- | --- |
| From RCF 310 to CSL 210 | Confirmation of an URA 307 activation/deactivation.
Confirmation of an URA 307 update.
Confirmation of data flow creation.
Confirmation of data flow termination.
Confirmation of the creation of a network and logical radio link association.
Confirmation of changing a data flow.
Confirmation of starting radio environment measurements.
Failure of an URA 307 activation/deactivation.
Failure of data flow creation.
Failure of data flow termination.
Failure of the creation of a network and logical association.
Failure of changing a data flow.
Failure of starting radio environment measurements.
Failure of an URA 307update.
URA(s) 307 list retrieving.
Information related to the radio environment.
Information about RE capabilities.
Information about errors. |

Table 5a describes an overview of the data flow services that are associated with networking stack, and the interfaces for the data flow services are used to transmit the messages outlined by Table 5b. The class definition and related operations of the data flow services are described in clause 8.5 of [EN303681-1].

TABLE 5a

Data Flow Services

| Data Flow Services | Description |
| --- | --- |
| Sending User Data | In order to transmit user data through a particular data flow among multiple data flows, Networking stack requests FC to perform the transmission of the user data. Then FC acknowledges the confirmation of the transmission to Networking stack. |
| Receiving User Data | When receiving user data through multiple data flows, FC transfers the received user data together with the data flow ID to the Networking stack. |

TABLE 5b

| Involved Entities | Messages |
| --- | --- |
| From CSL 210 to RCF 310 | Request of user data transfer (transmission: SendUserData, reception: ReceiveUserData). |
| From RCF 310 to CSL 210 | Confirmation of user data transfer.
Failure of user data transfer.
User data. |

According to various embodiments, the RRAP1 receives the various (g)MURI primitives calls which are provided one-by-one by the CSL 210 to a single RCF 310 or multiple RCFs 310 via the (g)MURI (e.g., as defined in [EN303146-1] for MURI and [EN303681-2] for gMURI), including the primitives outlined by Table 6.

TABLE 6

| Service Class | Primitives |
| --- | --- |
| IAdministrativeServices | installRadioApps( ): INTEGER
uninstallRadioApps( ): INTEGER |

TABLE 6-continued

| Service Class | Primitives |
| --- | --- |
|  | createRadioApps( ): INTEGER
delRadioApps( ): INTEGER
updateRadioApps( ): Integer
getRadioAppParameters( ): RadioAppParameters
setRadioAppParameters( ): BOOLEAN
getListOfRadioApps( ): RadioAppsList |
| IAccessControlServices | activateRadioApps( ): INTEGER
deactivateRadioApps( ): BOOLEAN
getListOfRadioApps( ): RadioAppsList
startRadioMeasurement( ): BOOLEAN
stopRadioMeasurement( ): RadioMeasurementsList
createAssociation( ): INTEGER
terminateAssociation( ): BOOLEAN
createDataFlow( ): INTEGER
terminateDataFlow( ): INTEGER
changeDataFlow( ): INTEGER
reportErrors( ): void |
| IDataFlowServices | sendUserData( ): BOOLEAN
receiveUserData( ): UserData |

When a new service primitive call is received by RRAP1, then the following is assessed:

Is the service primitive call performed correctly (e.g., input parameters and call procedure are correct) and the corresponding action is correctly executed for RRAP2 (e.g., installation, uninstallation, etc.), then a corresponding output signal is created which is fed to the RF front-end can be measured externally. Alternatively, the IDataFlowServices primitives are used to provide an ACK/NACK back to the CSL 210 indicating the interface has been used correctly (ACK)/incorrectly (NACK).

A unique output signal is generated for each of the service primitives defined for (g)MURI. The output signal is typically maintained either for i) a predefined time or ii) until the next service primitive call is received. For example, for the correct usage of a specific service primitive (and after verification that the right action was performed on RRAP2) a rectangular output signal is fed to the RF front-end (similar to the clock signal indicated in FIG. 8). In order to clearly relate the signal to a specific service primitive, the periodicity of the rectangular output signal is changed for each of the service primitives (and the relationship between signal periodicity and related service primitive is pre-defined). For example, the smallest periodicity corresponds to the first service primitive in the list above, the next longer periodicity corresponds to the second service primitive in the list above, etc. Finally, the longest periodicity corresponds to the last service primitive in the list above. Alternatively, an ACK/NACK signal is sent back to the CSL 210 indicating the interface has been used correctly (ACK)/incorrectly (NACK). For example, for the incorrect usage of a specific service primitive (or after identification that the wrong action was performed on RRAP2) a triangular output signal is fed to the RF front-end (see e.g., analytic representation of a symmetric triangle wave 802 of FIG. 8).

Similar to item a above, the relationship to a specific service primitive can be given through the allocation of a specific distinct periodicity to a specific service primitive. For example, the smallest periodicity corresponds to the first service primitive in the list above, the next longer periodicity corresponds to the second service primitive in the list above, etc. Finally, the longest periodicity corresponds to the last service primitive in the list above. Alternatively, an ACK/

NACK signal is sent back to the CSL 210 indicating the interface has been used correctly (ACK)/incorrectly (NACK).

1.2.3.2. Test Mode for Radio Control Framework

In order to enable RRAP1 to perform the related tests, a "test mode" is defined and implemented for the RCF 310 as follows: while in test mode, the inputs to RCF 310 received through (g)MURI (e.g., the one or more service primitives calls) are directly forwarded to RRAP1. In the opposite direction, RRAP1 can create all of the (g)MURI calls which are used from RCF 310 to CSL 210 (e.g., in the opposite direction), the corresponding signals are then verified in CSL 210. Furthermore, RRAP1 is able to request information about the status of RRAP2, for example through suitable interaction with RCF 310.

1.2.3.3. Verification of Output Vectors

Figure 14:
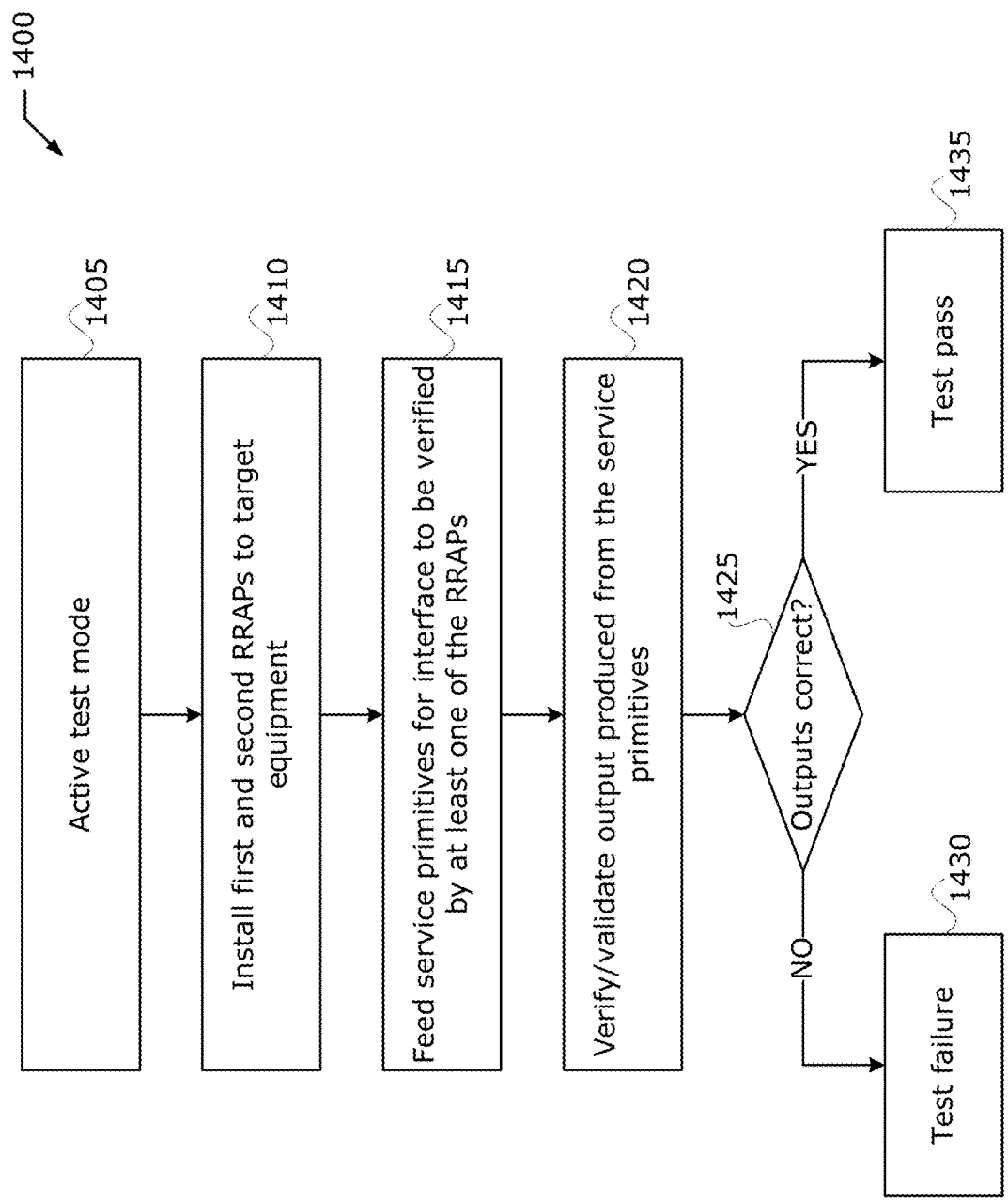
FIG. 14 depicts an example interface testing procedure.

FIG. 14 shows an example interface testing procedure 1400 for testing the interface(s) of an equipment under test. Procedure 1400 begins at operation 1405 where a test mode is activated for an RE element (e.g., RCF 310 for testing the (g)MURI). At operation 1410, RRAP1 and RRAP2 are installed onto the target equipment. At operation 1415, service primitives are fed from a source entity to a destination entity and verified by one or both of the RRAPs. For example, for testing the (g)MURI, all service primitives as defined in [EN303146-1] for MURI and [EN303681-1] for gMURI are fed from CSL 210 to RCF 310 and verified by RRAP1. For example, the actions are performed in the following order:

1. RRAP2 is installed through "+installRadioApps( ): INTEGER"
2. RRAP2 is instantiated through "+createRadioApps( ): INTEGER"
3. A new version of RRAP2 is replacing the previously instantiated version through "+updateRadioApps( ): Integer"
4. RRAP2 is activated through "+activateRadioApps( ): INTEGER"
5. RRAP2 association is created through "+createAssociation( ): INTEGER"
6. RRAP2 data flow is created through "+createDataFlow( ): INTEGER"
7. RRAP2 data flow is changed through "+changeDataFlow( ): INTEGER"
8. The RadioApp (RA) parameters are requested through "+getRadioAppParameters( ):RadioAppParameters"
9. The RadioApp (RA) parameters are modified through "+setRadioAppParameters( ): BOOLEAN"
10. The list of RadioApps is requested through "+getListOfRadioApps( ): RadioAppsList"
11. The list of RadioApps is requested through "+getListOfRadioApps( ): RadioAppsList"
12. Example Errors are created through "+reportErrors( ): void"
13. Radio Measurements are started through "+startRadioMeasurement( ): BOOLEAN"
14. Radio Measurements are terminated through "+stopRadioMeasurement( ):RadioMeasurementsList"
15. Example Data is sent through "+sendUserData( ): BOOLEAN"
16. Example Data is received through "+receiveUserData( ): UserData"
17. RRAP2 data flow is terminated through "terminateDataFlow( ): INTEGER"
18. RRAP2 association is terminated through "+terminateAssociation( ): BOOLEAN"
19. RRAP2 is deactivated through "+deactivateRadioApps( ): BOOLEAN"
20. RRAP2 is deleted through "+delRadioApps( ): INTEGER"
21. RRAP2 is uninstalled through "+uninstallRadioApps( ): INTEGER"

Alternatively, any other order of the above mentioned verification steps may be applied. At operation 1420, the outputs produced after application of the service primitives is verified and/or validated. At operation 1425, the outputs are determined to be correct or incorrect. In case that one of the service primitives is incorrectly implemented, the test fails at operation 1430. In case that the service primitives are correctly implemented, the test passed at operation 1435. After verification/validation of the service primitives, the test is concluded.

1.2.4. Ad4381: Radio Equipment Testing Through Test Access Testing

FIGS. 2 and 3 show the overall architecture as defined for the (g)MURI (see e.g., [EN303146-1] and [EN303681-1]), the (g)RRFI (see e.g., [EN303146-2] and [EN303681-2]), and the (g)URAI (see e.g., [EN303146-3] and [EN303681-3]).

The present disclosure addresses how to verify, in a unified way (e.g., independent of manufacturer choices for HW implementation of functions), that the (g)MURI, (g)URAI, and/or (g)RRFI interfaces are correctly implemented on a target RE 201. While [AD3395-Z] proposes a hardware implementation validation, the present disclosure introduces an implementation-agnostic IP access for testing purposes. This may be required in a future Harmonized Standard supporting the implementation of [RED] Article 3(3)(*i*) on the Combination of HW and SW.

The challenge is that the available standards are introducing functional requirements which are abstracted from any hardware implementation choice. A manufacturer thus needs to instantiate the requirements defined for the Interfaces and choose a suitable HW/SW implementation solution. Those implementation solution may vary substantially between different vendors and different products.

Figure 9:
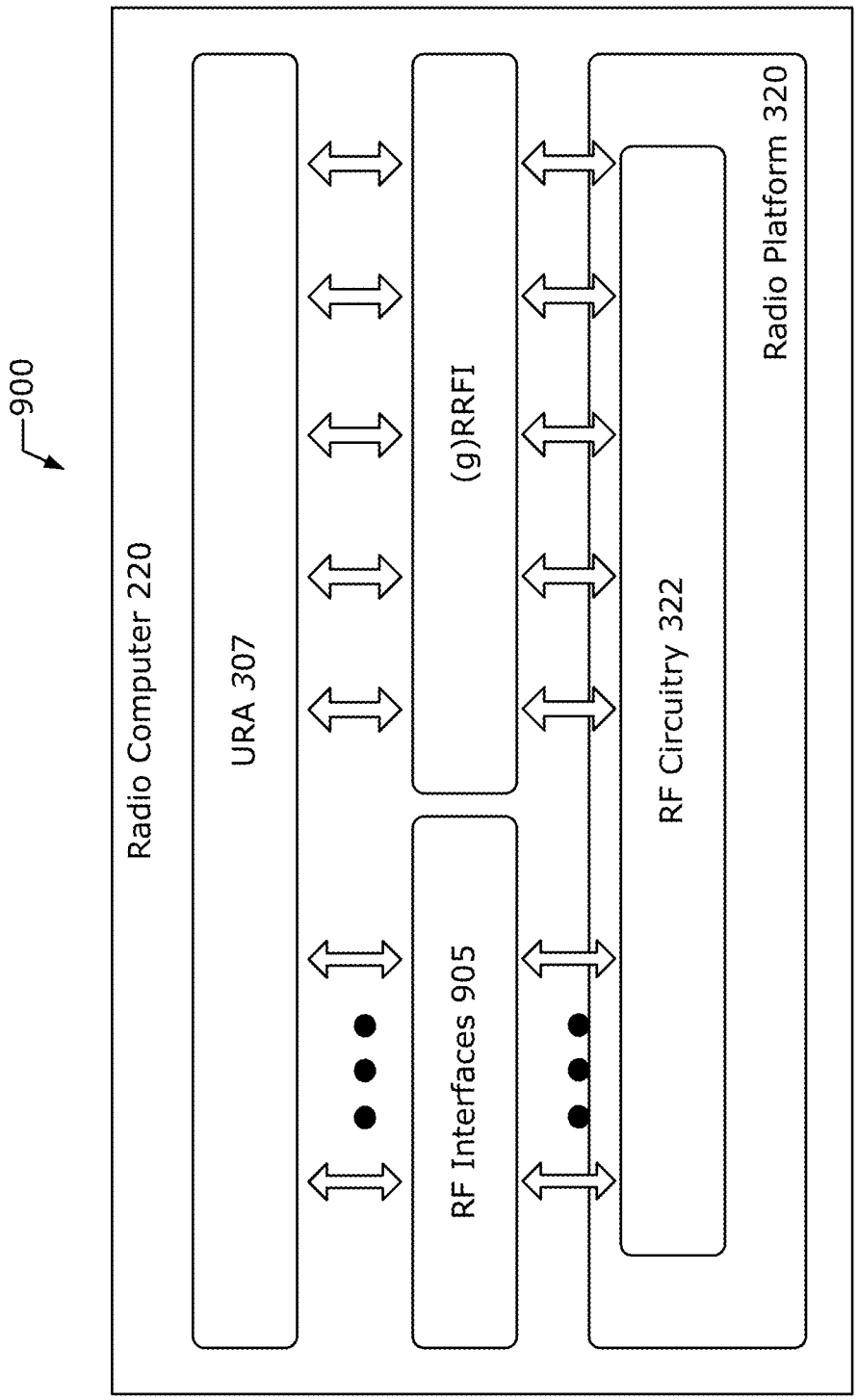
FIG. 9 depicts interconnections between URA and RF Transceiver using (g)RRFI for an RRE.

FIG. 9 shows interconnections 900 between URA 307 and RF TRx 322 using the (g)RRFI for RRE 201. As shown, the (g)RRFI can support up to five kinds of services depending on the applicable Radio Equipment Reconfiguration Class (RERC) (see e.g., [EN303641]). The RRE 201 supports all the services as required by the corresponding RERC as shown in table 5.1 of [EN303681-2] and fully detailed in clause 8 of [EN303681-2]. In case that the RRE 201 supports multiple RERCs, the concerned RRE 201 supports all the services as defined in table 5.1 of [EN303681-2]. These services include spectrum control services, power control services, antenna management services, transmit (Tx)/receive (Rx) chain control services, and RVM 371 protection services.

The spectrum control services are used to set up spectrum-related parameters such as carrier frequency, bandwidth, sampling frequency, etc. that will be determined according to the URAs they are related to. The power control services are used to set up RF power-related parameters such as maximum Tx power level, Tx power level per antenna, Rx gain, etc. Specific power schemes which have to be controlled according to the communication circumstance around the reconfigurable RE are also included in the power control services.

The antenna management services are used to determine the antenna configuration. Antenna radiation pattern, antenna gain, antenna direction, sector configuration, polarization, frequency range, etc. are some factors to be considered in the Antenna Management services. In some implementations, the antenna management services depend on the configurability of the antenna. The Tx/Rx chain control services are used to provide parameters related to real-time control of the RF transceiver chain. Parameters to be controlled using the Tx/Rx Chain Control services include (but are not limited to) Tx start/stop time, Rx start/stop time, spectrum- and/or power-related values. The RVM 371 protection services are used to provide parameters related to the selection of RVM protection class. Parameters to be controlled using the RVM 371 protection services include, but are not limited to selection and/or request of RF protection class as well as, RF Front-end indication of input data signals modification.

The URAs 307 are RAs 370 that exhibit a common behavior from the RRE 201 perspective, and/or RAs 370 subject to a common reconfiguration, multiradio execution, and resource sharing strategy framework (depending on the concerned RERC). The RF circuitry 322 (also referred to as "RF TRx 322", "Radio Frequency Integrated Circuit 322", or "RFIC 322"), which includes transceiver chain(s), is part of the radio platform 320 in RC 220/300 that transforms baseband signals to radio signals in a Tx mode, and transforms radio signals to baseband signals in an Rx mode. The RF interfaces 905 denote digital interfaces that define the physical interconnections between Baseband Integrated Circuit (BBIC) 321 and RFIC 322 such, for example, the Mobile Industry Processor Interface (MIPI) Alliance DigRF$^{SM}$ specification version 4 (February 2014), which defines a high-speed interface between RFICs 322 and BBICs 321 in REs 201 and/or any other suitable interfaces such as those discussed herein. The (g)RRFI complements such RF interfaces 905 by defining services that are required for RREs 201.

The (g)RRFI is complementary to other RF interfaces 905, which define data flow (mechanisms) between baseband 321 and RF components 322. In this context, the (g)RRFI includes additions to those existing interfaces. Those additions are in particular addressing software reconfiguration requirements, such as the appropriate selection of protection classes. In some implementations, the baseband 321 comprises hard-wired baseband circuitry (e.g., ASIC type) that is configured to operate an RVM 371. The (g)RRFI based message exchanges are triggered by the RVM 371 component in order to handle software reconfiguration interactions with the RF Front-End/RF Transceiver chain. In other implementations, no RVM 371 is present, and thus, no interaction with the RF Front-End on Software Reconfiguration related features is available.

As mentioned previously, the (g)RRFI supports spectrum control services, power control services, antenna management services, transmit (Tx)/receive (Rx) chain control services, and RVM 371 protection services, which are further detailed infra.

Table 7a describes the services associated with the spectrum control, and the interfaces for the spectrum control services are used to transmit the messages outlined by Table 7b. The class definition and related operations of the spectrum control services are described in clause 8.7 of [EN303681-2].

TABLE 7a

Spectrum Control Services

| Spectrum Control Services | Description |
|---|---|
| Setting of Centre Frequency | Since the RF band to be used by a given RAT may have to be changed depending on user environments, the spectrum control service provides setting of the center carrier frequency in the RF band of the given RAT. |
| Setting of Bandwidth | Since the RF band to be used by a given RAT may have to be changed depending on user environments, the spectrum control service provides setting of the bandwidth of the channel to be used by a given RAT. With this service, the bandwidth can adaptively be controlled depending on user environments. |
| Setting of Sampling Rate | Depending on a given RAT, spectrum control service provides setting of the sampling rate. |
| Request of Chain Parameters | Since not only URA but also the other components like MPM may request information about chain parameters such as center frequency, bandwidth, sampling rate, etc. of a given RAT, spectrum control service provides those information. |

TABLE 7b

| Involved Entities | Messages |
|---|---|
| From URA 307 to TRx 322 | Request of center frequency set up. Request of bandwidth set up. Request of sampling rate set up. Request of getting Tx chain parameters. Request of getting Rx chain parameters. |
| From TRx 322 to URA 307 | Confirmation of center frequency set up. Confirmation of bandwidth set up. Confirmation of sampling rate set up. Confirmation of getting Tx chain parameters. Confirmation of getting Rx chain parameters. Failure of center frequency set up. Failure of bandwidth set up. Failure of sampling rate set up. Failure of getting Tx chain parameters. Failure of getting Rx chain parameters. |

Table 8a describes the services associated with the spectrum control, and the interfaces for the spectrum control services are used to transmit the messages outlined by Table 8b. The class definition and related operations of the spectrum control services are described in clause 8.7 of [EN303681-2].

TABLE 8a

Power Control Services

| Power Control Services | Description |
|---|---|
| Setting of Maximum Transmit Power | Since each RAT might be associated with its own maximum power level, power control service provides setting of the maximum transmit power for each URA. The maximum transmit power level might be dynamically controlled depending on user environments. |
| Setting of Antenna Power | Multiple antenna technologies such as Multiple Input Multiple Output (MIMO), Beamforming, etc. might require different transmit power at each antenna. Therefore, power control service provides setting of transmit power for each antenna. The algorithm of the antenna power allocation might be determined depending on the Radio Application code provided by $3_{rd}$ party. |

TABLE 8a-continued

Power Control Services

| Power Control Services | Description |
|---|---|
| Setting of Rx Gain | Since the required power level of the RX signal might be different for each RAT, power control service provides setting of Rx gain in order to cope with the signal environment of too low or too high Rx signal power level. |

TABLE 8b

| Involved Entities | Messages |
|---|---|
| From URA 307 to TRx 322 | – Request of maximum power level set up for Tx chain.<br>– Request of Tx power set up per Tx antenna.<br>– Request of Rx gain set up for Rx chain. |
| From TRx 322 to URA 307 | – Confirmation of maximum power level set up for Tx chain.<br>– Confirmation of Tx power set up per Tx antenna.<br>– Confirmation of Rx gain set up for Rx chain.<br>– Failure of maximum power level set up for Tx chain.<br>– Failure of Tx power set up per Tx antenna.<br>– Failure of Rx gain set up for Rx chain. |

Table 9a describes the services associated with the antenna management, and the interfaces for the antenna management services are used to transmit the messages outlined by Table 9b. The class definition and related operations of the antenna management services are described in clause 8.7 of [EN303681-2].

TABLE 9a

Antenna Management Services

| Antenna Management Services | Description |
|---|---|
| Selection of Antenna Port | In the case of multiple antennas, each of which might be associated with a different RX/Tx characteristics, any subset of the multiple antennas have to be available. Therefore, antenna management service provides selection of antenna ports for each URA. Depending on user environments, the same URA might use a different subset of antennas. |

TABLE 9b

| Involved Entities | Messages |
|---|---|
| From URA 307 to TRx 322<br>From TRx 322 to URA 307 | – Request of Tx antenna port selection.<br>– Request of Rx antenna port selection.<br>– Confirmation of Tx antenna port selection.<br>– Confirmation of Rx antenna port selection.<br>– Failure of Tx antenna port selection.<br>– Failure of Rx antenna port selection. |

Table 10a describes the services associated with the Tx/Rx chain control, and the interfaces for the Tx/Rx chain control services are used to transmit the messages outlined by Table 10b. The class definition and related operations of the Tx/Rx chain control services are described in clause 8.7 of [EN303681-2].

TABLE 10a

Tx/Rx Chain Control Services

| Tx/Rx Chain Control Services | Description |
|---|---|
| Setting of start/stop Time for Transmission | Since Tx of data stream is active for a given duration, Tx/Rx chain control service provides setting of start/stop time of the corresponding Tx chain |

TABLE 10a-continued

Tx/Rx Chain Control Services

| Tx/Rx Chain Control Services | Description |
| --- | --- |
| Setting of start/stop Time for Reception<br>Request for Updating Chain Parameters | Since Rx of data stream is active for a given duration, Tx/Rx chain control service provides setting of start/stop time of the corresponding Rx chain. Considering a case that a specific set of parameters in the presently running URA might be changed, Tx/Rx chain control service provides request for real-time updating of chain parameters such as center frequency, bandwidth, etc. of the presently running URA instead of resetting the current URA and setting up another URA. |

TABLE 10b

| Involved Entities | Messages |
| --- | --- |
| From URA 307 to TRx 322 | – Request of Tx start time set up.<br>– Request of Tx stop time set up.<br>– Request of Rx start time set up.<br>– Request of Rx stop time set up.<br>– Request of Tx/Rx chain parameter(s) update. |
| From TRx 322 to URA 307 | – Confirmation of Tx start time set up.<br>– Confirmation of Tx stop time set up.<br>– Confirmation of Rx start time set up.<br>– Confirmation of Rx stop time set up.<br>– Confirmation of Tx/Rx chain parameter(s) update.<br>– Failure of Tx start time set up.<br>– Failure of Tx stop time set up.<br>– Failure of Rx start time set up.<br>– Failure of Rx stop time set up.<br>– Failure of Tx/Rx chain parameter(s) update. |

Table 11 describes the services associated with the RVM protection, and the interfaces for the RVM protection services are used to transmit the messages outlined by Table 11x. The class definition and related operations of the RVM protection services are described in clause 8.7 of [EN303681-2].

TABLE 11a

RVM Protection Services

| RVM Protection Services | Description |
| --- | --- |
| Selection of RF Protection Class | In the context of software reconfiguration, the RF front-end typically allows the selection of RF protection classes. The suitable protection class is typically provided with the software component and influences the level of required re-certification (leading to the final declaration of conformity within the EU context) of the concerned Radio Equipment. The selection request for a specific RF Protection class is typically followed by an acknowledgement message (ACK) issued by the RF Front-End in case of successful operation, in case of unsuccessful operation a NACK (not acknowledgement) message is issued. In case that the RF front-end is not providing support for a specific requested protection class then the next higher protection class is selected which comprises the requested protection features plus possibly further ones. This is followed by the issuance of an ACKM (acknowledgement with Modification) message. Possibly, details on the modified protection class selection are given (possibly this information is provided on request). If the request for a protection class specifically indicates that no higher class may be selected (the more restrictive protection mechanisms may prevent the software components from operating correctly), then the next lower class is selected in case that the specific requested protection class is not available. This, however, possibly requires a more detailed re-certification process since the lower protection class may lead to a less protected front-end and thus poses a higher risk to other users. |
| Request of RF Protection Class status | Other components (in particular Base Band and/or Application Processor components) may request information on the RF protection class status. Then, the RF front-end provides information on which protection class mechanisms are activates, e.g. additional filters for limiting OOB emissions and/or spurious emissions, limitation of maximum output power levels, etc. |
| Request for (temporary/conditional) change of RF Protection Classes (including (de-)activation of RF Protection) | RF Protection may be changed depending on the currently active Radio Access Technologies (e.g., when hard-wired WiFi is used then no RF Protection Classes are required and they are deactivated). On the other hand, when a reconfigurable RAT is used, then a specific RF protection class is required (for example in order to reduce the required level of re-certification. The change of the protection class can occur based on a specific external trigger to the RF front-end or it can be automated (e.g., the RF-front end is programmed such that RF protection classes are (re-)configured as required) typically depending the input waveform/RAT data. |
| RF Front-end indication of modification of input data signals | In case that the RF Front-End protection mechanisms (selected by one of the upper processes) need to alter the request for data transmission (e.g., reduction of output power levels, cutting of out-band signal components, etc.), this message is providing a corresponding information to the outputs of the RF Front-End. It is typically processed by the Base Band and/or Application Processors. |

TABLE 11a-continued

RVM Protection Services

| RVM Protection Services | Description |
| --- | --- |
| RF Front-end emergency switch off | In case that the RF Front-End protection mechanisms detect massive violations of the emission limitations (e.g. massive OOB/spurious emissions, etc.) then the RF Front-End may decide to switch off the concerned transmission (while other (simultaneous) transmissions may still continue to operate in case they meet the limitations). |
| Information on Cross-RAT Interference | When multiple RATs are transmitted (received) simultaneously, it is possibly that the various RATs interfere with each other. If such a case is detected in the RF front-end, the RF front-end is providing corresponding information via the (g)RRFI. |

TABLE 11b

| Involved Entities | Messages |
| --- | --- |
| From URA 307 to TRx 322 | – Request of RF protection class selection.<br>– Request of change of RF protection class.<br>– Request of RF protection class Status.<br>– Request of information on data modification by RF protection.<br>– Request of information on cross RAT interference by RF protection.<br>– Request of emergency switch off of RF front-end. |
| From TRx 322 to URA 307 | – Confirmation of RF protection class selection.<br>– Confirmation of change of RF protection class.<br>– Confirmation of emergency switch off of RF front-end.<br>– Failure of RF protection class selection.<br>– Failure of change of RF protection class.<br>– RF protection class Status.<br>– Information on data modification by RF protection.<br>– Information on cross RAT interference by RF protection |

Primitives of the (g)RRFI are outlined by Table 12.

TABLE 12

| Service Class | Primitives |
| --- | --- |
| SpectrumControlServices | + setTxCenterFreguency( ): BOOLEAN<br>+ setTxBandwidth( ): BOOLEAN<br>+ setTxSamplingRate( ): BOOLEAN<br>+ setRxCenterFreguency( ): BOOLEAN<br>+ setRxBandwidth( ): BOOLEAN<br>+ setRxSamplingRate( ): BOOLEAN<br>+ getTxChainParameters( ): TxChainParameters<br>+ getRxChainParameters( ): RxChain Parameters |
| PowerControlServices | + setMaximumTxPowerLevel( ): BOOLEAN<br>+ setTxAntennaPower( ): BOOLEAN<br>+ setRxGain( ): BOOLEAN<br>+ getMeasurementsofTxPowerLevels( ): TxPowerLevels |
| AntennaManagementServices | + setTxAntennaPort( ): INTEGER<br>+ setRxAntennaPort( ): INTEGER |
| Tx/RxChainControlServices | + setTxStartTime( ): TxStartTime<br>+ setTxStopTime( ): TxStopTime<br>+ setRxStartTime( ): RxStartTime<br>+ setRxStopTime( ): RxStopTime<br>+ updateTxChainParameters( ) : BOOLEAN<br>+ updateRxChainParameters( ) : BOOLEAN |
| RVMProtectionServices | + setRFProtectionClass( ): AckType<br>+ RequestConditionalChangeOfProtectionClass( ): AckType<br>+ RequestStatusRFProtectionClass( ): ProtectionStatusType<br>+ RequestInformationOnDataModificationByRFProtection( ): RFProtectionInformationType<br>+ RequestInformationOnCrossRAInterferenceByRFProtection( ): RFProtectionInformationType<br>+30 RequestInformationOnEmergencySwitchoffByRFProtection( ): ProtectionStatusType |

Figure 10:
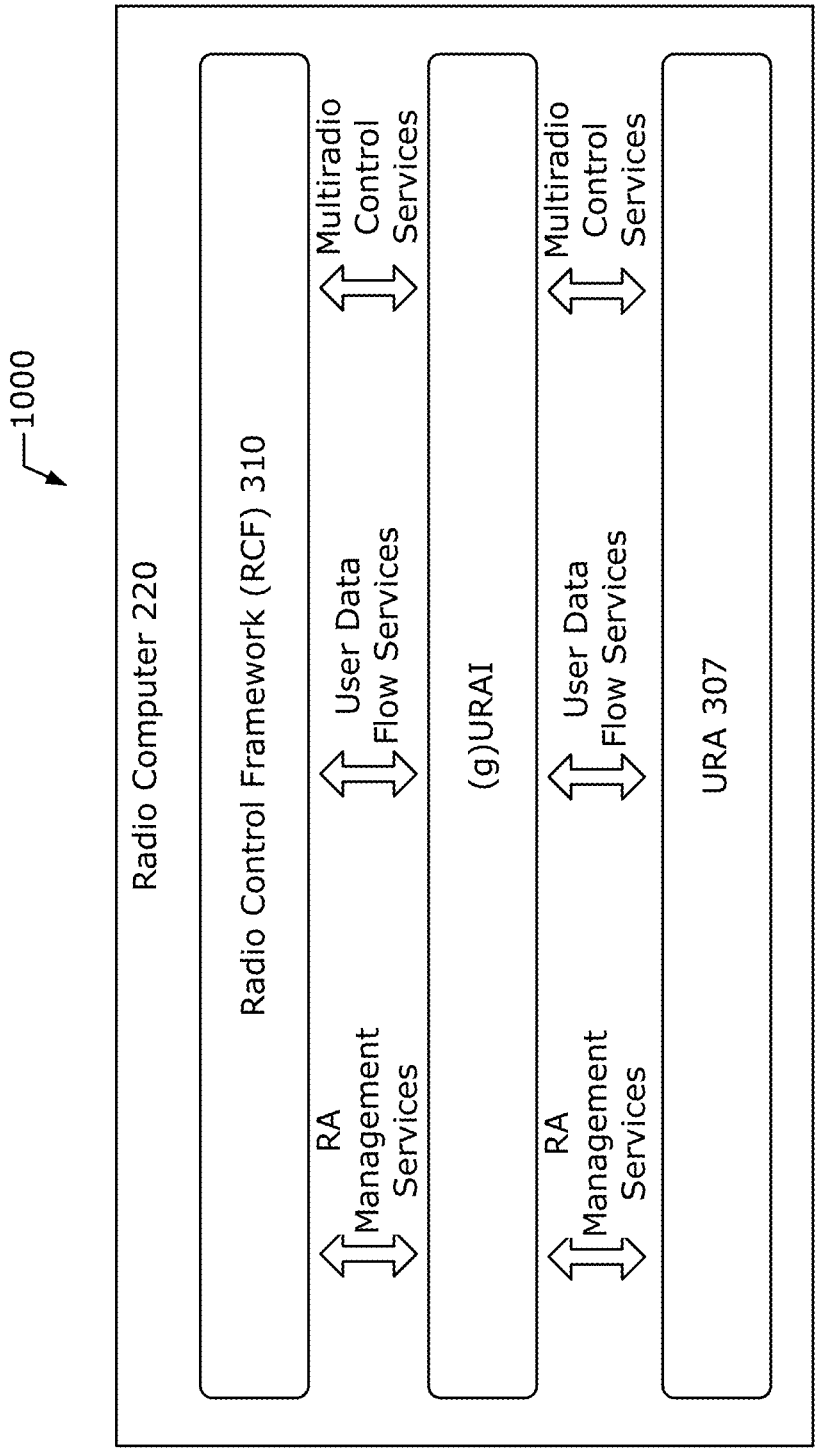
FIG. 10 depicts interconnections between an RCF and URA using (g)URAI for an RRE.

FIG. 10 shows interconnections 1000 between an RCF 310 and a URA 307 using the (g) URAI for RRE 201. As shown, the (g)URAI supports three kinds of services: radio application management services, user data flow services, and multiradio control services.

The radio application management services are used by the RCM 312, which is included in the RCF 310 (see e.g., FIG. 3), to control URA 307 functions such as reporting of discovered Peer Equipment's, creating/terminating association with Peer Equipment, starting/stopping communication with Peer Equipment, etc. The user data flow services are used by the FC 313, which is included in the RCF 310 (see e.g., FIG. 3), to transmit user data to the URA 307, or used by URA 307 to transmit received user data to FC 313. These services also include management of data flow, which is provided by the FC 313. The multiradio control services are used by the MRC 314, which is included in the RCF 310 (see e.g., FIG. 3), to manage spectral resource usage.

Table 13a describes the services associated with radio application management, and the interfaces for the radio application management services are used to transmit the messages outlined by Table 13b. The class definition and related operations of the radio application management services are described in clause 8.5 of [EN303681-3].

TABLE 13a

| Radio Application Management Services | |
|---|---|
| Radio Application Management Services | Description |
| Report Discovered Peer Equipments | URA reports RCM about the accessible peer equipment(s) found during the procedure of the discovery process. In the case when the reconfigurable RE isr equested to be a peer equipment by another RE, the requesting RE shall be included as an accessible peer equipment too. |
| Create and Terminate Association with Peer Equipment | RCM requests URA to create/terminate association with an accessible peer equipment. See note. |
| Start and stop communication with Peer Equipment | Among the activated and associated URAs, RCM requests some selected URAs to perform actual transmission/reception of user data. |

NOTE:
This service is triggering the creation and termination of associations with peer equipment, using corresponding protocols of the respective RATs.

TABLE 13b

| Involved Entities | Messages |
|---|---|
| From RCF 310 to URA 307 | – Request of report discovered Peer Equipment.<br>– Request of create/terminate association with Peer Equipment.<br>– Request of start and stop communication with Peer Equipment. |
| From URA 307 to RCF 310 | – Confirmation of association creation.<br>– Confirmation of association termination.<br>– Confirmation of start communication with Peer Equipment.<br>– Confirmation of stop communication with Peer Equipment.<br>– Failure of association creation.<br>– Failure of association termination.<br>– Failure of start communication with Peer Equipment.<br>– Failure of stop communication with Peer Equipment.<br>– Information about discovered Peer Equipments. |

Table 14a describes the user data flow services, and the interfaces for the user data flow services are used to transmit the messages outlined by Table 14b. The class definition and related operations of the user data flow services are described in clause 8.5 of [EN303681-3].

TABLE 14a

| User Data Flow Services | |
|---|---|
| User Data Flow Services | Description |
| Data flow control | In sending or receiving user data, there might be some conflicts in data flow between sender and receiver. URA requests FC to change the configuration of data flow. |
| Send data | Transfer of transmit data from FC to URA. |
| Receive data | Transfer of receive data from URA to FC. |

TABLE 14b

| Involved Entities | Messages |
| --- | --- |
| From RCF 310 to URA 307 | – Request of user data transfer. Request of user data transfer initiates TX operation in URA.<br>– TX Information related to URA. Examples of TX Information may include signal bandwidth, carrier frequency, etc. It is provided when appropriate, for example after Request of user data transfer.<br>– Information related to TX User Data. Examples of Information related to TX User Data may include flow ID, size of the data packet, etc. It is provided when appropriate, for example after Request of user data transfer.<br>– Confirmation of data flow configuration changes.<br>– Confirmation of user data reception.<br>– Failure of data flow configuration changes.<br>– Failure of user data reception. |
| From URA 307 to RCF 310 | – Request for changing of data flow configuration.<br>– Request for user data reception. Request of user data reception initiates RX operation in RCF.<br>– RX Information related to URA. Examples of RX Information may include signal bandwidth, carrier frequency, etc. It is provided when appropriate, for example after Request of user data reception.<br>– Information related to RX user data. Examples of Information related to RX User Data may include flow ID, size of the data packet, etc. It is provided when appropriate, for example after Request of user data reception.<br>– Confirmation of user data transfer.<br>– Failure of user data transfer. |

Table 15a describes the services associated with the multiradio control, and the interfaces for the multiradio control services are used to transmit the messages outlined by Table 15b. The class definition and related operations of the multiradio control services are described in clause 8.5 of [EN303681-3].

TABLE 15a

| Multiradio Control Services | |
| --- | --- |
| Multiradio Control Services | Description |
| Synchronize Radio Time | MRC request all the active URAs to operate with a unified synchronism. |

TABLE 15b

| Involved Entities | Messages |
| --- | --- |
| From RCF 310 to URA 307<br>From URA 307 to RCF 310 | – Request of synchronize radio time.<br>– Confirmation of synchronize radio time.<br>– Failure of synchronize radio time. |

Primitives of the (g)URAI are outlined by Table 16.

TABLE 16

| Service Class | Primitives |
| --- | --- |
| RadioApplicationManagementServices | + reportPeerEquipment( ): PeerEquipmentList<br>+ creatNetAssociation( ): INTEGER<br>+ terminateNetAssociation( ): BOOLEAN<br>+ startTransmission( ): BOOLEAN<br>+ stopTransmission( ): BOOLEAN<br>+ startReception( ): BOOLEAN<br>+ stopReception( ): BOOLEAN |
| UserDataFlowServices | + requestChangeofDataflow( ): BOOLEAN<br>+ sendData( ): BOOLEAN<br>+ receiveData( ): BOOLEAN |
| MultiradioControlServices | + syncRadioTime( ): BOOLEAN |

Figure 11:
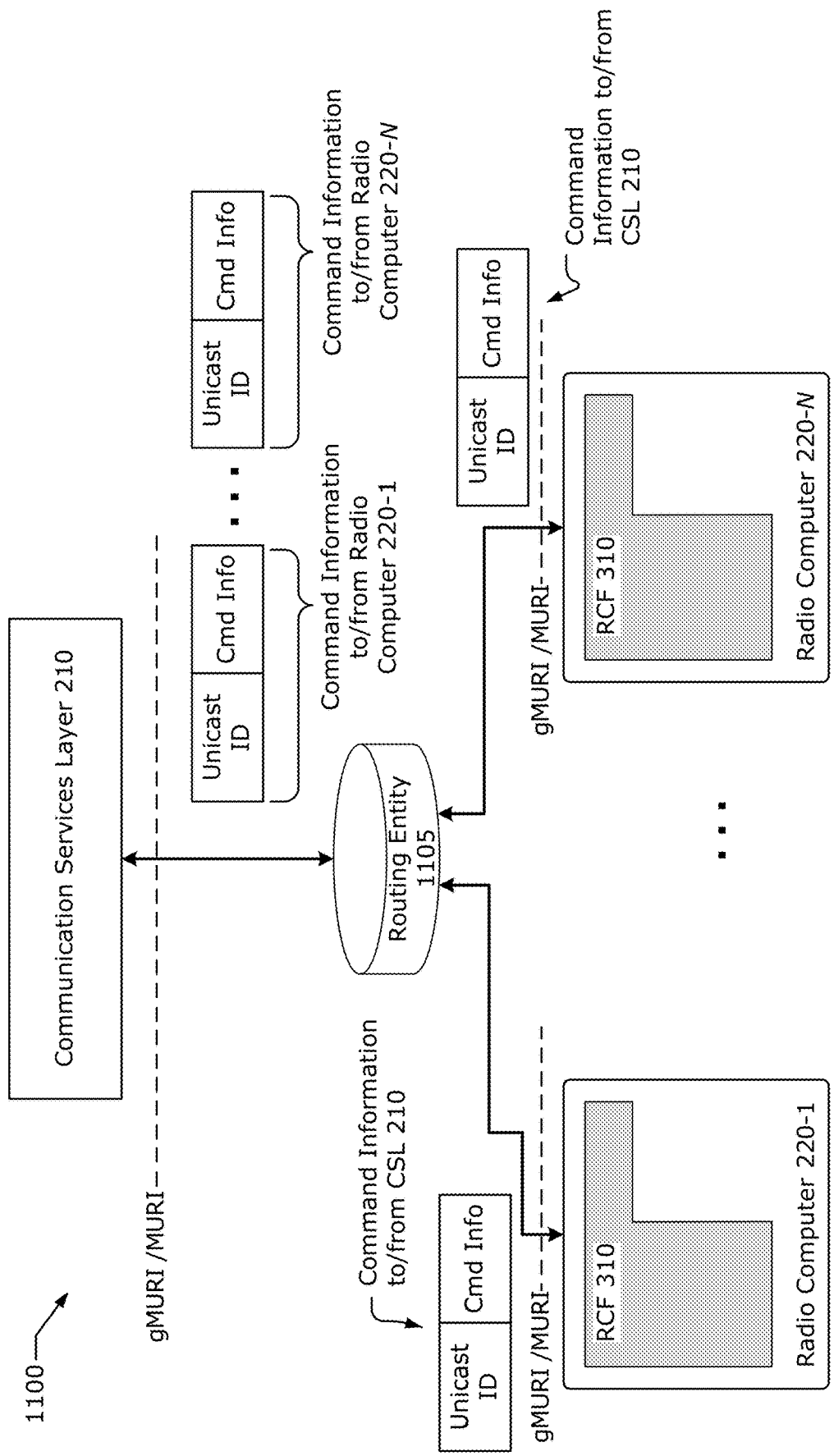
FIG. 11 shows an architecture for routing CSL message(s) to corresponding radio computer(s) in the case of multicast transmission.

FIG. 11 shows a routing architecture 1100 for the routing of the CSL message(s) to the corresponding radio computer(s) 300 in the case of multicast transmission. [EN303648] details that the CSL 210 interacts with a routing entity 1105 in order to communicate with various radio computers 220 as illustrated by FIG. 11. In FIG. 11, a routing entity 1105 interprets a multicast ID and forwards the data packets from the CSL 210 to the corresponding radio computers 300 (e.g., address translation is performed). For the reverse link (e.g., from radio computer 300 to CSL 210), unicast is applied.

Figure 12:
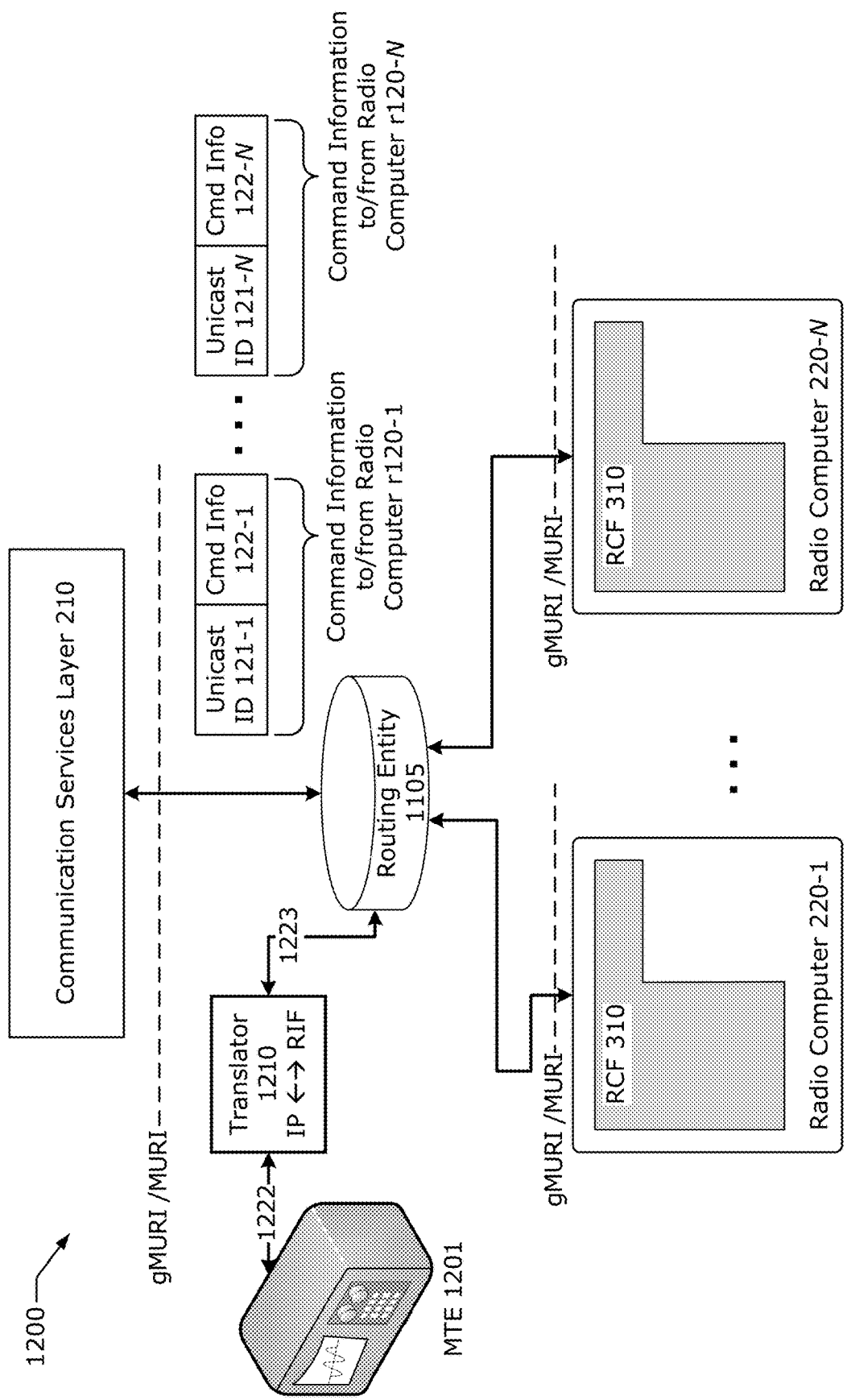
FIG. 12 shows the routing architecture of FIG. 11 enhanced with the packet-based access to equipment under test for the (g)MURI.

FIG. 12 shows a routing architecture 1200, which is a version of the routing architecture 1100 enhanced with the access to the equipment under test for (g)MURI. The routing architecture 1200 is enhanced with packet-based access (e.g., TCP/IP or UDP/IP based access), which allows access to the routing entity 1105. Here, a translation entity 1210 is introduced to provide access to the routing entity 1105 by the measurement (test) equipment (MTE) 1201. In some embodiments, the translation entity 1210 is provided by or introduced by an RE manufacturer (e.g., Original Equipment Manufacturer (OEM) or the like). The translation entity 1210 is a program, application, module, engine, compiler, software package, or other like hardware and/or software element that performs data translation, which may involve data transcoding and/or data transformation. For purposes of the present disclosure, the concept of "data translation" (or simply "translation") includes two different types of translation: transcoding and transformation.

"Transcoding" involves taking information/data in one format (e.g., a packed binary format) and translating the same information/data into another format in the same sequence. In other words, transcoding involves taking the same information in the same sequence and packaging the information (e.g., bits or bytes) differently. Transcoding does not involve rearranging the data, but instead involves changing the data from one format and writing it in another format, keeping the same order, sequence, and nesting of data items. "Transformation" is the process of converting data from a first format or structure into a second format or structure, and involves reshaping the data into the second format to conform with a schema and/or according to a transformation specification. Transformation involves rearranging data items, which may involve changing the order, sequence, and/or nesting of the data items (e.g., changing the schema of the data object). Stated another way, transformation involves going from one schema to another schema. The transformation specification indicates how to extract data out of the first format and how to create a completely different shape of data (e.g., the second format) from the extracted data. For example, a transformation specification may define how to handle different nodes (e.g., DOM nodes) if/when encountered and how to generate a result tree data structure from the encountered nodes (where the result tree is the basis for the output data structure).

In embodiments, the translation entity 1210 obtains (e.g., retrieves, accesses, reads, or is provided with directly or from a memory) data (or an instance of data) and/or control signaling (or an instance of control signaling) in a first format from the MTE 1201 over interface 1222 between the MTE 1201 and the translator 1210. The translation entity 1210 translates the signaling from the first format into a second format for consumption by the routing entity 1105 (e.g., for data/commands from MTE 1201 to the RE 201). The translation entity 1210 then sends the signaling in the second format over an interface 1223 between the translation entity 1210 and the routing entity 1105. Additionally, the translation entity 1210 obtains data and/or control signaling from the RE 201 over the interface 1223 in the second format, translates the data and/or control signaling into the first format for consumption by the MTE 1201 (e.g., for data/commands from the RE 201 to the MTE 1201), and sends the data and/or control signaling in the first format over the interface 1222 to the MTE 1201.

The first format data and/or control signaling may comprise messages, packets, frames, PDUs, SDUs, and/or the like. In some implementations, the first format may comprise TCP/IP packets, UDP/IP packets, or some other openly defined transport and/or internet layer packets (such as those discussed herein). The second format may be an RE internal format (RIF) or manufacturer such as a manufacturer or platform-specific internal format.

The packet-based access is provided to the external MTE 1201 for the following flows:

The MTE 1201 provides data/commands (or instances of data/commands) to any of the Radio Computers 300 (e.g., short-cutting the normal communication between the CSL 210 and the Radio Computers 300).

The MTE 1201 provides data/commands to any of the CSL 210 (e.g., short-cutting the normal communication between the Radio Computers 300 and the CSL 210).

One or more Radio Computers 300 provide data/commands to the MTE 1201 (e.g., short-cutting the normal communication between the CSL 210 and the Radio Computers 300).

The CSL 210 provides data/commands to the MTE 1201 (e.g., short-cutting the normal communication between the Radio Computers 300 and the CSL 210).

With the set-up introduced in FIG. 12, the MTE 1201 can directly access the target equipment under test (EUT) (e.g., RE 201) and is able to verify the correct implementation of any of the Interfaces (e.g., the (g)MURI) and is also able to verify key functionalities of the CSL 210, the Radio Computers 300 and their respective RCFs 310.

Figure 13:
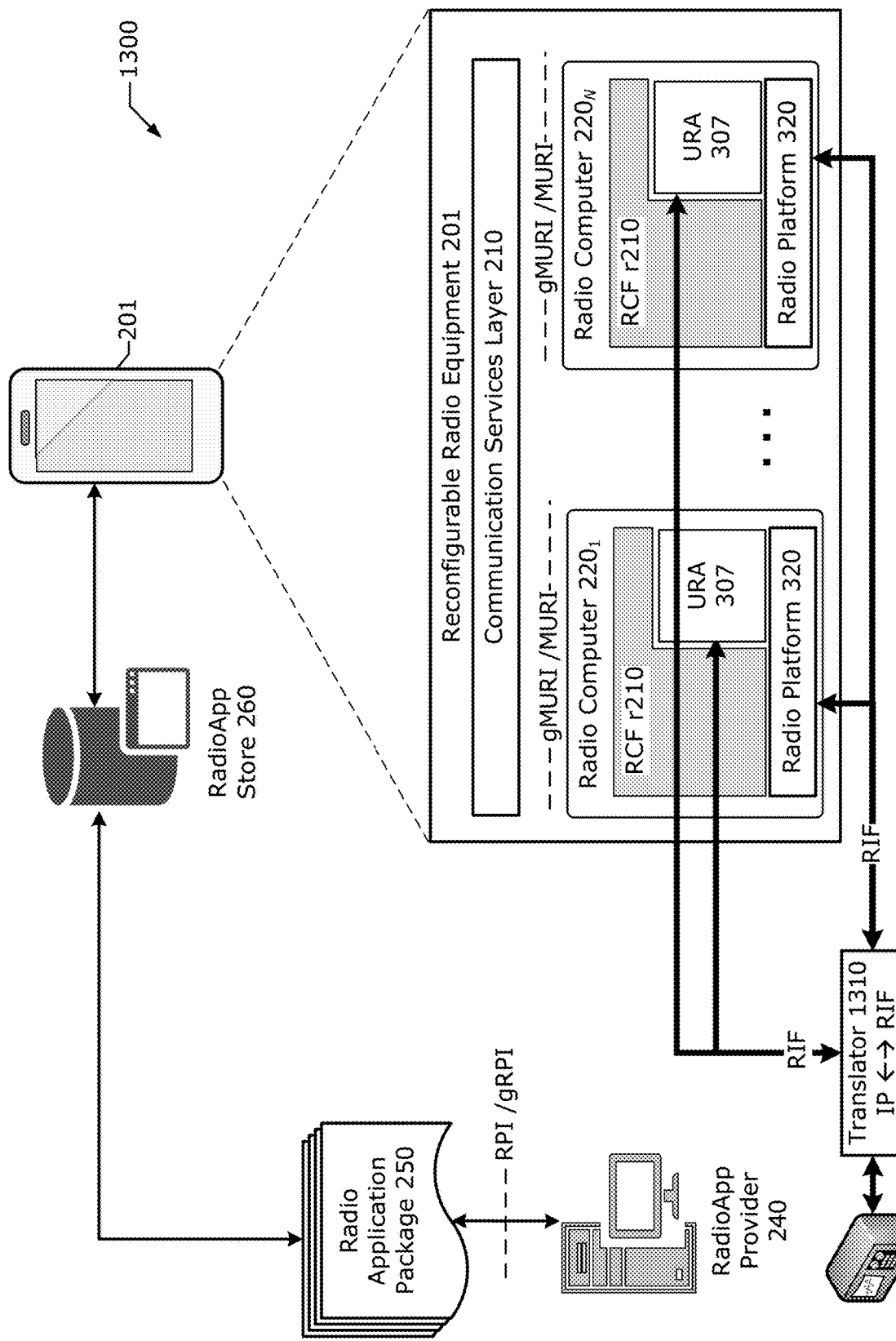
FIG. 13 shows an example packet-based access to equipment under test for a Reconfigurable Radio Frequency Interface (RRFI) and generalized RRFI (gRRFI) and Unified Radio Application Interface (URAI) and generalized URAI (gURAI).

FIG. 13 shows an example packet-based access 1300 to an EUT (e.g., RE 201) for (g)RRFI and (g)URAI. Here, the MTE 1301 may be the same or similar to MTE 1201. The translation entity 1310 may be the same or similar to the translation entity 1310, although the formats to be translated/transformed may be different for the (g)RRFI and/or (g)URAI than those performed for the (g)MURI. With the set-up introduced in FIG. 12, the MTE 1201 can directly access the EUT (e.g., RE 201) to verify the correct implementation of any of the interfaces (e.g., the (g)RRFI and/or (g)URAI) and is also able to verify key functionalities of the URAs 307, RCFs 310, and TRx 322.

Referring back to FIG. 14, the interface testing procedure 1400 can be used for testing the interface(s) of the EUT. At operation 1405, the MTE 1201 activates a test mode is activated for an RE element to be operated for the test (e.g., RCF 310 for testing the (g)MURI, RF TRx 322 for testing the (g)RRFI, and URA 307 for testing the (g)URAI). At operation 1410, RRAP1 and RRAP2 are installed onto the target equipment (e.g., RE 201). At operation 1415, service primitives are fed from a source entity to a destination entity (e.g., the activated test entity) and verified by one or both of the RRAPs. For example, for testing the (g)MURI, some or all of service primitives as defined in [EN303146-1] and/or [EN303681-1] are fed from CSL 210 to RCF 310 and verified by RRAP1, for example, performing the actions discussed in section 1.2.3.3. In another example, for testing the (g)RRFI, some or all of service primitives as defined in [EN303146-2] and/or [EN303681-2] are fed from the URA 307 to the RF TRx 322 (or vice versa) and verified by RRAP1. In another example, for testing the (g)URAI, some or all of service primitives as defined in [EN303146-3] and/or [EN303681-3] are fed from the URA 307 to the RCF 310 (or vice versa) and verified by RRAP1.

Similar to the (g)MURI, a direct external testing access is also used for the (g)RRFI and (g)URAI as illustrated by FIG. 13. An example testing procedure for the (g)RRFI is as follows:

Test of "Spectrum Control Services" including one or more of:

TX Center Frequencies are set following the manufacturer's declaration on supported options: +setTxCenterFrequency( ): BOOLEAN TX Signal Bandwidth values are set following the manufacturer's declaration on supported options: +setTxBandwidth( ): BOOLEAN TX Sampling Rate values are set following the manufacturer's declaration on supported options: +setTxSamplingRate( ): BOOLEAN RX Center Frequency values are set following the manufacturer's declaration on supported options: +setRxCenterFrequency( ): BOOLEAN RX Signal Bandwidth values are set following the manufacturer's declaration on supported options: +setRxBandwidth( ): BOOLEAN RX Sampling Rate values are set following the manufacturer's declaration on supported options: +setRxSamplingRate( ): BOOLEAN TX Chain Parameters are requested, received and validated following the manufacturer's declaration: +getTxChainParameters( ):TxChainParameters RX Chain Parameters are requested, received and validated following the manufacturer's declaration: +getRxChainParameters( ): RxChainParameters Test of "Power Control Services" including one or more of:

Maximum TX Power Level is set following the manufacturer's declaration and validated at the RF outputs: +setMaximumTxPowerLevel( ): BOOLEAN Maximum TX Antenna Power Level is set following the manufacturer's declaration and validated at the RF outputs:+setTxAntennaPower( ): BOOLEAN Rx Gain values are set following the manufacturer's declaration, an input signal is provided by the test equipment to the RF input and the decoding is verified (possible/not possible depending on the combination of RF input power levels and Rx Gain values): +setRxGain( ): BOOLEAN Tx Power Levels related information is requested, received and validated following the manufacturer's declaration: +getMeasurementsofTxPowerLevels( ):TxPowerLevels Test of "Antenna Management Services" including one or more of:

All possible Tx Antenna Ports are activated (one by one) following the manufacturer's declaration, a corresponding output signal is created (typically through a reference Radio Application Package) and the RF outputs are verified: +setTxAntennaPort( ): INTEGER All possible Rx Antenna Ports are activated (one by one) following the manufacturer's declaration, a corresponding input signal is created by the test equipment and the received signal is validated (typically through a suitable Radio Application Package): +setRxAntennaPort( ): INTEGER Test of "Tx/Rx Chain Control Services" including one or more of:

Suitable TxStartTime values are set following the manufacturer's declaration, suitable output signals are created (typically through a suitable Radio Application Package) and verified at the RF outputs: +setTxStartTime( ): TxStartTime Suitable TxStopTime values are set following the manufacturer's declaration, suitable output signals are created (typically through a suitable Radio Application Package) and verified at the RF outputs: +setTxStopTime( ): TxStopTime Suitable RxStartTime values are set following the manufacturer's declaration, suitable input signals are created (typically through the test equipment) and verified at the RF outputs (typically through a suitable Radio Application Package): +setRxStartTime( ): RxStartTime Suitable RxStopTime values are set following the manufacturer's declaration, suitable input signals are created (typically through the test equipment) and verified at the RF outputs (typically through a suitable Radio Application Package): +setRxStopTime( ): RxStopTime Suitable Tx Chain parameters are updated following the manufacturer's declaration and the resulting changes are validated at the RF outputs: +updateTxChainParameters( ): BOOLEAN Suitable Rx Chain parameters are updated following the manufacturer's declaration, suitable input signals are created by the Test Equipment and the resulting changes are validated (typically through a suitable Radio Application Package): +updateRxChainParameters( ):BOOLEAN Test of "RVM Protection Services" including one or more of:

RF Protection classes are set following the manufacturer's declaration, it is verified whether a reference Radio Application package can then only change RF parameters within the framework allowed by the selected RF protection class: +setRFProtectionClass( ): AckType RF Protection classes are changed following the manufacturer's declaration, it is verified whether a reference Radio Application package can then only change RF parameters within the framework allowed by the selected RF protection class: +RequestConditionalChangeOfProtectionClass( ): AckType The status of a RF Protection Class configuration is requested, received and validated by the test equipment: +RequestStatusRFProtectionClass( ): ProtectionStatusType Following the selection of a RF Protection Class configuration and the transmission of data, information is requested on any modification of data applied by the platform in order to meet the RF protection class requirements, the corresponding information is received and validated by the test equipment: +RequestInformationOnDataModificationByRFProtection( ): RFProtectionInformationType The platform is configured to have multiple RATs are transmitting (receiving) simultaneously (typically through suitable Radio Application Package(s)). In this case, it is possibly that the various RATs interfere with each other. Corresponding information is requested, received and validated by the testing equipment: +RequestInformationOnCrossRAInterferenceByRFProtection( ): RFProtectionInformationType The equipment under test is configured to create out RF signals such that there is a massive violation of the emission limitations (e.g. massive OOB/spurious emissions, etc.). In such a case, the RF Front-End may decide to switch off the concerned transmission. The corresponding behavior is triggered (typically through a suitable Radio Application Package), observed and validated by the testing equipment: +RequestInformationOnEmergencySwitchoffByRFProtection( ): ProtectionStatusType An example testing procedure or the (g)URAI is as follows:

Test of "Radio Application Management Services" including one or more of:

For the test, several Peer Equipment stations are set up and the platform is requested to obtain the list of discovered Peer Equipment, which is then received and validated by the test equipment: +reportPeerEquipment( ): PeerEquipmentList A peer equipment station is set up and a connection to this peer equipment is requested to be established; this is validated by the testing equipment typically through connecting to both the source and destination equipment and validating the creation of the association: +createNetAssociation( ): INTEGER A peer equipment station is set up and a connection to this peer equipment is requested to be established and then subsequently terminated; this is validated by the testing equipment typically through connecting to both the source and destination equipment and validating the termination of the association: +terminateNetAssociation( ): BOOLEAN The transmission is started, the testing equipment is typically validating the related actions on the level of the URAI or at the RF outputs: +startTransmission( ): BOOLEAN The transmission is terminated, the testing equipment is typically validating the related actions on the level of the URAI or at the RF outputs: +stopTransmission( ): BOOLEAN The reception is started, the testing equipment is typically validating the related actions on the level of the URAI or an input signal is fed to the RF inputs: +startReception( ): BOOLEAN The reception is terminated, the testing equipment is typically validating the related actions on the level of the URAI or an input signal is fed to the RF inputs and then the inputs are subsequently terminated: +stopReception( ): BOOLEAN Test of "User Data Flow Services" including one or more of:

The testing equipment requests changes in the data flow configuration following the manufacturer's declaration, the corresponding modified data flow characteristics are observed and validated by the testing equipment: +requestChangeofDataflow( ): BOOLEAN The sending of data is initiated, the testing equipment verifies the corresponding actions directly on the URAI interface or at the RF outputs: +sendData( ): BOOLEAN The receiving of data is initiated, the testing equipment verifies the corresponding actions directly by evaluating received data (for example triggered by providing suitable inputs to the RF front-end inputs): +receiveData( ): BOOLEAN Test of "Multiradio Control Services" including one or more of:

The synchronization of Radio Time is initiated following the manufacturer's declaration, the correspondingly synchronized signals are validated either on the level of URAI at the outputs or inputs of the RF front-end: +syncRadioTime( ): BOOLEAN The corresponding commands indicated above are typically added to an TCP/IP or UDP/IP package (packets) as one or more of:

Clear text of the command is used (e.g., text string "syncRadioTime") or an abbreviated version thereof;

A pre-defined code is being used instead of an (abbreviated) text string, e.g. "syncRadioTime" may be replaced by a number such as 0, 1, . . . . The manufacturer (of the test equipment or the equipment under test) may provide a declaration which command corresponds to which number; and/or Any other representation of the command may be applied in the corresponding packet created by the testing equipment.

Still referring to FIG. 14, at operation 1420, the outputs produced after application of the service primitives is verified and/or validated. At operation 1425, the outputs are determined to be correct or incorrect. In case that one of the service primitives is incorrectly implemented, the test fails at operation 1430. In case that the service primitives are correctly implemented, the test passed at operation 1435. After verification/validation of the service primitives, the test is concluded.

1.2.5. Modular Software Reconfiguration for Radio Equipment

The software reconfiguration approaches discussed herein enable reconfiguration of REs through software as specified in ETSI EN 303 641 V1.1.2 (2020 March) ("[EN303641]"), ETSI EN 303 648 V1.1.2 (2020 March) ("[EN303648]"), ETSI EN 303 681-1 V1.1.2 (2020 June) ("[EN303681-1]"), ETSI EN 303 681-2 V1.1.2 (2020 June) ("[EN303681-2]"), and ETSI EN 303 681-4 V1.1.2 (2020 June) ("[EN303681-4]"), and the use cases discussed in ETSI TR 103 585 V1.1.1 (2018 February) ("[TR103585]"); the overall framework is complemented by security solutions such as those discussed in ETSI TS 103 436 V1.2.1 (2018 February) ("[TS103436]"). The specific case of Mobile Device reconfiguration is addressed in ETSI EN 303 095 V1.3.1 (2018-05) ("[EN303095]"), ETSI EN 303 146-1 V1.3.1 (2018 June) ("[EN303146-1]"), ETSI EN 303 146-2 V1.1.5 (2016 March) ("[EN303146-2]"), ETSI EN 303 146-3 V1.3.1 (2018 June) ("[EN303146-3]"), ETSI EN 303 146-4 V1.1.1 (2017 January) ("[EN303146-4]"), ETSI TR 103 087 v1.2.1 (2017 November) ("[TR103087]"), and [TS103436]. The software reconfiguration approaches have been designed from a holistic perspective with an emphasis on the needs of commercial equipment, addressing: technical requirements (e.g., code portability and efficiency), security requirements (e.g., security delivery and installation of software components), and regulatory requirements (e.g., technical solutions for re-certification of platforms when radio characteristics are modified).

In various implementations, reconfiguration can be performed on an individual level (e.g., users choosing among new features for their respective component) or en-mass (e.g., automatic upgrade of all platforms). Reconfigurable REs may also be tailored to the needs of the [RED], which includes articles on software reconfiguration. Specific attention is given to security requirements, addressing in particular: proof of conformance of the radio platform and radio applications to the regulatory Declaration of Conformity, considering that the set of installed radio applications can change over time; proof of the integrity of radio applications; proof of the identity of the developer of radio applications; built-in support for security updates; and prevention of code theft.

Moving from today's hardware design principles to software reconfiguration solutions will likely require a paradigm change, which can take place in a gradual step-wise approach. For example, in a first-generation implementation, the functionality may be limited to a replacement of specific (hardwired) components by executable software, designed specifically for a given target platform. Features such as secure delivery of software components and installation will be sufficient to address this need. Hardware resources (e.g., FPGA resources) are typically added to the original design to enable the replacement. Second-generation implementations may build on the first-generation implementations to design portable and yet highly (power) efficient code thanks to the Radio Virtual Machine (RVM). The RVM is a representation of a radio algorithm and may be somewhat different from other virtual machine concepts as generally applied in the computer science and IT arts. Furthermore, the level of autonomy of the platform may evolve over time, including distributed selection of the most relevant features and dynamic replacement of corresponding software components.

With the above features, the software reconfiguration solution is suited to meet the requirements of 5G and beyond applications. For example, it will enable automotive communication platforms to remain relevant over the lifetime of a vehicle and to address platform vulnerabilities which may arise over the lifetime of a vehicle, enable product adaptation to specific market needs for Internet of Things (IoT) solutions, etc.

1.2.5.1. Use Case 1—Smartphone Reconfiguration

Figure 15:
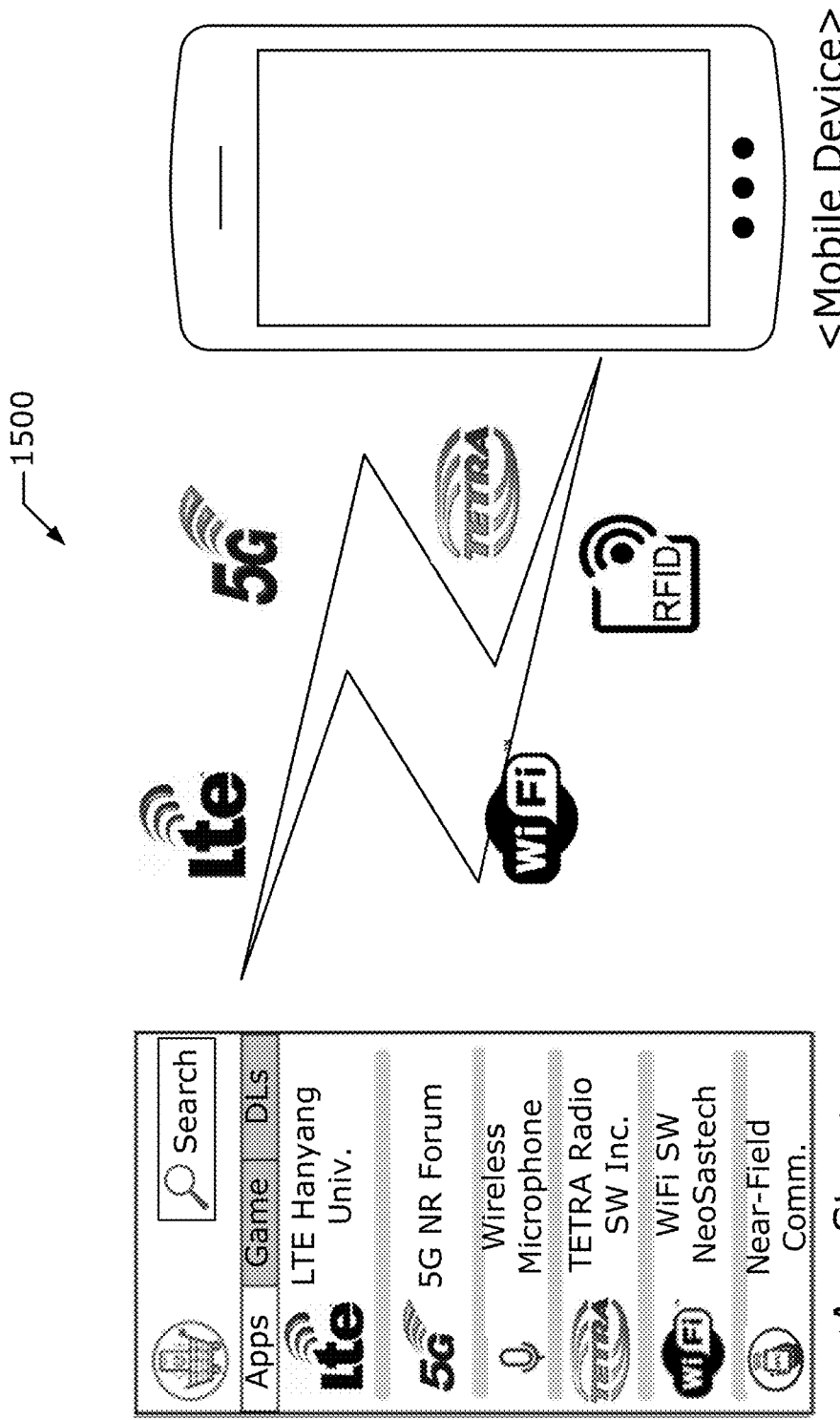
FIG. 15 illustrates an example smartphone reconfiguration use case according to various embodiments.

FIG. 15 shows an example smartphone reconfiguration use case 1500 according to various embodiments. In today's world, the usage of smartphone apps is ubiquitous. These applications, however, typically provide new tools or games to the end-user without altering any radio parameters. The ETSI software reconfiguration solution provides a framework for introducing RadioApps, i.e. applications which extend or modify existing radio features and define solutions for technical, certification and security needs.

Such RadioApps will be used to optimize the operation of a smartphone in general or for usage in a specific market with special needs. In a typical example of case i) RadioApps will be used to optimize the operation of a smartphone in response to the introduction of new features on the network side as they evolve in future releases of the 3GPP standard. In addition, the optimum configuration is identified (e.g., new power-efficient modulation and coding schemes, etc.) to meet power efficiency (see e.g., Siaud et al., "Green-oriented multi-techno link adaptation metrics for 5G heterogeneous networks", EURASIP J Wireless Com Networking, 2016, Art. No. 92, pp. 1-13 (1 Apr. 2016), available at: https://doi.org/10.1186/s13638-016-0588-2), predictable QoS and other requirements. To give an example of specific market usages, in an industrial environment, new mechanisms may be added through software reconfiguration taking the specific characteristics of the usage environment into account. Beyond the provisioning of additional modules, the ETSI framework also allows for the replacement of entire RATs in cases where sufficient computational resources are available.

1.2.5.2. Use Case 2—Automotive Applications

Automotive communication is currently a key trend in the industry. Solutions for Vehicle-to-Everything (V2X) communications, including Vehicle-to-Vehicle (V2V), Vehicle-to-Infrastructure (V2I), etc., are currently being developed with the objective to guarantee a safe(r) driving environment for the future. The challenge is to ensure that a radio communications component remains relevant over the entire lifetime of a vehicle, i.e. ten years and beyond. It is almost certain that a V2X framework feature-set will evolve within this period. Software reconfiguration will enable manufacturers to replace specific software and thus maintain related feature-sets up to date without requiring changes to the hardware. This approach reduces the overall cost for change since a vehicle does not need to be upgraded by an authorized dealer (as it would be required for hardware changes), but the process is handled through over-the-air remote control.

1.2.5.3. Use Case 3—Radio Access Network (Ran) Reconfiguration

With the evolution of wireless standards, network functions need to be updated. In this use case, the installation of RadioApps can be used to provide updated or new features which address the radio characteristics of the network. Network functions are distributed across a variety of physical entities which all require dedicated software updates for the provisioning of a specific new service. Such equipment may then be further connected to a larger network, for example through wireless or cabled backbone network access. In this use case, the network operator is able to alter or extend the functionalities of this equipment through installation of suitable RadioApps.

1.2.5.4. Use Case 4—Internet-of-Things Device Reconfiguration

Future IoT devices, including 5G and beyond, will address a substantial variety of use cases, encompassing for example gaming, voice communication, medical applications, industrial automation, etc. Each such application has its particular needs in terms of features, form factors, etc. Due to quasi-infinite possibilities, it is unlikely that chip-makers will offer tailored components for each application. Rather, a limited number of generic and reconfigurable components will be made available which are suitably tailored to the target market through software components. The ETSI software reconfiguration solution provides a suitable ecosystem to support the future IoT market needs.

1.2.5.5. Use Case 5—Radio Reconfiguration Through an External Component USB Stick)

This use case concerns standalone radio external components that embed all the capabilities necessary to radio processing. The host device is not involved in radio processing but may configure operational parameters as allowed by the external component (e.g., a USB Stick). Thus, the separation between the host device and the external component is clear and embodied by the physical interface between the two. On the host device, only a device driver is necessary to operate the external component and integrate it into the networking stack. In order to reconfigure the external component, the host device may be used as a staging area to store Radio Applications which are then loaded on the external component via the device driver (e.g., the device driver may leverage the Administrator).

1.2.5.6. Use Case 6—Reconfigurable Satellite Telecom Payload

Figure 16:
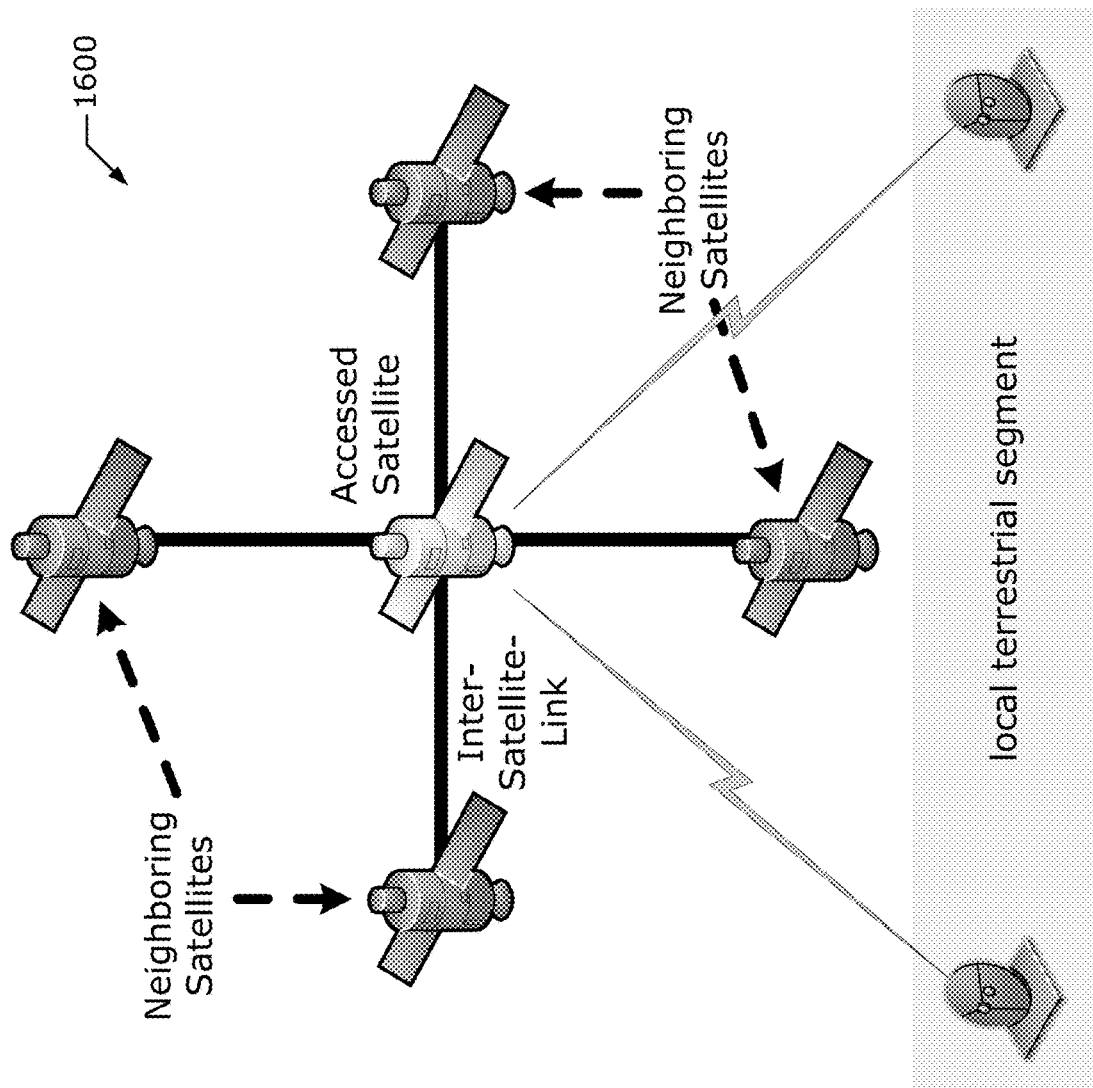
FIG. 16 illustrates an example of software reconfiguration enabling satellite telecom payload according to various embodiments

FIG. 16 shows an example of software reconfiguration enabling satellite telecom payload according to various embodiments. The lifetime of satellites varies from a few years for Low Earth Orbiting (LEO) satellites until 10 or even 15 years for Geostationary Earth Orbit (GEO) satellites. This fact and the rapid progress in the field of digital communications raise the problem of technological obsolescence of onboard telecom payload. The emergence of new signal processing algorithms and new standards that provide reliable and high-speed transmission of information requires the reconfiguration of the onboard equipment. Satellite communication systems are considered as a part of the global network infrastructure with the integrated satellite segment. Therefore, they should be provisioned within the same management framework as the terrestrial segment, including the management approach for radio software reconfiguration.

1.2.5.7. Use Case 7—Bug-Fix and Security Updates

Bug-fixes and security updates are essential to the maintenance of software, and as such also for a Radio Application throughout its lifecycle. Bug-fixes help ensure that Radio Applications will behave according to specification even after the Radio Application has been installed on a device. Security updates help ensure the integrity of an implementation. Application security is an evolving field and implementations believed to be secure at some point in time may later become insecure as new attack methods are devised.

1.2.5.8. Use Case 8—Medical Applications

Medical applications, such as remote surgery, monitoring of patient's life support data, etc. require highly reliable and stable communication systems. Still, software reconfiguration is expected to be broadly applied in order to enable users to have access to latest software updates and best possible functionalities. For example, in this context it is of specific importance to immediately remedy any incorrect behavior or security vulnerabilities in order to ensure a maximum level of protection.

2. Edge Computing System Configurations and Arrangements

Edge computing, at a general level, refers to the implementation, coordination, and use of computing and resources at locations closer to the "edge" or collection of "edges" of the network. The purpose of this arrangement is to improve total cost of ownership, reduce application and network latency, reduce network backhaul traffic and associated energy consumption, improve service capabilities, and improve compliance with security or data privacy requirements (especially as compared to conventional cloud computing). Components that can perform edge computing operations ("edge nodes") can reside in whatever location needed by the system architecture or ad hoc service (e.g., in an high performance compute data center or cloud installation; a designated edge node server, an enterprise server, a roadside server, a telecom central office; or a local or peer at-the-edge device being served consuming edge services).

Individual compute platforms or other components that can perform edge computing operations (referred to as "edge compute nodes," "edge nodes," or the like) can reside in whatever location needed by the system architecture or ad hoc service. In many edge computing architectures, edge nodes are deployed at NANs, gateways, network routers, and/or other devices that are closer to endpoint devices (e.g., UEs, IoT devices, etc.) producing and consuming data. As examples, edge nodes may be implemented in a high performance compute data center or cloud installation; a designated edge node server, an enterprise server, a roadside server, a telecom central office; or a local or peer at-the-edge device being served consuming edge services.

Edge compute nodes may partition resources (e.g., memory, CPU, GPU, interrupt controller, I/O controller, memory controller, bus controller, network connections or sessions, etc.) where respective partitionings may contain security and/or integrity protection capabilities. Edge nodes may also provide orchestration of multiple applications through isolated user-space instances such as containers, partitions, virtual environments (VEs), virtual machines (VMs), Function-as-a-Service (FaaS) engines, Servlets, servers, and/or other like computation abstractions. Containers are contained, deployable units of software that provide code and needed dependencies. Various edge system arrangements/architecture treats VMs, containers, and functions equally in terms of application composition. The edge nodes are coordinated based on edge provisioning functions, while the operation of the various applications are coordinated with orchestration functions (e.g., VM or container engine, etc.). The orchestration functions may be used to deploy the isolated user-space instances, identifying and scheduling use of specific hardware, security related functions (e.g., key management, trust anchor management, etc.), and other tasks related to the provisioning and lifecycle of isolated user spaces Applications that have been adapted for edge computing include but are not limited to virtualization of traditional network functions (e.g., to operate telecommunications or Internet services) and the introduction of next-generation features and services (e.g., to support 5G network services). Use-cases which are projected to extensively utilize edge computing include connected self-driving cars, surveillance, Internet of Things (IoT) device data analytics, video encoding and analytics, location aware services, device sensing in Smart Cities, among many other network and compute intensive services.

Edge computing may, in some scenarios, offer or host a cloud-like distributed service, to offer orchestration and management for applications and coordinated service instances among many types of storage and compute resources. Edge computing is also expected to be closely integrated with existing use cases and technology developed for IoT and Fog/distributed networking configurations, as endpoint devices, clients, and gateways attempt to access network resources and applications at locations closer to the edge of the network.

The present disclosure provides specific examples relevant to edge computing configurations provided within Multi-Access Edge Computing (MEC) and 5G network implementations. However, many other standards and network implementations are applicable to the edge and service management concepts discussed herein. For example, many other edge computing/networking technologies may be applicable to the present disclosure in various combinations and layouts of devices located at the edge of a network. Examples of such other edge computing/networking technologies include Content Delivery Networks (CDNs) (also referred to as "Content Distribution Networks" or the like); Mobility Service Provider (MSP) edge computing and/or Mobility as a Service (MaaS) provider systems (e.g., used in AECC architectures); Nebula edge-cloud systems; Fog computing systems; Cloudlet edge-cloud systems; Mobile Cloud Computing (MCC) systems; Central Office Re-architected as a Datacenter (CORD), mobile CORD (M-CORD) and/or Converged Multi-Access and Core (COMAC) systems; and/or the like. Further, the techniques disclosed herein may relate to other IoT edge network systems and configurations, and other intermediate processing entities and architectures may also be used for purposes of the present disclosure.

Figure 17:
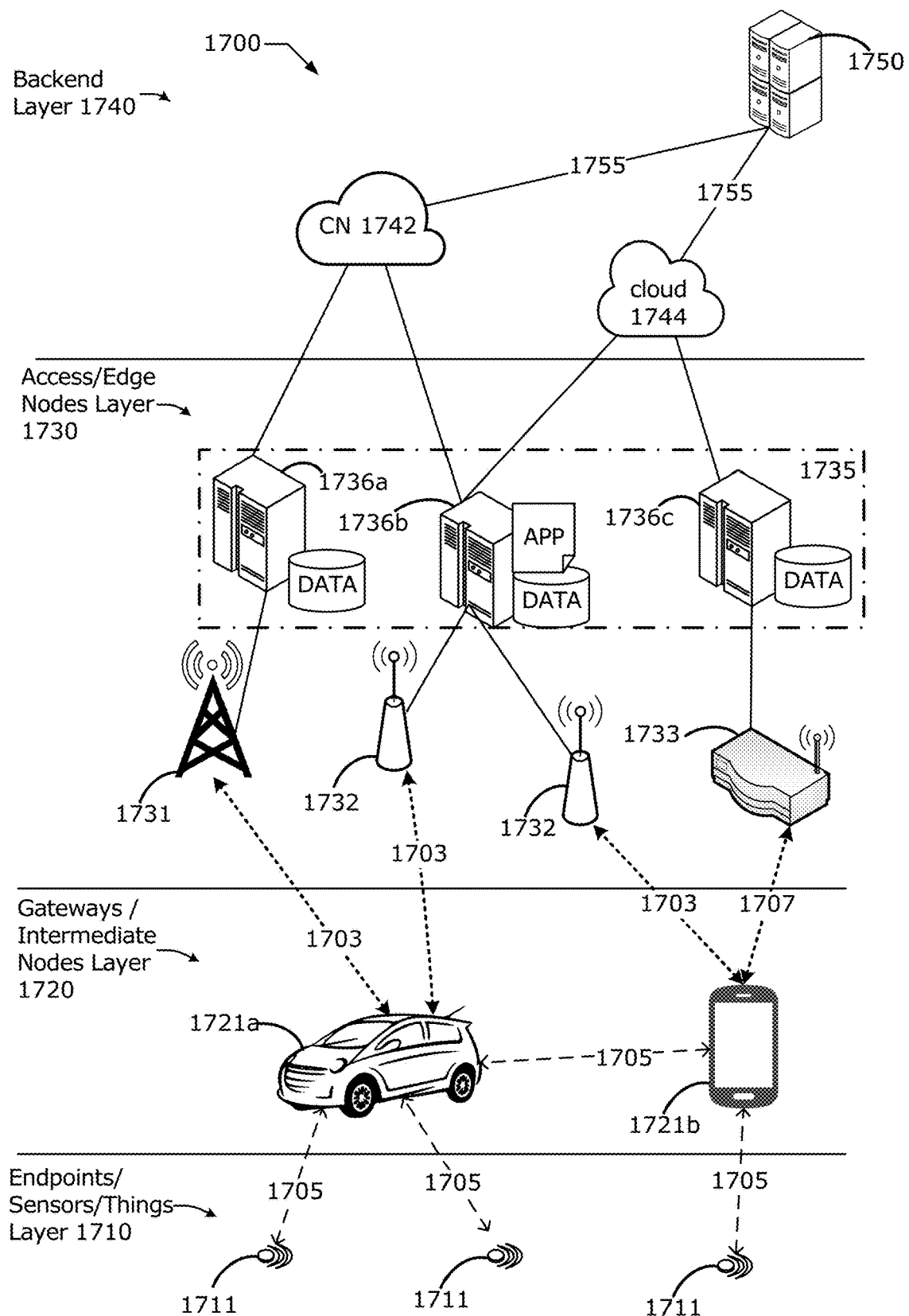
FIG. 17 illustrates an example edge computing environment.

FIG. 17 illustrates an example edge computing environment 1700. FIG. 17 specifically illustrates the different layers of communication occurring within the environment 1700, starting from endpoint sensors or things layer 1710 (e.g., operating in an Internet of Things (IoT) network topology) comprising one or more IoT devices 1711 (also referred to as edge endpoints 1710 or the like); increasing in sophistication to gateways or intermediate node layer 1720 comprising one or more user equipment (UEs) 1721a and 1721b (also referred to as intermediate nodes 1720 or the like), which facilitate the collection and processing of data from endpoints 1710; increasing in processing and connectivity sophistication to access node layer 1730 (or "edge node layer 1730") comprising a plurality of network access nodes (NANs) 1731, 1732, and 1733 (collectively referred to as "NANs 1731-1733" or the like) and a plurality of edge compute nodes 1736a-c (collectively referred to as "edge compute nodes 1736" or the like) within an edge computing system 1735; and increasing in connectivity and processing sophistication to a backend layer 1710 comprising core network (CN) 1742 and cloud 1744. The processing at the backend layer 1710 may be enhanced by network services as performed by one or more remote application (app) servers 1750 and/or other cloud services. Some or all of these elements may be equipped with or otherwise implement some or all features and/or functionality discussed herein.

The environment 1700 is shown to include end-user devices, such as intermediate nodes 1720 and endpoints 1710, which are configured to connect to (or communicatively couple with) one or more multiple communication networks (also referred to as "access networks," "radio access networks," or the like) based on different access technologies (or "radio access technologies") for accessing application services. These access networks may include one or more of NANs 1731, 1732, and/or 1733. The NANs 1731-1733 are arranged to provide network connectivity to the end-user devices via respective links 1703, 1707 between the individual NANs and the one or more UEs 1711, 1721.

As examples, the communication networks and/or access technologies may include cellular technology such as LTE, MuLTEfire, and/or NR/5G (e.g., as provided by Radio Access Network (RAN) node 1731 and/or RAN nodes 1732), WiFi or wireless local area network (WLAN) technologies (e.g., as provided by access point (AP) 1733 and/or RAN nodes 1732), and/or the like. Different technologies exhibit benefits and limitations in different scenarios, and application performance in different scenarios becomes dependent on the choice of the access networks (e.g., WiFi, LTE, etc.) and the used network and transport protocols (e.g., Transfer Control Protocol (TCP), Virtual Private Network (VPN), Multi-Path TCP (MPTCP), Generic Routing Encapsulation (GRE), etc.).

The intermediate nodes 1720 include UE 1721*a* and UE 1721*b* (collectively referred to as "UE 1721" or "UEs 1721"). In this example, the UE 1721*a* is illustrated as a vehicle UE, and UE 1721*b* is illustrated as a smartphone (e.g., handheld touchscreen mobile computing device connectable to one or more cellular networks). However, these UEs 1721 may comprise any mobile or non-mobile computing device, such as tablet computers, wearable devices, PDAs, pagers, desktop computers, laptop computers, wireless handsets, unmanned vehicles or drones, and/or any type of computing device including a wireless communication interface.

The endpoints 1710 include UEs 1711, which may be IoT devices (also referred to as "IoT devices 1711"), which are uniquely identifiable embedded computing devices (e.g., within the Internet infrastructure) that comprise a network access layer designed for low-power IoT applications utilizing short-lived UE connections. The IoT devices 1711 are any physical or virtualized, devices, sensors, or "things" that are embedded with hardware and/or software components that enable the objects, devices, sensors, or "things" capable of capturing and/or recording data associated with an event, and capable of communicating such data with one or more other devices over a network with little or no user intervention. As examples, IoT devices 1711 may be abiotic devices such as autonomous sensors, gauges, meters, image capture devices, microphones, light emitting devices, audio emitting devices, audio and/or video playback devices, electro-mechanical devices (e.g., switch, actuator, etc.), EEMS, ECUs, ECMs, embedded systems, microcontrollers, control modules, networked or "smart" appliances, MTC devices, M2M devices, and/or the like. The IoT devices 1711 can utilize technologies such as M2M or MTC for exchanging data with an MTC server (e.g., a server 1750), an edge server 1736 and/or edge computing system 1735, or device via a PLMN, ProSe or B2D communication, sensor networks, or IoT networks. The M2M or MTC exchange of data may be a machine-initiated exchange of data.

The IoT devices 1711 may execute background applications (e.g., keep-alive messages, status updates, etc.) to facilitate the connections of the IoT network. Where the IoT devices 1711 are, or are embedded in, sensor devices, the IoT network may be a WSN. An IoT network describes an interconnecting IoT UEs, such as the IoT devices 1711 being connected to one another over respective direct links 1705. The IoT devices may include any number of different types of devices, grouped in various combinations (referred to as an "IoT group") that may include IoT devices that provide one or more services for a particular user, customer, organizations, etc. A service provider (e.g., an owner/operator of server 1750, CN 1742, and/or cloud 1744) may deploy the IoT devices in the IoT group to a particular area (e.g., a geolocation, building, etc.) in order to provide the one or more services. In some implementations, the IoT network may be a mesh network of IoT devices 1711, which may be termed a fog device, fog system, or fog, operating at the edge of the cloud 1744. The fog involves mechanisms for bringing cloud computing functionality closer to data generators and consumers wherein various network devices run cloud application logic on their native architecture. Fog computing is a system-level horizontal architecture that distributes resources and services of computing, storage, control, and networking anywhere along the continuum from cloud 1744 to Things (e.g., IoT devices 1711). The fog may be established in accordance with specifications released by the OFC, the OCF, among others. Additionally or alternatively, the fog may be a tangle as defined by the IOTA foundation.

The fog may be used to perform low-latency computation/aggregation on the data while routing it to an edge cloud computing service (e.g., edge nodes 1730) and/or a central cloud computing service (e.g., cloud 1744) for performing heavy computations or computationally burdensome tasks. On the other hand, edge cloud computing consolidates human-operated, voluntary resources, as a cloud. These voluntary resource may include, inter-alia, intermediate nodes 1720 and/or endpoints 1710, desktop PCs, tablets, smartphones, nano data centers, and the like. In various implementations, resources in the edge cloud may be in one to two-hop proximity to the IoT devices 1711, which may result in reducing overhead related to processing data and may reduce network delay.

Additionally or alternatively, the fog may be a consolidation of IoT devices 1711 and/or networking devices, such as routers and switches, with high computing capabilities and the ability to run cloud application logic on their native architecture. Fog resources may be manufactured, managed, and deployed by cloud vendors, and may be interconnected with high speed, reliable links. Moreover, fog resources reside farther from the edge of the network when compared to edge systems but closer than a central cloud infrastructure. Fog devices are used to effectively handle computationally intensive tasks or workloads offloaded by edge resources.

Additionally or alternatively, the fog may operate at the edge of the cloud 1744. The fog operating at the edge of the cloud 1744 may overlap or be subsumed into an edge network 1730 of the cloud 1744. The edge network of the cloud 1744 may overlap with the fog, or become a part of the fog. Furthermore, the fog may be an edge-fog network that includes an edge layer and a fog layer. The edge layer of the edge-fog network includes a collection of loosely coupled, voluntary and human-operated resources (e.g., the aforementioned edge compute nodes 1736 or edge devices). The Fog layer resides on top of the edge layer and is a consolidation of networking devices such as the intermediate nodes 1720 and/or endpoints 1710 of FIG. 17.

Data may be captured, stored/recorded, and communicated among the IoT devices 1711 or, for example, among the intermediate nodes 1720 and/or endpoints 1710 that have direct links 1705 with one another as shown by FIG. 17. Analysis of the traffic flow and control schemes may be implemented by aggregators that are in communication with the IoT devices 1711 and each other through a mesh network. The aggregators may be a type of IoT device 1711 and/or network appliance. In the example of FIG. 17, the aggregators may be edge nodes 1730, or one or more designated intermediate nodes 1720 and/or endpoints 1710. Data may be uploaded to the cloud 1744 via the aggregator, and commands can be received from the cloud 1744 through gateway devices that are in communication with the IoT devices 1711 and the aggregators through the mesh network. Unlike the traditional cloud computing model, in some implementations, the cloud 1744 may have little or no computational capabilities and only serves as a repository for archiving data recorded and processed by the fog. In these implementations, the cloud 1744 centralized data storage system and provides reliability and access to data by the computing resources in the fog and/or edge devices. Being at the core of the architecture, the Data Store of the cloud 1744 is accessible by both Edge and Fog layers of the aforementioned edge-fog network.

As mentioned previously, the access networks provide network connectivity to the end-user devices 1720, 1710 via respective NANs 1731-1733. The access networks may be Radio Access Networks (RANs) such as an NG RAN or a 5G RAN for a RAN that operates in a 5G/NR cellular network, an E-UTRAN for a RAN that operates in an LTE or 4G cellular network, or a legacy RAN such as a UTRAN or GERAN for GSM or CDMA cellular networks. The access network or RAN may be referred to as an Access Service Network for WiMAX implementations. Additionally or alternatively, all or parts of the RAN may be implemented as one or more software entities running on server computers as part of a virtual network, which may be referred to as a cloud RAN (CRAN), Cognitive Radio (CR), a virtual baseband unit pool (vBBUP), and/or the like. Additionally or alternatively, the CRAN, CR, or vBBUP may implement a RAN function split, wherein one or more communication protocol layers are operated by the CRAN/CR/vBBUP and other communication protocol entities are operated by individual RAN nodes 1731, 1732. This virtualized framework allows the freed-up processor cores of the NANs 1731, 1732 to perform other virtualized applications, such as virtualized applications for various elements discussed herein.

The UEs 1721, 1711 may utilize respective connections (or channels) 1703, each of which comprises a physical communications interface or layer. The connections 1703 are illustrated as an air interface to enable communicative coupling consistent with cellular communications protocols, such as 3GPP LTE, 5G/NR, Push-to-Talk (PTT) and/or PTT over cellular (POC), UMTS, GSM, CDMA, and/or any of the other communications protocols discussed herein. Additionally or alternatively, the UEs 1711, 1721 and the NANs 1731-1733 communicate data (e.g., transmit and receive) data over a licensed medium (also referred to as the "licensed spectrum" and/or the "licensed band") and an unlicensed shared medium (also referred to as the "unlicensed spectrum" and/or the "unlicensed band"). To operate in the unlicensed spectrum, the UEs 1711, 1721 and NANs 1731-1733 may operate using LAA, enhanced LAA (eLAA), and/or further eLAA (feLAA) mechanisms. The UEs 1721, 1711 may further directly exchange communication data via respective direct links 1705, which may be LTE/NR Proximity Services (ProSe) link or PC5 interfaces/links, or WiFi based links or a personal area network (PAN) based links (e.g., IEEE 802.15.4 based protocols including ZigBee, IPv6 over Low power Wireless Personal Area Networks (6LoWPAN), WirelessHART, MiWi, Thread, etc.; WiFi-direct; Bluetooth/Bluetooth Low Energy (BLE) protocols).

Additionally or alternatively, individual UEs 1721, 1711 provide radio information to one or more NANs 1731-1733 and/or one or more edge compute nodes 1736 (e.g., edge servers/hosts, etc.). The radio information may be in the form of one or more measurement reports, and/or may include, for example, signal strength measurements, signal quality measurements, and/or the like. Each measurement report is tagged with a timestamp and the location of the measurement (e.g., the UEs 1721, 1711 current location). As examples, the measurements collected by the UEs 1721, 1711 and/or included in the measurement reports may include one or more of the following: bandwidth (BW), network or cell load, latency, jitter, round trip time (RTT), number of interrupts, out-of-order delivery of data packets, transmission power, alpha fairness ("a-fairness"), packet loss rate, packet reception rate (PRR), e2e delay, physical resource block (PRB) utilization, cell throughput, radio utilization level per NAN (e.g., physical radio resource utilization and the like), packet delay (e.g., distribution of packet delay in the UL and/or DL air-interface; average delay, average packet delay in the UL and/or DL direction; average re-ordering delay in the UL and/or DL direction, etc.), data volume measurements, bit error rate, bit error ratio (BER), Block Error Rate (BLER), signal-to-noise ratio (SNR), signal-to-noise and interference ratio (SINR), signal-plus-noise-plus-distortion to noise-plus-distortion (SINAD) ratio, carrier-to-interference plus noise ratio (CINR), Additive White Gaussian Noise (AWGN), energy per bit to noise power density ratio (Eb/N0), energy per bit to interference power density ratio (Ec/I0), peak-to-average power ratio (PAPR), Reference Signal Received Power (RSRP), Received Signal Strength Indicator (RSSI), Reference Signal Received Quality (RSRQ), GNSS timing of cell frames for UE positioning for E-UTRAN or 5G/NR (e.g., a timing between an AP or RAN node reference time and a GNSS-specific reference time for a given GNSS), channel quality indicator (CQI) related measurements (e.g., wideband CQI distribution, etc.), Modulation Coding Scheme (MCS) related measurements (e.g., MCS distribution in one or more channels, MCS distribution for MU-MIMO, etc.), channel state information (CSI) related measurements (e.g., CQI, MCS, precoding matrix indicator (PMI), CSI-RS resource indicator (CRI), SS/PBCH Block Resource indicator (SSBRI), layer indicator (LI), rank indicator (RI), L1-RSRP and/or L1-SINR, etc.), GNSS code measurements (e.g., the GNSS code phase (integer and fractional parts) of the spreading code of the ith GNSS satellite signal), GNSS carrier phase measurements (e.g., the number of carrier-phase cycles (integer and fractional parts) of the ith GNSS satellite signal, measured since locking onto the signal; also called Accumulated Delta Range (ADR)), channel interference measurement, thermal noise power measurement, received interference power measurement, and/or other like measurements. The RSRP, RSSI, and/or RSRQ measurements may include RSRP, RSSI, and/or RSRQ measurements of cell-specific reference signals, channel state information reference signals (CSI-RS), and/or synchronization signals (SS) or SS blocks for 3GPP networks (e.g., LTE or 5G/NR) and RSRP, RSSI, and/or RSRQ measurements of various beacon, Fast Initial Link Setup (FILS) discovery frames, or probe response frames for IEEE 802.11 WLAN/WiFi networks. Other measurements may be additionally or alternatively used, such as those discussed in 3GPP TS 36.214 v16.2.0 (2021 Mar. 31) ("[TS36214]"), 3GPP TS 38.215 v16.4.0 (2020 December) ("[TS38215]"), IEEE 802.11-2020, "IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications" (2021 Feb. 26) ("[IEEE80211]"), and/or the like. Additionally or alternatively, any of the aforementioned measurements (or combination of measurements) may be collected by one or more NANs 1731-1733 and provided to the edge compute node(s) 1736.

Additionally or alternatively, the measurements can include one or more of the following measurements: measurements related to Data Radio Bearer (DRB) (e.g., number of DRBs attempted to setup, number of DRBs successfully setup, number of released active DRBs, in-session activity time for DRB, number of DRBs attempted to be resumed, number of DRBs successfully resumed, etc.); measurements related to Radio Resource Control (RRC) (e.g., mean number of RRC connections, maximum number of RRC connections, mean number of stored inactive RRC connections, maximum number of stored inactive RRC connections, number of attempted, sucessful, and/or failed RRC connection establishments, etc.); measurements related to UE Context (UECNTX); measurements related to Radio Resource Utilization (RRU) (e.g., DL total PRB usage, UL total PRB usage, distribution of DL total PRB usage, distribution of UL total PRB usage, DL PRB used for data traffic, UL PRB used for data traffic, DL total available PRBs, UL total available PRBs, etc.); measurements related to Registration Management (RM); measurements related to Session Management (SM) (e.g., number of PDU sessions requested to setup; number of PDU sessions successfully setup; number of PDU sessions failed to setup, etc.); measurements related to GTP Management (GTP); measurements related to IP Management (IP); measurements related to Policy Association (PA); measurements related to Mobility Management (MM) (e.g., for inter-RAT, intra-RAT, and/or Intra/Inter-frequency handovers and/or conditional handovers: number of requested, successful, and/or failed handover preparations; number of requested, successful, and/or failed handover resource allocations; number of requested, successful, and/or failed handover executions; mean and/or maximum time of requested handover executions; number of successful and/or failed handover executions per beam pair, etc.); measurements related to Virtualized Resource(s) (VR); measurements related to Carrier (CARR); measurements related to QoS Flows (QF) (e.g., number of released active QoS flows, number of QoS flows attempted to release, in-session activity time for QoS flow, in-session activity time for a UE 1711, 1721, number of QoS flows attempted to setup, number of QoS flows successfully established, number of QoS flows failed to setup, number of initial QoS flows attempted to setup, number of initial QoS flows successfully established, number of initial QoS flows failed to setup, number of QoS flows attempted to modify, number of QoS flows successfully modified, number of QoS flows failed to modify, etc.); measurements related to Application Triggering (AT); measurements related to Short Message Service (SMS); measurements related to Power, Energy and Environment (PEE); measurements related to NF service (NFS); measurements related to Packet Flow Description (PFD); measurements related to Random Access Channel (RACH); measurements related to Measurement Report (MR); measurements related to Layer 1 Measurement (L1M); measurements related to Network Slice Selection (NSS); measurements related to Paging (PAG); measurements related to Non-IP Data Delivery (NIDD); measurements related to external parameter provisioning (EPP); measurements related to traffic influence (TI); measurements related to Connection Establishment (CE); measurements related to Service Parameter Provisioning (SPP); measurements related to Background Data Transfer Policy (BDTP); measurements related to Data Management (DM); and/or any other performance measurements.

The radio information may be reported in response to a trigger event and/or on a periodic basis. Additionally or alternatively, individual UEs 1721, 1711 report radio information either at a low periodicity or a high periodicity depending on a data transfer that is to take place, and/or other information about the data transfer. Additionally or alternatively, the edge compute node(s) 1736 may request the measurements from the NANs 1731-1733 at low or high periodicity, or the NANs 1731-1733 may provide the measurements to the edge compute node(s) 1736 at low or high periodicity. Additionally or alternatively, the edge compute node(s) 1736 may obtain other relevant data from other edge compute node(s) 1736, core network functions (NFs), application functions (AFs), and/or other UEs 1711, 1721 such as Key Performance Indicators (KPIs), with the measurement reports or separately from the measurement reports.

Additionally or alternatively, performance indicators from a core network (or individual NFs) may be used for various purposes. Performance indicators comprise performance data aggregated over a group of NFs, such as, for example, average latency along a network slice. The performance indicators can be derived from performance measurements collected at a particular NFs that belong to the group. The aggregation method is identified in the performance indicator definition. Performance indicators at the network slice subnet level can be derived from the performance measurements collected at the NFs that belong to the network slice subnets or to the constituent network slice subnets. The performance indicators at the network slice subnet level can be made available via the corresponding performance management service for network slice subnet. The performance indicators at the network slice level, can be derived from the network slice subnet level Performance Indicators collected at the constituent network slice subnets and/or NFs. The network slice level performance indicators can be made available via the corresponding performance management service for network slice.

Additionally or alternatively, in cases where is discrepancy in the observation data from one or more UEs 1711, 1721, one or more RAN nodes 1731-1733, and/or core network NFs (e.g., missing reports, errorneous data, etc.) simple imputations may be performed to supplement the obtained observation data such as, for example, substituting values from previous reports and/or historical data, apply an extrapolation filter, and/or the like. Additionally or alternatively, acceptable bounds for the observation data may be predetermined or configured. For example, CQI and MCS measurements may be configured to only be within ranges defined by suitable 3GPP standards. In cases where a reported data value does not make sense (e.g., the value exceeds an acceptable range/bounds, or the like), such values may be dropped for the current learning/training episode or epoch. For example, on packet delivery delay bounds may be defined or configured, and packets determined to have been received after the packet delivery delay bound may be dropped.

In any of the embodiments discussed herein, any suitable data collection and/or measurement mechanism(s) may be used to collect the observation data. For example, data marking (e.g., sequence numbering, etc.), packet tracing, signal measurement, data sampling, and/or timestamping techniques may be used to determine any of the aforementioned metrics/observations. The collection of data may be based on occurrence of events that trigger collection of the data. Additionally or alternatively, data collection may take place at the initiation or termination of an event. The data collection can be continuous, discontinuous, and/or have start and stop times. The data collection techniques/mechanisms may be specific to a hardware (HW) configuration/implementation or non-HW-specific, or may be based on various software parameters (e.g., OS type and version, etc.). Various configurations may be used to define any of the aforementioned data collection parameters. Such configurations may be defined by suitable specifications/standards, such as 3GPP, ETSI and/or O-RAN standards.

The UE 1721*b* is shown to be configured to access an access point (AP) 1733 via a connection 1707. In this example, the AP 1733 is shown to be connected to the Internet without connecting to the CN 1742 of the wireless system. The connection 1707 can comprise a local wireless connection, such as a connection consistent with any IEEE 802.11 protocol, wherein the AP 1733 would comprise a wireless fidelity (WiFi®) router. Additionally or alternatively, the UEs 1721 and IoT devices 1711 can be configured to communicate using suitable communication signals with each other or with any of the AP 1733 over a single or multicarrier communication channel in accordance with various communication techniques, such as, but not limited to, an orthogonal frequency division multiplexing (OFDM) communication technique, a single-carrier frequency division multiple access (SC-FDMA) communication technique, and/or the like, although the scope of the present disclosure is not limited in this respect. The communication technique may include a suitable modulation scheme such as Complementary Code Keying (CCK); Phase-Shift Keying (PSK) such as Binary PSK (BPSK), Quadrature PSK (QPSK), Differential PSK (DPSK), etc.; or Quadrature Amplitude Modulation (QAM) such as M-QAM; and/or the like.

The one or more NANs 1731 and 1732 that enable the connections 1703 may be referred to as "RAN nodes" or the like. The RAN nodes 1731, 1732 may comprise ground stations (e.g., terrestrial access points) or satellite stations providing coverage within a geographic area (e.g., a cell). The RAN nodes 1731, 1732 may be implemented as one or more of a dedicated physical device such as a macrocell base station, and/or a low power base station for providing femtocells, picocells or other like cells having smaller coverage areas, smaller user capacity, or higher bandwidth compared to macrocells. In this example, the RAN node 1731 is embodied as a NodeB, evolved NodeB (eNB), or a next generation NodeB (gNB), and the RAN nodes 1732 are embodied as relay nodes, distributed units, or Road Side Unites (RSUs). Any other type of NANs can be used.

Any of the RAN nodes 1731, 1732 can terminate the air interface protocol and can be the first point of contact for the UEs 1721 and IoT devices XE111. Additionally or alternatively, any of the RAN nodes 1731, 1732 can fulfill various logical functions for the RAN including, but not limited to, RAN function(s) (e.g., radio network controller (RNC) functions and/or NG-RAN functions) for radio resource management, admission control, uplink and downlink dynamic resource allocation, radio bearer management, data packet scheduling, etc. Additionally or alternatively, the UEs 1711, 1721 can be configured to communicate using OFDM communication signals with each other or with any of the NANs 1731, 1732 over a multicarrier communication channel in accordance with various communication techniques, such as, but not limited to, an OFDMA communication technique (e.g., for downlink communications) and/or an SC-FDMA communication technique (e.g., for uplink and ProSe or sidelink communications), although the scope of the present disclosure is not limited in this respect.

For most cellular communication systems, the RAN function(s) operated by the RAN or individual NANs 1731-1732 organize downlink transmissions (e.g., from any of the RAN nodes 1731, 1732 to the UEs 1711, 1721) and uplink transmissions (e.g., from the UEs 1711, 1721 to RAN nodes 1731, 1732) into radio frames (or simply "frames") with 10 millisecond (ms) durations, where each frame includes ten 1 ms subframes. Each transmission direction has its own resource grid that indicate physical resource in each slot, where each column and each row of a resource grid corresponds to one symbol and one subcarrier, respectively. The duration of the resource grid in the time domain corresponds to one slot in a radio frame. The resource grids comprises a number of resource blocks (RBs), which describe the mapping of certain physical channels to resource elements (REs). Each RB may be a physical RB (PRB) or a virtual RB (VRB) and comprises a collection of REs. An RE is the smallest time-frequency unit in a resource grid. The RNC function(s) dynamically allocate resources (e.g., PRBs and modulation and coding schemes (MCS)) to each UE 1711, 1721 at each transmission time interval (TTI). A TTI is the duration of a transmission on a radio link 1703, 1705, and is related to the size of the data blocks passed to the radio link layer from higher network layers.

The NANs 1731/1732 may be configured to communicate with one another via respective interfaces or links (not shown), such as an X2 interface for LTE implementations (e.g., when CN 1742 is an Evolved Packet Core (EPC)), an Xn interface for 5G or NR implementations (e.g., when CN 1742 is an Fifth Generation Core (5GC)), or the like. The NANs 1731 and 1732 are also communicatively coupled to CN 1742. Additionally or alternatively, the CN 1742 may be an evolved packet core (EPC) network, a NextGen Packet Core (NPC) network, a 5G core (5GC), or some other type of CN. The CN 1742 may comprise a plurality of network elements, which are configured to offer various data and telecommunications services to customers/subscribers (e.g., users of UEs 1721 and IoT devices 1711) who are connected to the CN 1742 via a RAN. The components of the CN 1742 may be implemented in one physical node or separate physical nodes including components to read and execute instructions from a machine-readable or computer-readable medium (e.g., a non-transitory machine-readable storage medium). Additionally or alternatively, Network Functions Virtualization (NFV) may be utilized to virtualize any or all of the above-described network node functions via executable instructions stored in one or more computer-readable storage mediums (described in further detail infra). A logical instantiation of the CN 1742 may be referred to as a network slice, and a logical instantiation of a portion of the CN 1742 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more CN 1742 components/functions.

The CN 1742 is shown to be communicatively coupled to an application server 1750 and a network 1750 via an IP communications interface 1755. the one or more server(s) 1750 comprise one or more physical and/or virtualized systems for providing functionality (or services) to one or more clients (e.g., UEs 1721 and IoT devices 1711) over a network. The server(s) 1750 may include various computer devices with rack computing architecture component(s), tower computing architecture component(s), blade computing architecture component(s), and/or the like. The server(s) 1750 may represent a cluster of servers, a server farm, a cloud computing service, or other grouping or pool of servers, which may be located in one or more datacenters. The server(s) 1750 may also be connected to, or otherwise associated with one or more data storage devices (not shown). Moreover, the server(s) 1750 may include an operating system (OS) that provides executable program instructions for the general administration and operation of the individual server computer devices, and may include a computer-readable medium storing instructions that, when executed by a processor of the servers, may allow the servers to perform their intended functions. Suitable implementations for the OS and general functionality of servers are known or commercially available, and are readily implemented by persons having ordinary skill in the art. Generally, the server(s) 1750 offer applications or services that use IP/network resources. As examples, the server(s) 1750 may provide traffic management services, cloud analytics, content streaming services, immersive gaming experiences, social networking and/or microblogging services, and/or other like services. In addition, the various services provided by the server(s) 1750 may include initiating and controlling software and/or firmware updates for applications or individual components implemented by the UEs 1721 and IoT devices 1711. The server(s) 1750 can also be configured to support one or more communication services (e.g., Voice-over-Internet Protocol (VoIP) sessions, PTT sessions, group communication sessions, social networking services, etc.) for the UEs 1721 and IoT devices 1711 via the CN 1742.

The Radio Access Technologies (RATs) employed by the NANs 1731-1733, the UEs 1721, 1711, and the other elements in FIG. 17 may include one or more V2X RATs, which allow these elements to communicate directly with one another, with infrastructure equipment (e.g., NANs 1731-1733), and other devices. Any number of V2X RATs may be used for V2X communication. In some implementations, at least two distinct V2X RATs may be used including WLAN V2X (W-V2X) RAT based on IEEE V2X technologies (e.g., DSRC for the U.S. and ITS-G5 for Europe) and 3GPP C-V2X RAT (e.g., LTE, 5G/NR, and beyond).

The W-V2X RATs include, for example, IEEE 1609.0-2019, "IEEE Guide for Wireless Access in Vehicular Environments (WAVE) Architecture" (2019 Apr. 10) ("[IEEE16090]"), SAE Int'l "V2X Communications Message Set Dictionary" (formerly "Dedicated Short Range Communication (DSRC) Message Set Dictionary") (2020 Jul. 23) ("[J2735_202007]"), Intelligent Transport Systems in the 5 GHz frequency band (ITS-G5), the IEEE 802.11p protocol (which is the layer 1 (L1) and layer 2 (L2) part of WAVE, DSRC, and ITS-G5), and sometimes IEEE 802.16-2017, "IEEE Standard for Air Interface for Broadband Wireless Access Systems" (sometimes referred to as "Worldwide Interoperability for Microwave Access" or "WiMAX") (2018-03-02) ("[WiMAX]"). The term "DSRC" refers to vehicular communications in the 5.9 GHz frequency band that is generally used in the United States, while "ITS-G5" refers to vehicular communications in the 5.9 GHz frequency band in Europe. Since any number of different RATs are applicable (including IEEE 802.11p-based RATs) that may be used in any geographic or political region, the terms "DSRC" (used, among other regions, in the U.S.) and "ITS-G5" (used, among other regions, in Europe) may be used interchangeably throughout this disclosure. The access layer for the ITS-G5 interface is outlined in ETSI EN 302 663 V1.3.1 (2020 January) (hereinafter "[EN302663]") and describes the access layer of the ITS-S reference architecture. The ITS-G5 access layer (which now incorporates IEEE 802.11p) and IEEE 802.2 Logical Link Control (LLC) ("[IEEE8022]") and/or IEEE/ISO/IEC 8802-2-1998 protocols, as well as features for Decentralized Congestion Control (DCC) methods discussed in ETSI TS 102 687 V1.2.1 (2018 April) ("[TS102687]"). The access layer for 3GPP LTE-V2X based interface(s) is outlined in, inter alia, ETSI EN 303 613 V1.1.1 (2020-01), 3GPP TS 23.285 v16.2.0 (2019-12); and 3GPP 5G/NR-V2X is outlined in, inter alia, 3GPP TR 23.786 v16.1.0 (2019-06) and 3GPP TS 23.287 v16.2.0 (2020 March).

The cloud 1744 may represent a cloud computing architecture/platform that provides one or more cloud computing services. Cloud computing refers to a paradigm for enabling network access to a scalable and elastic pool of shareable computing resources with self-service provisioning and administration on-demand and without active management by users. Computing resources (or simply "resources") are any physical or virtual component, or usage of such components, of limited availability within a computer system or network. Examples of resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. Cloud computing provides cloud computing services (or cloud services), which are one or more capabilities offered via cloud computing that are invoked using a defined interface (e.g., an API or the like). Some capabilities of cloud 1744 include application capabilities type, infrastructure capabilities type, and platform capabilities type. A cloud capabilities type is a classification of the functionality provided by a cloud service to a cloud service customer (e.g., a user of cloud 1744), based on the resources used. The application capabilities type is a cloud capabilities type in which the cloud service customer can use the cloud service provider's applications; the infrastructure capabilities type is a cloud capabilities type in which the cloud service customer can provision and use processing, storage or networking resources; and platform capabilities type is a cloud capabilities type in which the cloud service customer can deploy, manage and run customer-created or customer-acquired applications using one or more programming languages and one or more execution environments supported by the cloud service provider. Cloud services may be grouped into categories that possess some common set of qualities. Some cloud service categories that the cloud 1744 may provide include, for example, Communications as a Service (CaaS), which is a cloud service category involving real time interaction and collaboration services; Compute as a Service (CompaaS), which is a cloud service category involving the provision and use of processing resources needed to deploy and run software; Database as a Service (DaaS), which is a cloud service category involving the provision and use of database system management services; Data Storage as a Service (DSaaS), which is a cloud service category involving the provision and use of data storage and related capabilities; Firewall as a Service (FaaS), which is a cloud service category involving providing firewall and network traffic management services; Infrastructure as a Service (IaaS), which is a cloud service category involving infrastructure capabilities type; Network as a Service (NaaS), which is a cloud service category involving transport connectivity and related network capabilities; Platform as a Service (PaaS), which is a cloud service category involving the platform capabilities type; Software as a Service (SaaS), which is a cloud service category involving the application capabilities type; Security as a Service, which is a cloud service category involving providing network and information security (infosec) services; and/or other like cloud services.

Additionally or alternatively, the cloud 1744 may represent a network such as the Internet, a local area network (LAN), a wide area network (WAN), a wireless local area network (WLAN), or a wireless wide area network (WWAN) including proprietary and/or enterprise networks for a company or organization, or combinations thereof.

Here, the cloud 1744 includes one or more networks that comprise computers, network connections among the computers, and software routines to enable communication between the computers over network connections. In this regard, the cloud 1744 comprises one or more network elements that may include one or more processors, communications systems (e.g., including network interface controllers, one or more transmitters/receivers connected to one or more antennas, etc.), and computer readable media. Examples of such network elements may include wireless access points (WAPs), home/business servers (with or without RF communications circuitry), routers, switches, hubs, radio beacons, base stations, picocell or small cell base stations, backbone gateways, and/or any other like network device. Connection to the cloud 1744 may be via a wired or a wireless connection using the various communication protocols discussed infra. More than one network may be involved in a communication session between the illustrated devices. Connection to the cloud 1744 may require that the computers execute software routines which enable, for example, the seven layers of the OSI model of computer networking or equivalent in a wireless (cellular) phone network. Cloud 1744 may be used to enable relatively long-range communication such as, for example, between the one or more server(s) 1750 and one or more UEs 1721 and IoT devices 1711. Additionally or alternatively, the cloud 1744 may represent the Internet, one or more cellular networks, local area networks, or wide area networks including proprietary and/or enterprise networks, TCP/Internet Protocol (IP)-based network, or combinations thereof. In these implementations, the cloud 1744 may be associated with network operator who owns or controls equipment and other elements necessary to provide network-related services, such as one or more base stations or access points, one or more servers for routing digital data or telephone calls (e.g., a core network or backbone network), etc. The backbone links 1755 may include any number of wired or wireless technologies, and may be part of a LAN, a WAN, or the Internet. In one example, the backbone links 1755 are fiber backbone links that couple lower levels of service providers to the Internet, such as the CN 1712 and cloud 1744.

Additionally or alternatively, the various access technologies may include cellular technology such as LTE, MuLTEfire, and/or NR/5G (e.g., as provided by Radio Access Network (RAN) nodes 1731-1732, WLAN (e.g., WiFi®) technologies (e.g., as provided by an access point (AP) 1733), and/or the like. Different technologies exhibit benefits and limitations in different scenarios, and application performance in different scenarios becomes dependent on the choice of the access networks (e.g., WiFi, LTE, etc.) and the used network and transport protocols (e.g., Transfer Control Protocol (TCP), Virtual Private Network (VPN), Multi-Path TCP (MPTCP), Generic Routing Encapsulation (GRE), etc.).

The edge compute nodes 1736 may include or be part of an edge system 1735 (or edge network 1735). The edge compute nodes 1736 may also be referred to as "edge hosts 1736" or "edge servers 1736." The edge system 1735 includes a collection of edge servers 1736 (e.g., MEC hosts/servers 1736-1 and 1736-2 of Figure XP1) and edge management systems (not shown by FIG. 17) necessary to run edge computing applications (e.g., MEC Apps XP136 of Figure XP1) within an operator network or a subset of an operator network. The edge servers 1736 are physical computer systems that may include an edge platform (e.g., MEC platform XP137 of Figure XP1) and/or virtualization infrastructure (e.g., VI XP138 of Figure XP1), and provide compute, storage, and network resources to edge computing applications. Each of the edge servers 1736 are disposed at an edge of a corresponding access network, and are arranged to provide computing resources and/or various services (e.g., computational task and/or workload offloading, cloud-computing capabilities, IT services, and other like resources and/or services as discussed herein) in relatively close proximity to intermediate nodes 1720 and/or endpoints 1710. The VI of the edge servers 1736 provide virtualized environments and virtualized resources for the edge hosts, and the edge computing applications may run as VMs and/or application containers on top of the VI. One example implementation of the edge system 1735 is a MEC system 1735, which is discussed in more detail infra with respect to FIGS. 24-25. It should be understood that the disclosed MEC systems and services deployment examples are only one illustrative example of edge computing systems/networks 1735, and that the present disclosure may be applicable to many other edge computing/networking technologies in various combinations and layouts of devices located at the edge of a network including the various edge computing networks/systems described herein. Further, the techniques disclosed herein may relate to other IoT edge network systems and configurations, and other intermediate processing entities and architectures may also be applicable to the present disclosure.

As shown by FIG. 17, each of the NANs 1731, 1732, and 1733 are co-located with edge compute nodes (or "edge servers") 1736a, 1736b, and 1736c, respectively. These implementations may be small-cell clouds (SCCs) where an edge compute node 1736 is co-located with a small cell (e.g., pico-cell, femto-cell, etc.), or may be mobile micro clouds (MCCs) where an edge compute node 1736 is co-located with a macro-cell (e.g., an eNB, gNB, etc.). The edge compute node 1736 may be deployed in a multitude of arrangements other than as shown by FIG. 17. In a first example, multiple NANs 1731-1733 are co-located or otherwise communicatively coupled with one edge compute node 1736. In a second example, the edge servers 1736 may be co-located or operated by RNCs, which may be the case for legacy network deployments, such as 3G networks. In a third example, the edge servers 1736 may be deployed at cell aggregation sites or at multi-RAT aggregation points that can be located either within an enterprise or used in public coverage areas. In a fourth example, the edge servers 1736 may be deployed at the edge of CN 1742. These implementations may be used in follow-me clouds (FMC), where cloud services running at distributed data centers follow the UEs 1721 as they roam throughout the network.

In any of the implementations discussed herein, the edge servers 1736 provide a distributed computing environment for application and service hosting, and also provide storage and processing resources so that data and/or content can be processed in close proximity to subscribers (e.g., users of UEs 1721, 1711) for faster response times The edge servers 1736 also support multitenancy run-time and hosting environment(s) for applications, including virtual appliance applications that may be delivered as packaged virtual machine (VM) images, middleware application and infrastructure services, content delivery services including content caching, mobile big data analytics, and computational offloading, among others. Computational offloading involves offloading computational tasks, workloads, applications, and/or services to the edge servers 1736 from the UEs 1711/1721, CN 1742, cloud 1744, and/or server(s) 1750, or vice versa. For example, a device application or client application operating in a UE 1721/1711 may offload application tasks or workloads to one or more edge servers 1736. In another example, an edge server 1736 may offload application tasks or workloads to one or more UE 1721/1711 (e.g., for distributed ML computation or the like).

Figure 18:
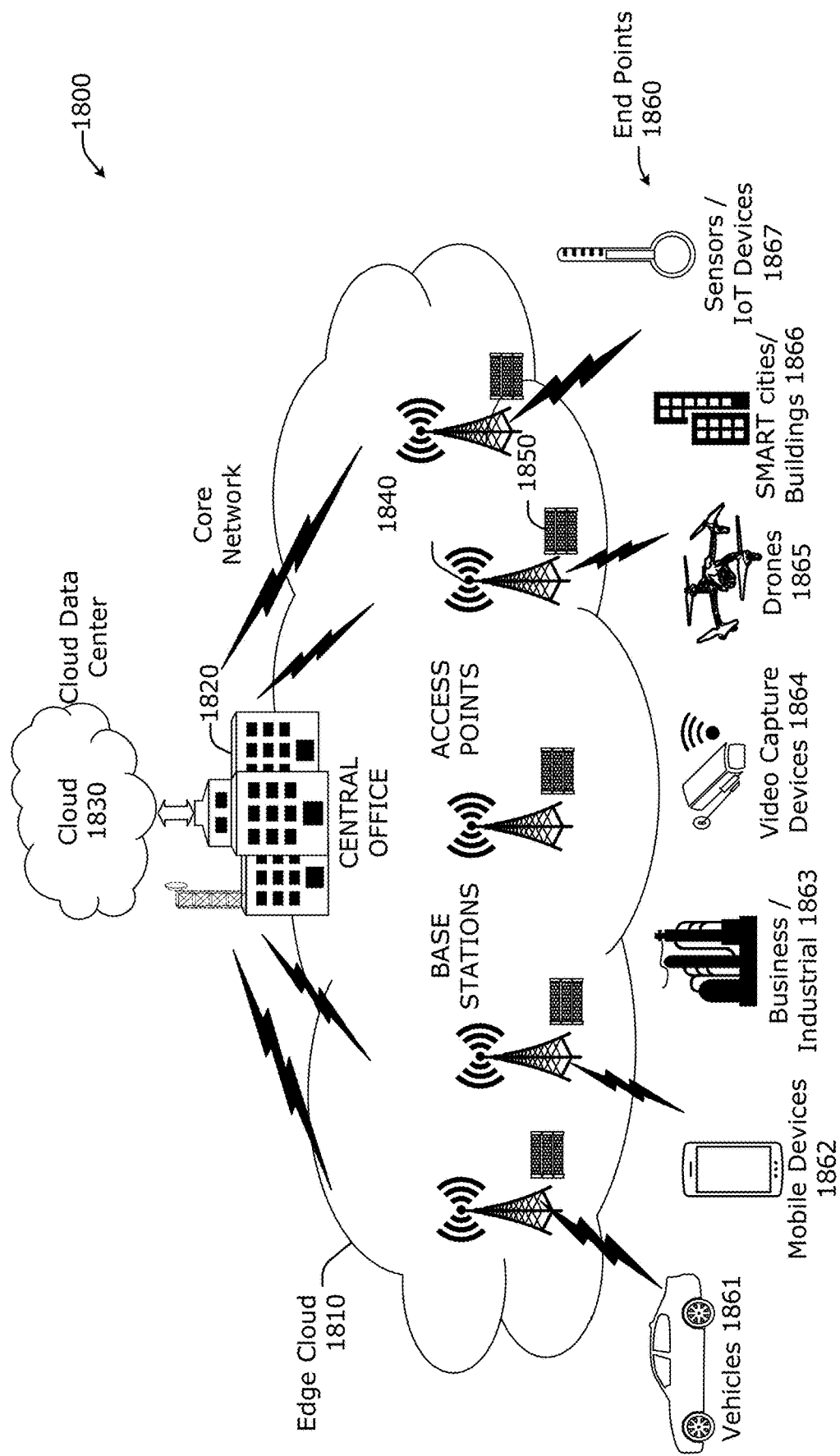
FIG. 18 illustrates an overview of an edge cloud configuration for edge computing.

FIG. 18 is a block diagram 1800 showing an overview of a configuration for edge computing, which includes a layer of processing referred to in many of the following examples as an "edge cloud". As shown, the edge cloud 1810 is co-located at an edge location, such as a network access node (NAN) 1840 (e.g., access point or base station), a local processing hub 1850, or a central office 1820, and thus may include multiple entities, devices, and equipment instances. The edge cloud 1810 is located much closer to the endpoint (consumer and producer) data sources 1860 (e.g., autonomous vehicles 1861, user equipment 1862, business and industrial equipment 1863, video capture devices 1864, drones 1865, smart cities and building devices 1866, sensors and IoT devices 1867, etc.) than the cloud data center 1830. Compute, memory, and storage resources which are offered at the edges in the edge cloud 1810 are critical to providing ultra-low latency response times for services and functions used by the endpoint data sources 1860 as well as reduce network backhaul traffic from the edge cloud 1810 toward cloud data center 1830 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of an appropriately arranged compute platform (e.g., x86, ARM, Nvidia or other CPU/GPU based compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Alternatively, an arrangement with hardware combined with virtualized functions, commonly referred to as a hybrid arrangement may also be successfully implemented. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 19:
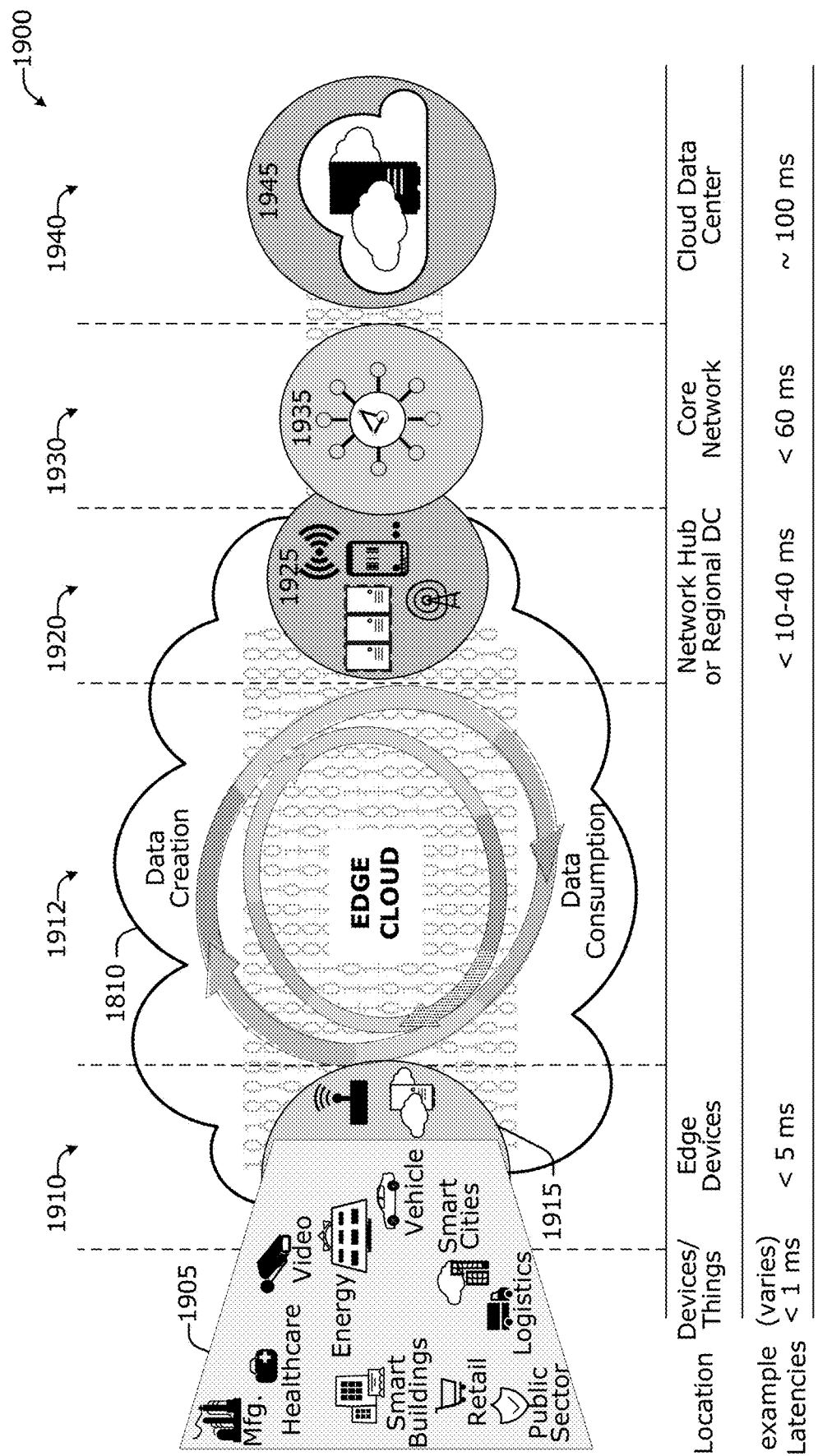
FIG. 19 illustrates operational layers among endpoints, an edge cloud, and cloud computing environments.

FIG. 19 illustrates operational layers among endpoints, an edge cloud, and cloud computing environments. Specifically, FIG. 19 depicts examples of computational use cases 1905, utilizing the edge cloud 1810 among multiple illustrative layers of network computing. The layers begin at an endpoint (devices and things) layer 1900, which accesses the edge cloud 1810 to conduct data creation, analysis, and data consumption activities. The edge cloud 1810 may span multiple network layers, such as an edge devices layer 1910 having gateways, on-premise servers, or network equipment (nodes 1915) located in physically proximate edge systems; a network access layer 1920, encompassing base stations, radio processing units, network hubs, regional data centers (DC), or local network equipment (equipment 1925); and any equipment, devices, or nodes located therebetween (in layer 1912, not illustrated in detail). The network communications within the edge cloud 1810 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 1900, under 5 ms at the edge devices layer 1910, to even between 10 to 40 ms when communicating with nodes at the network access layer 1920. Beyond the edge cloud 1810 are core network 1930 and cloud data center 1940 layers, each with increasing latency (e.g., between 50-60 ms at the core network layer 1930, to 100 or more ms at the cloud data center layer). As a result, operations at a core network data center 1935 or a cloud data center 1945, with latencies of at least 50 to 100 ms or more, will not be able to accomplish many time-critical functions of the use cases 1905. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 1935 or a cloud data center 1945, a central office or content data network may be considered as being located within a "near edge" layer ("near" to the cloud, having high latency values when communicating with the devices and endpoints of the use cases 1905), whereas an access point, base station, on-premise server, or network gateway may be considered as located within a "far edge" layer ("far" from the cloud, having low latency values when communicating with the devices and endpoints of the use cases 1905). It will be understood that other categorizations of a particular network layer as constituting a "close", "local", "near", "middle", or "far" edge may be based on latency, distance, number of network hops, or other measurable characteristics, as measured from a source in any of the network layers 1900-1940.

The various use cases 1905 may access resources under usage pressure from incoming streams, due to multiple services utilizing the edge cloud. To achieve results with low latency, the services executed within the edge cloud 1810 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 1810 may provide the ability to serve and respond to multiple applications of the use cases 1905 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.), which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 1810 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 1810 (network layers 1900-1940), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Here, a "producer" refers to an entity or element that provides a service to other entities or elements on the same edge node or on different edge nodes, and a "consumer" refers to an entity or element that can consumer end user traffic and/or user services from a producer on the same or different edge nodes. For example, a producer app may provide location services, mapping services, transcoding services, AI/ML services, and/or other like services. Additionally or alternatively, a consumer app may be a content delivery network (CDN) node, AR or VR apps, gaming apps, and/or some other type of app. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 1810.

As such, the edge cloud 1810 is formed from network components and functional features operated by and within edge gateway nodes, edge aggregation nodes, or other edge compute nodes among network layers 1910-1930. The edge cloud 1810 thus may be embodied as any type of network that provides edge computing and/or storage resources which are proximately located to radio access network (RAN) capable endpoint devices (e.g., mobile computing devices, IoT devices, smart devices, etc.), which are discussed herein. In other words, the edge cloud 1810 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 1810 may be servers, multi-tenant servers, appliance computing devices, and/or any other type of computing devices. For example, the edge cloud 1810 may include an appliance computing device that is a self-contained electronic device including a housing, a chassis, a case or a shell. In some circumstances, the housing may be dimensioned for portability such that it can be carried by a human and/or shipped. Alternatively, it may be a smaller module suitable for installation in a vehicle for example. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Smaller, modular implementations may also include an extendible or embedded antenna arrangement for wireless communications. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, and/or sensors 3372 of FIG. 33, and/or the like). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, actuators (e.g., actuators 3374 of FIG. 33) etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 33. The edge cloud 1810 may also include one or more servers and/or one or more multi-tenant servers. Such a server may include an operating system and implement a virtual computing environment. A virtual computing environment may include a hypervisor managing (e.g., spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

Figure 20:
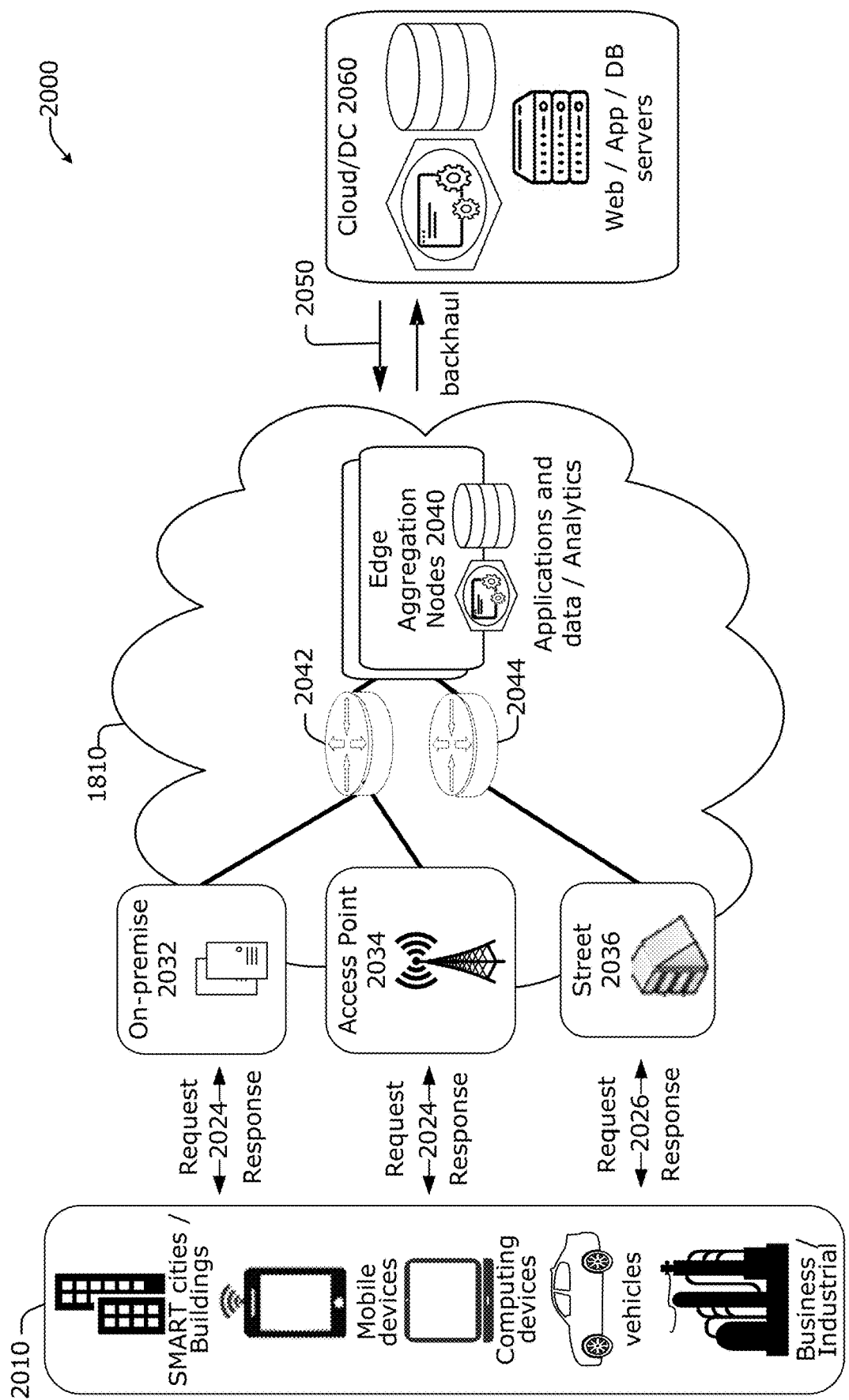
FIG. 20 illustrates an example approach for networking and services in an edge computing system.

FIG. 20 shows various client endpoints 2010 (in the form of mobile devices, computers, autonomous vehicles, business computing equipment, industrial processing equipment) that exchange requests and responses that are specific to the type of endpoint network aggregation. For instance, client endpoints 2010 may obtain network access via a wired broadband network, by exchanging requests and responses 2022 through an on-premise network system 2032. Some client endpoints 2010, such as mobile computing devices, may obtain network access via a wireless broadband network, by exchanging requests and responses 2024 through an access point (e.g., cellular network tower) 2034. Some client endpoints 2010, such as autonomous vehicles may obtain network access for requests and responses 2026 via a wireless vehicular network through a street-located network system 2036. However, regardless of the type of network access, the TSP may deploy aggregation points 2042, 2044 within the edge cloud 1810 to aggregate traffic and requests. Thus, within the edge cloud 1810, the TSP may deploy various compute and storage resources, such as at edge aggregation nodes 2040, to provide requested content. The edge aggregation nodes 2040 and other systems of the edge cloud 1810 are connected to a cloud or data center 2060, which uses a backhaul network 2050 to fulfill higher-latency requests from a cloud/data center for websites, applications, database servers, etc. Additional or consolidated instances of the edge aggregation nodes 2040 and the aggregation points 2042, 2044, including those deployed on a single server framework, may also be present within the edge cloud 1810 or other areas of the TSP infrastructure.

Figure 21:
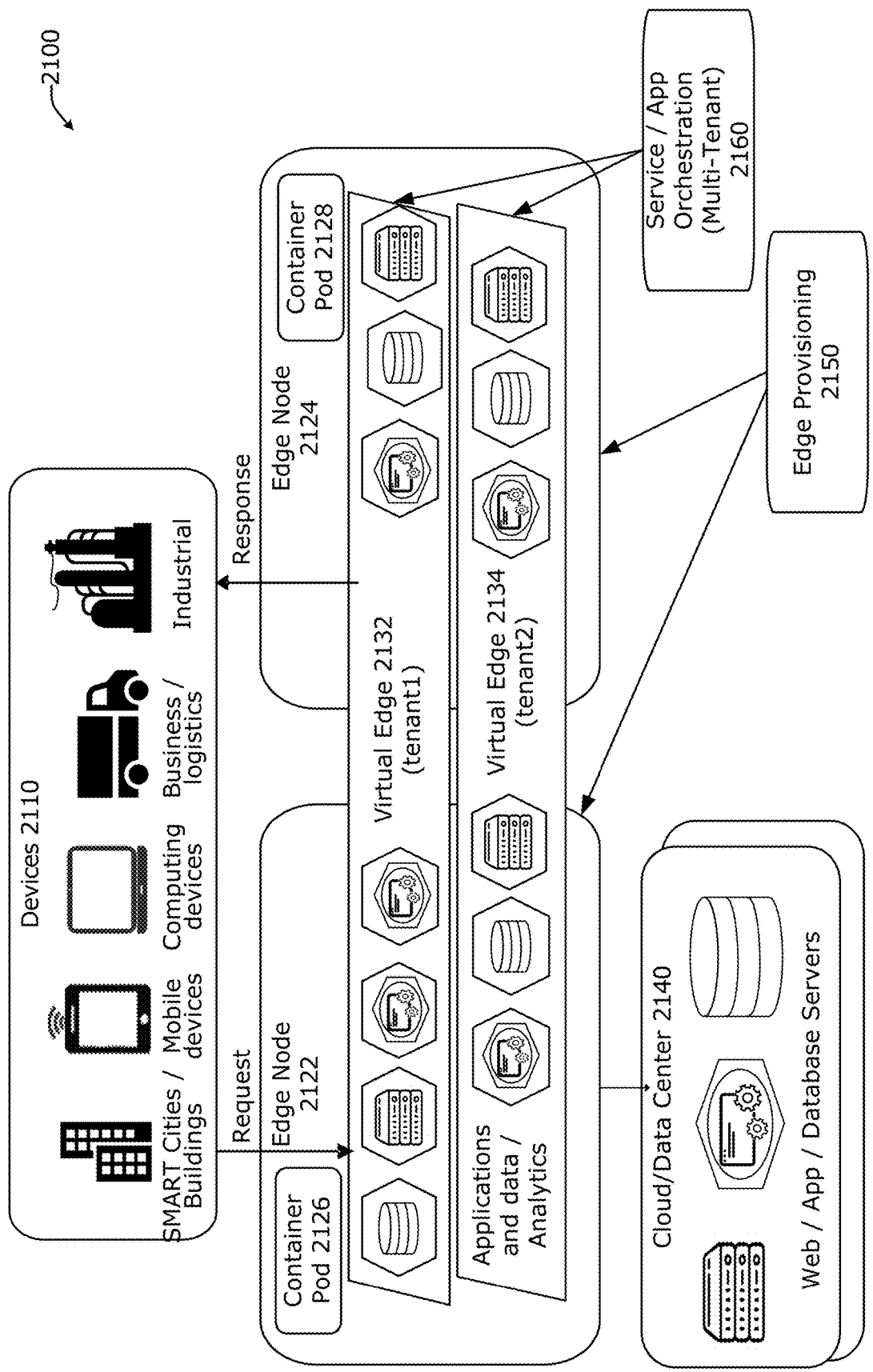
FIG. 21 illustrates deployment of a virtual edge configuration in an edge computing system operated among multiple edge nodes and multiple tenants.

FIG. 21 illustrates deployment and orchestration for virtualized and container-based edge configurations across an edge computing system operated among multiple edge nodes and multiple tenants (e.g., users, providers) which use such edge nodes. Specifically, FIG. 21 depicts coordination of a first edge node 2122 and a second edge node 2124 in an edge computing system 2100, to fulfill requests and responses for various client endpoints 2110 (e.g., smart cities/building systems, mobile devices, computing devices, business/logistics systems, industrial systems, etc.), which access various virtual edge instances. Here, the virtual edge instances 2132, 2134 provide edge compute capabilities and processing in an edge cloud, with access to a cloud/data center 2140 for higher-latency requests for websites, applications, database servers, etc. However, the edge cloud enables coordination of processing among multiple edge nodes for multiple tenants or entities.

In FIG. 21, these virtual edge instances include: a first virtual edge 2132, offered to a first tenant (Tenant 1), which offers a first combination of edge storage, computing, and services; and a second virtual edge 2134, offering a second combination of edge storage, computing, and services. The virtual edge instances 2132, 2134 are distributed among the edge nodes 2122, 2124, and may include scenarios in which a request and response are fulfilled from the same or different edge nodes. The configuration of the edge nodes 2122, 2124 to operate in a distributed yet coordinated fashion occurs based on edge provisioning functions 2150. The functionality of the edge nodes 2122, 2124 to provide coordinated operation for applications and services, among multiple tenants, occurs based on orchestration functions 2160.

Some of the devices 2110 are multi-tenant devices where Tenant 1 may function within a tenant1 'slice' while a Tenant 2 may function within a tenant2 slice (and, in further examples, additional or sub-tenants may exist; and each tenant may even be specifically entitled and transactionally tied to a specific set of features all the way day to specific hardware features). A trusted multi-tenant device may further contain a tenant specific cryptographic key such that the combination of key and slice may be considered a "root of trust" (RoT) or tenant specific RoT. A RoT may further be computed dynamically composed using a DICE (Device Identity Composition Engine) architecture such that a single DICE hardware building block may be used to construct layered trusted computing base contexts for layering of device capabilities (such as a Field Programmable Gate Array (FPGA)). The RoT may further be used for a trusted computing context to enable a "fan-out" that is useful for supporting multi-tenancy. Within a multi-tenant environment, the respective edge nodes 2122, 2124 may operate as security feature enforcement points for local resources allocated to multiple tenants per node. Additionally, tenant runtime and application execution (e.g., in instances 2132, 2134) may serve as an enforcement point for a security feature that creates a virtual edge abstraction of resources spanning potentially multiple physical hosting platforms. Finally, the orchestration functions 2160 at an orchestration entity may operate as a security feature enforcement point for marshalling resources along tenant boundaries.

Edge computing nodes may partition resources (memory, central processing unit (CPU), graphics processing unit (GPU), interrupt controller, input/output (I/O) controller, memory controller, bus controller, etc.) where respective partitionings may contain a RoT capability and where fan-out and layering according to a DICE model may further be applied to Edge Nodes. Cloud computing nodes often use containers, FaaS engines, Servlets, servers, or other computation abstraction that may be partitioned according to a DICE layering and fan-out structure to support a RoT context for each. Accordingly, the respective RoTs spanning devices 2110, 2122, and 2140 may coordinate the establishment of a distributed trusted computing base (DTCB) such that a tenant-specific virtual trusted secure channel linking all elements end to end can be established.

Further, it will be understood that a container may have data or workload specific keys protecting its content from a previous edge node. As part of migration of a container, a pod controller at a source edge node may obtain a migration key from a target edge node pod controller where the migration key is used to wrap the container-specific keys. When the container/pod is migrated to the target edge node, the unwrapping key is exposed to the pod controller that then decrypts the wrapped keys. The keys may now be used to perform operations on container specific data. The migration functions may be gated by properly attested edge nodes and pod managers (as described above).

In further examples, an edge computing system is extended to provide for orchestration of multiple applications through the use of containers (a contained, deployable unit of software that provides code and needed dependencies) in a multi-owner, multi-tenant environment. A multi-tenant orchestrator may be used to perform key management, trust anchor management, and other security functions related to the provisioning and lifecycle of the trusted 'slice' concept in FIG. 21. For instance, an edge computing system may be configured to fulfill requests and responses for various client endpoints from multiple virtual edge instances (and, from a cloud or remote data center). The use of these virtual edge instances may support multiple tenants and multiple applications (e.g., augmented reality (AR)/virtual reality (VR), enterprise applications, content delivery, gaming, compute offload) simultaneously. Further, there may be multiple types of applications within the virtual edge instances (e.g., normal applications; latency sensitive applications; latency-critical applications; user plane applications; networking applications; etc.). The virtual edge instances may also be spanned across systems of multiple owners at different geographic locations (or, respective computing systems and resources which are co-owned or co-managed by multiple owners).

For instance, each edge node 2122, 2124 may implement the use of containers, such as with the use of a container "pod" 2126, 2128 providing a group of one or more containers. In a setting that uses one or more container pods, a pod controller or orchestrator is responsible for local control and orchestration of the containers in the pod. Various edge node resources (e.g., storage, compute, services, depicted with hexagons) provided for the respective edge slices 2132, 2134 are partitioned according to the needs of each container.

With the use of container pods, a pod controller oversees the partitioning and allocation of containers and resources. The pod controller receives instructions from an orchestrator (e.g., orchestrator 2160) that instructs the controller on how best to partition physical resources and for what duration, such as by receiving key performance indicator (KPI) targets based on SLA contracts. The pod controller determines which container requires which resources and for how long in order to complete the workload and satisfy the SLA. The pod controller also manages container lifecycle operations such as: creating the container, provisioning it with resources and applications, coordinating intermediate results between multiple containers working on a distributed application together, dismantling containers when workload completes, and the like. Additionally, a pod controller may serve a security role that prevents assignment of resources until the right tenant authenticates or prevents provisioning of data or a workload to a container until an attestation result is satisfied.

Also, with the use of container pods, tenant boundaries can still exist but in the context of each pod of containers. If each tenant specific pod has a tenant specific pod controller, there will be a shared pod controller that consolidates resource allocation requests to avoid typical resource starvation situations. Further controls may be provided to ensure attestation and trustworthiness of the pod and pod controller. For instance, the orchestrator 2160 may provision an attestation verification policy to local pod controllers that perform attestation verification. If an attestation satisfies a policy for a first tenant pod controller but not a second tenant pod controller, then the second pod could be migrated to a different edge node that does satisfy it. Alternatively, the first pod may be allowed to execute and a different shared pod controller is installed and invoked prior to the second pod executing.

Figure 22:
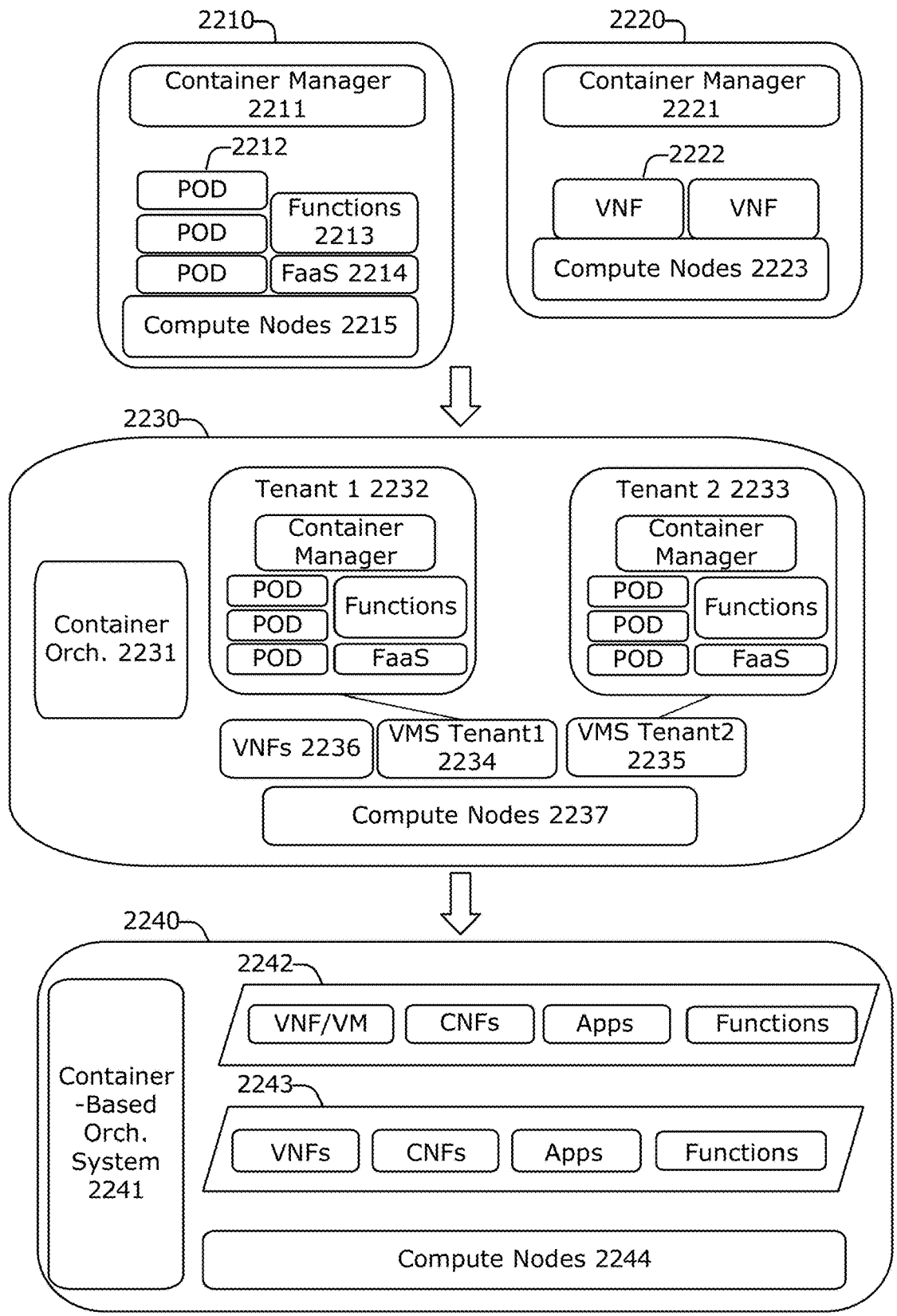
FIG. 22 illustrates various compute arrangements deploying containers in an edge computing system.

FIG. 22 illustrates additional compute arrangements deploying containers in an edge computing system. As a simplified example, system arrangements 2210, 2220 depict settings in which a pod controller (e.g., container managers 2211, 2221, and container orchestrator 2231) is adapted to launch containerized pods, functions, and functions-as-a-service instances through execution via compute nodes 2215 in arrangement 2210, or to separately execute containerized virtualized network functions through execution via compute nodes 2223 in arrangement 2220. This arrangement is adapted for use of multiple tenants in system arrangement 2230 (using compute nodes 2237), where containerized pods (e.g., pods 2212), functions (e.g., functions 2213, VNFs 2222, 2236), and functions-as-a-service instances (e.g., FaaS instance 2214) are launched within virtual machines (e.g., VMs 2234, 2235 for tenants 2232, 2233) specific to respective tenants (aside the execution of virtualized network functions). This arrangement is further adapted for use in system arrangement 2240, which provides containers 2242, 2243, or execution of the various functions, applications, and functions on compute nodes 2244, as coordinated by an container-based orchestration system 2241.

The system arrangements of depicted in FIG. 22 provides an architecture that treats VMs, Containers, and Functions equally in terms of application composition (and resulting applications are combinations of these three ingredients). Each ingredient may involve use of one or more accelerator (FPGA, ASIC) components as a local backend. In this manner, applications can be split across multiple edge owners, coordinated by an orchestrator.

In the context of FIG. 22, the pod controller/container manager, container orchestrator, and individual nodes may provide a security enforcement point. However, tenant isolation may be orchestrated where the resources allocated to a tenant are distinct from resources allocated to a second tenant, but edge owners cooperate to ensure resource allocations are not shared across tenant boundaries. Or, resource allocations could be isolated across tenant boundaries, as tenants could allow "use" via a subscription or transaction/contract basis. In these contexts, virtualization, containerization, enclaves and hardware partitioning schemes may be used by edge owners to enforce tenancy. Other isolation environments may include: bare metal (dedicated) equipment, virtual machines, containers, virtual machines on containers, or combinations thereof.

In further examples, aspects of software-defined or controlled silicon hardware, and other configurable hardware, may integrate with the applications, functions, and services an edge computing system. Software defined silicon (SDSi) may be used to ensure the ability for some resource or hardware ingredient to fulfill a contract or service level agreement, based on the ingredient's ability to remediate a portion of itself or the workload (e.g., by an upgrade, reconfiguration, or provision of new features within the hardware configuration itself).

Figure 23:
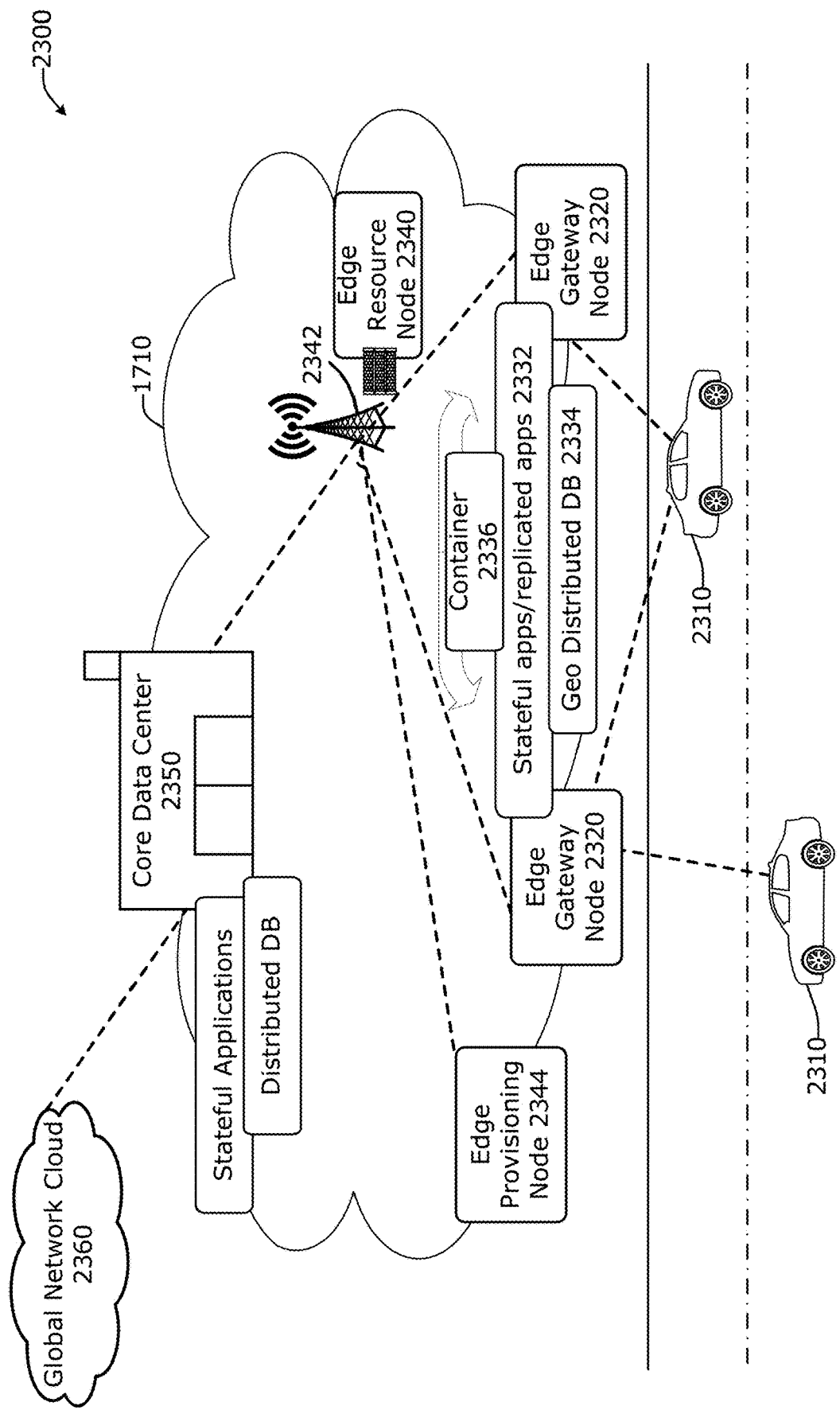
FIG. 23 illustrates a compute and communication use case involving mobile access to applications in an edge computing system.

FIG. 23 shows an example arrangement in which the edge computing systems and arrangements discussed herein may be applicable in various solutions, services, and/or use cases involving mobility. FIG. 23 shows vehicle compute and communication use case involving mobile access to applications in an edge computing system 2300 that implements an edge cloud 1810. In this use case, respective client compute nodes 2310 may be embodied as in-vehicle compute systems (e.g., in-vehicle navigation and/or infotainment systems) located in corresponding vehicles which communicate with the edge gateway nodes 2320 during traversal of a roadway. For instance, the edge gateway nodes 2320 may be located in a roadside cabinet or other enclosure built-into a structure having other, separate, mechanical utility, which may be placed along the roadway, at intersections of the roadway, or other locations near the roadway. As respective vehicles traverse along the roadway, the connection between its client compute node 2310 and a particular edge gateway device 2320 may propagate so as to maintain a consistent connection and context for the client compute node 2310. Likewise, mobile edge nodes may aggregate at the high priority services or according to the throughput or latency resolution requirements for the underlying service(s) (e.g., in the case of drones). The respective edge gateway devices 2320 include an amount of processing and storage capabilities and, as such, some processing and/or storage of data for the client compute nodes 2310 may be performed on one or more of the edge gateway devices 2320.

The edge gateway devices 2320 may communicate with one or more edge resource nodes 2340, which are illustratively embodied as compute servers, appliances or components located at or in a network access node (NAN) 2342 (e.g., a base station of a cellular network). As discussed above, the respective edge resource nodes 2340 include an amount of processing and storage capabilities and, as such, some processing and/or storage of data for the client compute nodes 2310 may be performed on the edge resource node 2340. For example, the processing of data that is less urgent or important may be performed by the edge resource node 2340, while the processing of data that is of a higher urgency or importance may be performed by the edge gateway devices 2320 (depending on, for example, the capabilities of each component, or information in the request indicating urgency or importance). Based on data access, data location or latency, work may continue on edge resource nodes when the processing priorities change during the processing activity. Likewise, configurable systems or hardware resources themselves can be activated (e.g., through a local orchestrator) to provide additional resources to meet the new demand (e.g., adapt the compute resources to the workload data).

The edge resource node(s) 2340 also communicate with the core data center 2350, which may include compute servers, appliances, and/or other components located in a central location (e.g., a central office of a cellular communication network). The core data center 2350 may provide a gateway to the global network cloud 2360 (e.g., the Internet) for the edge cloud 1810 operations formed by the edge resource node(s) 2340 and the edge gateway devices 2320. Additionally, in some examples, the core data center 2350 may include an amount of processing and storage capabilities and, as such, some processing and/or storage of data for the client compute devices may be performed on the core data center 2350 (e.g., processing of low urgency or importance, or high complexity).

The edge gateway nodes 2320 or the edge resource nodes 2340 may offer the use of stateful applications 2332 and a geographic distributed database 2334. Although the applications 2332 and database 2334 are illustrated as being horizontally distributed at a layer of the edge cloud 1810, it will be understood that resources, services, or other components of the application may be vertically distributed throughout the edge cloud (including, part of the application executed at the client compute node 2310, other parts at the edge gateway nodes 2320 or the edge resource nodes 2340, etc.). Additionally, as stated previously, there can be peer relationships at any level to meet service objectives and obligations. Further, the data for a specific client or application can move from edge to edge based on changing conditions (e.g., based on acceleration resource availability, following the car movement, etc.). For instance, based on the "rate of decay" of access, prediction can be made to identify the next owner to continue, or when the data or computational access will no longer be viable. These and other services may be utilized to complete the work that is needed to keep the transaction compliant and lossless.

In further scenarios, a container 2336 (or pod of containers) may be flexibly migrated from an edge node 2320 to other edge nodes (e.g., 2320, 2340, etc.) such that the container with an application and workload does not need to be reconstituted, re-compiled, re-interpreted in order for migration to work. However, in such settings, there may be some remedial or "swizzling" translation operations applied. For example, the physical hardware at node 2340 may differ from edge gateway node 2320 and therefore, the hardware abstraction layer (HAL) that makes up the bottom edge of the container will be re-mapped to the physical layer of the target edge node. This may involve some form of late-binding technique, such as binary translation of the HAL from the container native format to the physical hardware format, or may involve mapping interfaces and operations. A pod controller may be used to drive the interface mapping as part of the container lifecycle, which includes migration to/from different hardware environments.

The scenarios encompassed by FIG. 23 may utilize various types of mobile edge nodes, such as an edge node hosted in a vehicle (car/truck/tram/train) or other mobile unit, as the edge node will move to other geographic locations along the platform hosting it. With vehicle-to-vehicle communications, individual vehicles may even act as network edge nodes for other cars, (e.g., to perform caching, reporting, data aggregation, etc.). Thus, it will be understood that the application components provided in various edge nodes may be distributed in static or mobile settings, including coordination between some functions or operations at individual endpoint devices or the edge gateway nodes 2320, some others at the edge resource node 2340, and others in the core data center 2350 or global network cloud 2360.

In further configurations, the edge computing system may implement FaaS computing capabilities through the use of respective executable applications and functions. In an example, a developer writes function code (e.g., "computer code" herein) representing one or more computer functions, and the function code is uploaded to a FaaS platform provided by, for example, an edge node or data center. A trigger such as, for example, a service use case or an edge processing event, initiates the execution of the function code with the FaaS platform.

In an example of FaaS, a container is used to provide an environment in which function code (e.g., an application which may be provided by a third party) is executed. The container may be any isolated-execution entity such as a process, a Docker or Kubernetes container, a virtual machine, etc. Within the edge computing system, various datacenter, edge, and endpoint (including mobile) devices are used to "spin up" functions (e.g., activate and/or allocate function actions) that are scaled on demand. The function code gets executed on the physical infrastructure (e.g., edge computing node) device and underlying virtualized containers. Finally, container is "spun down" (e.g., deactivated and/or deallocated) on the infrastructure in response to the execution being completed.

Further aspects of FaaS may enable deployment of edge functions in a service fashion, including a support of respective functions that support edge computing as a service (Edge-as-a-Service or "EaaS"). Additional features of FaaS may include: a granular billing component that enables customers (e.g., computer code developers) to pay only when their code gets executed; common data storage to store data for reuse by one or more functions; orchestration and management among individual functions; function execution management, parallelism, and consolidation; management of container and function memory spaces; coordination of acceleration resources available for functions; and distribution of functions between containers (including "warm" containers, already deployed or operating, versus "cold" which require initialization, deployment, or configuration).

The edge computing system 2300 can include or be in communication with an edge provisioning node 2344. The edge provisioning node 2344 can distribute software such as the example computer readable instructions 3382 of FIG. 33, to various receiving parties for implementing any of the methods described herein. The example edge provisioning node 2344 may be implemented by any computer server, home server, content delivery network, virtual server, software distribution system, central facility, storage device, storage disk, storage node, data facility, cloud service, etc., capable of storing and/or transmitting software instructions (e.g., code, scripts, executable binaries, containers, packages, compressed files, and/or derivatives thereof) to other computing devices. Component(s) of the example edge provisioning node 644 may be located in a cloud, in a local area network, in an edge network, in a wide area network, on the Internet, and/or any other location communicatively coupled with the receiving party(ies). The receiving parties may be customers, clients, associates, users, etc. of the entity owning and/or operating the edge provisioning node 2344. For example, the entity that owns and/or operates the edge provisioning node 2344 may be a developer, a seller, and/or a licensor (or a customer and/or consumer thereof) of software instructions such as the example computer readable instructions 3382 of FIG. 33. The receiving parties may be consumers, service providers, users, retailers, OEMs, etc., who purchase and/or license the software instructions for use and/or re-sale and/or sub-licensing.

In an example, edge provisioning node 2344 includes one or more servers and one or more storage devices/disks. The storage devices and/or storage disks host computer readable instructions such as the example computer readable instructions 3382 of FIG. 33, as described below. Similarly to edge gateway devices 2320 described above, the one or more servers of the edge provisioning node 2344 are in communication with a NAN 2342 or other network communication entity. In some examples, the one or more servers are responsive to requests to transmit the software instructions to a requesting party as part of a commercial transaction. Payment for the delivery, sale, and/or license of the software instructions may be handled by the one or more servers of the software distribution platform and/or via a third-party payment entity. The servers enable purchasers and/or licensors to download the computer readable instructions 3382 from the edge provisioning node 2344. For example, the software instructions, which may correspond to the example computer readable instructions 3382 of FIG. 33, may be downloaded to the example processor platform/s, which is to execute the computer readable instructions 3382 to implement the methods described herein.

In some examples, the processor platform(s) that execute the computer readable instructions 3382 can be physically located in different geographic locations, legal jurisdictions, etc. In some examples, one or more servers of the edge provisioning node 2344 periodically offer, transmit, and/or force updates to the software instructions (e.g., the example computer readable instructions 3382 of FIG. 33) to ensure improvements, patches, updates, etc. are distributed and applied to the software instructions implemented at the end user devices. In some examples, different components of the computer readable instructions 3382 can be distributed from different sources and/or to different processor platforms; for example, different libraries, plug-ins, components, and other types of compute modules, whether compiled or interpreted, can be distributed from different sources and/or to different processor platforms. For example, a portion of the software instructions (e.g., a script that is not, in itself, executable) may be distributed from a first source while an interpreter (capable of executing the script) may be distributed from a second source.

2.1. Multi-Access Edge Computing (MEC) Aspects

Figure 24:
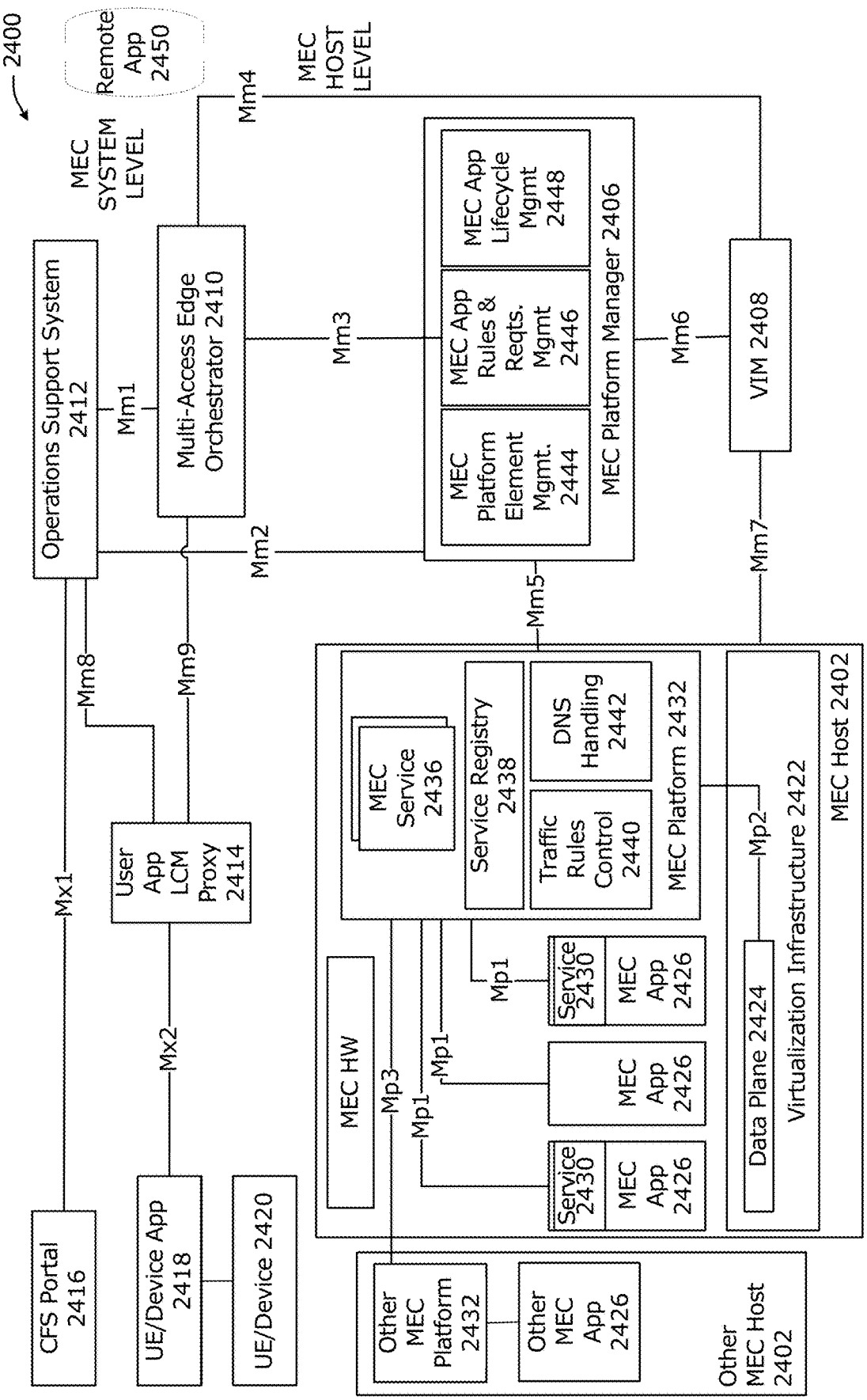
FIG. 24 illustrates a MEC system reference architecture.

FIG. 24 illustrates a MEC system reference architecture (or MEC architecture) 2400 providing functionalities in accordance with ETSI GS MEC 003 v2.1.1 (2019 January) ("[MEC003]"); ETSI GS MEC 009 V2.1.1 (2019 January) ("[MEC009]"); ETSI GS MEC 011 V1.1.1 (2017-07) ("[MEC011]"); ETSI GS MEC 012 V2.1.1 (2019 December) ("[MEC012]"); ETSI GS MEC 013 v2.1.1 (2019 September) ("[MEC013]"); ETSI GS MEC 014 V1.1.1 (2018 February) ("[MEC014]"); ETSI GS MEC 015 v2.1.1 (2020 June) ("[MEC015]"); ETSI GS MEC 028 v2.1.1 (2020 June) ("[MEC028]"); ETSI GS MEC 029 v2.1.1 (2019 July) ("[MEC029]"); ETSI MEC GS 030 v2.1.1 (2020 April) ("[MEC030]"); among many other ETSI MEC standards. MEC offers application developers and content providers cloud-computing capabilities and an IT service environment at the Edge of the network. This environment is characterized by ultra-low latency and high bandwidth as well as real-time access to radio network information that can be leveraged by applications. MEC technology permits to flexible and rapid deployment of innovative applications and services towards mobile subscribers, enterprises and vertical segments. In particular, regarding the automotive sector, applications such as V2X (e.g., IEEE 802.11p based protocols such as DSRC/ITS-G5, or 3GPP C-V2X based protocols) need to exchange data, provide data to aggregation points and access to data in databases which provide an overview of the local situation derived from a multitude of sensors (by various cars, roadside units, etc.).

The MEC architecture 2400 includes MEC hosts 2402, a virtualization infrastructure manager (VIM) 2408, an MEC platform manager 2406, an MEC orchestrator 2410, an operations support system (OSS) 2412, a user app proxy 2414, a UE app 2418 running on UE 2420, and CFS portal 2416. The MEC host 2402 can include a MEC platform 2432 with filtering rules control component 2440, a DNS handling component 2442, a service registry 2438, and MEC services 2436. The MEC services 2436 can include at least one scheduler, which can be used to select resources for instantiating MEC apps (or NFVs) 2426 upon virtualization infrastructure (VI) 2422. The MEC apps 2426 can be configured to provide services 2430, which can include processing network communications traffic of different types associated with one or more wireless connections (e.g., connections to one or more RANs or core network functions) and/or some other services such as those discussed herein. The other MEC host 2402 may have a same or similar configuration/implementation as the MEC host 2402, and the other MEC app 2426 instantiated within other MEC host 2402 can be similar to the MEC apps 2426 instantiated within MEC host 2402. The VI 2422 includes a data plane 2424 coupled to the MEC platform 2422 via an MP2 interface. Additional interfaces between various network entities of the MEC architecture 2400 are illustrated in FIG. 24.

The MEC system 2400 includes three groups of reference points, including "Mp" reference points regarding the MEC platform functionality; "Mm" reference points, which are management reference points; and "Mx" reference points, which connect MEC entities to external entities. The interfaces/reference points in the MEC system 2400 may include IP-based connections, and may be used to provide Representational State Transfer (REST or RESTful) services, and the messages conveyed using the reference points/interfaces may be in XML, HTML, JSON, or some other desired format, such as those discussed herein. A suitable Authentication, Authorization, and Accounting (AAA) protocol, such as the radius or diameter protocols, may also be used for communicating over the reference points/interfaces.

The logical connections between various entities of the MEC architecture 2400 may be access-agnostic and not dependent on a particular deployment. MEC enables implementation of MEC apps 2426 as software-only entities that run on top of a VI 2422, which is located in or close to the network Edge. A MEC app 2426 is an application that can be instantiated on a MEC host 2402 within the MEC system 2400 and can potentially provide or consume MEC services 2436.

The MEC entities depicted by FIG. 24 can be grouped into a MEC system level, MEC host level, and network level entities (not shown). The network level (not shown) includes various external network level entities, such as a 3GPP network, a local area network (e.g., a LAN, WLAN, PAN, DN, LADN, etc.), and external network(s). The MEC system level includes MEC system level management entities and UE 2420, and is discussed in more detail infra. The MEC host level includes one or more MEC hosts 2402, 2404 and MEC management entities, which provide functionality to run MEC Apps 2426 within an operator network or a subset of an operator network. The MEC management entities include various components that handle the management of the MEC-specific functionality of a particular MEC platform 2432, MEC host 2402, and the MEC Apps 2426 to be run.

The MEC platform manager 2406 is a MEC management entity including MEC platform element management component 2444, MEC app rules and requirements management component 2446, and MEC app lifecycle management component 2448. The various entities within the MEC architecture 2400 can perform functionalities as discussed in [MEC003]. The remote app 2450 is configured to communicate with the MEC host 2402 (e.g., with the MEC apps 2426) via the MEC orchestrator 2410 and the MEC platform manager 2406.

The MEC host 2402 is an entity that contains an MEC platform 2432 and VI 2422 which provides compute, storage, and network resources for the purpose of running MEC Apps 2426. The VI 2422 includes a data plane (DP) 2424 that executes traffic rules 2440 received by the MEC platform 2432, and routes the traffic among MEC Apps 2426, MEC services 2436, DNS server/proxy (see e.g., via DNS handling entity 2442), 3GPP network, local networks, and external networks. The MEC DP 2424 may be connected with the (R)AN nodes and the 3GPP core network, and/or may be connected with an access point via a wider network, such as the internet, an enterprise network, or the like.

The MEC platform 2432 is a collection of essential functionality required to run MEC Apps 2426 on a particular VI 2422 and enable them to provide and consume MEC services 2436, and that can provide itself a number of MEC services 937a. The MEC platform 2432 can also provide various services and/or functions, such as offering an environment where the MEC Apps 2426 can discover, advertise, consume and offer MEC services 2436 (discussed infra), including MEC services 2436 available via other platforms when supported. The MEC platform 2432 may be able to allow authorized MEC Apps 2426 to communicate with third party servers located in external networks. The MEC platform 2432 may receive traffic rules from the MEC platform manager 2406, applications, or services, and instruct the data plane accordingly (see e.g., Traffic Rules Control 2440). The MEC platform 2432 may send instructions to the DP 2424 within the VI 2422 via the Mp2 reference point. The Mp2 reference point between the MEC platform 2432 and the DP 2424 of the VI 2422 may be used to instruct the DP 2434 on how to route traffic among applications, networks, services, etc. The MEC platform 2432 may translate tokens representing UEs 2420, UE apps, individual sessions, and/or individual flows within a session in the traffic rules into specific network addresses (e.g., IP addresses or the like). The MEC platform 2432 also receives DNS records from the MEC platform manager 2406 and configures a DNS proxy/server accordingly. The MEC platform 2432 hosts MEC services 2436 including the multi-access Edge services discussed infra, and provide access to persistent storage and time of day information. Furthermore, the MEC platform 2432 may communicate with other MEC platforms 2432 of other MEC servers 2402 via the Mp3 reference point. Upon receipt of update, activation or deactivation of traffic rules from the MEC platform manager 2406, apps, or services, the MEC platform 2432 instructs the data plane 2424 accordingly. The MEC platform 2432 also receives DNS records from the MEC platform manager 2406 and uses them to configure a DNS proxy/server 2442. The traffic rules control 2440 allows the MEC platform 2432 to perform traffic routing including traffic rules update, activation, and deactivation. Additionally or alternatively, the traffic rules control 2440 allows the MEC platform 2432 to perform traffic steering, for example, by directing data packets over one or more access network connections in a multi-access environment comprising multiple access networks, each of which may have multiple access network connections and/or may implement different access technologies.

The VI 2422 represents the totality of all hardware and software components which build up the environment in which MEC Apps 2426 and/or MEC platform 2432 are deployed, managed and executed. The VI 2422 may span across several locations, and the network providing connectivity between these locations is regarded to be part of the VI 2422. The physical hardware resources of the VI 2422 includes computing, storage and network resources that provide processing, storage and connectivity to MEC Apps 2426 and/or MEC platform 2432 through a virtualization layer (e.g., a hypervisor, VM monitor (VMM), or the like). The virtualization layer may abstract and/or logically partition the physical hardware resources of the MEC server 2402 as a hardware abstraction layer. The virtualization layer may also enable the software that implements the MEC Apps 2426 and/or MEC platform 2432 to use the underlying VI 2422, and may provide virtualized resources to the MEC Apps 2426 and/or MEC platform 2432, so that the MEC Apps 2426 and/or MEC platform 2432 can be executed.

The MEC Apps 2426 are applications that can be instantiated on a MEC host/server 2402 within the MEC system 2400 and can potentially provide or consume MEC services 2436. The term "MEC service" refers to a service provided via a MEC platform 2432 either by the MEC platform 2432 itself or by a MEC App 2426. MEC Apps 2426 may run as VM on top of the VI 2422 provided by the MEC server 2402, and can interact with the MEC platform 2432 to consume and provide the MEC services 2436. The Mp1 reference point between the MEC platform 2432 and the MEC Apps 2426 is used for consuming and providing service specific functionality. Mp1 provides service registration 2438, service discovery, and communication support for various services, such as the MEC services 2436 provided by MEC host 2402. Mp1 may also provide application availability, session state relocation support procedures, traffic rules and DNS rules activation, access to persistent storage and time of day information, and/or the like. Additionally or alternatively, the MEC Apps 2426 may communicate with the MEC platform 2432 using the MEC APIs discussed in ETSI GS MEC 011 V2.1.1 (2019 November).

The MEC Apps 2426 are instantiated on the VI 2422 of the MEC server 2402 based on configuration or requests validated by the MEC management (e.g., MEC platform manager 2406). The MEC Apps 2426 can also interact with the MEC platform 2432 to perform certain support procedures related to the lifecycle of the MEC Apps 2426, such as indicating availability, preparing relocation of user state, etc. The MEC Apps 2426 may have a certain number of rules and requirements associated to them, such as required resources, maximum latency, required or useful services, etc. These requirements may be validated by the MEC management, and can be assigned to default values if missing. MEC services 2436 are services provided and/or consumed either by the MEC platform 2432 and/or MEC Apps 2426. The service consumers (e.g., MEC Apps 2426 and/or MEC platform 2432) may communicate with particular MEC services 2436 over individual APIs (including MEC V2X API and the other MEC APIs discussed herein). When provided by an application, a MEC service 2436 can be registered in a list of services in the service registries 2438 to the MEC platform 2432 over the Mp1 reference point. Additionally, a MEC App 2426 can subscribe to one or more services 2430/2436 for which it is authorized over the Mp1 reference point.

Examples of MEC services 2436 include V2X information services (VIS), RNIS (see e.g., [MEC012], Location Services [MEC013], UE identity services [MEC014], Traffic Management Services (TMS) and BWMS [MEC015], WLAN Access Information (WAI) services [MEC028], Fixed Access Information (FAI) services [MEC029], and/or other MEC services. The RNIS, when available, provides authorized MEC Apps 2426 with radio network related information, and expose appropriate up-to-date radio network information to the MEC Apps 2426. The RNI may include, inter alia, radio network conditions, measurement and statistics information related to the UP, information related to UEs 2420 served by the radio node(s) associated with the MEC host 2402 (e.g., UE context and radio access bearers), changes on information related to UEs 2420 served by the radio node(s) associated with the MEC host XE136, and/or the like. The RNI may be provided at the relevant granularity (e.g., per UE 2420, per cell, per period of time).

The service consumers (e.g., MEC Apps 2426, MEC platform 2432, etc.) may communicate with the RNIS over an RNI API to obtain contextual information from a corresponding RAN. RNI may be provided to the service consumers via a NAN (e.g., (R)AN node, RRH, AP, etc.). The RNI API may support both query and subscription (e.g., a pub/sub) based mechanisms that are used over a Representational State Transfer (RESTful) API or over a message broker of the MEC platform 2432 (not shown). A MEC App 2426 may query information on a message broker via a transport information query procedure, wherein the transport information may be pre-provisioned to the MEC App 2426 via a suitable configuration mechanism. The various messages communicated via the RNI API may be in XML, JSON, Protobuf, or some other suitable format.

The VIS provides supports various V2X applications including the journey-aware QoS predictions among many others. The RNI may be used by MEC Apps 2426 and MEC platform 2432 to optimize the existing services and to provide new types of services that are based on up to date information on radio conditions. As an example, a MEC App 2426 may use RNI to optimize current services such as video throughput guidance. In throughput guidance, a radio analytics MEC App 2426 may use MEC services to provide a backend video server with a near real-time indication on the throughput estimated to be available at the radio DL interface in a next time instant. The throughput guidance radio analytics application computes throughput guidance based on the required radio network information it obtains from a multi-access Edge service running on the MEC server 2402. RNI may be also used by the MEC platform 2432 to optimize the mobility procedures required to support service continuity, such as when a certain MEC App 2426 requests a single piece of information using a simple request-response model (e.g., using RESTful mechanisms) while other MEC Apps 2426 subscribe to multiple different notifications regarding information changes (e.g., using a pub/sub mechanism and/or message broker mechanisms).

The LS, when available, may provide authorized MEC Apps 2426 with location-related information, and expose such information to the MEC Apps 2426. With location related information, the MEC platform 2432 or one or more MEC Apps 2426 perform active device location tracking, location-based service recommendations, and/or other like services. The LS supports the location retrieval mechanism, e.g., the location is reported only once for each location information request. The LS supports a location subscribe mechanism, for example, the location is able to be reported multiple times for each location request, periodically or based on specific events, such as location change. The location information may include, inter alia, the location of specific UEs 2420 currently served by the radio node(s) associated with the MEC server 2402, information about the location of all UEs 2420 currently served by the radio node(s) associated with the MEC server XE136, information about the location of a certain category of UEs 2420 currently served by the radio node(s) associated with the MEC server XE136, a list of UEs 2420 in a particular location, information about the location of all radio nodes currently associated with the MEC host 2402, and/or the like. The location information may be in the form of a geolocation, a Global Navigation Satellite Service (GNSS) coordinate, a Cell identity (ID), and/or the like. The LS is accessible through the API defined in the Open Mobile Alliance (OMA) specification "RESTful Network API for Zonal Presence" OMA-TS-REST-NetAPI-ZonalPresence-V1-0-20160308-C. The Zonal Presence service utilizes the concept of "zone", where a zone lends itself to be used to group all radio nodes that are associated to a MEC host 2402, or a subset thereof, according to a desired deployment. In this regard, the OMA Zonal Presence API provides means for MEC Apps 2426 to retrieve information about a zone, the access points associated to the zones and the users that are connected to the access points. In addition, the OMA Zonal Presence API, allows authorized application to subscribe to a notification mechanism, reporting about user activities within a zone. A MEC server 2402 may access location information or zonal presence information of individual UEs 2420 using the OMA Zonal Presence API to identify the relative location or positions of the UEs 2420.

The TMS allows Edge applications to get informed of various traffic management capabilities and multi-access network connection information, and allows Edge applications to provide requirements, e.g. delay, throughput, loss, for influencing traffic management operations. In some implementations, the TMS includes Multi-Access Traffic Steering (MTS), which seamlessly performs steering, splitting, and duplication of application data traffic across multiple access network connections. The BWMS provides for the allocation of bandwidth to certain traffic routed to and from MEC Apps 2426, and specify static/dynamic up/down bandwidth resources, including bandwidth size and bandwidth priority. MEC Apps 2426 may use the BWMS to update/receive bandwidth information to/from the MEC platform 2432. Different MEC Apps 2426 running in parallel on the same MEC server 2402 may be allocated specific static, dynamic up/down bandwidth resources, including bandwidth size and bandwidth priority. The BWMS includes a bandwidth management (BWM) API to allowed registered applications to statically and/or dynamically register for specific bandwidth allocations per session/application. The BWM API includes HTTP protocol bindings for BWM functionality using RESTful services or some other suitable API mechanism. The BWM service is for allocating/adjusting BW resources for MEC apps, and allows MEC apps to provide their BW requirements.

Different MEC applications (apps) running in parallel on the same MEC host may require specific static/dynamic up/down bandwidth (BW) resources, including BW size and BW priority. In some cases different sessions running in parallel on the same app may each have specific BW requirements. In addition, sessions driven by Apps running from closer to end users (e.g., shorter RTT) may receive unfair advantage over session driven by apps running from distant locations (e.g., outside the RAN). To resolve potential resource conflicts between such competing applications, BWM and/or Multi-access Traffic Steering (MTS) services may be used.

The MTS services may be provided as part of the BWMS or separately from the BWMS. The MTS service is for seamlessly steering/splitting/duplicating app data traffic across multiple access network connections. The MTS service allows apps/MEC apps to get informed of various MTS capabilities and MX network connection info. The MTS also allows MEC apps to provide requirements (e.g., delay, throughput, loss, etc.) for influencing traffic management operations. The specific session or app/MEC app may be identified using a set of filters and/or identifiers (IDs) within the resource request.

The purpose of the UE Identity feature is to allow UE specific traffic rules in the MEC system 2400. When MEC system 2400 supports the UE Identity feature, the MEC platform 2432 provides the functionality (e.g., UE Identity API) for a MEC App 2426 to register a tag representing a UE 2420 or a list of tags representing respective UEs 2420. Each tag is mapped into a specific UE 2420 in the MNO's system, and the MEC platform 2432 is provided with the mapping information. The UE Identity tag registration triggers the MEC platform 2432 to activate the corresponding traffic rule(s) 2440 linked to the tag. The MEC platform 2432 also provides the functionality (e.g., UE Identity API) for a MEC App 2426 to invoke a de-registration procedure to disable or otherwise stop using the traffic rule for that user.

The WAIS is a service that provides WLAN access related information to service consumers within the MEC System 2400. The WAIS is available for authorized MEC Apps 2426 and is discovered over the Mp1 reference point. The granularity of the WLAN Access Information may be adjusted based on parameters such as information per station, per NAN/AP, or per multiple APs (Multi-AP). The WLAN Access Information may be used by the service consumers to optimize the existing services and to provide new types of services that are based on up-to-date information from WLAN APs, possibly combined with the information such as RNI or Fixed Access Network Information. The WAIS defines protocols, data models, and interfaces in the form of RESTful APIs. Information about the APs and client stations can be requested either by querying or by subscribing to notifications, each of which include attribute-based filtering and attribute selectors.

The FAIS is a service that provides Fixed Access Network Information (or FAI) to service consumers within the MEC System 2400. The FAIS is available for the authorized MEC Apps 2426 and is discovered over the Mp1 reference point. The FAI may be used by MEC Apps 2426 and the MEC platform 2432 to optimize the existing services and to provide new types of services that are based on up-to-date information from the fixed access (e.g., NANs), possibly combined with other information such as RNI or WLAN Information from other access technologies. Service consumers interact with the FAIS over the FAI API to obtain contextual information from the fixed access network. Both the MEC Apps 2426 and the MEC platform 2432 may consume the FAIS; and both the MEC platform 2432 and the MEC Apps 2426 may be the providers of the FAI. The FAI API supports both queries and subscriptions (pub/sub mechanism) that are used over the RESTful API or over alternative transports such as a message bus. Alternative transports may also be used.

The MEC management comprises MEC system level management and MEC host level management. The MEC management comprises the MEC platform manager 2406 and the VI manager (VIM) 2408, and handles the management of MEC-specific functionality of a particular MEC server 2402 and the applications running on it. In some implementations, some or all of the multi-access Edge management components may be implemented by one or more servers located in one or more data centers, and may use virtualization infrastructure that is connected with NFV infrastructure used to virtualize NFs, or using the same hardware as the NFV infrastructure.

The MEC platform manager 2406 is responsible for managing the life cycle of applications including informing the MEC orchestrator (MEC-O) 2410 of relevant application related events. The MEC platform manager 2406 may also provide MEC Platform Element management functions 2444 to the MEC platform 2432, manage MEC App rules and requirements 2446 including service authorizations, traffic rules, DNS configuration and resolving conflicts, and manage MEC App lifecycles mgmt 2448. The MEC platform manager 2406 may also receive virtualized resources, fault reports, and performance measurements from the VIM 2408 for further processing. The Mm5 reference point between the MEC platform manager 2406 and the MEC platform 2432 is used to perform platform configuration, configuration of the MEC Platform element mgmt 2444, MEC App rules and reqts 2446, MEC App lifecycles mgmt 2448, and management of application relocation.

The VIM 2408 may be an entity that allocates, manages and releases virtualized (compute, storage and networking) resources of the VI 2422, and prepares the VI 2422 to run a software image. To do so, the VIM 2408 may communicate with the VI 2422 over the Mm7 reference point between the VIM 2408 and the VI 2422. Preparing the VI 2422 may include configuring the VI 2422, and receiving/storing the software image. When supported, the VIM 2408 may provide rapid provisioning of applications, such as described in "Openstack++ for Cloudlet Deployments", available at http://reports-archive.adm.cs.cmu.edu/anon/2015/CMU-CS-15-123.pdf. The VIM 2408 may also collect and report performance and fault information about the virtualized resources, and perform application relocation when supported. For application relocation from/to external cloud environments, the VIM 2408 may interact with an external cloud manager to perform the application relocation, for example using the mechanism described in "Adaptive VM Handoff Across Cloudlets", and/or possibly through a proxy. Furthermore, the VIM 2408 may communicate with the MEC platform manager 2406 via the Mm6 reference point, which may be used to manage virtualized resources, for example, to realize the application lifecycle management. Moreover, the VIM 2408 may communicate with the MEC-O 2410 via the Mm4 reference point, which may be used to manage virtualized resources of the MEC server 2402, and to manage application images. Managing the virtualized resources may include tracking available resource capacity, etc.

The MEC system level management includes the MEC-O 2410, which has an overview of the complete MEC system 2400. The MEC-O 2410 may maintain an overall view of the MEC system 2400 based on deployed MEC hosts 2402, available resources, available MEC services 2436, and topology. The Mm3 reference point between the MEC-O 2410 and the MEC platform manager 2406 may be used for the management of the application lifecycle, application rules and requirements and keeping track of available MEC services 2436. The MEC-O 2410 may communicate with the user application lifecycle management proxy (UALMP) 2414 via the Mm9 reference point in order to manage MEC Apps 2426 requested by UE app 2418.

The MEC-O 2410 may also be responsible for on-boarding of application packages, including checking the integrity and authenticity of the packages, validating application rules and requirements and if necessary adjusting them to comply with operator policies, keeping a record of on-boarded packages, and preparing the VIM(s) 2408 to handle the applications. The MEC-O 2410 may select appropriate MEC host(s) 901 for application instantiation based on constraints, such as latency, available resources, and available services. The MEC-O 2410 may also trigger application instantiation and termination, as well as trigger application relocation as needed and when supported.

The Operations Support System (OSS) 2412 is the OSS of an operator that receives requests via the Customer Facing Service (CFS) portal 2416 over the Mx1 reference point and from UE apps 2418 for instantiation or termination of MEC Apps 2426. The OSS 2412 decides on the granting of these requests. The CFS portal 2416 (and the Mx1 interface) may be used by third-parties to request the MEC system 2400 to run apps 2418 in the MEC system 2400. Granted requests may be forwarded to the MEC-O 2410 for further processing. When supported, the OSS 2412 also receives requests from UE apps 2418 for relocating applications between external clouds and the MEC system 2400. The Mm2 reference point between the OSS 2412 and the MEC platform manager 2406 is used for the MEC platform manager 2406 configuration, fault and performance management. The Mm1 reference point between the MEC-O 2410 and the OSS 2412 is used for triggering the instantiation and the termination of MEC Apps 2426 in the MEC system 2400.

The UE app(s) 2418 (also referred to as "device applications" or the like) is one or more apps running in a device 2420 that has the capability to interact with the MEC system 2400 via the user application lifecycle management proxy 2414. The UE app(s) 2418 may be, include, or interact with one or more client applications, which in the context of MEC, is application software running on the device 2418 that utilizes functionality provided by one or more specific MEC Apps 2426. The user app LCM proxy 2414 may authorize requests from UE apps 2418 in the UE 2420 and interacts with the OSS 2412 and the MEC-O 2410 for further processing of these requests. The term "lifecycle management," in the context of MEC, refers to a set of functions required to manage the instantiation, maintenance and termination of a MEC App 2426 instance. The user app LCM proxy 2414 may interact with the OSS 2412 via the Mm8 reference point, and is used to handle UE 2418 requests for running applications in the MEC system 2400. A user app may be an MEC App 2426 that is instantiated in the MEC system 2400 in response to a request of a user via an application running in the UE 2420 (e.g., UE App 2418). The user app LCM proxy 2414 allows UE apps 2418 to request on-boarding, instantiation, termination of user applications and when supported, relocation of user applications in and out of the MEC system 2400. It also allows informing the user apps about the state of the user apps. The user app LCM proxy 2414 is only accessible from within the mobile network, and may only be available when supported by the MEC system 2400. A UE app 2418 may use the Mx2 reference point between the user app LCM proxy 2414 and the UE app 2418 to request the MEC system 2400 to run an application in the MEC system 2400, or to move an application in or out of the MEC system 2400. The Mx2 reference point may only be accessible within the mobile network and may only be available when supported by the MEC system 2400.

In order to run an MEC App 2426 in the MEC system 2400, the MEC-O 2410 receives requests triggered by the OSS 2412, a third-party, or a UE app 2418. In response to receipt of such requests, the MEC-O 2410 selects a MEC server/host 2402 to host the MEC App 2426 for computational offloading, etc. These requests may include information about the application to be run, and possibly other information, such as the location where the application needs to be active, other application rules and requirements, as well as the location of the application image if it is not yet on-boarded in the MEC system 2400.

The MEC-O 2410 may select one or more MEC servers 2402 for computational intensive tasks. The selected one or more MEC servers XE136 may offload computational tasks of a UE app 2418 based on various operational parameters, such as network capabilities and conditions, computational capabilities and conditions, application requirements, and/or other like operational parameters. The application requirements may be rules and requirements associated to/with one or more MEC Apps 2426, such as deployment model of the application (e.g., whether it is one instance per user, one instance per host, one instance on each host, etc.); required virtualized resources (e.g., compute, storage, network resources, including specific hardware support); latency requirements (e.g., maximum latency, how strict the latency constraints are, latency fairness between users); requirements on location; multi-access Edge services that are required and/or useful for the MEC Apps 2426 to be able to run; multi-access Edge services that the MEC Apps 2426 can take advantage of, if available; connectivity or mobility support/requirements (e.g., application state relocation, application instance relocation); required multi-access Edge features, such as VM relocation support or UE identity; required network connectivity (e.g., connectivity to applications within the MEC system 2400, connectivity to local networks, or to the Internet); information on the operator's MEC system 2400 deployment or mobile network deployment (e.g., topology, cost); requirements on access to user traffic; requirements on persistent storage; traffic rules 2440; DNS rules 2442; etc.

The MEC-O 2410 considers the requirements and information listed above and information on the resources currently available in the MEC system 2400 to select one or several MEC servers 2402 to host MEC Apps 2426 and/or for computational offloading. After one or more MEC servers XE136 are selected, the MEC-O 2410 requests the selected MEC host(s) 2402 to instantiate the application(s) or application tasks. The actual algorithm used to select the MEC servers 2402 depends on the implementation, configuration, and/or operator deployment. The selection algorithm(s) may be based on the task offloading criteria/parameters, for example, by taking into account network, computational, and energy consumption requirements for performing application tasks, as well as network functionalities, processing, and offloading coding/encodings, or differentiating traffic between various RATs. Under certain circumstances (e.g., UE mobility events resulting in increased latency, load balancing decisions, etc.), and if supported, the MEC-O 2410 may decide to select one or more new MEC hosts 2402 to act as a primary/source node, and initiates the transfer of an application instance or application-related state information from the one or more source MEC hosts 2402 to the one or more target MEC hosts 2402.

In a first implementation, a UPF of the 5GS is mapped into the MEC architecture 2400 as the MEC data plane 2424. In this implementation, the UPF handles the UP path of PDU sessions. Additionally, the UPF provides the interface to a data network and supports the functionality of a PDU session anchor.

In a second implementation, an application function (AF) of the 5GS is mapped into the MEC architecture 2400 as the MEC platform 2432. In these implementations, the AF is configurable or operable to perform application influence on traffic routing, access network capability exposure, and interact with the policy framework for policy control. The second implementation may be combined with the first implementation, or may be a standalone implementation. In the first and/or second implementations, since user traffic is routed to the local DN, MEC apps 2426, 2427, and/or 2428 can be mapped in or to the DN of the 5GS.

In a third implementation, the RAN of 5GS can be a virtual RAN based on a VNF, and the UPF is configurable or operable to function as the MEC data plane 2424 within an NF virtualization infrastructure (NFVI) (e.g., VI 2422).

In these implementations, the AF can be configured as MEC platform VNF with MEC APIs, MEC app enablement functionality (see e.g., [MEC009]), and API principles functionality (see e.g., [MEC009]). Additionally, the local DN an include MEC apps 2426, 2427, and/or 2428 instantiated as VNFs. This implementation can be configured to provide functionalities in accordance with [MEC003] and/or ETSI GR MEC 017 V1.1.1 (2018 February) ("[MEC017]"). The third implementation may be combined with the first implementation and/or the second implementation, or may be a standalone implementation.

Additionally or alternatively, the access level Edge (e.g., the various NANs and/or (R)ANs discussed herein) can use one or more APIs to communicate with local/regional level Edge networks. The local/regional level Edge networks can include network nodes using corresponding applications to communicate with a national level Edge network. The national level Edge can include various NANs that use applications for accessing one or more remote clouds within the global level Edge. The NANs are also configurable or operable for vertical segment management and SLA compliance. Additionally or alternatively, MEC deployment can be based on the definition of "Edge" to provide degrees of freedom to MNOs, especially when deploying MEC in an NFV environment (e.g., MEC entities can be instantiated as Virtualized NFs (VNFs), thus with high flexibility in terms of deployment for the operator).

Additionally or alternatively, MEC system 2400 can be flexibly deployed depending on the use case/vertical segment/information to be processed. Some components of the MEC system 2400 can be co-located with other elements of the system. As an example, in certain use cases (e.g., enterprise), a MEC app 2426 may need to consume a MEC service locally, and it may be efficient to deploy a MEC host locally equipped with the needed set of APIs. In another example, deploying a MEC server 2402 in a data center (which can be away from the access network) may not need to host some APIs like the RNI API (which can be used for gathering radio network information from the radio base station). On the other hand, RNI information can be elaborated and made available in the cloud RAN (CRAN) environments at the aggregation point, thus enabling the execution of suitable radio-aware traffic management algorithms. Additionally or alternatively, a bandwidth management API may be present both at the access level Edge and also in more remote Edge locations, in order to set up transport networks (e.g., for CDN-based services).

Figure 25:
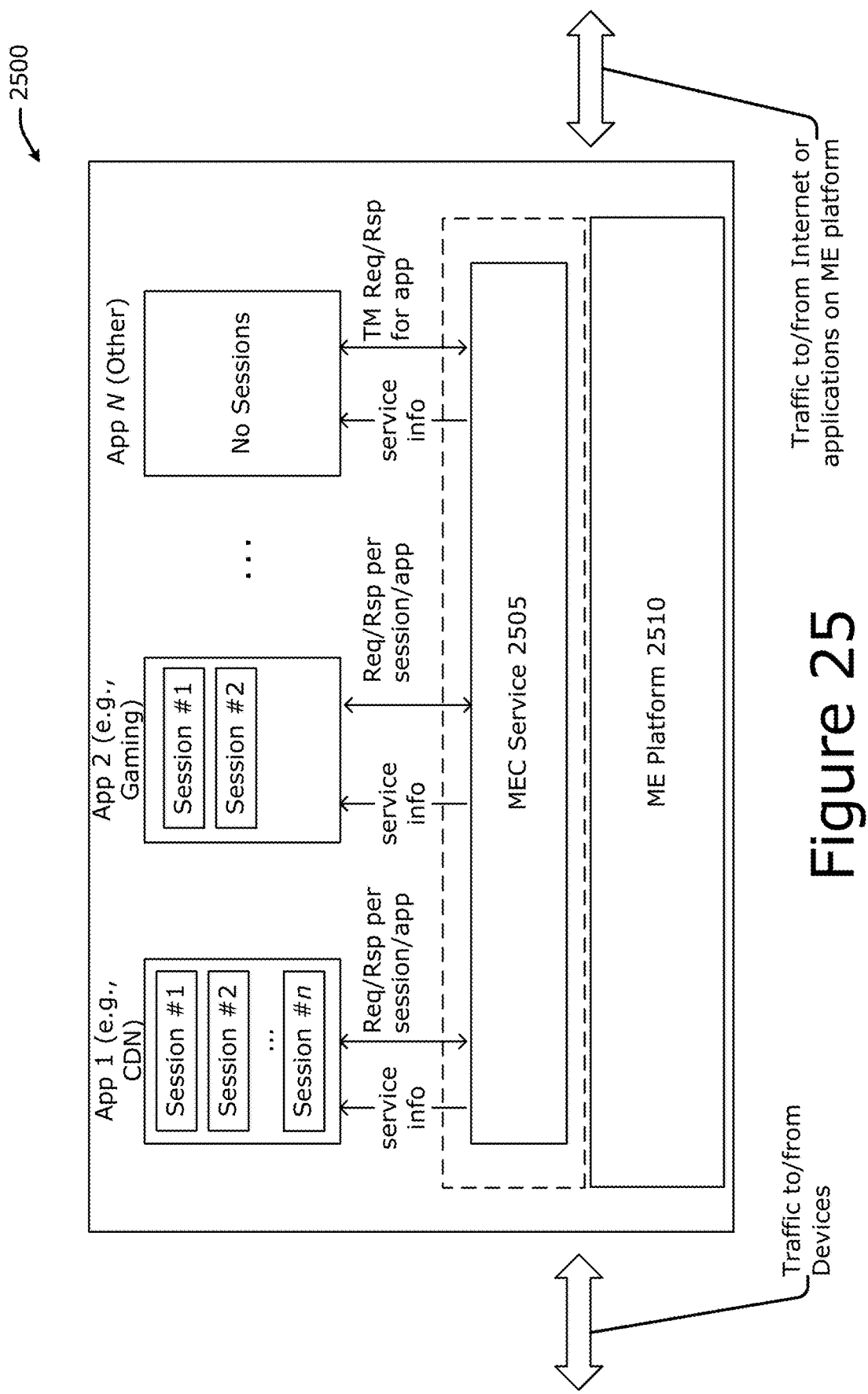
FIG. 25 illustrates an example MEC service architecture.

FIG. 25 illustrates an example MEC service architecture 2500. MEC service architecture 2500 includes the MEC service 2505, ME platform 2510 (corresponding to MEC platform 2432), and applications (Apps) 1 to N (where N is a number). As an example, the App 1 may be a CDN app/service hosting 1 to n sessions (where n is a number that is the same or different than N), App 2 may be a gaming app/service which is shown as hosting two sessions, and App N may be some other app/service which is shown as a single instance (e.g., not hosting any sessions). Each App may be a distributed application that partitions tasks and/or workloads between resource providers (e.g., servers such as ME platform 2510) and consumers (e.g., UEs 101, user apps instantiated by individual UEs 101, other servers/services, network functions, application functions, etc.). Each session represents an interactive information exchange between two or more elements, such as a client-side app and its corresponding server-side app, a user app instantiated by a UE 101 and a MEC app instantiated by the ME platform 2510, and/or the like. A session may begin when App execution is started or initiated and ends when the App exits or terminates execution. Additionally or alternatively, a session may begin when a connection is established and may end when the connection is terminated. Each App session may correspond to a currently running App instance. Additionally or alternatively, each session may correspond to a Protocol Data Unit (PDU) session or multi-access (MA) PDU session. A PDU session is an association between a UE 1711, 1721 and a DN that provides a PDU connectivity service, which is a service that provides for the exchange of PDUs between a UE 1711, 1721 and a Data Network. An MA PDU session is a PDU Session that provides a PDU connectivity service, which can use one access network at a time, or simultaneously a 3GPP access network 110A and a non-3GPP access network 110B. Furthermore, each session may be associated with a session identifier (ID) which is data the uniquely identifies a session, and each App (or App instance) may be associated with an App ID (or App instance ID) which is data the uniquely identifies an App (or App instance).

The MEC service 2505 provides one or more MEC services 2436 to MEC service consumers (e.g., Apps 1 to N). The MEC service 2505 may optionally run as part of the platform (e.g., ME platform 2510) or as an application (e.g., ME app). Different Apps 1 to N, whether managing a single instance or several sessions (e.g., CDN), may request specific service info per their requirements for the whole application instance or different requirements per session. The MEC service 2505 may aggregate all the requests and act in a manner that will help optimize the BW usage and improve Quality of Experience (QoE) for applications.

The MEC service 2505 provides a MEC service API that supports both queries and subscriptions (e.g., pub/sub mechanism) that are used over a Representational State Transfer ("REST" or "RESTful") API or over alternative transports such as a message bus. For RESTful architectural style, the MEC APIs contain the HTTP protocol bindings for traffic management functionality.

Each Hypertext Transfer Protocol (HTTP) message is either a request or a response. A server listens on a connection for a request, parses each message received, interprets the message semantics in relation to the identified request target, and responds to that request with one or more response messages. A client constructs request messages to communicate specific intentions, examines received responses to see if the intentions were carried out, and determines how to interpret the results. The target of an HTTP request is called a "resource." Additionally or alternatively, a "resource" is an object with a type, associated data, a set of methods that operate on it, and relationships to other resources if applicable. Each resource is identified by at least one Uniform Resource Identifier (URI), and a resource URI identifies at most one resource. Resources are acted upon by the RESTful API using HTTP methods (e.g., POST, GET, PUT, DELETE, etc.). With every HTTP method, one resource URI is passed in the request to address one particular resource. Operations on resources affect the state of the corresponding managed entities.

Considering that a resource could be anything, and that the uniform interface provided by HTTP is similar to a window through which one can observe and act upon such a thing only through the communication of messages to some independent actor on the other side, an abstraction is needed to represent ("take the place of") the current or desired state of that thing in our communications. That abstraction is called a representation. For the purposes of HTTP, a "representation" is information that is intended to reflect a past, current, or desired state of a given resource, in a format that can be readily communicated via the protocol. A representation comprises a set of representation metadata and a potentially unbounded stream of representation data. Additionally or alternatively, a resource representation is a serialization of a resource state in a particular content format.

An origin server might be provided with, or be capable of generating, multiple representations that are each intended to reflect the current state of a target resource. In such cases, some algorithm is used by the origin server to select one of those representations as most applicable to a given request, usually based on content negotiation. This "selected representation" is used to provide the data and metadata for evaluating conditional requests constructing the payload for response messages (e.g., 200 OK, 304 Not Modified responses to GET, and the like). A resource representation is included in the payload body of an HTTP request or response message. Whether a representation is required or not allowed in a request depends on the HTTP method used (see e.g., Fielding et al., "Hypertext Transfer Protocol (HTTP/1.1): Semantics and Content", IETF RFC 7231 (June 2014)).

The MEC API resource Universal Resource Indicators (URIs) are discussed in various ETSI MEC standards, such as those mentioned herein. The MTS API supports additional application-related error information to be provided in the HTTP response when an error occurs (see e.g., clause 6.15 of ETSI GS MEC 009 V2.1.1 (2019 January) ("[MEC009]")). The syntax of each resource URI follows [MEC009], as well as Berners-Lee et al., "Uniform Resource Identifier (URI): Generic Syntax", IETF Network Working Group, RFC 3986 (January 2005) and/or Nottingham, "URI Design and Ownership", IETF RFC 8820 (June 2020). In the RESTful MEC service APIs, including the VIS API, the resource URI structure for each API has the following structure: {apiRoot}/{apiName}/{apiVersion}/{apiSpecificSuffixes}

Here, "apiRoot" includes the scheme ("https"), host and optional port, and an optional prefix string. The "apiName" defines the name of the API (e.g., MTS API, RNI API, etc.). The "apiVersion" represents the version of the API, and the "apiSpecificSuffixes" define the tree of resource URIs in a particular API. The combination of "apiRoot", "apiName" and "apiVersion" is called the root URI. The "apiRoot" is under control of the deployment, whereas the remaining parts of the URI are under control of the API specification. In the above root, "apiRoot" and "apiName" are discovered using the service registry (see e.g., service registry 2438 in FIG. 24). It includes the scheme ("http" or "https"), host and optional port, and an optional prefix string. For the a given MEC API, the "apiName" may be set to "mec" and "apiVersion" may be set to a suitable version number (e.g., "v1" for version 1). The MEC APIs support HTTP over TLS (also known as HTTPS). All resource URIs in the MEC API procedures are defined relative to the above root URI.

The JSON content format may also be supported. The JSON format is signaled by the content type "application/json". The MTS API may use the OAuth 2.0 client credentials grant type with bearer tokens (see e.g., [MEC009]). The token endpoint can be discovered as part of the service availability query procedure defined in [MEC009]. The client credentials may be provisioned into the MEC app using known provisioning mechanisms.

2.2. Open RAN (O-RAN) Aspects

Figure 26:
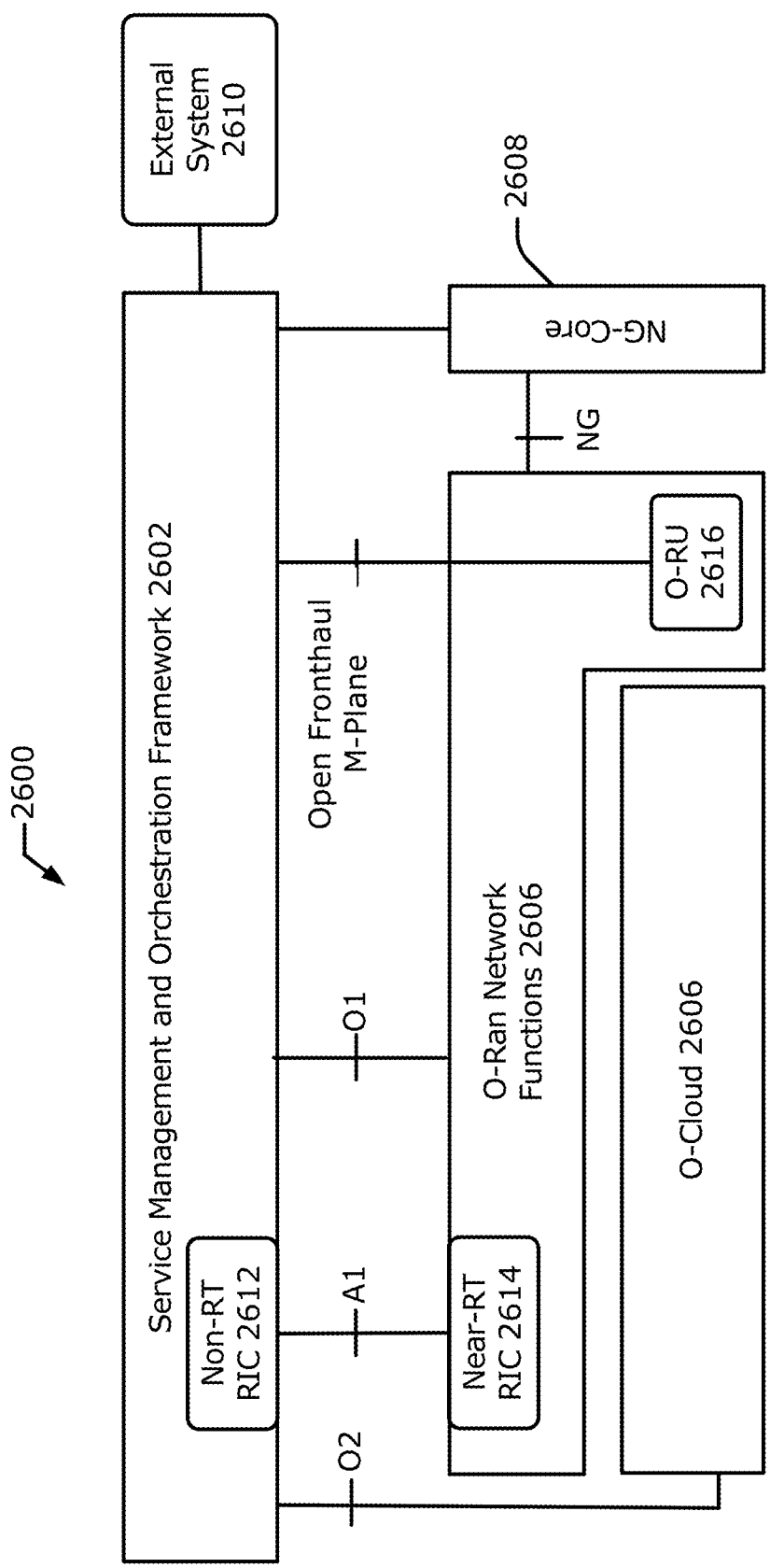
FIG. 26 depicts an Open RAN (O-RAN) system architecture.

FIG. 26 illustrates an example Open RAN (O-RAN) system architecture 2600 according to various embodiments. The O-RAN architecture 2600 includes four O-RAN defined interfaces—namely, the A1 interface, the O1 interface, the O2 interface, and the Open Fronthaul Management (M)-plane interface—which connect the Service Management and Orchestration framework (SMO) 2602 to O-RAN network functions (NFs) 2604 and the O-Cloud 2606.

The O1 interface is an interface between orchestration & management entities (Orchestration/NMS) and O-RAN managed elements, for operation and management, by which FCAPS management, Software management, File management and other similar functions shall be achieved (see e.g., O-RAN Alliance Working Group (WG) 1, "O-RAN Architecture Description" v04.00 (March 2021) ("[O-RAN.WG1.O-RAN-Architecture-Description-v04.00]"), O-RAN Alliance WG6, "Cloud Architecture and Deployment Scenarios for O-RAN Virtualized RAN" v02.01 (July 2020) ("[O-RAN.WG6.CAD-v02.01]"). The O2 interface is an interface between the Service Management and Orchestration Framework and the O-Cloud (see e.g., [O-RAN.WG1.O-RAN-Architecture-Description-v04.00], [O-RAN.WG6.CAD-v02.01]). The A1 interface is an interface between the O-RAN Non-Real Time (RT) RAN Intelligent Controller (RIC) 2612 and the Near-RT RIC 2614 to enable policy-driven guidance of Near-RT RIC applications/functions, and support AI/ML workflow The SMO 2602 (see e.g., O-RAN Alliance WG1, "O-RAN Operations and Maintenance Interface Specification" v04.00 (November 2020) ("[O-RAN.WG1.O1-Interface.0-v04.00]")) also connects with an external system 2610, which provides enrighment data to the SMO 2602. FIG. 26 also illustrates that the A1 interface terminates at an O-RAN Non-Real Time (RT) RAN Intelligent Controller (RIC) 2612 in or at the SMO 2602 and at the O-RAN Near-RT RIC 2614 in or at the O-RAN NFs 2604. The O-RAN NFs 2604 can be VNFs such as VMs or containers, sitting above the O-Cloud 2606 and/or Physical Network Functions (PNFs) utilizing customized hardware. All O-RAN NFs 2604 are expected to support the O1 interface when interfacing the SMO 2602. The O-RAN NFs 2604 connect to the NG-Core 2608 via the NG interface (which is a 3GPP defined interface). The Open Fronthaul M-plane interface between the SMO 2602 and the O-RAN Radio Unit (O-RU) 2616 supports the O-RU 2616 management in the O-RAN hybrid model as specified in O-RAN Alliance WG4, O-RAN Fronthaul Management Plane Specification, version 2.0 (July 2019) ("[ORAN-WG4.MP.0-v02.00.00]"). The Open Fronthaul M-plane interface is an optional interface to the SMO 2602 that is included for backward compatibility purposes as per [ORAN-WG4.MP.0-v02.00.00], and is intended for management of the O-RU 2616 in hybrid mode only. The management architecture of flat mode O-RAN Alliance WG1, "O-RAN Operations and Maintenance Architecture Specification" v04.00 (November 2020) ("[O-RAN.WG1.OAM-Architecture-v04.00]") and its relation to the O1 interface for the O-RU 2616 is for future study. The O-RU 2616 termination of the O1 interface towards the SMO 2602 as specified in [O-RAN.WG1.OAM-Architecture-v04.00].

Figure 27:
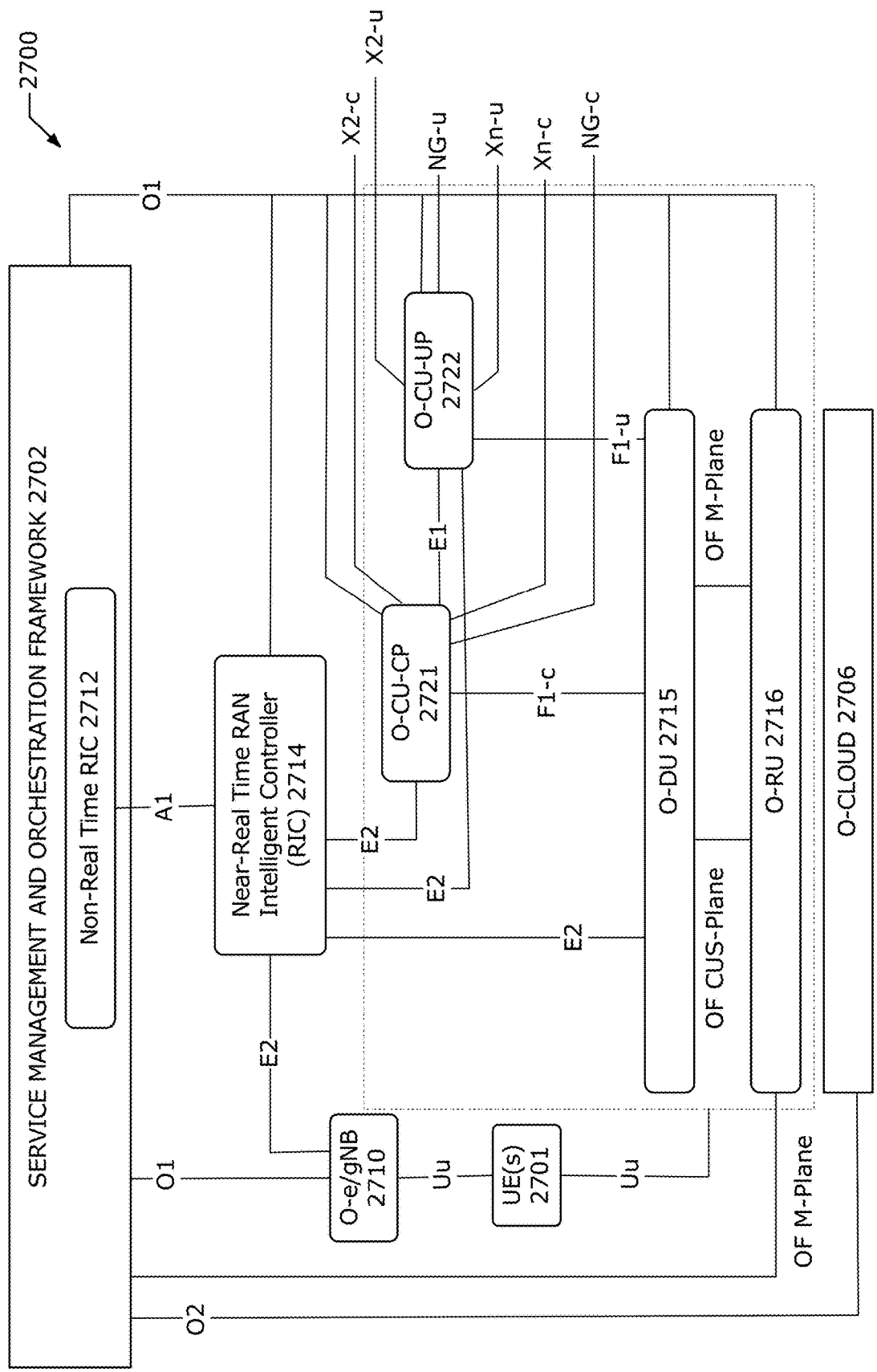
FIG. 27 depicts a logical architecture of the O-RAN system architecture of FIG. 26.

FIG. 27 illustrates a logical architecture 2700 of the O-RAN system architecture 2600 of FIG. 26. In FIG. 27, the SMO 2702 corresponds to the SMO 2602, O-Cloud 2706 corresponds to the O-Cloud 2606, the non-RT RIC 2712 corresponds to the non-RT RIC 2612, the near-RT RIC 2714 corresponds to the near-RT RIC 2614, and the O-RU 2716 corresponds to the O-RU 2616 of FIG. 27, respectively. The O-RAN logical architecture 2700 includes a radio portion and a management portion.

The management portion/side of the architectures 2700 includes the SMO 2702 containing the non-RT RIC 2712, and may include the O-Cloud 2706. The O-Cloud 2706 is a cloud computing platform including a collection of physical infrastructure nodes to host the relevant O-RAN functions (e.g., the near-RT RIC 2714, O-CU-CP 2721, O-CU-UP 2722, and the O-DU 2715), supporting software components (e.g., OSs, VMMs, container runtime engines, ML engines, etc.), and appropriate management and orchestration functions.

The radio portion/side of the logical architecture 2700 includes the near-RT RIC 2714, the O-RAN Distributed Unit (O-DU) 2715, the O-RU 2716, the O-RAN Central Unit—Control Plane (O-CU-CP) 2721, and the O-RAN Central Unit—User Plane (O-CU-UP) 2722 functions. The radio portion/side of the logical architecture 2700 may also include the O-e/gNB 2710.

The O-DU 2715 is a logical node hosting RLC, MAC, and higher PHY layer entities/elements (High-PHY layers) based on a lower layer functional split. The O-RU 2716 is a logical node hosting lower PHY layer entities/elements (Low-PHY layer) (e.g., FFT/iFFT, PRACH extraction, etc.) and RF processing elements based on a lower layer functional split. Virtualization of O-RU 2716 is FFS. The O-CU-CP 2721 is a logical node hosting the RRC and the control plane (CP) part of the PDCP protocol. The O-CU-UP 2722 is a logical node hosting the user plane part of the PDCP protocol and the SDAP protocol.

An E2 interface terminates at a plurality of E2 nodes. The E2 interface connects the near-RT RIC 2714 and one or more O-CU-CP 2721, one or more O-CU-UP 2722, one or more O-DU 2715, and one or more O-e/gNB 2710. The E2 nodes are logical nodes/entities that terminate the E2 interface. For NR/5G access, the E2 nodes include the O-CU-CP 2721, O-CU-UP 2722, O-DU 2715, or any combination of elements as defined in -RAN Alliance WG3, "O-RAN Near-Real-time RAN Intelligent Controller Architecture & E2 General Aspects and Principles" v01.01 (July 2020) ("[O-RAN.WG3.E2GAP-v01.01]"). For E-UTRA access the E2 nodes include the O-e/gNB 2710. As shown in FIG. 27, the E2 interface also connects the O-e/gNB 2710 to the Near-RT RIC 2714. The protocols over E2 interface are based exclusively on Control Plane (CP) protocols. The E2 functions are grouped into the following categories: (a) near-RT RIC 2714 services (REPORT, INSERT, CONTROL and POLICY, as described in [O-RAN.WG3.E2GAP-v01.01]); and (b) near-RT RIC 2714 support functions, which include E2 Interface Management (E2 Setup, E2 Reset, Reporting of General Error Situations, etc.) and Near-RT RIC Service Update (e.g., capability exchange related to the list of E2 Node functions exposed over E2). A RIC Service is a Service provided on an E2 Node to provide access to messages and measurements and/or enable control of the E2 Node from the Near-RT RIC.

FIG. 27 shows the Uu interface between a UE 2701 and O-e/gNB 2710 as well as between the UE 2701 and O-RAN components. The Uu interface is a 3GPP defined interface (see e.g., sections 5.2 and 5.3 of 3GPP TS 38.401 v16.3.0 (2020 Oct. 2) ("[TS38401]"), which includes a complete protocol stack from L1 to L3 and terminates in the NG-RAN or E-UTRAN. The O-e/gNB 2710 is an LTE eNB (see e.g., 3GPP TS 36.401 v16.0.0 (2020 Jul. 16)), a 5G gNB or ng-eNB (see e.g., [TS38300]) that supports the E2 interface.

The O-e/gNB 2710 may be the same or similar as NANs 1731-1733, and UE 2701 may be the same or similar as any of UEs 1721, 1711 discussed with respect to FIG. 17, and/or the like. There may be multiple UEs 2701 and/or multiple O-e/gNB 2710, each of which may be connected to one another the via respective Uu interfaces. Although not shown in FIG. 27, the O-e/gNB 2710 supports O-DU 2715 and O-RU 2716 functions with an Open Fronthaul interface between them.

The Open Fronthaul (OF) interface(s) is/are between O-DU 2715 and O-RU 2716 functions (see e.g., [ORAN-WG4.MP.0-v02.00.00], O-RAN Alliance WG4, "O-RAN Fronthaul Control, User and Synchronization Plane Specification 6.0" v06.00 (March 2021) ("[O-RAN-WG4.CUS.0-v06.00]")). The OF interface(s) includes the Control User Synchronization (CUS) Plane and Management (M) Plane. FIGS. 26 and 27 also show that the O-RU 2716 terminates the OF M-Plane interface towards the O-DU 2715 and optionally towards the SMO 2702 as specified in [ORAN-WG4.MP.0-v02.00.00]. The O-RU 2716 terminates the OF CUS-Plane interface towards the O-DU 2715 and the SMO 2702.

The F1-c interface connects the O-CU-CP 2721 with the O-DU 2715. As defined by 3GPP, the F1-c interface is between the gNB-CU-CP and gNB-DU nodes (see e.g., [TS38401]), 3GPP TS 38.470 v16.3.0 (2020 Oct. 2) ("[TS38470]"). However, for purposes of O-RAN, the F1-c interface is adopted between the O-CU-CP 2721 with the O-DU 2715 functions while reusing the principles and protocol stack defined by 3GPP and the definition of interoperability profile specifications.

The F1-u interface connects the O-CU-UP 2722 with the O-DU 2715. As defined by 3GPP, the F1-u interface is between the gNB-CU-UP and gNB-DU nodes [TS38401], [TS38470]. However, for purposes of O-RAN, the F1-u interface is adopted between the O-CU-UP 2722 with the O-DU 2715 functions while reusing the principles and protocol stack defined by 3GPP and the definition of interoperability profile specifications.

The NG-C interface is defined by 3GPP as an interface between the gNB-CU-CP and the AMF in the 5GC, and the NG-C is also referred as the N2 interface (see e.g., [TS38300]). The NG-U interface is defined by 3GPP, as an interface between the gNB-CU-UP and the UPF in the 5GC, and the NG-u interface is referred as the N3 interface (see e.g., [TS38300]). In O-RAN, NG-C and NG-U protocol stacks defined by 3GPP are reused and may be adapted for O-RAN purposes.

The X2-C interface is defined in 3GPP for transmitting control plane information between eNBs or between eNB and en-gNB in EN-DC. The X2-U interface is defined in 3GPP for transmitting user plane information between eNBs or between eNB and en-gNB in EN-DC (see e.g., 3GPP TS 36.420 v16.0.0 (2020 Jul. 17), [TS38300]). In O-RAN, X2-c and X2-u protocol stacks defined by 3GPP are reused and may be adapted for O-RAN purposes The Xn-c interface is defined in 3GPP for transmitting control plane information between gNBs, ng-eNBs, or between an ng-eNB and gNB. The Xn-u interface is defined in 3GPP for transmitting user plane information between gNBs, ng-eNBs, or between ng-eNB and gNB (see e.g., 3GPP TS 38.420 v16.0.0 (2020 Jul. 16), [TS38300]). In O-RAN, Xn-C and Xn-U protocol stacks defined by 3GPP are reused and may be adapted for O-RAN purposes The E1 interface is defined by 3GPP as being an interface between the gNB-CU-CP (e.g., gNB-CU-CP 3728) and gNB-CU-UP (see e.g., [TS38401], 3GPP TS 38.460 v16.1.0 (2020 Jul. 17)). In O-RAN, E1 protocol stacks defined by 3GPP are reused and adapted as being an interface between the O-CU-CP 2721 and the O-CU-UP 2722 functions.

The O-RAN Non-Real Time (RT) RAN Intelligent Controller (RIC) 2712 is a logical function within the SMO 2602, 2702 that enables non-real-time control and optimization of RAN elements and resources; AI/machine learning (ML) workflow(s) including model training, inferences, and updates; and policy-based guidance of applications/features in the Near-RT RIC 2714.

The O-RAN near-RT RIC 2714 is a logical function that enables near-real-time control and optimization of RAN elements and resources via fine-grained data collection and actions over the E2 interface. The near-RT RIC 2714 may include one or more AI/ML workflows including model training, inferences, and updates.

The non-RT RIC 2712 can be an ML training host to host the training of one or more ML models. ML training can be performed offline using data collected from the RIC, O-DU 2715 and O-RU 2716. For supervised learning, non-RT RIC 2712 is part of the SMO 2702, and the ML training host and/or ML model host/actor can be part of the non-RT RIC 2712 and/or the near-RT RIC 2714. For unsupervised learning, the ML training host and ML model host/actor can be part of the non-RT RIC 2712 and/or the near-RT RIC 2714. For reinforcement learning, the ML training host and ML model host/actor may be co-located as part of the non-RT RIC 2712 and/or the near-RT RIC 2714. In some implementations, the non-RT RIC 2712 may request or trigger ML model training in the training hosts regardless of where the model is deployed and executed. ML models may be trained and not currently deployed.

In some implementations, the non-RT RIC 2712 provides a query-able catalog for an ML designer/developer to publish/install trained ML models (e.g., executable software components). In these implementations, the non-RT RIC 2712 may provide discovery mechanism if a particular ML model can be executed in a target ML inference host (MF), and what number and type of ML models can be executed in the MF. For example, there may be three types of ML catalogs made discoverable by the non-RT RIC 2712: a design-time catalog (e.g., residing outside the non-RT RIC 2712 and hosted by some other ML platform(s)), a training/deployment-time catalog (e.g., residing inside the non-RT RIC 2712), and a run-time catalog (e.g., residing inside the non-RT RIC 2712). The non-RT RIC 2712 supports necessary capabilities for ML model inference in support of ML assisted solutions running in the non-RT RIC 2712 or some other ML inference host. These capabilities enable executable software to be installed such as VMs, containers, etc. The non-RT RIC 2712 may also include and/or operate one or more ML engines, which are packaged software executable libraries that provide methods, routines, data types, etc., used to run ML models. The non-RT RIC 2712 may also implement policies to switch and activate ML model instances under different operating conditions.

The non-RT RIC 2712 is be able to access feedback data (e.g., FM and PM statistics) over the O1 interface on ML model performance and perform necessary evaluations. If the ML model fails during runtime, an alarm can be generated as feedback to the non-RT RIC 2712. How well the ML model is performing in terms of prediction accuracy or other operating statistics it produces can also be sent to the non-RT RIC 2712 over O1. The non-RT RIC 2712 can also scale ML model instances running in a target MF over the O1 interface by observing resource utilization in MF. The environment where the ML model instance is running (e.g., the MF) monitors resource utilization of the running ML model. This can be done, for example, using an ORAN-SC component called ResourceMonitor in the near-RT RIC 2714 and/or in the non-RT RIC 2712, which continuously monitors resource utilization. If resources are low or fall below a certain threshold, the runtime environment in the near-RT RIC 2714 and/or the non-RT RIC 2712 provides a scaling mechanism to add more ML instances. The scaling mechanism may include a scaling factor such as an number, percentage, and/or other like data used to scale up/down the number of ML instances. ML model instances running in the target ML inference hosts may be automatically scaled by observing resource utilization in the MF. For example, the Kubernetes® (K8s) runtime environment typically provides an auto-scaling feature.

The A1 interface is between the non-RT RIC 2712 (within or outside the SMO 2702) and the near-RT RIC 2714. The A1 interface supports three types of services as defined in -RAN Alliance WG2, "O-RAN A1 interface: General Aspects and Principles 2.02" v02.02 (March 2021) ("[O-RAN.WG2.A1GAP-v02.02]"), including a Policy Management Service, an Enrichment Information Service, and ML Model Management Service. A1 policies have the following characteristics compared to persistent configuration (see e.g., [O-RAN.WG2.A1GAP-v02.02]): A1 policies are not critical to traffic; A1 policies have temporary validity; A1 policies may handle individual UE or dynamically defined groups of UEs; A1 policies act within and take precedence over the configuration; and A1 policies are non-persistent, e.g., do not survive a restart of the near-RT RIC. O-RAN is currently developing a framework for adding 3rd party xApps to a Base Station product, which is assembled from components from different suppliers.

Figure 28:
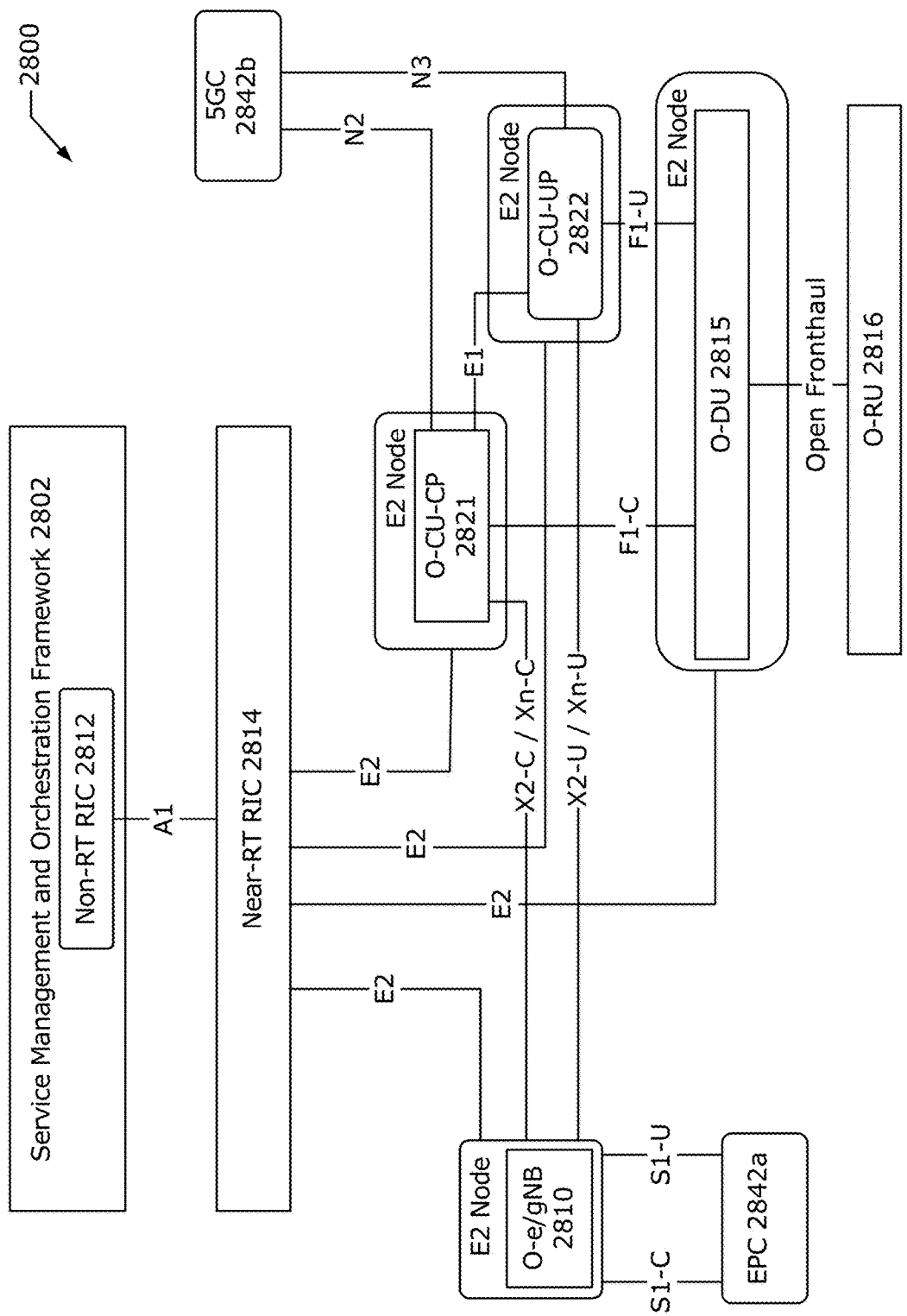
FIG. 28 illustrates an O-RAN Architecture including Near-RT RIC interfaces.

FIG. 28 illustrates an example O-RAN Architecture 2800 including Near-RT RIC interfaces. The Near-RT RIC 2814 is connected to the Non-RT RIC 2812 through the A1 interface (see e.g., [O-RAN.WG2.A1GAP-v02.02]). The Near-RT RIC 2814 is a logical network node placed between the E2 Nodes and the Service Management & Orchestration layer (SMO) 2802, which hosts the Non-RT RIC 2812. The Near-RT RIC 2814 may be the same or similar as the Near-RT RIC 2614 and Near-RT RIC 2714 of FIGS. 26 and 27, and the Non-RT RIC 2812 may be the same or similar as the Non-RT RIC 2612 and/or the Non-RT RIC 2712 of FIGS. 26 and 27. The SMO 2802 may be the same or similar to the SMO 2602 and/or the SMO 2702 of FIGS. 26 and 27. A Near-RT RIC 2814 is connected to only one Non-RT RIC 2812.

As mentioned previously, E2 is a logical interface connecting the Near-RT RIC 2814 with an E2 Node. The Near-RT RIC 2814 is connected to the O-CU-CP 2821, the Near-RT RIC 2814 is connected to the O-CU-UP 2822, the Near-RT RIC 2814 is connected to the O-DU 2815, and the Near-RT RIC 2814 is connected to the O-e/gNB 2810. The O-DU 2815 is connected to the O-RU 2816. The O-CU-CP 2821, the O-CU-UP 2822, the O-DU 2815, and the O-e/gNB 2810 may be the same or similar to the O-CU-CP 2721, the O-DU 2715, and the O-e/gNB 2710 of FIG. 27. The O-RU 2816 may be the same or similar to the O-RU 2616 and/or the O-RU 2716 of FIGS. 26 and 27.

An E2 Node is connected to only one Near-RT RIC 2814. A Near-RT RIC 2814 can be connected to multiple E2 Nodes (e.g., multiple O-CU-CPs 2821, O-CU-UPs 2822, O-DUs 2815, and O-e/gNBs 2810). F1 (e.g., F1 control plane (F1-C) and F1 user plane (F1-U)) and E1 are logical 3GPP interfaces, whose protocols, termination points and cardinalities are specified in [TS38401]. In addition, the Near-RT RIC 2814 and other RAN nodes have O1 interfaces as defined in [O-RAN.WG1.OAM-Architecture-v04.00], and [O-RAN.WG1.O-RAN-Architecture-Description-v04.00].

Additionally, the O-CU-CP 2821 is connected to the 5G Core Network (5GC) 2842*b* via an N2 interface, the O-CU-UP 2822 is connected to the 5GC 2842*b* via an N3 interface, and the O-gNBs 2810 is connected to the O-CU-CP 2821 via an Xn control plane interface (Xn-C), and is connected to the O-CU-UP 2822 via an Xn user plane interface (Xn-U); these interfaces are defined in 3GPP TS 23.501 v17.1.1 (2021-06-24) ("[TS23501]"), 3GPP TS 38.300 v16.6.0 (2021-07-06) ("[TS38300]"), and other 3GPP standards. Furthermore, the O-eNBs 2810 are connected to an Evolved Packet Core (EPC) 2842*a* via S1 control place (S1-C) and S1 user plane (S1-U) interfaces, and the O-eNBs 2810 is connected to the O-CU-CP 2821 via an X2 control plane interface (X2-C) and/or an Xn control plane interface (Xn-C), and is connected to the O-CU-UP 2822 via an X2 user plane interface (X2-U) and/or an Xn user plane interface (Xn-U); these interfaces are discussed in 3GPP TS 36.300 v16.6.0 (2021 Jul. 6) ("[TS36300]") and/or other other 3GPP standards.

The Near-RT RIC 2814 hosts one or more xApps that use the E2 interface to collect near real-time information (e.g., UE basis, Cell basis) and provide value added services. The Near-RT RIC 2814 may receive declarative Policies and obtain Data Enrichment information over the A1 interface (see e.g., [O-RAN.WG2.A1GAP-v02.02]).

The protocols over E2 interface are based on control plane protocols and are defined in O-RAN Alliance WG1, "Near-Real-time RAN Intelligent Controller, E2 Application Protocol (E2AP)" v01.01 (July 2020) ("[O-RAN.WG3.E2AP-v01.0]"). On E2 or Near-RT RIC 2814 failure, the E2 Node will be able to provide services but there may be an outage for certain value-added services that may only be provided using the Near-RT RIC 2814.

The Near-RT RIC 2814 provides a database function that stores the configurations relating to E2 nodes, Cells, Bearers, Flows, UEs and the mappings between them. The Near-RT RIC 2814 provides ML tools that support data pipelining. The Near-RT RIC 2814 provides a messaging infrastructure. The Near-RT RIC 2814 provides logging, tracing and metrics collection from Near-RT RIC 2814 framework and xApps to SMO. The Near-RT RIC 2814 provides security functions. The Near-RT RIC 2814 supports conflict resolution to resolve the potential conflicts or overlaps which may be caused by the requests from xApps.

The Near-RT RIC 2814 also provides an open API enabling the hosting of 3rd party xApps and xApps from the Near-RT RIC 2814 platform vendor. Near-RT RIC 2814 also provides an open API decoupled from specific implementation solutions, including a Shared Data Layer (SDL) that works as an overlay for underlying databases and enables simplified data access.

An xApp is an application designed to run on the Near-RT RIC 2814. Such an application is likely to include or provide one or more microservices and at the point of on-boarding will identify which data it consumes and which data it provides. An xApp is independent of the Near-RT RIC 2814 and may be provided by any third party. The E2 enables a direct association between the xApp and the RAN functionality. A RAN Function is a specific Function in an E2 Node; examples include X2AP, F1AP, E1AP, S1AP, NGAP interfaces and RAN internal functions handling UEs, Cells, etc.

The architecture of an xApp comprises the code implementing the xApp's logic and the RIC libraries that allow the xApp to: send and receive messages; read from, write to, and get notifications from the SDL layer; and write log messages. Additional libraries will be available in future versions including libraries for setting and resetting alarms and sending statistics. Furthermore, xApps can use access libraries to access specific name-spaces in the SDL layer. For example, the R-NIB that provides information about which E2 nodes (e.g., CU/DU) the RIC is connected to and which SMs are supported by each E2 node, can be read by using the R-NIB access library.

The O-RAN standard interfaces (e.g., O1, A1, and E2) are exposed to the xApps as follows: xApp will receive its configuration via K8s ConfigMap—the configuration can be updated while the xApp is running and the xApp can be notified of this modification by using inotify( ); xApp can send statistics (PM) either by (a) sending it directly to VES collector in VES format, (b) by exposing statistics via a REST interface for Prometheus to collect; xApp will receive A1 policy guidance via an RMR message of a specific kind (policy instance creation and deletion operations); and xApp can subscribe to E2 events by constructing the E2 subscription ASN.1 payload and sending it as a message (RMR), xApp will receive E2 messages (e.g., E2 INDICATION) as RMR messages with the ASN.1 payload. Similarly xApp can issue E2 control messages.

In addition to A1 and E2 related messages, xApps can send messages that are processes by other xApps and can receive messages produced by other xApps. Communication inside the RIC is policy driven, that is, an xApp cannot specify the target of a message. It simply sends a message of a specific type and the routing policies specified for the RIC instance will determine to which destinations this message will be delivered (logical pub/sub).

Logically, an xApp is an entity that implements a well-defined function. Mechanically, an xApp is a K8s pod that includes one or multiple containers. In order for an xApp to be deployable, it needs to have an xApp descriptor (e.g., JSON) that describes the xApp's configuration parameters and information the RIC platform needs to configure the RIC platform for the xApp. The xApp developer will also need to provide a JSON schema for the descriptor.

In addition to these basic requirements, an xApp may do any of the following: read initial configuration parameters (passed in the xApp descriptor); receive updated configuration parameters; send and receive messages; read and write into a persistent shared data storage (key-value store); receive A1-P policy guidance messages—specifically operations to create or delete a policy instance (JSON payload on an RMR message) related to a given policy type; define a new A1 policy type; make subscriptions via E2 interface to the RAN, receive E2 INDICATION messages from the RAN, and issue E2 POLICY and CONTROL messages to the RAN; and report metrics related to its own execution or observed RAN events.

The lifecycle of xApp development and deployment consists of the following states: Development (design, implementation, local testing); Released (the xApp code and xApp descriptor are committed to LF Gerrit repo and included in an O-RAN release. The xApp is packaged as Docker container and its image released to LF Release registry); On-boarded/Distributed (the xApp descriptor (and potentially helm chart) is customized for a given RIC environment and the resulting customized helm chart is stored in a local helm chart repo used by the RIC environment's xApp Manager); Run-time Parameters Configuration (before the xApp can be deployed, run-time helm chart parameters will be provided by the operator to customized the xApp Kubemetes deployment instance. This procedure is mainly used to configure run-time unique helm chart parameters such as instance UUID, liveness check, east-bound and north-bound service endpoints (e.g., DBAAS entry, VES collector endpoint) and so on); and deployed (the xApp has been deployed via the xApp Manager and the xApp pod is running on a RIC instance. For xApps where it makes sense, the deployed status may be further divided into additional states controlled via xApp configuration updates. For example, Running, Stopped).

The general principles guiding the definition of Near-RT RIC architecture as well as the interfaces between Near-RT RIC 2814, E2 Nodes and Service Management & Orchestration are the following: Near-RT RIC 2814 and E2 Node functions are fully separated from transport functions. Addressing scheme used in Near-RT RIC 2814 and the E2 Nodes shall not be tied to the addressing schemes of transport functions; the E2 Nodes support all protocol layers and interfaces defined within 3GPP radio access networks that include eNB for E-UTRAN and gNB/ng-eNB for NG-RAN; Near-RT RIC 2814 and hosted "xApp" applications shall use a set of services exposed by an E2 Node that is described by a series of RAN function and Radio Access Technology (RAT) dependent E2 Service Models; and the Near-RT RIC 2814 interfaces are defined along the following principles: the functional division across the interfaces have as few options as possible; interfaces are based on a logical model of the entity controlled through this interface; and one physical network element can implement multiple logical nodes.

xApps may enhance the RRM capabilities of the Near-RT RIC 2814. xApps provide logging, tracing and metrics collection to the Near-RT RIC 2814. xApps include an xApp descriptor and xApp image. The xApp image is the software package. The xApp image contains all the files needed to deploy an xApp. An xApp can have multiple versions of xApp image, which are tagged by the xApp image version number.

The xApp descriptor describes the packaging format of xApp image. The xApp descriptor also provides the necessary data to enable their management and orchestration. The xApp descriptor provides xApp management services with necessary information for the LCM of xApps, such as deployment, deletion, upgrade etc. The xApp descriptor also provides extra parameters related to the health management of the xApps, such as auto scaling when the load of xApp is too heavy and auto healing when xApp becomes unhealthy. The xApp descriptor provides FCAPS and control parameters to xApps when xApp is launched.

The definition of xApp descriptor includes: xApp basic information, FCAPS management specifications, and control specifications. The basic information of xApp, including name, version, provider, URL of xApp image, virtual resource requirements (e.g., CPU), etc. The basic information of xApp is used to support LCM of xApps. Additionally or alternatively, the basic information of xApp includes or indicates configuration, metrics, and control data about an xApp. The FCAPS management specifications that specify the options of configuration, performance metrics collection, etc. for the xApp. The control specifications that specify the data types consumed and provided by the xApp for control capabilities (e.g., Performance Management (PM) data that the xApp subscribes, the message type of control messages).

Additionally or alternatively, the xApp descriptor components include xApp configuration, xApp controls specification, and xApp metrics. The xApp configuration specification includes a data dictionary for the configuration data (e.g., metadata such as a yang definition or a list of configuration parameters and their semantics). Additionally, the xApp configuration may include an initial configuration of xApps. The xApp controls specification includes the types of data it consumes and provides that enable control capabilities (e.g., xApp URL, parameters, input/output type). The xApp metrics specification shall include a list of metrics (e.g., metric name, type, unit and semantics) provided by the xApp.

Figure 29:
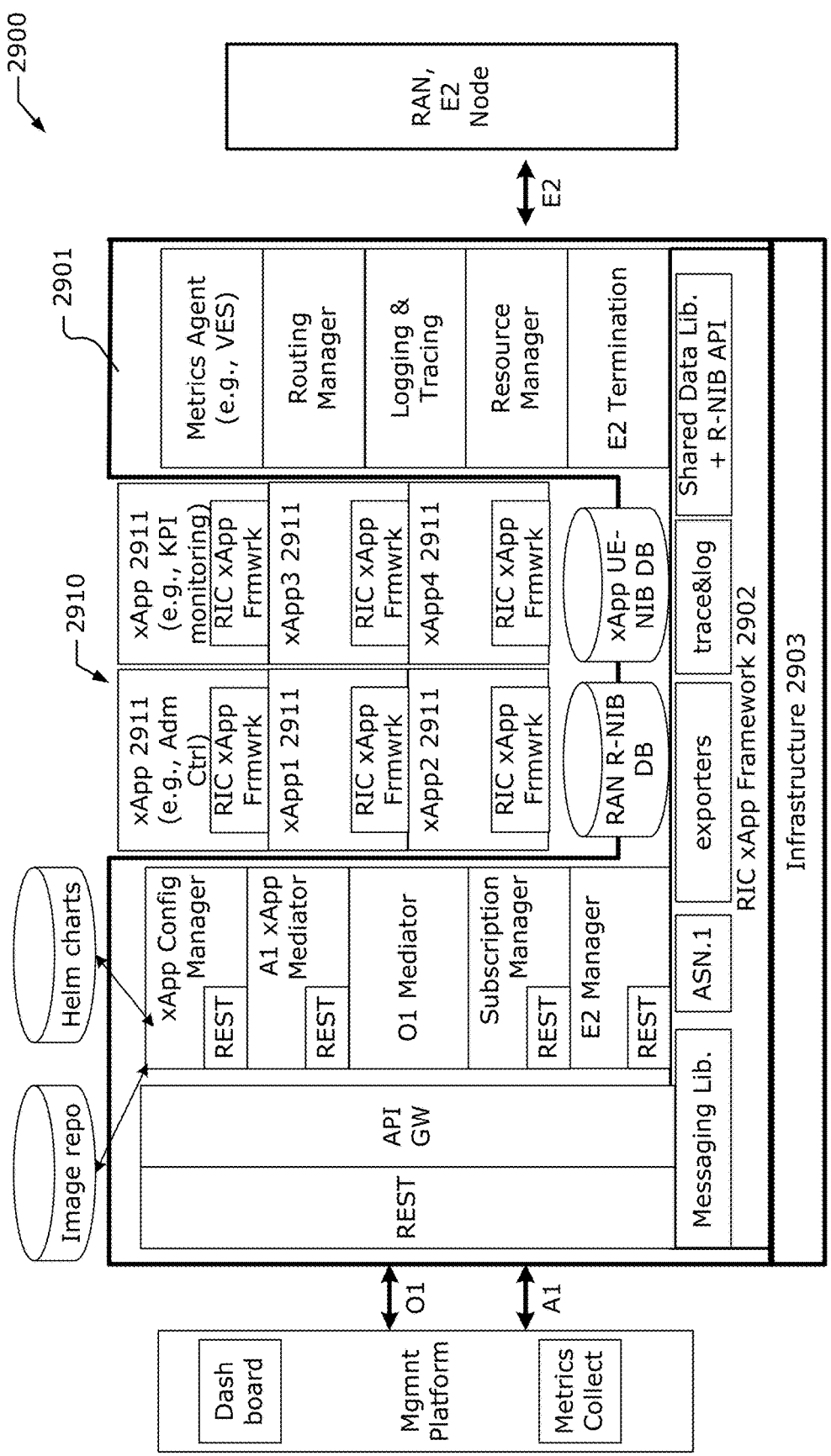
FIG. 29 depicts an O-RAN architectures/frameworks for adding 3rd party xApps.
Figure 30:
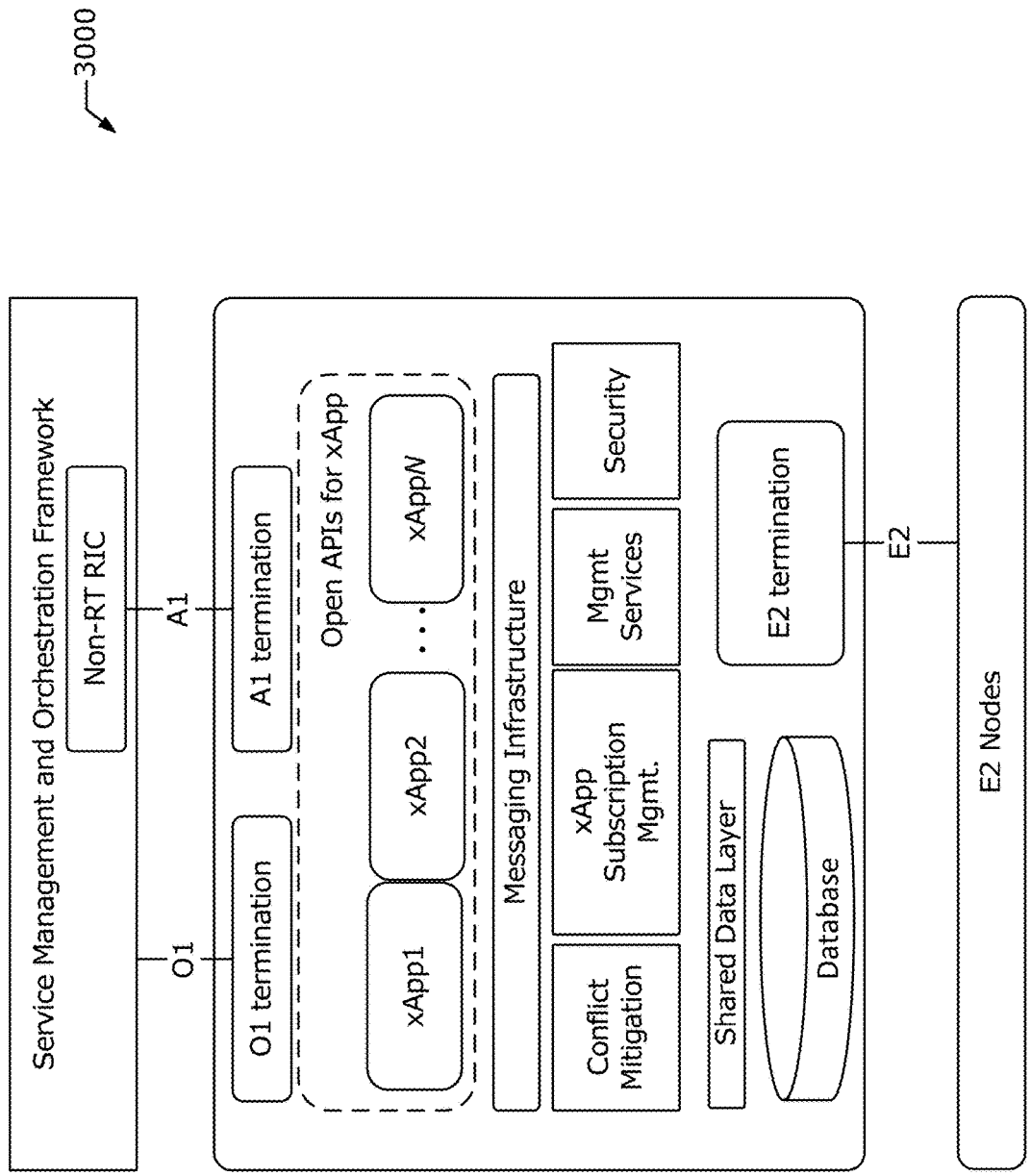
FIG. 30 depicts a Near-RT RIC Internal Architecture.

FIG. 29 depicts an O-RAN architecture/framework 2900 for adding 3rd party xApps, and FIG. 30 depicts a Near-RT RIC Internal Architecture 3000.

In FIG. 29, the O-RAN architecture/framework 2900 includes a RIC platform 2901 on top of infrastructure 2903. The RIC platform 2901 includes a RIC xApp framework 2902, a Radio-Network Information Base (R-NIB) database (DB), an xApp UE Network Information Base (UE-NIB) DB, a metrics agent (e.g., a VNF Event Stream (VES) agent, VES Prometheus Adapter (*VESPA*), etc.), a routing manager (e.g., Prometheus event monitoring and alerting system, etc.), a logger/tracer (e.g., OpenTracing, etc.), a resource manager, an E2 termination, an xApp configuration manager, an A1 xApp mediator, an O1 mediator, a subscription manager, a E2 manager, and API gateway (GW) (e.g., Kong, etc.), and a REST element. The xApp configuration manager communicates with an image repository and a Helm charts repository using, for example, REST APIs and/or the like.

The RIC xApp framework 2902 includes a messaging library (lib.), and ASN.1 module, one or more exporters (e.g., Prometheus exporters, etc.), a trace and log element, and a shared library with R-NIB APIs and/or the like. The RIC platform 2901 communicates with a management platform over the O1 interface and/or the A1 interface, and also communicates with a RAN and/or E2 nodes over the E2 interface. The management platform may include dashboards and/or metrics collectors. Furthermore, various xApps operate on top of the RIC xApp framework 2902, such as, for example an administration control xApp, a KPI monitor xApp, as well as other xApps. One or more of the xApps may implement aspects of the cybersecurity and/or interface testing embodiments discussed herein.

In the examples of FIGS. 29 and 30, the Near-RT RIC hosts the following functions: Database functionality, which allows reading and writing of RAN/UE information; xApp subscription management, which merges subscriptions from different xApps and provides unified data distribution to xApps; Conflict mitigation, which resolves potentially overlapping or conflicting requests from multiple xApps; Messaging infrastructure, which enables message interaction amongst Near-RT RIC internal functions; Security, which provides the security scheme for the xApps; and Management services including: fault management, configuration management, and performance management as a service producer to SMO; life-cycle management of xApps; and logging, tracing and metrics collection, which capture, monitor and collect the status of Near-RT RIC internals and can be transferred to external system for further evaluation; and Interface Termination including: E2 termination, which terminates the E2 interface from an E2 Node; A1 termination, which terminates the A1 interface from the non-RT RIC; and O1 termination, which terminates the O1 interface from SMO; and Functions hosted by xApps, which allow services to be executed at the Near-RT RIC and the outcomes sent to the E2 Nodes via E2 interface.

xApps may provide UE related information to be stored in the UE-NIB (UE-Network Information Base) database. UE-NIB maintains a list of UEs and associated data. The UE-NIB maintains tracking and correlation of the UE identities associated with the connected E2 nodes.

xApps may provide radio access network related information to be stored in the R-NIB (Radio-Network Information Base) database. The R-NIB stores the configurations and near real-time information relating to connected E2 Nodes and the mappings between them.

xApp subscription management manages subscriptions from the xApps to the E2 Nodes. xApp subscription management enforces authorization of policies controlling xApp access to messages. xApp subscription management enables merging of identical subscriptions from different xApps into a single subscription to the E2 Node.

3. Hardware Components, Configurations, and Arrangements

Figure 31:
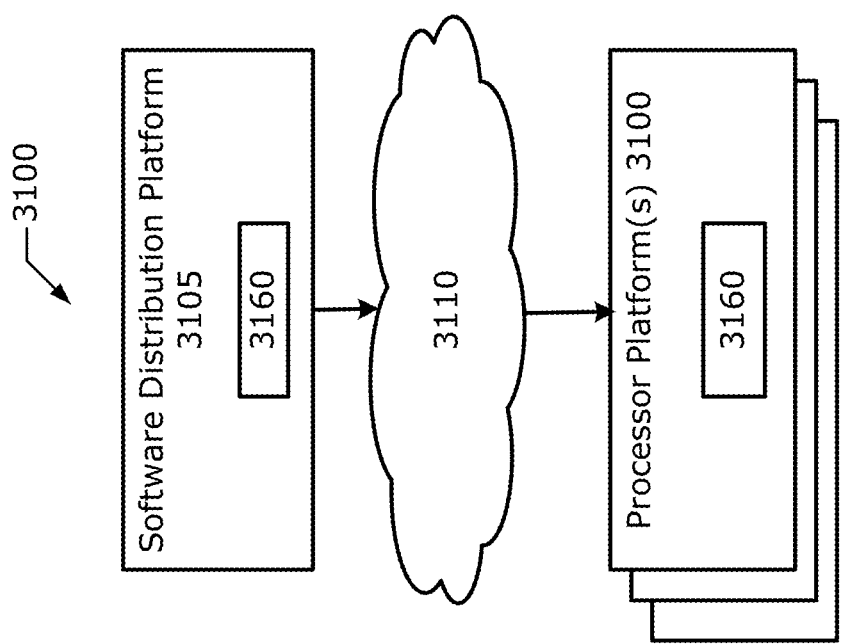
FIG. 31 illustrates an example software distribution platform.

FIG. 31 illustrates a software distribution platform 3105 to distribute software 3160, such as the example computer readable instructions 3360 of FIG. 33, to one or more devices, such as example processor platform(s) 3100 and/or example connected edge devices 3362 (see e.g., FIG. 33) and/or any of the other computing systems/devices discussed herein. The example software distribution platform 3105 may be implemented by any computer server, data facility, cloud service, etc., capable of storing and transmitting software to other computing devices (e.g., third parties, the example connected edge devices 3362 of FIG. 33). Example connected edge devices may be customers, clients, managing devices (e.g., servers), third parties (e.g., customers of an entity owning and/or operating the software distribution platform 3105). Example connected edge devices may operate in commercial and/or home automation environments. In some examples, a third party is a developer, a seller, and/or a licensor of software such as the example computer readable instructions 3360 of FIG. 33. The third parties may be consumers, users, retailers, OEMs, etc. that purchase and/or license the software for use and/or re-sale and/or sub-licensing. In some examples, distributed software causes display of one or more user interfaces (UIs) and/or graphical user interfaces (GUIs) to identify the one or more devices (e.g., connected edge devices) geographically and/or logically separated from each other (e.g., physically separated IoT devices chartered with the responsibility of water distribution control (e.g., pumps), electricity distribution control (e.g., relays), etc.).

In FIG. 31, the software distribution platform 3105 includes one or more servers and one or more storage devices. The storage devices store the computer readable instructions 3160, which may correspond to the example computer readable instructions 3360 of FIG. 33, as described above. The one or more servers of the example software distribution platform 3105 are in communication with a network 3110, which may correspond to any one or more of the Internet and/or any of the example networks as described herein. In some examples, the one or more servers are responsive to requests to transmit the software to a requesting party as part of a commercial transaction. Payment for the delivery, sale and/or license of the software may be handled by the one or more servers of the software distribution platform and/or via a third-party payment entity. The servers enable purchasers and/or licensors to download the computer readable instructions 3160 from the software distribution platform 3105. For example, the software 3160, which may correspond to the example computer readable instructions 3360 of FIG. 33, may be downloaded to the example processor platform(s) 3100, which is/are to execute the computer readable instructions 3160 to implement Radio apps.

In some examples, one or more servers of the software distribution platform 3105 are communicatively connected to one or more security domains and/or security devices through which requests and transmissions of the example computer readable instructions 3160 must pass. In some examples, one or more servers of the software distribution platform 3105 periodically offer, transmit, and/or force updates to the software (e.g., the example computer readable instructions 3360 of FIG. 33) to ensure improvements, patches, updates, etc. are distributed and applied to the software at the end user devices.

In FIG. 31, the computer readable instructions 3160 are stored on storage devices of the software distribution platform 3105 in a particular format. A format of computer readable instructions includes, but is not limited to a particular code language (e.g., Java, JavaScript, Python, C, C#, SQL, HTML, etc.), and/or a particular code state (e.g., uncompiled code (e.g., ASCII), interpreted code, linked code, executable code (e.g., a binary), etc.). In some examples, the computer readable instructions 3382 stored in the software distribution platform 3105 are in a first format when transmitted to the example processor platform(s) 3100. In some examples, the first format is an executable binary in which particular types of the processor platform(s) 3100 can execute. However, in some examples, the first format is uncompiled code that requires one or more preparation tasks to transform the first format to a second format to enable execution on the example processor platform(s) 3100. For instance, the receiving processor platform(s) 3100 may need to compile the computer readable instructions 3160 in the first format to generate executable code in a second format that is capable of being executed on the processor platform(s) 3100. In still other examples, the first format is interpreted code that, upon reaching the processor platform(s) 3100, is interpreted by an interpreter to facilitate execution of instructions.

FIGS. 32 and 33 depict further examples of edge computing systems and environments that may fulfil any of the compute nodes or devices discussed herein. Respective edge compute nodes may be embodied as a type of device, appliance, computer, or other "thing" capable of communicating with other edge, networking, or endpoint components. For example, an edge compute device may be embodied as a smartphone, a mobile compute device, a smart appliance, an in-vehicle compute system (e.g., a navigation system), or other device or system capable of performing the described functions.

In FIG. 32, an edge compute node 3200 includes a compute engine (also referred to herein as "compute circuitry") 3202, an input/output (I/O) subsystem 3208, data storage 3210, a communication circuitry subsystem 3212, and, optionally, one or more peripheral devices 3214. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component. Additionally or alternatively, the edge compute node 3200 (or portions thereof) may be contained in a housing, a chassis, a case, or a shell such as those discussed previously with respect to the appliance computing device of the edge cloud 1810 of FIG. 18.

The compute node 3200 may be embodied as any type of engine, device, or collection of devices capable of performing various compute functions. The compute node 3200 may correspond to the RRE 201, RadioApp provider system 240, and/or RadioApp store 260 of FIG. 2; UEs 1711, 1721a, NANs 1731-1733, edge compute node(s) 1736, CN 1742 (or compute node(s) therein), and/or cloud 1744 (or compute node(s) therein) of FIG. 17; edge cloud 1810 (or systems/devices therein), central office 1820 (or systems/devices therein), NAN 1840, processing hub 1850, and/or end point devices 1860 of FIG. 18; use case devices 1905, network equipment (nodes) 1915, equipment 1925 of FIG. 19; client endpoints 2010, on-premise network system 2032, access point 2034, aggregation points 2042, 2044, edge aggregation nodes 2040, and/or data center 2060 (or systems/devices therein) of FIG. 20; devices 2110, edge nodes 2122, 2124 and/or cloud/data center 2140 of FIG. 21; container managers 2211, 2221, container orchestrator 2231, and/or compute nodes 2215, 2223 of FIG. 22; client compute nodes 2310, edge gateway devices 2320, edge resource nodes 2340, NAN 2342, core data center 2350 (or systems/devices therein) of FIG. 23; UE 2420, MEC host 2402 (or systems/devices therein), OSS 2412 (or systems/devices therein) of FIG. 24; ME platform 2510 of FIG. 25; SMO 2602, O-RAN NFs 2604, O-Cloud 2606, NG-Core 2608, external system 2610, Non-RT RIC 2612, Near-RT RIC 2614, O-RU 2616 of FIG. 26; UE 2701, SMO 2702, O-cloud 2706, O-e/gNB 2710, Non-RT RIC 2712, Near-RT RIC 2714, O-DU 2715, O-RU 2716, O-CU-CP 2721, O-CU-UP 2722 and/or FIG. 27; E2 nodes of FIG. 28; software distribution platform 3105 and/or processor platform(s) 3100 of FIG. 31; and/or any other component, device, and/or system discussed herein.

In some examples, the compute node 3200 may be embodied as a single device such as an integrated circuit, an embedded system, an FPGA, a System-on-Chip (SoC), or other integrated system or device. The compute node 3200 includes or is embodied as a processor 3204 and a memory 3206. The processor 3204 may be embodied as any type of processor capable of performing the functions described herein (e.g., executing an application). For example, the processor 3204 may be embodied as a multi-core processor(s), a microcontroller, or other processor or processing/controlling circuit.

In some examples, the processor 3204 may be embodied as, include, or be coupled to an FPGA, an application specific integrated circuit (ASIC), reconfigurable hardware or hardware circuitry, or other specialized hardware to facilitate performance of the functions described herein. Also in some examples, the processor 3204 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC, or enhanced SmartNIC), acceleration circuitry, storage devices, storage disks, or AI hardware (e.g., GPUs or programmed FPGAs). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that a xPU, a SOC, a CPU, and other variations of the processor 3204 may work in coordination with each other to execute many types of operations and instructions within and on behalf of the compute node 3200.

The memory 3206 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In one example, the memory device is a block addressable memory device, such as those based on NAND or NOR technologies. A memory device may also include a three dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the main memory 3206 may be integrated into the processor 3204. The main memory 3206 may store various software and data used during operation such as one or more applications, data operated on by the application(s), libraries, and drivers.

The compute circuitry 3202 is communicatively coupled to other components of the compute node 3200 via the I/O subsystem 3208, which may be embodied as circuitry and/or components to facilitate input/output operations with the compute circuitry 3202 (e.g., with the processor 3204 and/or the main memory 3206) and other components of the compute circuitry 3202. For example, the I/O subsystem 3208 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 3208 may form a portion of an SoC and be incorporated, along with one or more of the processor 3204, the main memory 3206, and other components of the compute circuitry 3202, into the compute circuitry 3202.

The one or more illustrative data storage devices/disks 3210 may be embodied as one or more of any type(s) of physical device(s) configured for short-term or long-term storage of data such as, for example, memory devices, memory, circuitry, memory cards, flash memory, hard disk drives, solid-state drives (SSDs), and/or other data storage devices/disks. Individual data storage devices/disks 3210 may include a system partition that stores data and firmware code for the data storage device/disk 3210. Individual data storage devices/disks 3210 may also include one or more operating system partitions that store data files and executables for operating systems depending on, for example, the type of compute node 3200.

The communication circuitry 3212 may be embodied as any communication circuit, device, or collection thereof, capable of enabling communications over a network between the compute circuitry 3202 and another compute device (e.g., an edge gateway node or the like). The communication circuitry 3212 may be configured to use any one or more communication technology (e.g., wired or wireless communications) and associated protocols (e.g., a cellular networking protocol such a 3GPP 4G or 5G standard, a wireless local area network protocol such as IEEE 802.11/WiFi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The communication circuitry 3212 includes a network interface controller (NIC) 3220, which may also be referred to as a host fabric interface (HFI). The NIC 3220 may be embodied as one or more add-in-boards, daughter cards, network interface cards, controller chips, chipsets, or other devices that may be used by the compute node 3200 to connect with another compute device. In some examples, the NIC 3220 may be embodied as part of a system-on-a-chip (SoC) that includes one or more processors, or included on a multichip package that also contains one or more processors. In some examples, the NIC 3220 may include a local processor (not shown) and/or a local memory (not shown) that are both local to the NIC 3220. In such examples, the local processor of the NIC 3220 may be capable of performing one or more of the functions of the compute circuitry 3202 described herein. Additionally, or alternatively, in such examples, the local memory of the NIC 3220 may be integrated into one or more components of the client compute node at the board level, socket level, chip level, and/or other levels. Additionally or alternatively, the communication circuitry 3212 may include one or more transceivers (TRx) 3221, each of which include various hardware devices/components such as baseband processor(s), switches, filters, amplifiers, antenna elements, and the like to facilitate communications over an air interface.

Additionally, in some examples, a respective compute node 3200 may include one or more peripheral devices 3214. Such peripheral devices 3214 may include any type of peripheral device found in a compute device or server such as audio input devices, a display, other input/output devices, interface devices, and/or other peripheral devices, depending on the particular type of the compute node 3200. In further examples, the compute node 3200 may be embodied by a respective edge compute node in an edge computing system (e.g., client compute node, edge gateway node, edge aggregation node, V-ITS-Ss discussed previous, etc.) or like forms of appliances, computers, subsystems, circuitry, or other components.

FIG. 33 illustrates an example of components that may be present in an edge computing node 3350 for implementing the techniques (e.g., operations, processes, methods, and methodologies) described herein. The edge computing node 3350 may correspond to the the RRE 201, RadioApp provider system 240, and/or RadioApp store 260 of FIG. 2; UEs 1711, 1721a, NANs 1731-1733, edge compute node(s) 1736, CN 1742 (or compute node(s) therein), and/or cloud 1744 (or compute node(s) therein) of FIG. 17; edge cloud 1810 (or systems/devices therein), central office 1820 (or systems/devices therein), NAN 1840, processing hub 1850, and/or end point devices 1860 of FIG. 18; use case devices 1905, network equipment (nodes) 1915, equipment 1925 of FIG. 19; client endpoints 2010, on-premise network system 2032, access point 2034, aggregation points 2042, 2044, edge aggregation nodes 2040, and/or data center 2060 (or systems/devices therein) of FIG. 20; devices 2110, edge nodes 2122, 2124 and/or cloud/data center 2140 of FIG. 21; container managers 2211, 2221, container orchestrator 2231, and/or compute nodes 2215, 2223 of FIG. 22; client compute nodes 2310, edge gateway devices 2320, edge resource nodes 2340, NAN 2342, core data center 2350 (or systems/devices therein) of FIG. 23; UE 2420, MEC host 2402 (or systems/devices therein), OSS 2412 (or systems/devices therein) of FIG. 24; ME platform 2510 of FIG. 25; SMO 2602, O-RAN NFs 2604, O-Cloud 2606, NG-Core 2608, external system 2610, Non-RT RIC 2612, Near-RT RIC 2614, O-RU 2616 of FIG. 26; UE 2701, SMO 2702, O-cloud 2706, O-e/gNB 2710, Non-RT RIC 2712, Near-RT RIC 2714, O-DU 2715, O-RU 2716, O-CU-CP 2721, O-CU-UP 2722 and/or FIG. 27; E2 nodes of FIG. 28; software distribution platform 3105 and/or processor platform(s) 3100 of FIG. 31; compute node 3200 of FIG. 32; and/or any other component, device, and/or system discussed herein.

The edge computing node 3350 provides a closer view of the respective components of node 3200 when implemented as or as part of a computing device (e.g., as a mobile device, a base station, server, gateway, appliance, edge compute node, etc.). The edge computing node 3350 may include any combinations of the hardware or logical components referenced herein, and it may include or couple with any device usable with an edge communication network or a combination of such networks. The components may be implemented as ICs, portions thereof, discrete electronic devices, or other modules, instruction sets, programmable logic or algorithms, hardware, hardware accelerators, software, firmware, or a combination thereof adapted in the edge computing node 3350, or as components otherwise incorporated within a chassis of a larger system.

The edge computing node 3350 includes processing circuitry in the form of one or more processors 3352. The processor circuitry 3352 includes circuitry such as, but not limited to one or more processor cores and one or more of cache memory, low drop-out voltage regulators (LDOs), interrupt controllers, serial interfaces such as SPI, I2C or universal programmable serial interface circuit, real time clock (RTC), timer-counters including interval and watchdog timers, general purpose I/O, memory card controllers such as secure digital/multi-media card (SD/MMC) or similar, interfaces, mobile industry processor interface (MIPI) interfaces and Joint Test Access Group (JTAG) test access ports. In some implementations, the processor circuitry 3352 may include one or more hardware accelerators (e.g., same or similar to acceleration circuitry 3364), which may be microprocessors, programmable processing devices (e.g., FPGA, ASIC, etc.), or the like. The one or more accelerators may include, for example, computer vision and/or deep learning accelerators. In some implementations, the processor circuitry 3352 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein The processor circuitry 3352 may be, for example, one or more processor cores (CPUs), application processors, GPUs, RISC processors, Acorn RISC Machine (ARM) processors, CISC processors, one or more DSPs, one or more FPGAs, one or more PLDs, one or more ASICs, one or more baseband processors, one or more radio-frequency integrated circuits (RFIC), one or more microprocessors or controllers, a multi-core processor, a multithreaded processor, an ultra-low voltage processor, an embedded processor, an xPU/DPU/IPU/NPU, special purpose processing unit, specialized processing unit, or any other known processing elements, or any suitable combination thereof. The processors (or cores) 3352 may be coupled with or may include memory/storage and may be configured to execute instructions stored in the memory/storage to enable various applications or operating systems to run on the platform 3350. The processors (or cores) 3352 is configured to operate application software to provide a specific service to a user of the platform 3350. Additionally or alternatively, the processor(s) 3352 may be a special-purpose processor(s)/ controller(s) configured (or configurable) to operate according to the elements, features, and implementations discussed herein.

As examples, the processor(s) 3352 may include an Intel® Architecture Core™ based processor such as an i3, an i5, an i7, an i9 based processor; an Intel® microcontroller-based processor such as a Quark™, an Atom™, or other MCU-based processor; Pentium® processor(s), Xeon® processor(s), or another such processor available from Intel® Corporation, Santa Clara, California. However, any number other processors may be used, such as one or more of Advanced Micro Devices (AMD) Zen® Architecture such as Ryzen® or EPYC® processor(s), Accelerated Processing Units (APUs), MxGPUs, Epyc® processor(s), or the like; A5-A12 and/or S1-S4 processor(s) from Apple® Inc., Snapdragon™ or Centrig™ processor(s) from Qualcomm R Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; the ThunderX2® provided by Cavium™, Inc.; or the like. In some implementations, the processor(s) 3352 may be a part of a system on a chip (SoC), System-in-Package (SiP), a multi-chip package (MCP), and/or the like, in which the processor(s) 3352 and other components are formed into a single integrated circuit, or a single package, such as the Edison™ or Galileo™ SoC boards from Intel® Corporation. Other examples of the processor(s) 3352 are mentioned elsewhere in the present disclosure.

The processor(s) 3352 may communicate with system memory 3354 over an interconnect (IX) 3356. Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESB209 for Low Power DDR (LPDDR), JESB209-2 for LPDDR2, JESB209-3 for LPDDR3, and JESB209-4 for LPDDR4. Other types of RAM, such as dynamic RAM (DRAM), synchronous DRAM (SDRAM), and/or the like may also be included. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 3358 may also couple to the processor 3352 via the IX 3356.

In an example, the storage 3358 may be implemented via a solid-state disk drive (SSDD) and/or high-speed electrically erasable memory (commonly referred to as "flash memory"). Other devices that may be used for the storage 3358 include flash memory cards, such as SD cards, microSD cards, eXtreme Digital (XD) picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, phase change RAM (PRAM), resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a Domain Wall (DW) and Spin Orbit Transfer (SOT) based device, a thyristor based memory device, or a combination of any of the above, or other memory. The memory circuitry 3354 and/or storage circuitry 3358 may also incorporate three-dimensional (3D) cross-point (XPOINT) memories from Intel® and Micron®.

In low power implementations, the storage 3358 may be on-die memory or registers associated with the processor 3352. However, in some examples, the storage 3358 may be implemented using a micro hard disk drive (HDD). Further, any number of new technologies may be used for the storage 3358 in addition to, or instead of, the technologies described, such resistance change memories, phase change memories, holographic memories, or chemical memories, among others.

The components of edge computing device 3350 may communicate over an interconnect (IX) 3356. The IX 3356 may include any number of technologies, including ISA, extended ISA, I2C, SPI, point-to-point interfaces, power management bus (PMBus), PCI, PCIe, PCIx, Intel® UPI, Intel® Accelerator Link, Intel® CXL, CAPI, OpenCAPI, Intel® QPI, UPI, Intel® OPA IX, RapidIO™ system IXs, CCIX, Gen-Z Consortium IXs, a HyperTransport interconnect, NVLink provided by NVIDIA®, a Time-Trigger Protocol (TTP) system, a FlexRay system, PROFIBUS, and/or any number of other IX technologies. The IX 3356 may be a proprietary bus, for example, used in a SoC based system.

The IX 3356 couples the processor 3352 to communication circuitry 3366 for communications with other devices, such as a remote server (not shown) and/or the connected edge devices 3362. The communication circuitry 3366 is a hardware element, or collection of hardware elements, used to communicate over one or more networks (e.g., cloud 3363) and/or with other devices (e.g., edge devices 3362). The collection of hardware elements include hardware devices such as baseband circuitry 336x, switches, filters, amplifiers, antenna elements, and the like to facilitate OTA communications).

The transceiver 3366 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 3362. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The communication circuitry 3366 (or multiple transceivers 3366) may communicate using multiple standards or radios for communications at a different range. For example, the communication circuitry 3366 may include short-range RAT circuitry 336*y* to communicate with relatively close devices (e.g., within about 10 meters) based on BLE, or another low power radio, to save power. More distant connected edge devices 3362 (e.g., within about 50 meters) may be reached over ZigBee® circuitry 336*y* and/or other intermediate power radios 336*y*. Both communications techniques may take place over a single radio 336*y* at different power levels or may take place over separate transceivers 336*y*, for example, a local transceiver 336*y* using BLE and a separate mesh transceiver 336*y* using ZigBee®.

A wireless network transceiver 336*z* may be included to communicate with devices or services in the edge cloud 3363 via local or wide area network protocols. The wireless network transceiver 336*z* may be an LPWA transceiver that follows the IEEE 802.15.4, or IEEE 802.15.4g standards, among others. The edge computing node 3350 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 336*z*, as described herein. For example, the transceiver 336*z* may include a cellular transceiver that uses spread spectrum (SPA/SAS) communications for implementing high-speed communications. Further, any number of other protocols may be used, such as Wi-Fi® networks for medium speed communications and provision of network communications. The transceiver 336*z* may include radios that are compatible with any number of 3GPP specifications, such as LTE and 5G/NR communication systems, discussed in further detail at the end of the present disclosure.

A network interface controller (NIC) 3368 may be included to provide a wired communication to nodes of the edge cloud 3363 or to other devices, such as the connected edge devices 3362 (e.g., operating in a mesh). The wired communication may provide an Ethernet connection or may be based on other types of networks, such as Controller Area Network (CAN), Local Interconnect Network (LIN), DeviceNet, ControlNet, Data Highway+, or PROFINET, among many others. An additional NIC 3368 may be included to enable connecting to a second network, for example, a first NIC 3368 providing communications to the cloud over Ethernet, and a second NIC 3368 providing communications to other devices over another type of network.

Given the variety of types of applicable communications from the device to another component or network, applicable communications circuitry used by the device may include or be embodied by any one or more of components 3364, 3366, 3368, or 3370. Accordingly, in various examples, applicable means for communicating (e.g., receiving, transmitting, etc.) may be embodied by such communications circuitry.

The edge computing node 3350 may include or be coupled to acceleration circuitry 3364, which may be embodied by one or more AI accelerators, a neural compute stick, neuromorphic hardware, an FPGA, an arrangement of GPUs, one or more SoCs (including programmable SoCs), one or more CPUs, one or more digital signal processors, dedicated ASICs (including programmable ASICs), PLDs such as CPLDs or HCPLDs, and/or other forms of specialized processors or circuitry designed to accomplish one or more specialized tasks. These tasks may include AI processing (including machine learning, training, inferencing, and classification operations), visual data processing, network data processing, object detection, rule analysis, or the like. In FPGA-based implementations, the acceleration circuitry 3364 may comprise logic blocks or logic fabric and other interconnected resources that may be programmed (configured) to perform various functions, such as the procedures, methods, functions, etc. discussed herein. In such implementations, the acceleration circuitry 3364 may also include memory cells (e.g., EPROM, EEPROM, flash memory, static memory (e.g., SRAM, anti-fuses, etc.) used to store logic blocks, logic fabric, data, etc. in LUTs and the like.

The IX 3356 also couples the processor 3352 to a sensor hub or external interface 3370 that is used to connect additional devices or subsystems. The additional/external devices may include sensors 3372, actuators 3374, and positioning circuitry 3375.

The sensor circuitry 3372 includes devices, modules, or subsystems whose purpose is to detect events or changes in its environment and send the information (sensor data) about the detected events to some other a device, module, subsystem, etc. Examples of such sensors 3372 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras); light detection and ranging (LiDAR) sensors; proximity sensors (e.g., infrared radiation detector and the like); depth sensors, ambient light sensors; optical light sensors; ultrasonic transceivers; microphones; and the like.

The actuators 3374, allow platform 3350 to change its state, position, and/or orientation, or move or control a mechanism or system. The actuators 3374 comprise electrical and/or mechanical devices for moving or controlling a mechanism or system, and converts energy (e.g., electric current or moving air and/or liquid) into some kind of motion. The actuators 3374 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 3374 may include one or more electromechanical devices such as pneumatic actuators, hydraulic actuators, electromechanical switches including electromechanical relays (EMRs), motors (e.g., DC motors, stepper motors, servomechanisms, etc.), power switches, valve actuators, wheels, thrusters, propellers, claws, clamps, hooks, audible sound generators, visual warning devices, and/or other like electromechanical components. The platform 3350 may be configured to operate one or more actuators 3374 based on one or more captured events and/or instructions or control signals received from a service provider and/or various client systems The positioning circuitry 3375 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radiopositioning Integrated by Satellite (DORIS), etc.), or the like. The positioning circuitry 3375 comprises various hardware elements (e.g., including hardware devices such as switches, filters, amplifiers, antenna elements, and the like to facilitate OTA communications) to communicate with components of a positioning network, such as navigation satellite constellation nodes. Additionally or alternatively, the positioning circuitry 3375 may include a Micro-Technology for Positioning, Navigation, and Timing (Micro-PNT) IC that uses a master timing clock to perform position tracking/estimation without GNSS assistance. The positioning circuitry 3375 may also be part of, or interact with, the communication circuitry 3366 to communicate with the nodes and components of the positioning network. The positioning circuitry 3375 may also provide position data and/or time data to the application circuitry, which may use the data to synchronize operations with various infrastructure (e.g., radio base stations), for turn-by-turn navigation, or the like. When a GNSS signal is not available or when GNSS position accuracy is not sufficient for a particular application or service, a positioning augmentation technology can be used to provide augmented positioning information and data to the application or service. Such a positioning augmentation technology may include, for example, satellite based positioning augmentation (e.g., EGNOS) and/or ground based positioning augmentation (e.g., DGPS). In some implementations, the positioning circuitry 3375 is, or includes an INS, which is a system or device that uses sensor circuitry 3372 (e.g., motion sensors such as accelerometers, rotation sensors such as gyroscopes, and altimimeters, magnetic sensors, and/or the like to continuously calculate (e.g., using dead by dead reckoning, triangulation, or the like) a position, orientation, and/or velocity (including direction and speed of movement) of the platform 3350 without the need for external references.

In some optional examples, various input/output (I/O) devices may be present within or connected to, the edge computing node 3350, which are referred to as input circuitry 3386 and output circuitry 3384 in FIG. 33. The input circuitry 3386 and output circuitry 3384 include one or more user interfaces designed to enable user interaction with the platform 3350 and/or peripheral component interfaces designed to enable peripheral component interaction with the platform 3350. Input circuitry 3386 may include any physical or virtual means for accepting an input including, inter alia, one or more physical or virtual buttons (e.g., a reset button), a physical keyboard, keypad, mouse, touchpad, touchscreen, microphones, scanner, headset, and/or the like. The output circuitry 3384 may be included to show information or otherwise convey information, such as sensor readings, actuator position(s), or other like information. Data and/or graphics may be displayed on one or more user interface components of the output circuitry 3384. Output circuitry 3384 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 3350. The output circuitry 3384 may also include speakers or other audio emitting devices, printer(s), and/or the like. Additionally or alternatively, the sensor circuitry 3372 may be used as the input circuitry 3384 (e.g., an image capture device, motion capture device, or the like) and one or more actuators 3374 may be used as the output device circuitry 3384 (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 3376 may power the edge computing node 3350, although, in examples in which the edge computing node 3350 is mounted in a fixed location, it may have a power supply coupled to an electrical grid, or the battery may be used as a backup or for temporary capabilities. The battery 3376 may be a lithium ion battery, or a metal-air battery (e.g., a zinc-air battery, an aluminum-air battery, a lithium-air battery, etc.), one or more capacitors, and the like.

A battery monitor/charger 3378 may be included in the edge computing node 3350 to track the state of charge (SoCh) of the battery 3376, if included. The battery monitor/charger 3378 may be used to monitor other parameters of the battery 3376 to provide failure predictions, such as the state of health (SoH) and the state of function (SoF) of the battery 3376. The battery monitor/charger 3378 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX The battery monitor/charger 3378 may communicate the information on the battery 3376 to the processor 3352 over the IX 3356. The battery monitor/charger 3378 may also include an analog-to-digital (ADC) converter that enables the processor 3352 to directly monitor the voltage of the battery 3376 or the current flow from the battery 3376. The battery parameters may be used to determine actions that the edge computing node 3350 may perform, such as transmission frequency, mesh network operation, sensing frequency, and the like. In some implementations, the battery 3376 and/or battery monitor/charger 3378 can be divided into different power domains depending on use case/implementation, where different batteries 3376 are used for different power domains and each power domain may power different components/devices of the edge computing node 3350.

A power block 3380, or other power supply coupled to a grid, may be coupled with the battery monitor/charger 3378 to charge the battery 3376. In some examples, the power block 3380 may be replaced with a wireless power receiver to obtain the power wirelessly, for example, through a loop antenna in the edge computing node 3350. A wireless battery charging circuit, such as an LTC4020 chip from Linear Technologies of Milpitas, California, among others, may be included in the battery monitor/charger 3378. The specific charging circuits may be selected based on the size of the battery 3376, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 3358 may include instructions 3382 in the form of software, firmware, or hardware commands to implement the techniques described herein. Although such instructions 3382 are shown as code blocks included in the memory 3354 and the storage 3358, it may be understood that any of the code blocks may be replaced with hardwired circuits, for example, built into an application specific integrated circuit (ASIC).

In an example, the instructions 3382 provided via the memory 3354, the storage 3358, or the processor 3352 may be embodied as a non-transitory, machine-readable medium 3360 including code to direct the processor 3352 to perform electronic operations in the edge computing node 3350. The processor 3352 may access the non-transitory, machine-readable medium 3360 over the IX 3356. For instance, the non-transitory, machine-readable medium 3360 may be embodied by devices described for the storage 3358 or may include specific storage units such as storage devices and/or storage disks that include optical disks (e.g., digital versatile disk (DVD), compact disk (CD), CD-ROM, Blu-ray disk), flash drives, floppy disks, hard drives (e.g., SSDs), or any number of other hardware devices in which information is stored for any duration (e.g., for extended time periods, permanently, for brief instances, for temporarily buffering, and/or caching). The non-transitory, machine-readable medium 3360 may include instructions to direct the processor 3352 to perform a specific sequence or flow of actions, for example, as described with respect to the flowchart(s) and block diagram(s) of operations and functionality depicted above. the terms "machine-readable medium" and "computer-readable medium" are interchangeable. the term "non-transitory computer-readable medium" is expressly defined to include any type of computer readable storage device and/or storage disk and to exclude propagating signals and to exclude transmission media.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

The illustrations of FIGS. 32 and 33 are intended to depict a high-level view of components of a varying device, subsystem, or arrangement of an edge computing node. However, it will be understood that some of the components shown may be omitted, additional components may be present, and a different arrangement of the components shown may occur in other implementations. Further, these arrangements are usable in a variety of use cases and environments, including those discussed below (e.g., a mobile UE in industrial compute for smart city or smart factory, among many other examples).

The respective compute platforms of FIGS. 32 and 33 may support multiple edge instances (e.g., edge clusters) by use of tenant containers running on a single compute platform. Likewise, multiple edge nodes may exist as subnodes running on tenants within the same compute platform. Accordingly, based on available resource partitioning, a single system or compute platform may be partitioned or divided into supporting multiple tenants and edge node instances, each of which may support multiple services and functions—even while being potentially operated or controlled in multiple compute platform instances by multiple owners. These various types of partitions may support complex multi-tenancy and many combinations of multi-stakeholders through the use of an LSM or other implementation of an isolation/security policy. References to the use of an LSM and security features which enhance or implement such security features are thus noted in the following sections. Likewise, services and functions operating on these various types of multi-entity partitions may be load-balanced, migrated, and orchestrated to accomplish necessary service objectives and operations.

FIGS. 32 and 33 depict examples of edge computing systems and environments that may fulfill any of the compute nodes or devices discussed herein. Respective edge compute nodes may be embodied as a type of device, appliance, computer, or other "thing" capable of communicating with other edge, networking, or endpoint components. For example, an edge compute device may be embodied as a smartphone, a mobile compute device, a smart appliance, an in-vehicle compute system (e.g., a navigation system), or other device or system capable of performing the described functions.

4. Example Implementations

Additional examples of the presently described method, system, and device embodiments include the following, non-limiting implementations. Each of the following non-limiting examples may stand on its own or may be combined in any permutation or combination with any one or more of the other examples provided below or throughout the present disclosure.

Example A01 includes a method of checking whether an application (app) is relevant to a cybersecurity framework (CSF), the method comprising: determining whether the app applies to a first CSF; and determining whether the app applies to a second CSF if the app is determined to not apply to the first CSF.

Example A02 includes the method of example A01 and/or some other example(s) herein, wherein when the app applies to the first CSF, the method further comprises: connecting with a certification authority to verify whether a system including the app has a certification.

Example A03 includes the method of example A02 and/or some other example(s) herein, further comprising: rejecting usage of the app when the system including the app does not have a certification or does not have an available certification.

Example A04 includes the method of examples A01-A03 and/or some other example(s) herein, wherein when the app applies to the second CSF, the method further comprises: determining a cybersecurity level associated with the app based on a certification of the app according to the second CSF.

Example A05 includes the method of example A04 and/or some other example(s) herein, further comprising: accepting and installing the app when the cybersecurity level associated with the app matches a target cybersecurity level.

Example A06 includes the method of example A05 and/or some other example(s) herein, further comprising: rejecting the app when the cybersecurity level associated with the app does not match the target cybersecurity level.

Example A07 includes the method of examples A05-A06 and/or some other example(s) herein, wherein the cybersecurity level associated with the app is one of a basic level, a substantial level, and a high level; and the target cybersecurity level is one of the basic level, the substantial level, and the high level.

Example A08 includes the method of examples A01-A07 and/or some other example(s) herein, wherein when the app does not apply to the first CSF or the second CSF, the method further comprises: accepting and installing the app.

Example A09 includes the method of examples A01-A07 and/or some other example(s) herein, wherein when the app does not apply to the first CSF or the second CSF, the method further comprises: not accepting or installing the app; or deleting the app.

Example A10 includes the method of examples A01-A09 and/or some other example(s) herein, wherein the app includes a tag that indicates the applicability to the first CSF or the second CSF.

Example A11 includes the method of example A10 and/or some other example(s) herein, wherein the app is an xApp in an Open RAN (O-RAN) system architecture, and the tag is included in (or indicated by) the xApp descriptor.

Example A12 includes the method of examples A01-A11 and/or some other example(s) herein, wherein the first CSF is the European Union (ER) Radio Equipment Directive (RED) Article 3(3)(f) and the second CSF is the National Institute of Standards and Technology (NIST) Framework for Improving Critical Infrastructure Cybersecurity.

Example B01 includes a method for testing an internal interface of a reconfigurable radio equipment (RRE), the method comprising: loading or provisioning a Reference Radio Application Package (RRAP) to the RRE; and operating, by the RRE, the RRAP to create an output depending on reception of service primitives calls as defined the internal interface.

Example B02 includes the method of example B01 and/or some other example(s) herein, wherein the RRAP to cause the RRE to become or transition to a Platform Under Test (PUT).

Example B03 includes the method of examples B01-B02 and/or some other example(s) herein, wherein the RRAP comprises a first RRAP (RRAP1), the RRAP1 to cause the service primitives calls to a Radio Control Framework (RCF) of the RRE to be forwarded to the RRAP when an RCF test mode is activated.

Example B04 includes the method of example B03 and/or some other example(s) herein, wherein the RRAP further comprises a second RRAP (RRAP2), the RRAP2 to cause the RRE to generate the output.

Example B05 includes the method of example B04 and/or some other example(s) herein, wherein, when a service primitive is obtained by the RRAP1, the method comprises: operating, by the RRE, the RRAP1 to determine whether the service primitive call is performed correctly and a corresponding action is correctly executed for the RRAP2; generating the output when the service primitive call is performed correctly and the corresponding action is correctly executed for the RRAP2; and feeding the output to a radiofrequency (RF) front-end for measurement.

Example B06 includes the method of example B04 and/or some other example(s) herein, wherein, when a service primitive is obtained by the RRAP1, the method comprises: operating, by the RRE, the RRAP1 to issue an acknowledgement (ACK) to a Communication Services Layer (CSL) of the RRE to indicate that the interface has been used correctly, or issue a negative ACK (NACK) to the CSL to indicate that incorrectly the interface has not been used correctly.

Example B07 includes the method of examples B05-B06 and/or some other example(s) herein, wherein determining whether the service primitive call is performed correctly comprises: determining whether input parameters and call procedure are correct.

Example B08 includes the method of examples B05-B07 and/or some other example(s) herein, wherein determining whether the corresponding action is correctly executed for the RRAP2 comprises: determining installation and/or uninstallation.

Example B09 includes the method of examples B05-B08 and/or some other example(s) herein, wherein the output is an output signal, and a unique output signal is generated for each of the service primitives defined for the internal interface.

Example B10 includes the method of example B09 and/or some other example(s) herein, wherein the output signal is maintained either for a predefined time or until a next service primitive call is received.

Example B11 includes the method of example B10 and/or some other example(s) herein, wherein a periodicity of the output signal is different for each of the service primitives.

Example B12 includes the method of example B11 and/or some other example(s) herein, wherein a relationship between a periodicity of the output signal and a corresponding service primitive is pre-defined.

Example B13 includes the method of example B12 and/or some other example(s) herein, wherein a smallest periodicity corresponds to a first service primitive, a next longer periodicity corresponds to a second service primitive, and so forth, and a longest periodicity corresponds to a last service primitive.

Example B14 includes the method of examples B09-B13 and/or some other example(s) herein, wherein the output signal is a first output signal to be output when a correct usage for a particular service primitive is detected, and the method comprises: generating a second output signal when an incorrect usage for the particular service primitive is detected, wherein the first output signal is different than a second output signal.

Example B15 includes the method of example B14 and/or some other example(s) herein, wherein a unique second output signal is generated for each of the service primitives defined for the internal interface.

Example B16 includes the method of example B15 and/or some other example(s) herein, wherein the second output signal is maintained either for a predefined time or until a next service primitive call is received.

Example B17 includes the method of example B16 and/or some other example(s) herein, wherein a periodicity of the second output signal is different for each of the service primitives.

Example B18 includes the method of example B17 and/or some other example(s) herein, wherein a relationship between a periodicity of the second output signal and a corresponding service primitive is pre-defined.

Example B19 includes the method of example B18 and/or some other example(s) herein, wherein a smallest periodicity of the second output signal corresponds to a first service primitive, a next longer periodicity of the second output signal corresponds to a second service primitive, and so forth, and a longest periodicity of the second output signal corresponds to a last service primitive.

Example B20 includes the method of examples B14-B20 and/or some other example(s) herein, wherein the first output signal is a rectangular clock signal and the second output signal is a triangular clock signal.

Example B21 includes the method of examples B14-B20 and/or some other example(s) herein, wherein the second output signal is a rectangular clock signal and the first output signal is a triangular clock signal.

Example B22 includes the method of examples B01-B21 and/or some other example(s) herein, wherein the service primitives include IAdministrativeServices, and the IAdministrativeServices comprises installRadioApps( ): INTEGER; uninstallRadioApps( ): INTEGER; createRadioApps( ): INTEGER; delRadioApps( ): INTEGER; updateRadioApps( ): Integer; getRadioAppParameters( ): RadioAppParameters; setRadioAppParameters( ): BOOLEAN; and getListOfRadioApps( ): RadioAppsList.

Example B23 includes the method of example B22 and/or some other example(s) herein, wherein the service primitives include IAccessControlServices, and the IAccessControlServices comprises: activateRadioApps( ): INTEGER; deactivateRadioApps( ): BOOLEAN; getListOfRadioApps( ): RadioAppsList; startRadioMeasurement( ): BOOLEAN; stopRadioMeasurement( ): RadioMeasurementsList; createAssociation( ): INTEGER; terminateAssociation( ): BOOLEAN; createDataFlow( ): INTEGER; terminateDataFlow( ): INTEGER; and changeDataFlow( ): INTEGER; reportErrors( ): void.

Example B24 includes the method of example B23 and/or some other example(s) herein, wherein the service primitives include IdataFlowServices, and the IdataFlowServices comprises: sendUserData( ): BOOLEAN; and receiveUserData( ): UserData.

Example B25 includes the method of examples B01-B24 and/or some other example(s) herein, wherein the internal interface is one or more of a MultiRadio Interface (MURI), a generalized MURI (gMURI), a radio programming interface (RPI), a generalized RPI (gRPI), a Unified Radio Application Interface (URAI), a generalized URAI (gURAI), a Reconfigurable Radio Frequency Interface (RRFI), and/or a generalized RRFI (gRRFI).

Example C01 includes a method for testing a reconfigurable radio equipment (RRE), the method comprising: obtaining, by a translation entity, packets from a measurement/testing equipment (MTE), the packets in a first format; translating, by the translation entity, the packets into a second format; and sending, by the translation entity, signaling in the second format to a routing entity of the RRE.

Example C02 includes the method of example C01 and/or some other example(s) herein, wherein the routing entity is disposed between one or more radio computers of the RRE and a communication services layer (CSL) of the RRE.

Example C03 includes the method of example C02 and/or some other example(s) herein, wherein the packets include data/commands to be provided to any of the one or more radio computers, short-cutting communication between the CSL and the one or more radio computers.

Example C04 includes the method of example C02 and/or some other example(s) herein, wherein the packets include data/commands to be provided to the CSL, short-cutting communication between the one or more radio computers and the CSL.

Example C05 includes the method of examples C01-C04 and/or some other example(s) herein, further comprising: obtaining, by the translation entity, signaling in the second format from the routing entity; translating, by the translation entity, the signaling into packets having the first format; and sending, by the translation entity, the packets in the first format to the MTE.

Example C06 includes the method of example C05 and/or some other example(s) herein, wherein the signaling includes data/commands for the MTE provided by the one or more radio computers, short-cutting communication between the CSL and the one or more radio computers.

Example C07 includes the method of example 5 and/or some other example(s) herein, wherein the signaling includes data/commands for the MTE provided by the CSL, short-cutting communication between the one or more radio computers and the CSL.

Example C08 includes the method of examples C01-C07 and/or some other example(s) herein, further comprising:

activating a test mode of a Radio Control Framework (RCF) of at least one radio computer of the one or more radio computers; installing or provisioning a first Reference Radio Application Package (RRAP1) and a second Reference Radio Application Package (RRAP2) on the RRE; and feeding one or more service primitives of an interface under test (IUT) are fed from the CSL to the RCF and verified by the RRAP1.

Example C09 includes the method of example C08 and/or some other example(s) herein, wherein the packets include one or more commands of a testing procedure based on the IUT, and the signaling includes responses to the commands.

Example C10 includes the method of example C09 and/or some other example(s) herein, wherein the IUT is a Multi-Radio Interface (MURI) and/or generalized MURI (gMURI), and the testing procedure comprises validating one or more of the service primitives of the MURI/gMURI.

Example C11 includes the method of examples C09-C10 and/or some other example(s) herein, wherein the IUT is Reconfigurable Radio Frequency Interface (RRFI) and/or generalized RRFI (gRRFI), and the testing procedure comprises one or more of: a test of "Spectrum Control Services"; a test of "Power Control Services"; a test of "Antenna Management Services"; and/or a test of "Tx/Rx Chain Control Services" Test of "RVM Protection Services".

Example C12 includes the method of examples C09-C11 and/or some other example(s) herein, wherein the IUT is a Unified Radio Application Interface (URAI) and/or generalized URAI (gURAI), and the testing procedure comprises one or more of: a test of "Radio Application Management Services"; Test of "User Data Flow Services"; and/or Test of "Multiradio Control Services".

Example C13 includes the method of examples C09-C12 and/or some other example(s) herein, wherein the one or more commands are added to the packets as one or more of: clear text of the one or more commands or an abbreviated version thereof; and/or a pre-defined code or index corresponding to respective ones of the one or more commands.

Example C14 includes the method of examples C01-C13 and/or some other example(s) herein, wherein the packets in the first format are TCP/IP packets or UDP/IP packets.

Example C15 includes the method of examples C01-C14 and/or some other example(s) herein, wherein the second format is an RRE internal format or a proprietary format.

Example D01 includes a method for testing an internal interface of a reconfigurable radio equipment (RRE), the method comprising: activating a test mode for a first component of the RRE; installing a Reference Radio Application Package (RRAP) to the RRE; sending one or more service primitives defined by the internal interface to a second component of the RRE, the one or more service primitives to be provided by the second component to the first component; obtaining an output based on operation of the RRAP based on the one or more service primitives; and validating the obtained output.

Example D02 includes the method of example D01 and/or some other example(s) herein, wherein sending the one or more service primitives to the second component comprises: invoking service primitive calls for the one or more service primitives in a predefined order.

Example D03 includes the method of examples D01-D02 and/or some other example(s) herein, wherein the one or more service primitives are directly forwarded by the second component to the first component, and the RRAP is to cause the RRE to generate the output based on the one or more service primitives.

Example D04 includes the method of examples D01-D02 and/or some other example(s) herein, wherein the RRAP is a first RRAP (RRAP1), and the method further comprises: installing a second RRAP (RRAP2) to the RRE, wherein the RRAP2 is to cause the RRE to generate the output based on the one or more service primitives.

Example D05 includes the method of example D04 and/or some other example(s) herein, wherein validating the obtained output comprises: determining whether each service primitive of the one or more service primitives is performed correctly and a corresponding action is correctly executed for the RRAP2.

Example D06 includes the method of examples D04-D05 and/or some other example(s) herein, wherein the output is an output signal, and the RRAP1 or the RRAP2 is configured to cause the RRE to generate the output signal for each of the one or more service primitives sent to the second component.

Example D07 includes the method of example D06 and/or some other example(s) herein, wherein the output signal for each of the one or more service primitives is maintained for a predefined amount of time or until a next service primitive call sent to the second component.

Example D08 includes the method of example D07 and/or some other example(s) herein, wherein a periodicity of the output signal is different for at least one service primitive of the one or more service primitives.

Example D09 includes the method of examples D07-D08 and/or some other example(s) herein, wherein a relationship between a periodicity of the output signal and a corresponding service primitive is predefined.

Example D10 includes the method of examples D06-D09 and/or some other example(s) herein, wherein obtaining the output comprises: measuring the output signal from radiofrequency (RF) front-end circuitry of the RRE.

Example D11 includes the method of examples D06-D10 and/or some other example(s) herein, wherein the output signal is a rectangular clock signal or a triangular clock signal.

Example D12 includes the method of examples D01-D11 and/or some other example(s) herein, wherein the internal interface is a Multiradio Interface (MURI) or a generalized MURI (gMURI), the first component is a radio control framework (RCF) and the second component is a Communication Services Layer (CSL).

Example D13 includes the method of examples D01-D11 and/or some other example(s) herein, wherein the internal interface is a Unified Radio Application Interface (URAI) or a generalized URAI (gURAI), the first component is a radiofrequency (RF) transceiver and the second component is a Unified Radio Application (URA).

Example D14 includes the method of examples D01-D11 and/or some other example(s) herein, wherein the internal interface is a Reconfigurable Radio Frequency Interface (RRFI) or a generalized RRFI (gRRFI), the first component is a URA and the second component is an RCF.

Example D15 includes the method of examples D01-D11 and/or some other example(s) herein, wherein sending the one or more service primitives comprises: sending packets in a first format to a translation entity over a first interface, the packets including the one or more service primitives, wherein the translation entity is to translate the packets into a second format for delivery of the packets to a routing entity of the RRE.

Example D16 includes the method of example D15 and/or some other example(s) herein, wherein obtaining the output comprises: receiving one or more other packets in the first format from the translation entity over the first interface, the one or more other packets being translated from the second format to the first format by the translation entity, and the one or more other packets including data based on the one or more service primitives.

Example D17 includes the method of examples D15-D16 and/or some other example(s) herein, wherein the routing entity is disposed between one or more radio computers of the RRE and a CSL of the RRE.

Example D18 includes the method of example D17 and/or some other example(s) herein, wherein the packets include data or commands to be provided to any of the one or more radio computers, wherein the one or more radio computers include the first component or the second component.

Example D19 includes the method of examples D15-D18 and/or some other example(s) herein, wherein the first format is an internet protocol (IP), and the second format is an RRE-specific format or a proprietary format.

Example D20 includes the method of examples D01-D11 and/or some other example(s) herein, further comprising: checking whether an application (app) is relevant to at least one cybersecurity framework (CSF), the method comprising:

Example D21 includes the method of example D20 and/or some other example(s) herein, wherein checking whether the app is relevant to at least one CSF comprises: determining whether the app applies to a first CSF; connecting with a certification authority to verify whether a system including the app has a certification; and determining whether the app applies to a second CSF if the app is determined to not apply to the first CSF.

Example D22 includes the method of example D21 and/or some other example(s) herein, further comprising: rejecting usage of the app when the system including the app does not have a certification or does not have an available certification.

Example D23 includes the method of examples D21-D22 and/or some other example(s) herein, wherein when the app applies to the second CSF, the method further comprises: determining a cybersecurity level associated with the app based on a certification of the app according to the second CSF.

Example D24 includes the method of example D23 and/or some other example(s) herein, further comprising: accepting and installing the app when the cybersecurity level associated with the app matches a target cybersecurity level.

Example D25 includes the method of example D24 and/or some other example(s) herein, further comprising: rejecting the app when the cybersecurity level associated with the app does not match the target cybersecurity level.

Example D26 includes the method of examples D24-D25 and/or some other example(s) herein, wherein the cybersecurity level associated with the app is one of a basic level, a substantial level, and a high level; and the target cybersecurity level is one of the basic level, the substantial level, and the high level.

Example D27 includes the method of examples D22-D26 and/or some other example(s) herein, further comprising: accepting and installing the app when the app does not apply to the first CSF or the second CSF, the method further comprises; deleting the app when the app does not apply to the first CSF or the second CSF.

Example D28 includes the method of examples D22-D27 and/or some other example(s) herein, wherein the app includes a tag that indicates the applicability to the first CSF or the second CSF.

Example D29 includes the method of example D28 and/or some other example(s) herein, wherein the app is an xApp in an Open RAN (O-RAN) system, and the tag is included in a descriptor of the xApp.

Example D30 includes the method of examples D22-D29 and/or some other example(s) herein, wherein the first CSF is the European Union (ER) Radio Equipment Directive (RED) Article 3(3)(f) and the second CSF is the National Institute of Standards and Technology (NIST) Framework for Improving Critical Infrastructure Cybersecurity.

Example Z01 includes one or more computer readable media comprising instructions, wherein execution of the instructions by processor circuitry is to cause the processor circuitry to perform the method of any one of examples A01-A12, B01-B25, C01-C15, D01-D30 and/or any other aspect discussed herein.

Example Z02 includes a computer program comprising the instructions of example Z01.

Example Z03 includes an Application Programming Interface defining functions, methods, variables, data structures, and/or protocols for the computer program of example Z02.

Example Z04 includes an apparatus comprising circuitry loaded with the instructions of example Z01.

Example Z05 includes an apparatus comprising circuitry operable to run the instructions of example Z01.

Example Z06 includes an integrated circuit comprising one or more of the processor circuitry of example Z01 and the one or more computer readable media of example Z01.

Example Z07 includes a computing system comprising the one or more computer readable media and the processor circuitry of example Z01.

Example Z08 includes an apparatus comprising means for executing the instructions of example Z01.

Example Z09 includes a signal generated as a result of executing the instructions of example Z01.

Example Z10 includes a data unit generated as a result of executing the instructions of example Z01.

Example Z11 includes the data unit of example Z10, the data unit is a datagram, network packet, data frame, data segment, a Protocol Data Unit (PDU), a Service Data Unit (SDU), a message, or a database object.

Example Z12 includes a signal encoded with the data unit of example Z10 or Z11.

Example Z13 includes an electromagnetic signal carrying the instructions of example Z01.

Example Z14 includes an apparatus comprising means for performing the method of any one of examples A01-A12, B01-B25, C01-C15, D01-D30.

5. Terminology

As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof. The phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," each of which may refer to one or more of the same or different embodiments. Furthermore, the terms "comprising," "including," "having," and the like, as used with respect to the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "circuitry" at least in some embodiments refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an ASIC, a FPGA, programmable logic controller (PLC), SoC, SiP, multi-chip package (MCP), DSP, etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center) than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions.

The term "processor circuitry" at least in some embodiments refers to, is part of, or includes circuitry capable of sequentially and automatically carrying out a sequence of arithmetic or logical operations, or recording, storing, and/or transferring digital data. The term "processor circuitry" at least in some embodiments refers to one or more application processors, one or more baseband processors, a physical CPU, a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "memory" and/or "memory circuitry" at least in some embodiments refers to one or more hardware devices for storing data, including RAM, MRAM, PRAM, DRAM, and/or SDRAM, core memory, ROM, magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

The term "interface circuitry" at least in some embodiments refers to, is part of, or includes circuitry that enables the exchange of information between two or more components or devices. The term "interface circuitry" at least in some embodiments refers to one or more hardware interfaces, for example, buses, I/O interfaces, peripheral component interfaces, network interface cards, and/or the like.

The term "element" at least in some embodiments refers to a unit that is indivisible at a given level of abstraction and has a clearly defined boundary, wherein an element may be any type of entity including, for example, one or more devices, systems, controllers, network elements, modules, etc., or combinations thereof. The term "device" at least in some embodiments refers to a physical entity embedded inside, or attached to, another physical entity in its vicinity, with capabilities to convey digital information from or to that physical entity. The term "entity" at least in some embodiments refers to a distinct component of an architecture or device, or information transferred as a payload. The term "controller" at least in some embodiments refers to an element or entity that has the capability to affect a physical entity, such as by changing its state or causing the physical entity to move.

The term "Edge computing" encompasses many implementations of distributed computing that move processing activities and resources (e.g., compute, storage, acceleration resources) towards the "Edge" of the network, in an effort to reduce latency and increase throughput for endpoint users (client devices, user equipment, etc.). Such Edge computing implementations typically involve the offering of such activities and resources in cloud-like services, functions, applications, and subsystems, from one or multiple locations accessible via wireless networks. Thus, the references to an "Edge" of a network, cluster, domain, system or computing arrangement used herein are groups or groupings of functional distributed compute elements and, therefore, generally unrelated to "Edges" (links or connections) as used in graph theory. Specific arrangements of Edge computing applications and services accessible via mobile wireless networks (e.g., cellular and WiFi data networks) may be referred to as "mobile Edge computing" or "multi-access edge computing", which may be referenced by the acronym "MEC". The usage of "MEC" herein may also refer to a standardized implementation promulgated by the European Telecommunications Standards Institute (ETSI), referred to as "ETSI MEC". Terminology that is used by the ETSI MEC specification is generally incorporated herein by reference, unless a conflicting definition or usage is provided herein.

The term "compute node" or "compute device" at least in some embodiments refers to an identifiable entity implementing an aspect of Edge computing operations, whether part of a larger system, distributed collection of systems, or a standalone apparatus. In some examples, a compute node may be referred to as a "Edge node", "Edge device", "Edge system", whether in operation as a client, server, or intermediate entity. Specific implementations of a compute node may be incorporated into a server, base station, gateway, road side unit, on premise unit, UE or end consuming device, or the like.

The term "computer system" at least in some embodiments refers to any type interconnected electronic devices, computer devices, or components thereof. Additionally, the terms "computer system" and/or "system" at least in some embodiments refer to various components of a computer that are communicatively coupled with one another. Furthermore, the term "computer system" and/or "system" at least in some embodiments refer to multiple computer devices and/or multiple computing systems that are communicatively coupled with one another and configured to share computing and/or networking resources.

The term "architecture" at least in some embodiments refers to a computer architecture or a network architecture. A "network architecture" is a physical and logical design or arrangement of software and/or hardware elements in a network including communication protocols, interfaces, and media transmission. A "computer architecture" is a physical and logical design or arrangement of software and/or hardware elements in a computing system or platform including technology standards for interacts therebetween.

The term "appliance," "computer appliance," or the like, at least in some embodiments refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "user equipment" or "UE" at least in some embodiments refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, station, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. The term "station" or "STA" at least in some embodiments refers to a logical entity that is a singly addressable instance of a medium access control (MAC) and physical layer (PHY) interface to the wireless medium (WM). The term "wireless medium" or WM" at least in some embodiments refers to the medium used to implement the transfer of protocol data units (PDUs) between peer physical layer (PHY) entities of a wireless local area network (LAN).

The term "network element" at least in some embodiments refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "access point" or "AP" at least in some embodiments refers to an entity that contains one station (STA) and provides access to the distribution services, via the wireless medium (WM) for associated STAs. An AP comprises a STA and a distribution system access function (DSAF).

The term "base station" at least in some embodiments refers to a network element in a radio access network (RAN), such as a fourth-generation (4G) or fifth-generation (5G) mobile communications network which is responsible for the transmission and reception of radio signals in one or more cells to or from a user equipment (UE). A base station can have an integrated antenna or may be connected to an antenna array by feeder cables. A base station uses specialized digital signal processing and network function hardware. In some examples, the base station may be split into multiple functional blocks operating in software for flexibility, cost, and performance. In some examples, a base station can include an evolved node-B (eNB) or a next generation node-B (gNB). In some examples, the base station may operate or include compute hardware to operate as a compute node. However, in many of the scenarios discussed herein, a RAN node may be substituted with an access point (e.g., wireless network access point) or other network access hardware.

The term "E-UTEAN NodeB", "eNodeB", or "eNB" at least in some embodiments refers to a RAN node providing E-UTRA user plane (PDCP/RLC/MAC/PHY) and control plane (RRC) protocol terminations towards a UE, and connected via an S1 interface to the Evolved Packet Core (EPC). Two or more eNBs are interconnected with each other (and/or with one or more en-gNBs) by means of an X2 interface.

The term "next generation eNB" or "ng-eNB" at least in some embodiments refers to a RAN node providing E-UTRA user plane and control plane protocol terminations towards a UE, and connected via the NG interface to the 5GC. Two or more ng-eNBs are interconnected with each other (and/or with one or more gNBs) by means of an Xn interface.

The term "Next Generation NodeB", "gNodeB", or "gNB" at least in some embodiments refers to a RAN node providing NR user plane and control plane protocol terminations towards a UE, and connected via the NG interface to the 5GC. Two or more gNBs are interconnected with each other (and/or with one or more ng-eNBs) by means of an Xn interface.

The term "E-UTRA-NR gNB" or "en-gNB" at least in some embodiments refers to a RAN node providing NR user plane and control plane protocol terminations towards a UE, and acting as a Secondary Node in E-UTRA-NR Dual Connectivity (EN-DC) scenarios (see e.g., 3GPP TS 37.340 v16.6.0 (2021 Jul. 9)). Two or more en-gNBs are interconnected with each other (and/or with one or more eNBs) by means of an X2 interface.

The term "Next Generation RAN node" or "NG-RAN node" at least in some embodiments refers to either a gNB or an ng-eNB.

The term "Central Unit" or "CU" at least in some embodiments refers to a logical node hosting radio resource control (RRC), Service Data Adaptation Protocol (SDAP), and/or Packet Data Convergence Protocol (PDCP) protocols/layers of an NG-RAN node, or RRC and PDCP protocols of the en-gNB that controls the operation of one or more DUs; a CU terminates an F1 interface connected with a DU and may be connected with multiple DUs.

The term "Distributed Unit" or "DU" at least in some embodiments refers to a logical node hosting radio link control (RLC), medium access control (MAC), and physical (PHY) layers of the NG-RAN node or en-gNB, and its operation is partly controlled by a CU; one DU supports one or multiple cells, and one cell is supported by only one DU; and a DU terminates the F1 interface connected with a CU.

The term "Residential Gateway" or "RG" at least in some embodiments refers to a device providing, for example, voice, data, broadcast video, video on demand, to other devices in customer premises. The term "Wireline 5G Access Network" or "W-5GAN" at least in some embodiments refers to a wireline AN that connects to a 5GC via N2 and N3 reference points. The W-5GAN can be either a W-5GBAN or W-5GCAN. The term "Wireline 5G Cable Access Network" or "W-5GCAN" at least in some embodiments refers to an Access Network defined in/by CableLabs. The term "Wireline BBF Access Network" or "W-5GBAN" at least in some embodiments refers to an Access Network defined in/by the Broadband Forum (BBF). The term "Wireline Access Gateway Function" or "W-AGF" at least in some embodiments refers to a Network function in W-5GAN that provides connectivity to a 3GPP 5G Core network (5GC) to 5G-RG and/or FN-RG. The term "5G-RG" at least in some embodiments refers to an RG capable of connecting to a 5GC playing the role of a user equipment with regard to the 5GC; it supports secure element and exchanges N1 signaling with 5GC. The 5G-RG can be either a 5G-BRG or 5G-CRG.

The term "central office" (or CO) indicates an aggregation point for telecommunications infrastructure within an accessible or defined geographical area, often where telecommunication service providers have traditionally located switching equipment for one or multiple types of access networks. The CO can be physically designed to house telecommunications infrastructure equipment or compute, data storage, and network resources. The CO need not, however, be a designated location by a telecommunications service provider. The CO may host any number of compute devices for Edge applications and services, or even local implementations of cloud-like services.

The term "cloud computing" or "cloud" at least in some embodiments refers to a paradigm for enabling network access to a scalable and elastic pool of shareable computing resources with self-service provisioning and administration on-demand and without active management by users. Cloud computing provides cloud computing services (or cloud services), which are one or more capabilities offered via cloud computing that are invoked using a defined interface (e.g., an API or the like). The term "computing resource" or simply "resource" at least in some embodiments refers to any physical or virtual component, or usage of such components, of limited availability within a computer system or network. Examples of computing resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "workload" at least in some embodiments refers to an amount of work performed by a computing system, device, entity, etc., during a period of time or at a particular instant of time. A workload may be represented as a benchmark, such as a response time, throughput (e.g., how much work is accomplished over a period of time), and/or the like. Additionally or alternatively, the workload may be represented as a memory workload (e.g., an amount of memory space needed for program execution to store temporary or permanent data and to perform intermediate computations), processor workload (e.g., a number of instructions being executed by a processor during a given period of time or at a particular time instant), an I/O workload (e.g., a number of inputs and outputs or system accesses during a given period of time or at a particular time instant), database workloads (e.g., a number of database queries during a period of time), a network-related workload (e.g., a number of network attachments, a number of mobility updates, a number of radio link failures, a number of handovers, an amount of data to be transferred over an air interface, etc.), and/or the like. Various algorithms may be used to determine a workload and/or workload characteristics, which may be based on any of the aforementioned workload types.

The term "cloud service provider" (or CSP) indicates an organization which operates typically large-scale "cloud" resources comprised of centralized, regional, and Edge data centers (e.g., as used in the context of the public cloud). In other examples, a CSP may also be referred to as a Cloud Service Operator (CSO). References to "cloud computing" generally refer to computing resources and services offered by a CSP or a CSO, at remote locations with at least some increased latency, distance, or constraints relative to Edge computing.

The term "data center" at least in some embodiments refers to a purpose-designed structure that is intended to house multiple high-performance compute and data storage nodes such that a large amount of compute, data storage and network resources are present at a single location. This often entails specialized rack and enclosure systems, suitable heating, cooling, ventilation, security, fire suppression, and power delivery systems. The term may also refer to a compute and data storage node in some contexts. A data center may vary in scale between a centralized or cloud data center (e.g., largest), regional data center, and Edge data center (e.g., smallest).

The term "access Edge layer" indicates the sub-layer of infrastructure Edge closest to the end user or device. For example, such layer may be fulfilled by an Edge data center deployed at a cellular network site. The access Edge layer functions as the front line of the infrastructure Edge and may connect to an aggregation Edge layer higher in the hierarchy.

The term "aggregation Edge layer" indicates the layer of infrastructure Edge one hop away from the access Edge layer. This layer can exist as either a medium-scale data center in a single location or may be formed from multiple interconnected micro data centers to form a hierarchical topology with the access Edge to allow for greater collaboration, workload failover, and scalability than access Edge alone.

The term "network function virtualization" (or NFV) indicates the migration of NFs from embedded services inside proprietary hardware appliances to software-based virtualized NFs (or VNFs) running on standardized CPUs (e.g., within standard x86® and ARM® servers, such as those including Intel® Xeon™ or AMD® Epyc™ or Opteron™ processors) using industry standard virtualization and cloud computing technologies. Additionally or alternatively, NFV processing and data storage will occur at the Edge data centers that are connected directly to the local cellular site, within the infrastructure Edge.

The term "virtualized NF" (or VNF) indicates a software-based NF operating on multi-function, multi-purpose compute resources (e.g., x86, ARM processing architecture) which are used by NFV in place of dedicated physical equipment. Additionally or alternatively, several VNFs will operate on an Edge data center at the infrastructure Edge.

The term "edge compute node" at least in some embodiments refers to a real-world, logical, or virtualized implementation of a compute-capable element in the form of a device, gateway, bridge, system or subsystem, component, whether operating in a server, client, endpoint, or peer mode, and whether located at an "edge" of an network or at a connected location further within the network. References to a "node" used herein are generally interchangeable with a "device", "component", and "sub-system"; however, references to an "edge computing system" generally refer to a distributed architecture, organization, or collection of multiple nodes and devices, and which is organized to accomplish or offer some aspect of services or resources in an edge computing setting.

The term "cluster" at least in some embodiments refers to a set or grouping of entities as part of an Edge computing system (or systems), in the form of physical entities (e.g., different computing systems, networks or network groups), logical entities (e.g., applications, functions, security constructs, containers), and the like. In some locations, a "cluster" is also referred to as a "group" or a "domain". The membership of cluster may be modified or affected based on conditions or functions, including from dynamic or property-based membership, from network or system management scenarios, or from various example techniques discussed below which may add, modify, or remove an entity in a cluster. Clusters may also include or be associated with multiple layers, levels, or properties, including variations in security features and results based on such layers, levels, or properties.

The term "radio technology" at least in some embodiments refers to technology for wireless transmission and/or reception of electromagnetic radiation for information transfer. The term "radio access technology" or "RAT" at least in some embodiments refers to the technology used for the underlying physical connection to a radio based communication network. The "RAT type" identifies the transmission technology used in an access network, for example, new radio (NR), narrowband IoT (NB-IOT), Untrusted Non-3GPP, Trusted Non-3GPP, Trusted IEEE 802.11, Non-3GPP access, Wireline, Wireline-Cable, Wireline Broadband Forum (wireline-BBF), etc.

The term "V2X" at least in some embodiments refers to vehicle to vehicle (V2V), vehicle to infrastructure (V2I), infrastructure to vehicle (I2V), vehicle to network (V2N), and/or network to vehicle (N2V) communications and associated radio access technologies.

The term "communication protocol" (either wired or wireless) at least in some embodiments refers to a set of standardized rules or instructions implemented by a communication device and/or system to communicate with other devices and/or systems, including instructions for packetizing/depacketizing data, modulating/demodulating signals, implementation of protocols stacks, and/or the like. Examples of wireless communications protocols include a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology including, for example, 3GPP Fifth Generation (5G) or New Radio (NR), Universal Mobile Telecommunications System (UMTS), Freedom of Multimedia Access (FOMA), Long Term Evolution (LTE), LTE-Advanced (LTE Advanced), LTE Extra, LTE-A Pro, cdmaOne (2G), Code Division Multiple Access 2000 (CDMA 2000), Cellular Digital Packet Data (CDPD), Mobitex, Circuit Switched Data (CSD), High-Speed CSD (HSCSD), Wideband Code Division Multiple Access (W-CDM), High Speed Packet Access (HSPA), HSPA Plus (HSPA+), Time Division-Code Division Multiple Access (TD-CDMA), Time Division-Synchronous Code Division Multiple Access (TD-SCDMA), LTE LAA, MuLTEfire, UMTS Terrestrial Radio Access (UTRA), Evolved UTRA (E-UTRA), Evolution-Data Optimized or Evolution-Data Only (EV-D0), Advanced Mobile Phone System (AMPS), Digital AMPS (D-AMPS), Total Access Communication System/Extended Total Access Communication System (TACS/ETACS), Push-to-talk (PTT), Mobile Telephone System (MTS), Improved Mobile Telephone System (IMTS), Advanced Mobile Telephone System (AMTS), Cellular Digital Packet Data (CDPD), DataTAC, Integrated Digital Enhanced Network (iDEN), Personal Digital Cellular (PDC), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Bluetooth®, Bluetooth Low Energy (BLE), IEEE 802.15.4 based protocols (e.g., IPv6 over Low power Wireless Personal Area Networks (6LoWPAN), WirelessHART, MiWi, Thread, 802.11a, etc.) WiFi-direct, ANT/ANT+, Zig-Bee, Z-Wave, 3GPP device-to-device (B2D) or Proximity Services (ProSe), Universal Plug and Play (UPnP), Low-Power Wide-Area-Network (LPWAN), Long Range Wide Area Network (LoRA) or LoRaWAN™ developed by Semtech and the LoRa Alliance, Digital Enhanced Cordless Telecommunications (DECT), DECT Ultra Low Energy (DECT ULE), DECT-2020, Sigfox, Wireless Gigabit Alliance (WiGig) standard, Worldwide Interoperability for Microwave Access (WiMAX), mmWave standards in general (e.g., wireless systems operating at 10-300 GHz and above such as WiGig, IEEE 802.11ad, IEEE 802.11ay, etc.), V2X communication including C-V2X, WAVE, 802.11bd, Dedicated Short Range Communications (DSRC), Intelligent-Transport-Systems (ITS) including the European ITS-G5, ITS-GSB, ITS-GSC, etc. Ultra High Frequency (UHF) communication, Very High Frequency (VHF) communication. In addition to the standards listed above, any number of satellite uplink technologies may be used for purposes of the present disclosure including, for example, radios compliant with standards issued by the International Telecommunication Union (ITU), or the ETSI, among others. The examples provided herein are thus understood as being applicable to various other communication technologies, both existing and not yet formulated.

The term "channel" at least in some embodiments refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" at least in some embodiments refers to a connection between two devices through a RAT for the purpose of transmitting and receiving information.

The term "Quality of Service" or "QoS' at least in some embodiments refers to a description or measurement of the overall performance of a service (e.g., telephony and/or cellular service, network service, wireless communication/connectivity service, cloud computing service, etc.). In some cases, the QoS may be described or measured from the perspective of the users of that service, and as such, QoS may be the collective effect of service performance that determine the degree of satisfaction of a user of that service. In other cases, QoS at least in some embodiments refers to traffic prioritization and resource reservation control mechanisms rather than the achieved perception of service quality. In these cases, QoS is the ability to provide different priorities to different applications, users, or flows, or to guarantee a certain level of performance to a flow. In either case, QoS is characterized by the combined aspects of performance factors applicable to one or more services such as, for example, service operability performance, service accessibility performance; service retain ability performance; service reliability performance, service integrity performance, and other factors specific to each service. Several related aspects of the service may be considered when quantifying the QoS, including packet loss rates, bit rates, throughput, transmission delay, availability, reliability, jitter, signal strength and/or quality measurements, and/or other measurements such as those discussed herein.

The terms "beamforming" and "beam steering" at least in some embodiments refer to a spatial filtering mechanism used at a transmitter (Tx) to improve the received signal power, signal-to-noise ratio (SNR), or some other signaling metric at an intended receiver (Rx). The term "beamformer" at least in some embodiments refers to a STA that transmits a physical layer PDU (PPDU) using a beamforming steering matrix. The term "beamforming steering matrix" at least in some embodiments refers to a matrix determined using knowledge of the channel between a Tx and an intended Rx that maps from space-time streams to transmit antennas with the goal of improving the signal power, SNR, and/or some other signaling metric at the intended Rx.

The term "basic service set" or "BSS" at least in some embodiments refers to a set of STAs that have successfully synchronized using the JOIN service primitives and one STA that has used the START primitive. Alternatively, a set of STAs that have used the START primitive specifying matching mesh profiles where the match of the mesh profiles has been verified via the scanning procedure. Membership in a BSS does not imply that wireless communication with all other members of the BSS is possible.

The term "coordination function" at least in some embodiments refers to a logical function that determines when a STA is permitted to transmit PDUs via a WM. The term "distributed coordination function" or "DCF" at least in some embodiments refers to a class of coordination function (s) where the same coordination function logic is active in every STA in a basic service set (BSS) whenever the network is in operation. The term "distribution service" at least in some embodiments refers to a service that, by using association information, delivers medium access control (MAC) service tuples within a distribution system (DS). The term "distribution system" or DS" at least in some embodiments refers to a system used to interconnect a set of basic service sets (BSSs) and integrated local area networks (LANs) to create an extended service set (ESS).

The term "clear channel assessment (CCA) function" at least in some embodiments refers to a logical function in the physical layer (PHY) that determines the current state of use of a WM.

The terms "instantiate," "instantiation," and the like at least in some embodiments refers to the creation of an instance. An "instance" also at least in some embodiments refers to a concrete occurrence of an object, which may occur, for example, during execution of program code. The term "information element" at least in some embodiments refers to a structural element containing one or more fields. The term "field" at least in some embodiments refers to individual contents of an information element, or a data element that contains content. The term "database object", "data structure", or the like may refer to any representation of information that is in the form of an object, attribute-value pair (AVP), key-value pair (KVP), tuple, etc., and may include variables, data structures, functions, methods, classes, database records, database fields, database entities, associations between data and/or database entities (also referred to as a "relation"), blocks and links between blocks in block chain implementations, and/or the like. The term "data element" or "DE" at least in some embodiments refers to a data type that contains one single data. The term "data frame" or "DF" at least in some embodiments refers to a data type that contains more than one data element in a predefined order.

The term "datagram" at least in some embodiments at least in some embodiments refers to a basic transfer unit associated with a packet-switched network; a datagram may be structured to have header and payload sections. The term "datagram" at least in some embodiments may be referred to as a "data unit" or the like.

The term "subframe" at least in some embodiments at least in some embodiments refers to a time interval during which a signal is signaled. In some implementations, a subframe is equal to 1 millisecond (ms). The term "time slot" at least in some embodiments at least in some embodiments refers to an integer multiple of consecutive subframes. The term "superframe" at least in some embodiments at least in some embodiments refers to a time interval comprising two time slots.

The term "interoperability" at least in some embodiments refers to the ability of STAs utilizing one communication system or RAT to communicate with other STAs utilizing another communication system or RAT. The term "Coexistence" at least in some embodiments refers to sharing or allocating radiofrequency resources among STAs using either communication system or RAT.

The term "reliability" at least in some embodiments refers to the ability of a computer-related component (e.g., software, hardware, or network element/entity) to consistently perform a desired function and/or operate according to a specification. Reliability in the context of network communications (e.g., "network reliability") may refer to the ability of a network to carry out communication. Network reliability may also be (or be a measure of) the probability of delivering a specified amount of data from a source to a destination (or sink).

The term "user" in the context of reconfigurable radio equipment/systems, at least in some embodiments refers to an abstract representation of any entity issuing command requests (e.g., using the services) to the multiradio computer. Three types of users are distinguished based on the type of services used: administrator for multiradio management plane, mobility policy manager for control plane, and networking stack for user plane.

The term "use case" at least in some embodiments refers to a description of a system from a user's perspective. Use cases sometimes treat a system as a black box, and the interactions with the system, including system responses, are perceived as from outside the system. Use cases typically avoid technical jargon, preferring instead the language of the end user or domain expert.

The term "quality" at least in some embodiments refers to a property, character, attribute, or feature of something as being affirmative or negative, and/or a degree of excellence of something. Additionally or alternatively, the term "quality" at least in some embodiments, in the context of data processing systems, refers to a state of qualitative and/or quantitative aspects of data, processes, and/or some other aspects of data processing systems.

The term "application" may refer to a computer program designed to carry out a specific task other than one relating to the operation of the computer itself. Additionally or alternatively, term "application" may refer to a complete and deployable package, environment to achieve a certain function in an operational environment. The term "AI/ML application" or the like may be an application that contains some AI/ML models and application-level descriptions.

The term "machine learning" or "ML at least in some embodiments refers to the use of computer systems to optimize a performance criterion using example (training) data and/or past experience. ML involves using algorithms to perform specific task(s) without using explicit instructions to perform the specific task(s), but instead relying on learnt patterns and/or inferences. ML uses statistics to build mathematical model(s) (also referred to as "ML models" or simply "models") in order to make predictions or decisions based on sample data (e.g., training data). The model is defined to have a set of parameters, and learning is the execution of a computer program to optimize the parameters of the model using the training data or past experience. The trained model may be a predictive model that makes predictions based on an input dataset, a descriptive model that gains knowledge from an input dataset, or both predictive and descriptive. Once the model is learned (trained), it can be used to make inferences (e.g., predictions). ML algorithms perform a training process on a training dataset to estimate an underlying ML model. An ML algorithm is a computer program that learns from experience with respect to some task(s) and some performance measure(s)/metric(s), and an ML model is an object or data structure created after an ML algorithm is trained with training data. In other words, the term "ML model" or "model" may describe the output of an ML algorithm that is trained with training data. After training, an ML model may be used to make predictions on new datasets. Additionally, separately trained AI/ML models can be chained together in a AI/ML pipeline during inference or prediction generation. Although the term "ML algorithm at least in some embodiments refers to different concepts than the term "ML model," these terms may be used interchangeably for the purposes of the present disclosure. ML techniques generally fall into the following main types of learning problem categories: supervised learning, unsupervised learning, and reinforcement learning.

The term "supervised learning at least in some embodiments refers to an ML technique that aims to learn a function or generate an ML model that produces an output given a labeled data set. Supervised learning algorithms build models from a set of data that contains both the inputs and the desired outputs. For example, supervised learning involves learning a function or model that maps an input to an output based on example input-output pairs or some other form of labeled training data including a set of training examples. Each input-output pair includes an input object (e.g., a vector) and a desired output object or value (referred to as a "supervisory signal"). Supervised learning can be grouped into classification algorithms, regression algorithms, and instance-based algorithms.

The term "classification" in the context of ML may refer to an ML technique for determining the classes to which various data points belong. Here, the term "class" or "classes" may refer to categories, and are sometimes called "targets" or "labels." Classification is used when the outputs are restricted to a limited set of quantifiable properties. Classification algorithms may describe an individual (data) instance whose category is to be predicted using a feature vector. As an example, when the instance includes a collection (corpus) of text, each feature in a feature vector may be the frequency that specific words appear in the corpus of text. In ML classification, labels are assigned to instances, and models are trained to correctly predict the pre-assigned labels of from the training examples. ML algorithms for classification may be referred to as a "classifier." Examples of classifiers include linear classifiers, k-nearest neighbor (kNN), decision trees, random forests, support vector machines (SVMs), Bayesian classifiers, convolutional neural networks (CNNs), among many others (note that some of these algorithms can be used for other ML tasks as well).

The terms "regression algorithm" and/or "regression analysis" in the context of ML may refer to a set of statistical processes for estimating the relationships between a dependent variable (often referred to as the "outcome variable") and one or more independent variables (often referred to as "predictors", "covariates", or "features"). Examples of regression algorithms/models include logistic regression, linear regression, gradient descent (GD), stochastic GD (SGD), and the like.

The terms "instance-based learning" or "memory-based learning" in the context of ML may refer to a family of learning algorithms that, instead of performing explicit generalization, compares new problem instances with instances seen in training, which have been stored in memory. Examples of instance-based algorithms include k-nearest neighbor, and the like), decision tree Algorithms (e.g., Classification And Regression Tree (CART), Iterative Dichotomiser 3 (ID3), C4.5, chi-square automatic interaction detection (CHAID), etc.), Fuzzy Decision Tree (FDT), and the like), Support Vector Machines (SVM), Bayesian Algorithms (e.g., Bayesian network (BN), a dynamic BN (DBN), Naive Bayes, and the like), and ensemble algorithms (e.g., Extreme Gradient Boosting, voting ensemble, bootstrap aggregating ("bagging"), Random Forest and the like.

The term "feature" in the context of ML refers to an individual measureable property, quantifiable property, or characteristic of a phenomenon being observed. Features are usually represented using numbers/numerals (e.g., integers), strings, variables, ordinals, real-values, categories, and/or the like. A set of features may be referred to as a "feature vector." A "vector" may refer to a tuple of one or more values called scalars, and a "feature vector" may be a vector that includes a tuple of one or more features.

The term "unsupervised learning at least in some embodiments refers to an ML technique that aims to learn a function to describe a hidden structure from unlabeled data. Unsupervised learning algorithms build models from a set of data that contains only inputs and no desired output labels. Unsupervised learning algorithms are used to find structure in the data, like grouping or clustering of data points. Examples of unsupervised learning are K-means clustering, principal component analysis (PCA), and topic modeling, among many others. The term "semi-supervised learning at least in some embodiments refers to ML algorithms that develop ML models from incomplete training data, where a portion of the sample input does not include labels.

The term "reinforcement learning" or "RL" at least in some embodiments refers to a goal-oriented learning technique based on interaction with an environment. In RL, an agent aims to optimize a long-term objective by interacting with the environment based on a trial and error process. Examples of RL algorithms include Markov decision process, Markov chain, Q-learning, multi-armed bandit learning, and deep RL. The term "multi-armed bandit problem", "K-armed bandit problem", "N-armed bandit problem", or "contextual bandit" at least in some embodiments refers to a problem in which a fixed limited set of resources must be allocated between competing (alternative) choices in a way that maximizes their expected gain, when each choice's properties are only partially known at the time of allocation, and may become better understood as time passes or by allocating resources to the choice. The term "contextual multi-armed bandit problem" or "contextual bandit" at least in some embodiments refers to a version of multi-armed bandit where, in each iteration, an agent has to choose between arms; before making the choice, the agent sees a d-dimensional feature vector (context vector) associated with a current iteration, the learner uses these context vectors along with the rewards of the arms played in the past to make the choice of the arm to play in the current iteration, and over time the learner's aim is to collect enough information about how the context vectors and rewards relate to each other, so that it can predict the next best arm to play by looking at the feature vectors. Additional aspects of RL and multi-armed bandit problems are discussed in Sutton et al., "Reinforcement Learning: An Introduction", 2nd Ed., MIT press (2018).

The term "reward function", in the context of RL, at least in some embodiments refers to a function that outputs a reward value based on one or more reward variables; the reward value provides feedback for an RL policy so that an RL agent can learn a desirable behavior. The term "reward shaping", in the context of RL, at least in some embodiments refers to a adjusting or altering a reward function to output a positive reward for desirable behavior and a negative reward for undesirable behavior.

The terms "artificial neural network", "neural network", or "NN" refer to an ML technique comprising a collection of connected artificial neurons or nodes that (loosely) model neurons in a biological brain that can transmit signals to other arterial neurons or nodes, where connections (or edges) between the artificial neurons or nodes are (loosely) modeled on synapses of a biological brain. The artificial neurons and edges typically have a weight that adjusts as learning proceeds. The weight increases or decreases the strength of the signal at a connection. Neurons may have a threshold such that a signal is sent only if the aggregate signal crosses that threshold. The artificial neurons can be aggregated or grouped into one or more layers where different layers may perform different transformations on their inputs. Signals travel from the first layer (the input layer), to the last layer (the output layer), possibly after traversing the layers multiple times. NNs are usually used for supervised learning, but can be used for unsupervised learning as well. Examples of NNs include deep NN (DNN), feed forward NN (FFN), a deep FNN (DFF), convolutional NN (CNN), deep CNN (DCN), deconvolutional NN (DNN), a deep belief NN, a perception NN, recurrent NN (RNN) (e.g., including Long Short Term Memory (LS™) algorithm, gated recurrent unit (GRU), etc.), deep stacking network (DSN).

The term "session" at least in some embodiments refers to a temporary and interactive information interchange between two or more communicating devices, two or more application instances, between a computer and user, or between any two or more entities or elements.

The term "Data Network" or "DN" at least in some embodiments refers to a network hosting data-centric services such as, for example, operator services, the internet, third-party services, or enterprise networks. Additionally or alternatively, a DN at least in some embodiments refers to service networks that belong to an operator or third party, which are offered as a service to a client or user equipment (UE). DNs are sometimes referred to as "Packet Data Networks" or "PDNs". The term "Local Area Data Network" or "LADN" at least in some embodiments refers to a DN that is accessible by the UE only in specific locations, that provides connectivity to a specific DNN, and whose availability is provided to the UE.

The term "PDU Connectivity Service" at least in some embodiments refers to a service that provides exchange of protocol data units (PDUs) between a UE and a DN. The term "PDU Session" at least in some embodiments refers to an association between a UE and a DN that provides a PDU connectivity service. A PDU Session type can be IPv4, IPv6, IPv4v6, Ethernet, Unstructured, or any other network/connection type, such as those discussed herein. The term "MA PDU Session" at least in some embodiments refers to a PDU Session that provides a PDU connectivity service, which can use one access network at a time or multiple access networks simultaneously.

The term "traffic shaping" at least in some embodiments refers to a bandwidth management technique that manages data transmission to comply with a desired traffic profile or class of service. Traffic shaping ensures sufficient network bandwidth for time-sensitive, critical applications using policy rules, data classification, queuing, QoS, and other techniques. The term "throttling" at least in some embodiments refers to the regulation of flows into or out of a network, or into or out of a specific device or element.

The term "network address" at least in some embodiments refers to an identifier for a node or host in a computer network, and may be a unique identifier across a network and/or may be unique to a locally administered portion of the network. Examples of network addresses include a Closed Access Group Identifier (CAG-ID), Bluetooth hardware device address (BD ADDR), a cellular network address (e.g., Access Point Name (APN), AMF identifier (ID), AF-Service-Identifier, Edge Application Server (EAS) ID, Data Network Access Identifier (DNAI), Data Network Name (DNN), EPS Bearer Identity (EBI), Equipment Identity Register (EIR) and/or 5G-EIR, Extended Unique Identifier (EUI), Group ID for Network Selection (GIN), Generic Public Subscription Identifier (GPSI), Globally Unique AMF Identifier (GUAMI), Globally Unique Temporary Identifier (GUTI) and/or 5G-GUTI, International Mobile Equipment Identity (IMEI), IMEI Type Allocation Code (IMEA/TAC), International Mobile Subscriber Identity (IMSI), Local Area Data Network (LADN) DNN, Mobile Subscriber Identification Number (MSIN), Mobile Subscriber/Station ISDN Number (MSISDN), Network identifier (NID), Network Slice Instance (NSI) ID, Permanent Equipment Identifier (PEI), Public Land Mobile Network (PLMN) ID, QoS Flow ID (QFI) and/or 5G QoS Identifier (5QI), RAN ID, Routing Indicator, SMS Function (SMSF) ID, Stand-alone Non-Public Network (SNPN) ID, Subscription Concealed Identifier (SUCI), Subscription Permanent Identifier (SUPI), Temporary Mobile Subscriber Identity (TMSI) and variants thereof, UE Access Category and Identity, and/or other cellular network related identifiers), an email address, Enterprise Application Server (EAS) ID, an endpoint address, an Electronic Product Code (EPC) as defined by the EPCglobal Tag Data Standard, a Fully Qualified Domain Name (FQDN), an internet protocol (IP) address in an IP network (e.g., IP version 4 (Ipv4), IP version 6 (IPv6), etc.), an internet packet exchange (IPX) address, Local Area Network (LAN) ID, a media access control (MAC) address, personal area network (PAN) ID, a port number (e.g., Transmission Control Protocol (TCP) port number, User Datagram Protocol (UDP) port number), QUIC connection ID, RFID tag, service set identifier (SSID) and variants thereof, telephone numbers in a public switched telephone network (PTSN), universally unique identifier (UUID) (e.g., as specified in ISO/IEC 11578:1996), a Universal Resource Locator (URL) and/or Universal Resource Identifier (URI), Virtual LAN (VLAN) ID, an X.21 address, an X.25 address, Zigbee® ID, Zigbee® Device Network ID, and/or any other suitable network address and components thereof. The term "application identifier", "application ID", or "app ID" at least in some embodiments refers to an identifier that can be mapped to a specific application or application instance; in the context of 3GPP 5G/NR systems, an "application identifier" may refer to an identifier that can be mapped to a specific application traffic detection rule. An "endpoint address" may refer to an address used to determine the host/authority part of a target URI, where the target URI is used to access an NF service (e.g., to invoke service operations) of an NF service producer or for notifications to an NF service consumer. The term "CAG-ID" at least in some embodiments refers to an identifier of a Closed Access Group (CAG), and the term "closed access group" or "CAG" at least in some embodiments refers to a group of list of users permitted to connect and/or access a specific network, a specific access network, and/or attach to a specific cell or network access node. Closed access groups (CAGs) are sometimes referred to as Access Control Lists (ACLs), Closed Subscriber Groups (CSGs), Closed User Groups (CUGs), and the like. The term "port" as used herein (e.g., in the context of computer networks) at least in some embodiments refers to a communication endpoint, a virtual data connection between two or more entities, and/or a virtual point where network connections start and end; additionally or alternatively, a "port" is associated with a specific process or service.

The term "subnetwork" or "subnet" at least in some embodiments refers to a logical subdivision of a network, such as an IP network. The practice of dividing a network into two or more networks is called "subnetting." The term "netmask" or "subnet mask" at least in some embodiments refers to a bitmask applied by bitwise AND operations to a network address (e.g., an IP address in an IP network) to yield a routing prefix, and/or is a 32-bit "mask" used to divide an IP address into subnets and specify the network's available hosts.

The term "cryptographic hash function", "hash function", or "hash") at least in some embodiments refers to a mathematical algorithm that maps data of arbitrary size (sometimes referred to as a "message") to a bit array of a fixed size (sometimes referred to as a "hash value", "hash", or "message digest"). A cryptographic hash function is usually a one-way function, which is a function that is practically infeasible to invert. The term "integrity" at least in some embodiments refers to a mechanism that assures that data has not been altered in an unapproved way. Examples of cryptographic mechanisms that can be used for integrity protection include digital signatures, message authentication codes (MAC), and secure hashes.

The term "flow" at least in some embodiments refers to a sequence of data and/or data units (e.g., datagrams, packets, or the like) from a source entity/element to a destination entity/element. Additionally or alternatively, the terms "flow" or "traffic flow" at least in some embodiments refer to an artificial and/or logical equivalent to a call, connection, or link. Additionally or alternatively, the terms "flow" or "traffic flow" at least in some embodiments refer to a sequence of packets sent from a particular source to a particular unicast, anycast, or multicast destination that the source desires to label as a flow; from an upper-layer viewpoint, a flow may include of all packets in a specific transport connection or a media stream, however, a flow is not necessarily 1:1 mapped to a transport connection. Additionally or alternatively, the terms "flow" or "traffic flow" at least in some embodiments refer to a set of data and/or data units (e.g., datagrams, packets, or the like) passing an observation point in a network during a certain time interval. Additionally or alternatively, the term "flow" at least in some embodiments refers to a user plane data link that is attached to an association. Examples are circuit switched phone call, voice over IP call, reception of an SMS, sending of a contact card, PDP context for internet access, demultiplexing a TV channel from a channel multiplex, calculation of position coordinates from geopositioning satellite signals, etc. For purposes of the present disclosure, the terms "traffic flow", "data flow", "dataflow", "packet flow", "network flow", and/or "flow" may be used interchangeably even though these terms may refer to different concepts.

The term "stream" at least in some embodiments refers to a sequence of data elements made available over time. At least in some embodiments, functions that operate on a stream, which may produce another stream, are referred to as "filters," and can be connected in pipelines, analogously to function composition. Filters may operate on one item of a stream at a time, or may base an item of output on multiple items of input, such as a moving average.

The term "distributed computations" at least in some embodiments refers to a model in which components located on networked computers communicate and coordinate their actions by passing messages interacting with each other in order to achieve a common goal.

The term "microservice" at least in some embodiments refers to one or more processes that communicate over a network to fulfil a goal using technology-agnostic protocols (e.g., HTTP or the like). Additionally or alternatively, the term "microservice" at least in some embodiments refers to services that are relatively small in size, messaging-enabled, bounded by contexts, autonomously developed, independently deployable, decentralized, and/or built and released with automated processes. Additionally or alternatively, the term "microservice" at least in some embodiments refers to a self-contained piece of functionality with clear interfaces, and may implement a layered architecture through its own internal components. The term "microservice architecture" at least in some embodiments refers to a variant of the service-oriented architecture (SOA) structural style wherein applications are arranged as a collection of loosely-coupled services (e.g., fine-grained services) and may use lightweight protocols.

The term "time to live" (or "TTL") or "hop limit" at least in some embodiments refers to a mechanism which limits the lifespan or lifetime of data in a computer or network. TTL may be implemented as a counter or timestamp attached to or embedded in the data. Once the prescribed event count or timespan has elapsed, data is discarded or revalidated.

The term "queue" at least in some embodiments refers to a collection of entities (e.g., data, objects, events, etc.) are stored and held to be processed later. that are maintained in a sequence and can be modified by the addition of entities at one end of the sequence and the removal of entities from the other end of the sequence; the end of the sequence at which elements are added may be referred to as the "back", "tail", or "rear" of the queue, and the end at which elements are removed may be referred to as the "head" or "front" of the queue. Additionally, a queue may perform the function of a buffer, and the terms "queue" and "buffer" may be used interchangeably throughout the present disclosure. The term "enqueue" at least in some embodiments refers to one or more operations of adding an element to the rear of a queue. The term "dequeue" at least in some embodiments refers to one or more operations of removing an element from the front of a queue.

The term "queuing delay" at least in some embodiments refers to an amount of time a job waits in a queue until that job can be executed. Additionally or alternatively, the term "queuing delay" at least in some embodiments refers to an amount of time a packet waits in a queue until it can be processed and/or transmitted. The term "packet delay" at least in some embodiments refers to the time it takes to transfer any packet from one point to another. Additionally or alternatively, the term "packet delay" or "per packet delay" at least in some embodiments refers to the difference between a packet reception time and packet transmission time. Additionally or alternatively, the "packet delay" or "per packet delay" can be measured by subtracting the packet sending time from the packet receiving time where the transmitter and receiver are at least somewhat synchronized. The term "processing delay" at least in some embodiments refers to an amount of time taken to process a packet in a network node. The term "transmission delay" at least in some embodiments refers to an amount of time needed (or necessary) to push a packet (or all bits of a packet) into a transmission medium. The term "propagation delay" at least in some embodiments refers to amount of time it takes a signal's header to travel from a sender to a receiver. The term "network delay" at least in some embodiments refers to the delay of an a data unit within a network (e.g., an IP packet within an IP network).

The term "delay bound" at least in some embodiments refers to a predetermined or configured amount of acceptable delay. The term "per-packet delay bound" at least in some embodiments refers to a predetermined or configured amount of acceptable packet delay where packets that are not processed and/or transmitted within the delay bound are considered to be delivery failures and are discarded or dropped.

The term "Packet Drop Rate" at least in some embodiments refers to a share of packets that were not sent to the target due to high traffic load or traffic management and should be seen as a part of the packet loss rate. The term "Packet Loss Rate" at least in some embodiments refers to a share of packets that could not be received by the target, including packets dropped, packets lost in transmission and packets received in wrong format. The term "latency" at least in some embodiments refers to the amount of time it takes to transfer a first/initial data unit in a data burst from one point to another.

The term "performance indicator" at least in some embodiments refers to performance data aggregated over a group of network functions (NFs), which is derived from performance measurements collected at the NFs that belong to the group, according to the aggregation method identified in a Performance Indicator definition.

The term "physical rate" or "PHY rate" at least in some embodiments refers to a speed at which one or more bits are actually sent over a transmission medium. Additionally or alternatively, the term "physical rate" or "PHY rate" at least in some embodiments refers to a speed at which data can move across a wireless link between a transmitter and a receiver.

The term "throughput" or "network throughput" at least in some embodiments refers to a rate of production or the rate at which something is processed. Additionally or alternatively, the term "throughput" or "network throughput" at least in some embodiments refers to a rate of successful message (date) delivery over a communication channel. The term "goodput" at least in some embodiments refers to a number of useful information bits delivered by the network to a certain destination per unit of time.

The term "establish" or "establishment" at least in some embodiments refers to (partial or in full) acts, tasks, operations, etc., related to bringing or the readying the bringing of something into existence either actively or passively (e.g., exposing a device identity or entity identity). Additionally or alternatively, the term "establish" or "establishment" at least in some embodiments refers to (partial or in full) acts, tasks, operations, etc., related to initiating, starting, or warming communication or initiating, starting, or warming a relationship between two entities or elements (e.g., establish a session, establish a session, etc.). Additionally or alternatively, the term "establish" or "establishment" at least in some embodiments refers to initiating something to a state of working readiness. The term "established" at least in some embodiments refers to a state of being operational or ready for use (e.g., full establishment). Furthermore, any definition for the term "establish" or "establishment" defined in any specification or standard can be used for purposes of the present disclosure and such definitions are not disavowed by any of the aforementioned definitions.

The term "obtain" at least in some embodiments refers to (partial or in full) acts, tasks, operations, etc., of intercepting, movement, copying, retrieval, or acquisition (e.g., from a memory, an interface, or a buffer), on the original packet stream or on a copy (e.g., a new instance) of the packet stream. Other aspects of obtaining or receiving may involving instantiating, enabling, or controlling the ability to obtain or receive the stream of packets (or the following parameters and templates or template values).

Although many of the previous examples are provided with use of specific cellular/mobile network terminology, including with the use of 4G/5G 3GPP network components (or expected terahertz-based 6G/6G+technologies), it will be understood these examples may be applied to many other deployments of wide area and local wireless networks, as well as the integration of wired networks (including optical networks and associated fibers, transceivers, etc.). Furthermore, various standards (e.g., 3GPP, ETSI, etc.) may define various message formats, PDUs, containers, frames, etc., as comprising a sequence of optional or mandatory data elements (DEs), data frames (DFs), information elements (IEs), and/or the like. However, it should be understood that the requirements of any particular standard should not limit the embodiments discussed herein, and as such, any combination of containers, frames, DFs, DEs, IEs, values, actions, and/or features are possible in various embodiments, including any combination of containers, DFs, DEs, values, actions, and/or features that are strictly required to be followed in order to conform to such standards or any combination of containers, frames, DFs, DEs, IEs, values, actions, and/or features strongly recommended and/or used with or in the presence/absence of optional elements.

Although these implementations have been described with reference to specific exemplary aspects, it will be evident that various modifications and changes may be made to these aspects without departing from the broader scope of the present disclosure. Many of the arrangements and processes described herein can be used in combination or in parallel implementations to provide greater bandwidth/throughput and to support edge services selections that can be made available to the edge systems being serviced. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

The invention claimed is:

1. An apparatus to be employed as testing equipment for testing an internal interface of a reconfigurable radio equipment (RRE), the apparatus comprising:
   interface circuitry to connect the testing equipment with the RRE; and
   processor circuitry coupled with the interface circuitry, the processor circuitry arranged to:
      activate, via the interface circuitry, a test mode for a first component of the RRE;
      install, via the interface circuitry, a Reference Radio Application Package (RRAP) to the RRE;
      send, via the interface circuitry, one or more service primitives defined by the internal interface to a second component of the RRE, the one or more service primitives to be provided by the second component to the first component;
      obtain an output based on operation of the RRAP based on the one or more service primitives; and
      validate the obtained output.

2. The apparatus of claim 1, wherein, to send the one or more service primitives to the second component, the processor circuitry is arranged to:
   invoke service primitive calls for the one or more service primitives in a predefined order.

3. The apparatus of claim 1, wherein the one or more service primitives are directly forwarded by the second component to the first component, and the RRAP is to cause the RRE to generate the output based on the one or more service primitives.

4. The apparatus of claim 1, wherein the RRAP is a first RRAP (RRAP1), and the processor circuitry is arranged to:
   install, via the interface circuitry, a second RRAP (RRAP2) to the RRE, wherein the RRAP2 is to cause the RRE to generate the output based on the one or more service primitives.

5. The apparatus of claim 4, wherein, to validate the obtained output, the processor circuitry is arranged to:
   determine whether each service primitive of the one or more service primitives is performed correctly and whether a corresponding action is correctly executed for the RRAP2.

6. The apparatus of claim 1, wherein the output is an output signal, and the RRAP is configured to cause the RRE to generate the output signal for respective service primitives of the one or more service primitives sent to the second component.

7. The apparatus of claim 6, wherein the output signal for the respective service primitives is maintained for a predefined amount of time or until a next service primitive call is sent to the second component, and a periodicity of the output signal is different for at least one service primitive of the one or more service primitives.

8. The apparatus of claim 6, wherein, to obtain the output, the processor circuitry is arranged to:
   measure the output signal from radiofrequency (RF) front-end circuitry of the RRE.

9. The apparatus of claim 6, wherein the output signal is a rectangular clock signal or a triangular clock signal.

10. The apparatus of claim 1, wherein the internal interface is a Multiradio Interface (MURI) or a generalized MURI (gMURI), the first component is a radio control framework (RCF) and the second component is a Communication Services Layer (CSL).

11. The apparatus of claim 1, wherein the internal interface is a Unified Radio Application Interface (URAI) transceiver or a generalized URAI (gURAI), the first component is a radiofrequency (RF) transceiver and the second component is a Unified Radio Application (URA).

12. The apparatus of claim 1, wherein the internal interface is a Reconfigurable Radio Frequency Interface (RRFI) or a generalized RRFI (gRRFI), the first component is a URA and the second component is an RCF.

13. One or more non-transitory computer readable media (NTCRM) comprising instructions for testing an internal interface of a reconfigurable radio equipment (RRE), wherein execution of the instructions by one or more processors of testing equipment is to cause the testing equipment to:
generate and send one or more packets in a first format to a translation entity over a first interface, wherein the translation entity is to translate the one or more packets into a second format for delivery of the one or more packets to a second component of the RRE, the one or more packets including:
at least one first packet to activate a test mode of a first component of the RRE,
at least one second packet to install a Reference Radio Application Package (RRAP) to the RRE, and
at least one third packet including one or more service primitives;
obtain, from the translation entity over the first interface, one or more other packets in the first format, the one or more other packets being translated from the second format to the first format by the translation entity, and the one or more other packets including:
at least one fourth packet including data based on the one or more service primitives; and
validate an output of the RRE based on the data included in the at least one fourth packet.

14. The one or more NTCRM of claim 13, wherein the translation entity is to provide the translated one or more packets to a routing entity disposed between one or more radio computers of the RRE and a Communication Services Layer (CSL) of the RRE.

15. The one or more NTCRM of claim 13, wherein the one or more packets include data or commands to be provided to at least one radio computer of the one or more radio computers, and the at least one radio computer includes the first component or the second component.

16. The one or more NTCRM of claim 13, wherein the first format is an internet protocol (IP), and the second format is an RRE-specific format or a proprietary format.

17. One or more non-transitory computer readable media (NTCRM) comprising instructions for translating test packets for testing an internal interface of a reconfigurable radio equipment (RRE), wherein execution of the instructions by one or more processors of the RRE is to cause the RRE to:
obtain, over a first interface, one or more packets in a first format from testing equipment, wherein the one or more packets including:
at least one first packet to activate a test mode of a first component of the RRE,
at least one second packet to install a Reference Radio Application Package (RRAP) to the RRE, and
at least one third packet including one or more service primitives;
translate the one or more packets into a second format for consumption by a second component of the RRE;
send the one or more translated packets to a routing entity over a second interface;
obtain, from the routing entity over the second interface, data based on the one or more service primitives;
translate the data based on the one or more service primitives into one or more other packets in the first format; and
send the one or more other packets to the testing equipment over the first interface for validation of the data based on the one or more service primitives.

18. The one or more NTCRM of claim 17, wherein the routing entity disposed between one or more radio computers of the RRE and a Communication Services Layer (CSL) of the RRE.

19. The one or more NTCRM of claim 18, wherein, to translate the one or more packets into a second format, execution of the instructions is to cause the RRE to:
convert the one or more service primitives into data or commands to be provided to at least one radio computer of the one or more radio computers, and the at least one radio computer includes the first component or the second component.

20. The one or more NTCRM of claim 17, wherein the first format is an internet protocol (IP), and the second format is an RRE-specific format or a proprietary format.

* * * * *